United States Patent [19]

Bourne

[11] Patent Number: 5,048,552

[45] Date of Patent: Sep. 17, 1991

[54] UNIVERSAL TRIP VALVE OPERATORS AND TRIP ACTUATING SEISMIC VIBRATION SENSORS AND TRANSDUCERS THEREFOR

[76] Inventor: Douglas A. Bourne, 466 W. Valley Stream Blvd., Valley Stream, N.Y. 11580

[21] Appl. No.: 545,193

[22] Filed: Jun. 28, 1990

[51] Int. Cl.[5] ............................................. F16K 17/36
[52] U.S. Cl. ...................................... 137/39; 73/652;
74/2; 74/479; 137/73; 137/77; 251/74
[58] Field of Search .................... 73/652; 74/2, 479;
137/73, 77, 38, 39; 251/74

[56] References Cited

U.S. PATENT DOCUMENTS

| | | | |
|---|---|---|---|
| 1,521,150 | 12/1924 | Colonna | 251/74 |
| 1,586,004 | 5/1926 | Regelein et al. | 73/652 |
| 1,706,704 | 3/1929 | Phillips | 74/2 |
| 1,817,567 | 8/1931 | Karelitz | 73/652 |
| 1,857,220 | 5/1932 | Thumim | 335/190 |
| 2,223,292 | 11/1940 | Maxon | 251/69 |
| 2,255,965 | 9/1941 | Brandon | 137/69 |
| 2,282,348 | 5/1942 | Thumim | 74/2 |
| 2,301,876 | 11/1942 | Hurlburt | 251/69 |
| 2,839,929 | 6/1958 | Hurlburt, Jr. | 74/2 |
| 2,881,276 | 4/1959 | Mintz et al. | 73/514 |
| 3,082,627 | 3/1963 | Yeo et al. | 74/2 |
| 3,095,901 | 7/1963 | Larson | 251/66 |
| 3,098,527 | 7/1963 | Allen et al. | 169/19 |
| 3,117,455 | 1/1964 | Shepherd | 73/492 |
| 3,508,446 | 4/1970 | Yeo et al. | 74/2 |
| 3,518,891 | 7/1970 | Denkowski | 74/2 |
| 3,587,746 | 6/1971 | Venison et al. | 169/19 |
| 3,703,102 | 11/1972 | Pracher | 73/492 |
| 3,785,615 | 1/1974 | Haven | 251/74 |
| 3,788,596 | 1/1974 | Maeda | 74/2 |

(List continued on next page.)

OTHER PUBLICATIONS

*Emergency Shutoff and Firesafe Valves*, Jamesbury Corp., Bul. B132-1; 7/1984.
*Type FSR Fusible Spring-Return Actuators*, Jamesbury Corp., Bul. A182-1; 6/1985.
*Torq-Handle Spring Return Handles*, Jamesbury Corp., Bul. B160-1; 5/1983.
Paz, M., *Structural Dynamics Theory and Computation*, Van Nostrand Reinhold, 9/1980, pp. 144-145.
California Institute of Technology Earthquake Engineering Research Laboratory, *Analyses of Strong Motion Earthquake Accelerograms*, vol. 3—Response Spectra, Part C, pp. 95, 99 and 103, (not dated).
*Sentinel Valves*, Sentinel Valve Co. (not dated).

*Primary Examiner*—Robert G. Nilson

[57] ABSTRACT

A trip valve operator for actuating quarter turn valves comprises a return actuator, multi-stage leverage means for reducing the trigger load, a trigger, and one or more sensors or other trip actuators. The multi-stage leverage means comprises pivotally connected levers in series which form a compact mechanism, variously taking the form of four bar linkage or concatenated four bar linkage, that produces high leverage and low frictional holding torques at the reset position for reliable triggering, and that accommodates quarter turn actuation and can be single action reset. The operating areas of the successive stages of leverage overlap. Other multi-stage leverage means includes a leveraging release lever in which the short leverage arm has a land which lies in a radial plane with respect to the mounting pivot thereof for engaging a previous stage of leverage. Reset is provided by arm means which re-engage near the reset position. The trip valve operator can include by-pass means comprising a two degree of freedom linkage or a floating lever.

An omnidirectional, switched resonating seismic sensor and transducer is combined with the trip valve operator to form a seismic sensitive valve. The sensor comprises a mass element which can move in a horizontal plane, an omnidirectional spring network, a two degree of freedom ball bearing having means for preserving the alignment thereof, and a sliding frictional damper. The transducer converts the two degree of freedom motion of the mass element into a trigger throw and comprises a conical cam and a follower.

49 Claims, 39 Drawing Sheets

U.S. PATENT DOCUMENTS

| | | | |
|---|---|---|---|
| 3,987,679 | 10/1976 | Condon et al. | 74/2 |
| 3,990,039 | 11/1976 | Miller | 73/652 |
| 4,028,510 | 6/1977 | Yamaura et al. | 200/61.45 |
| 4,058,134 | 11/1977 | Komatsu et al. | 137/38 |
| 4,113,063 | 9/1978 | Troy | 251/69 |
| 4,161,183 | 7/1979 | Berry | 137/39 |
| 4,261,379 | 4/1981 | Berry | 137/39 |
| 4,503,717 | 3/1985 | Keller et al. | 251/74 |
| 4,531,533 | 7/1985 | Coombes et al. | 137/46 |
| 4,542,760 | 9/1985 | Flaviani | 251/74 X |
| 4,587,859 | 5/1986 | Coombes et al. | 251/66 |
| 4,689,997 | 9/1987 | Windisch | 73/652 |
| 4,771,643 | 9/1988 | Mott | 251/69 |
| 4,869,459 | 9/1989 | Bourne | 251/58 |

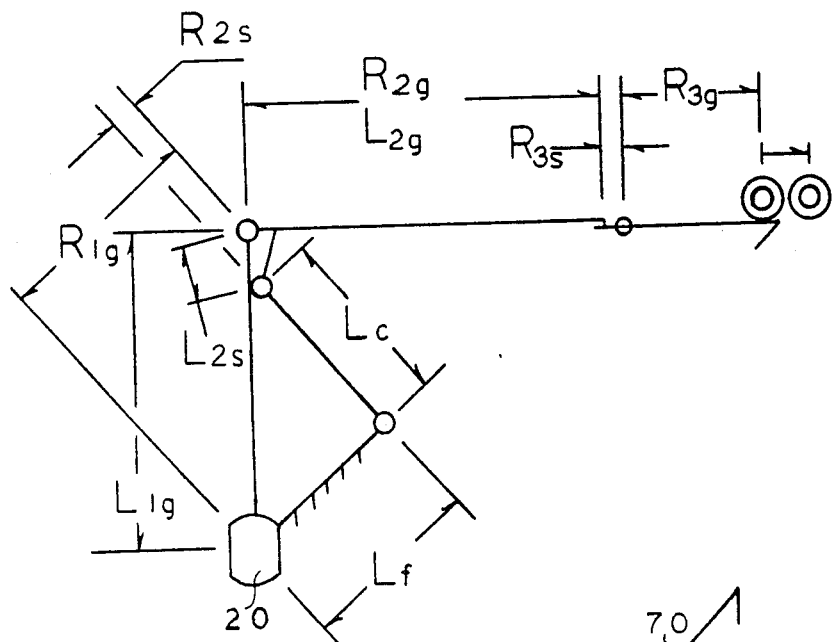
FIG. 3-A
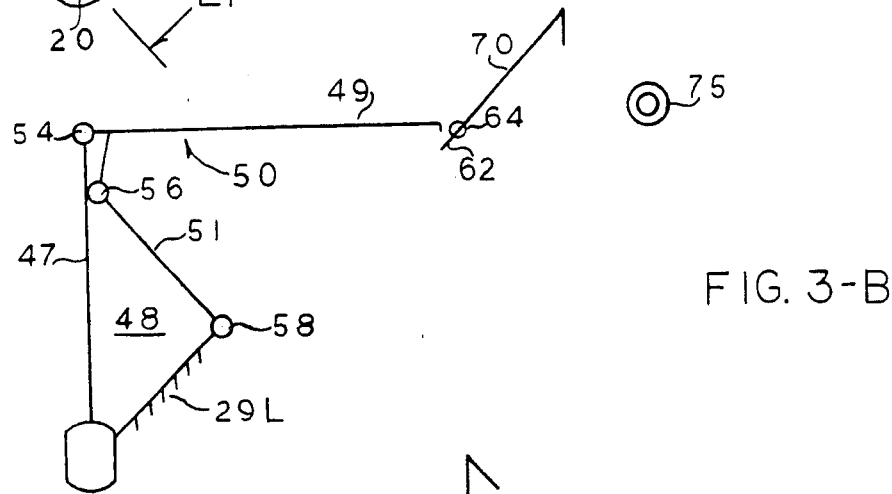
FIG. 3-B
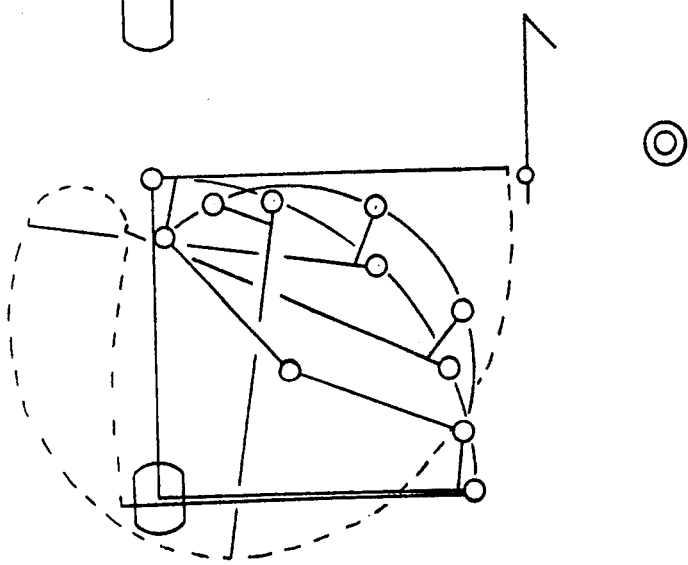
FIG. 3-C

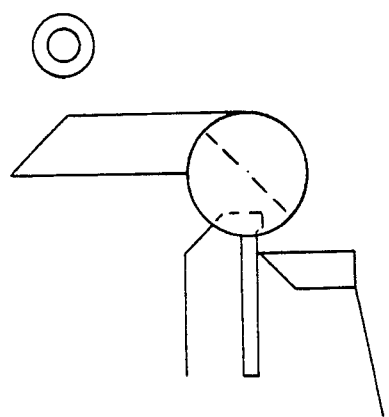
FIG. 4-A
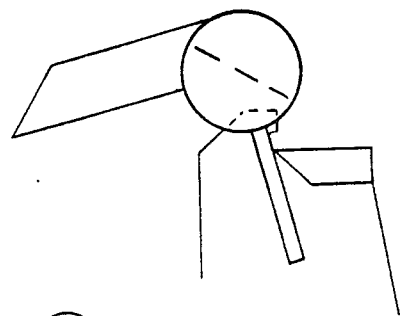
FIG. 4-B
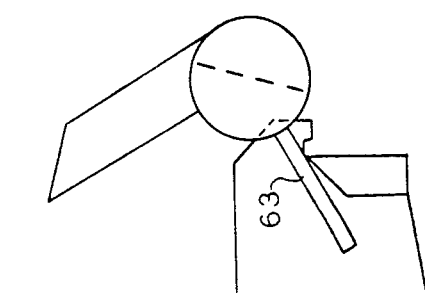
FIG. 4-C
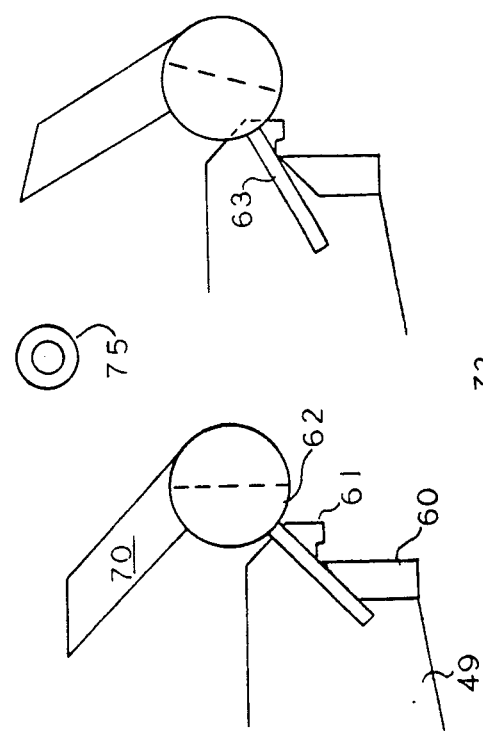
FIG. 4-D
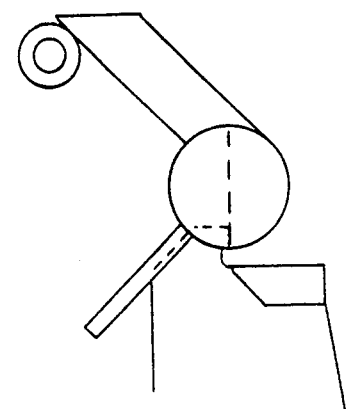
FIG. 4-E
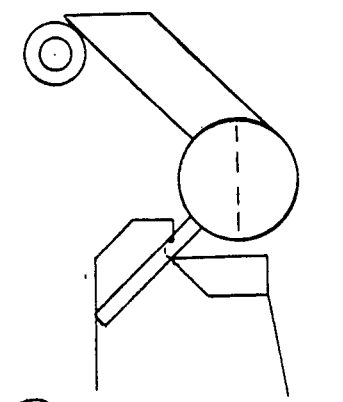
FIG. 4-F
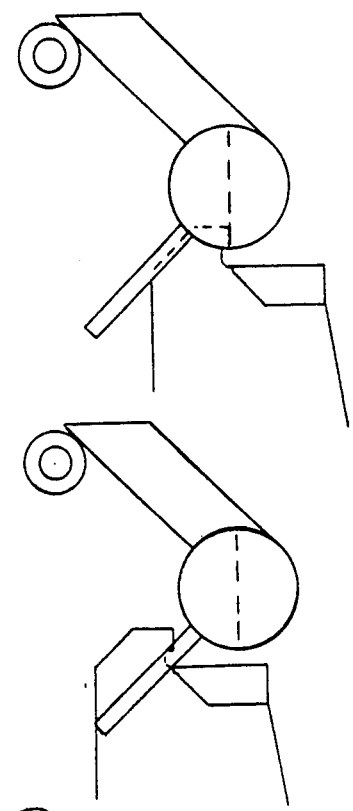
FIG. 4-G
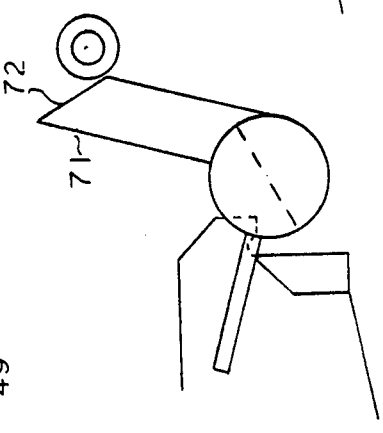
FIG. 4-H

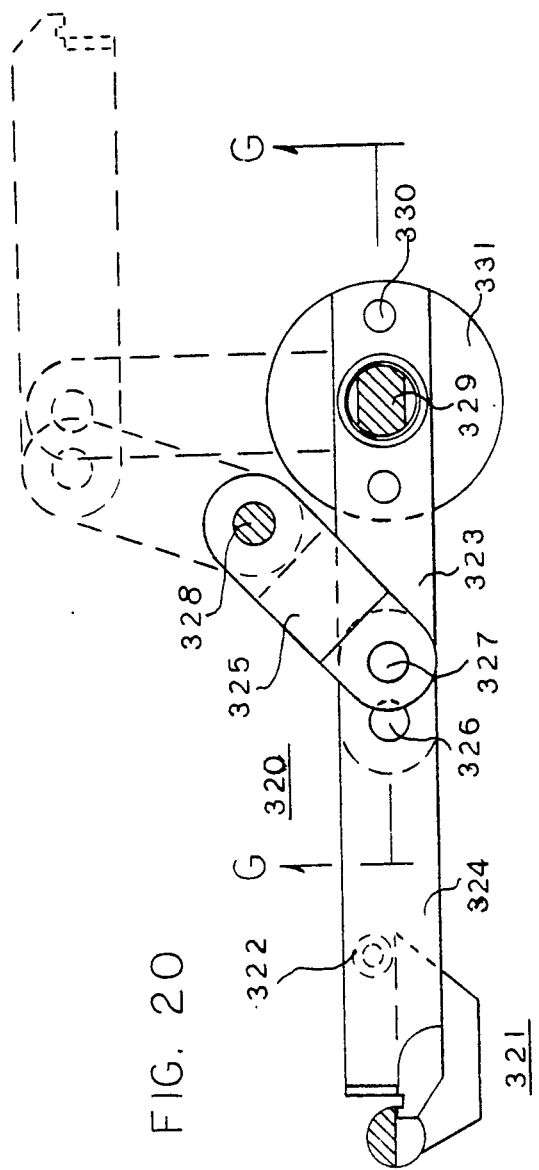
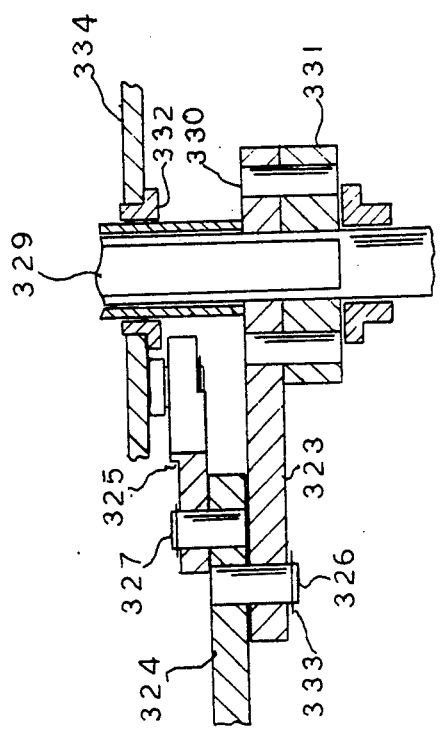
FIG. 20
FIG. 21

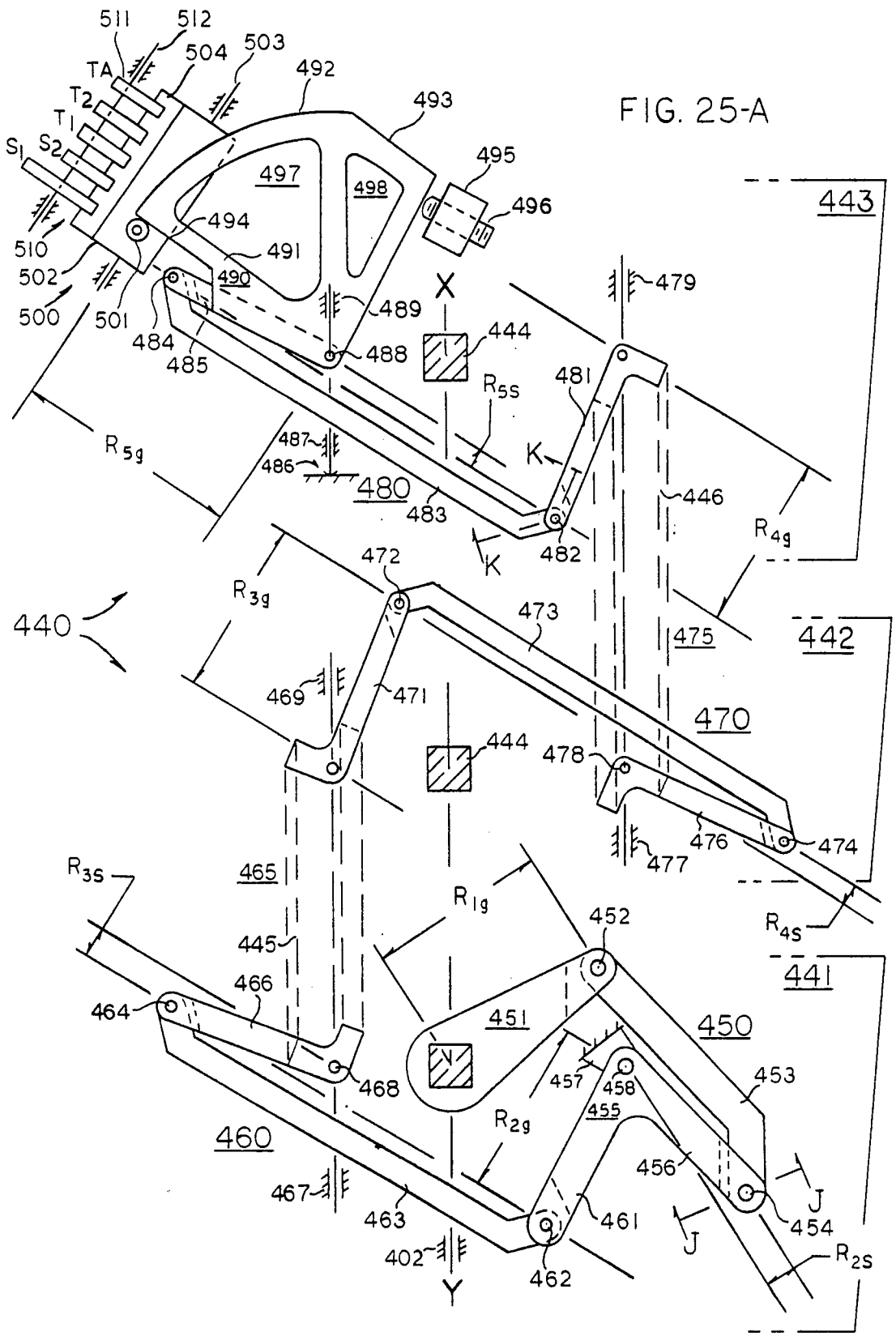
FIG. 25-A

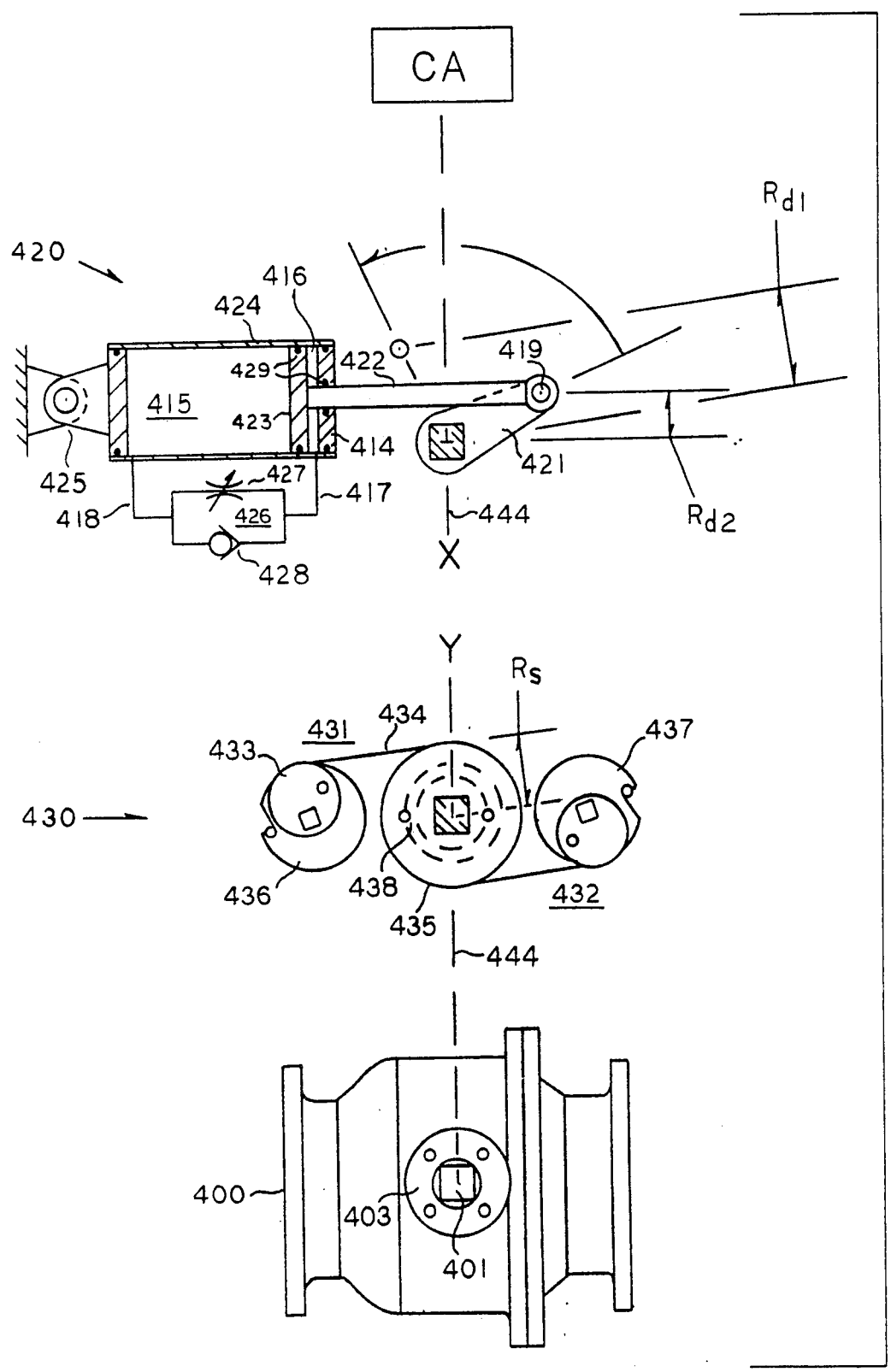
FIG. 25-B

FIG. 43
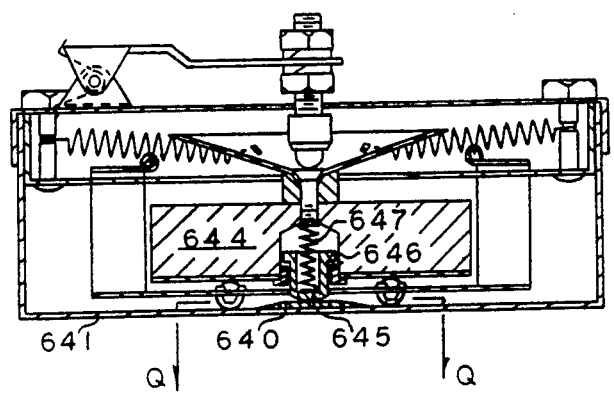
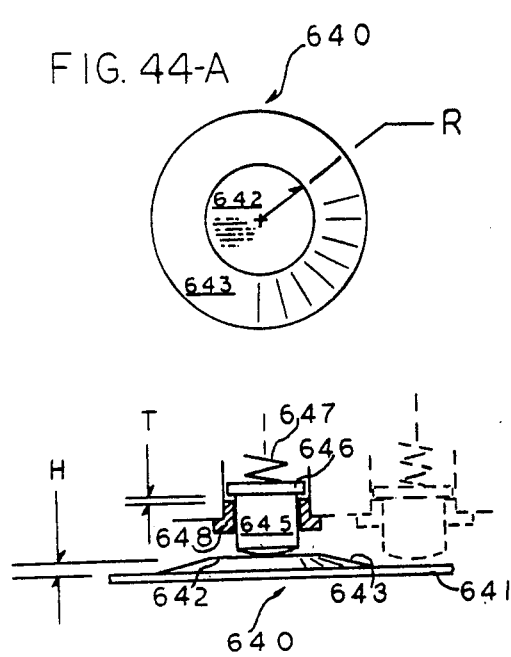
FIG. 44-A
FIG. 44-B
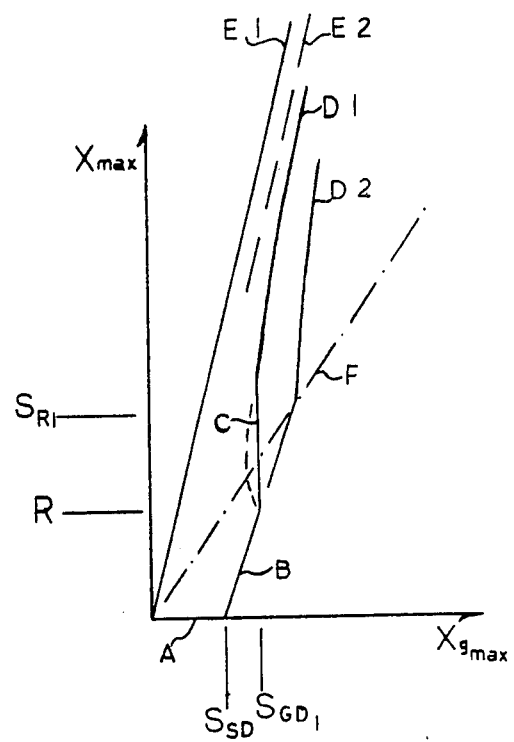
FIG. 45

FIG. 46
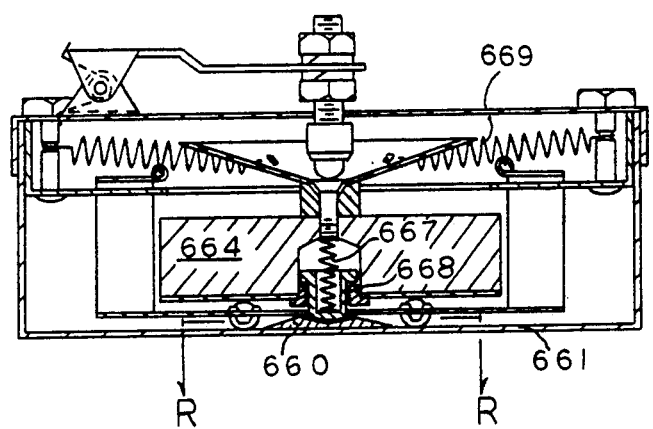
FIG. 47-A
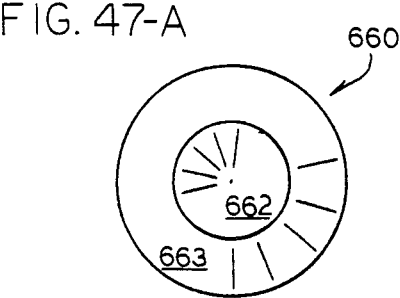
FIG. 48
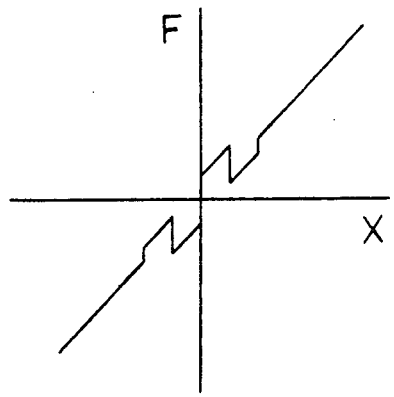
FIG. 47-B
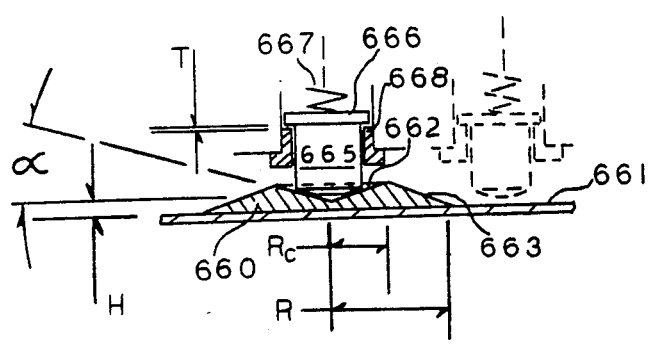

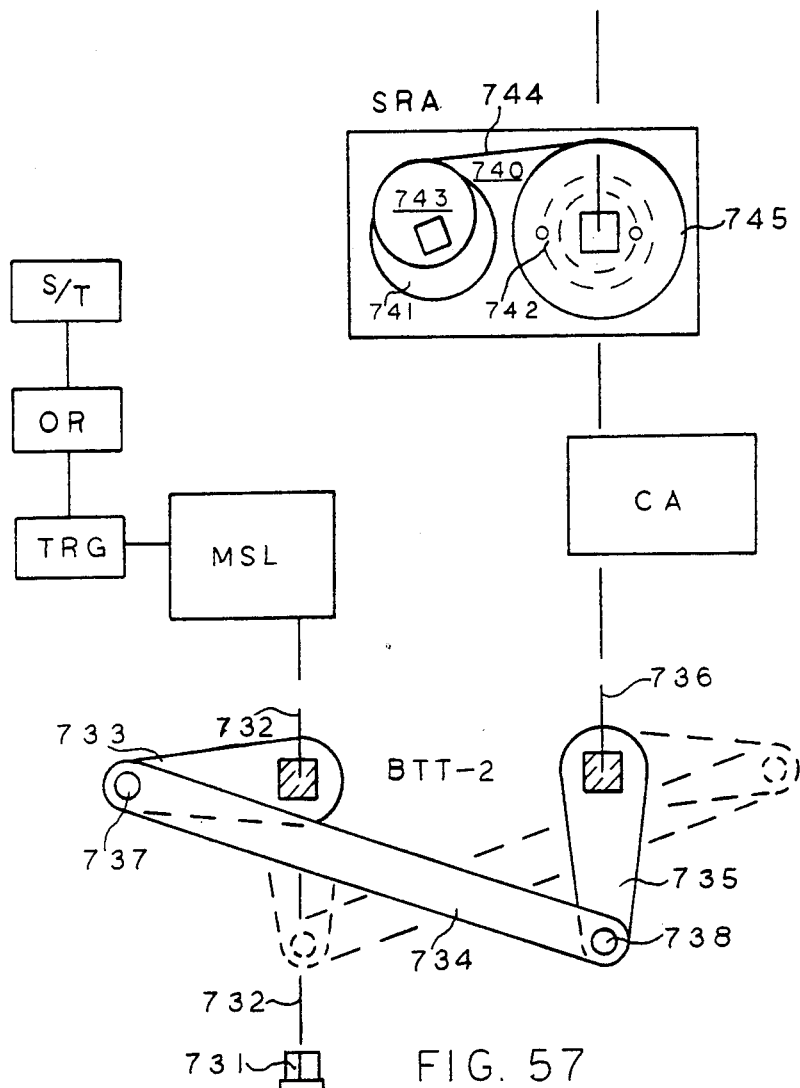
FIG. 57
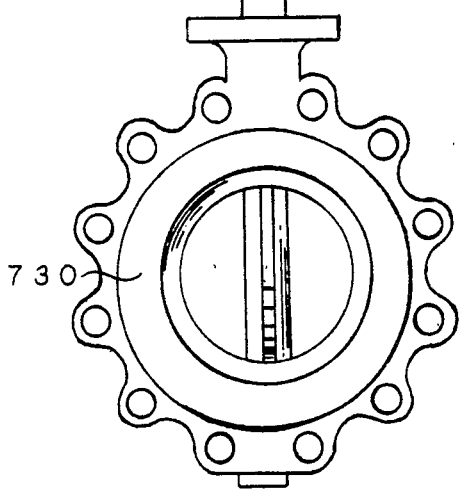
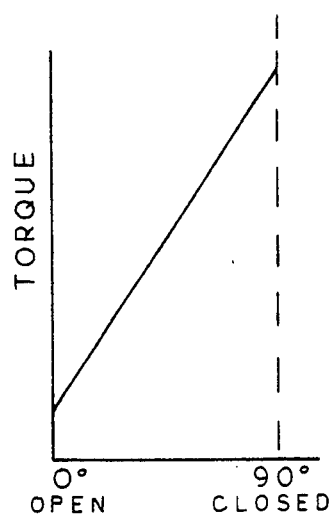
FIG. 58

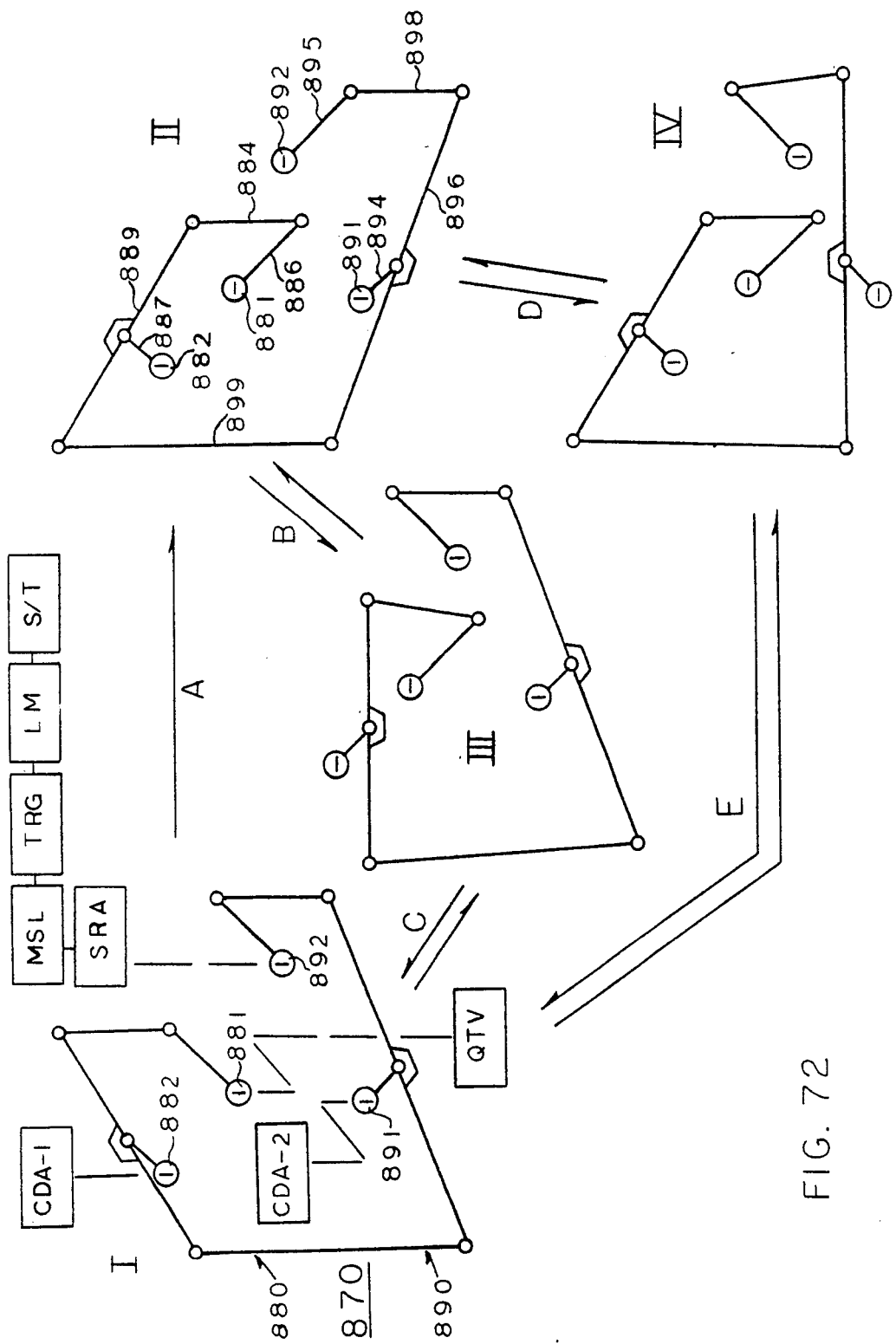

UNIVERSAL TRIP VALVE OPERATORS AND TRIP ACTUATING SEISMIC VIBRATION SENSORS AND TRANSDUCERS THEREFOR

BACKGROUND OF THE INVENTION

This invention relates to trip or trigger type valve operators and in particular to trip type valve operators for actuating quarter turn valving, which are configurable for triggering in response to a variety of sensed conditions as might be needed, for instance, in a safety shutdown of a fluid handling system or emergency activation of safety equipment or hazard suppression equipment. The invention further relates to sensors, transducers and other trip actuators for use therewith and in particular is directed toward a seismic vibration sensor and transducer for detecting damaging earthquake ground motion.

A variety of trip or trigger type valve operators and valves or trip valves are known in the prior art. Such valve operators function by sensing some unsafe condition through some sensing means and then actuating a valve from its reset position to its returned position. The returned position is usually either the closed or opened position of the valve. Depending on the sensors and/or the transducers employed therein, trip type valve operators and their associated valves are known by an assortment of names such as manual reset valve, fusible link emergency shutoff valve, seismic sensitive valve, sprinkler valve, or just a safety valve to name a few. The terms trip and trigger will be used interchangeably.

More specifically, trip valves are used as automatic shutoffs, vents, diverters, etc. in fluid transport, processing and storage systems in order to deal with hazardous conditions such as pipe rupture, excess flow, extreme overpressure, improper startup or control sequence procedures, and fires which can result from equipment failure, control system malfunction, human operator error, accidents, and destructive natural phenomena. These hazardous conditions need to be dealt with quickly before further equipment failures and malfunctions result and in order to minimize possible subsequent additional hazards such as fires, explosions and releases of toxic substances which can lead to loss of life and property and to contamination of the environment. Trip type valve operators also are used as spring returned 'failsafe' type valve operators where the controlled actuator (e.g. manual gearbox or electric gear motor) can not be return actuated by a spring return actuator.

The prior art teaches making trip valves in several ways. A few trip valves propose the use of standard valving such as ball valves or butterfly valves as their valve element while most prior art trip valves use specially designed valves which tend to be modifications of sliding stem globe or angle valves. Standard valves such as quarter turn ball valves and butterfly valves, have relatively high actuation loads whereas the common theme which runs through the special valve element designs is to find ways to reduce the valve actuation load so that the load is not such a problem to provide an actuator for and is not such a problem to trip. This typically involves either removing the usual valve stem packing or seals to reduce friction loads, or using the fluid pressure within the valve to actuate the valve closed and cause the valve plug to seal against the valve seats, or using only small valves which present smaller loads than larger valves, or limiting the maximum operating pressure of the valve to low pressures so that sealing requirements and hence friction loads therefrom are reduced and hydrostatic loads on the valve plug are reduced, or various combinations of these techniques. All of these techniques, however, have the serious drawback of compromising the basic utility and application versatility of the valve element. Such valve elements and their operators are, therefore, of limited use.

Quarter turn valving, such as ball valves and butterfly valves, has all of the following desirable features: high flow capacity and low pressure drops, ample to high pressure ratings, tight shutoff, a proven track record of relatively trouble free operation, stock availability in a variety of materials, stock availability with approval by recognized testing laboratories for a variety of services, economical, and generally speaking enjoys the wide acceptance of various industries, government departments and agencies, and building codes.

The few attempts in the prior art to apply a trip type valve operator to standard quarter turn valving all have various combinations of the following problems.

First, the spring actuators used in prior art trip type valve operators tend to be either impractically large or of questionable ability to meet typical quarter turn valve loads.

Second, the spring actuators used in prior art trip valve operators are not loadmatched to the typical quarter turn valve loads nor are the retensioning loads loadmatched to the reset actuator or controlled actuator and, therefore, are not used efficiently. All the consequences that this problem entails are described in my U.S. Pat. No. 4,869,459 of Sept. 26, 1989.

Third, is the problem of high trigger loads. Quarter turn valves present high loads (typical manufacturers' operating torque specifications for 1", 3", and 6" ball valves are 150, 600, and 3,000 IN.-LB. respectively) and therefore require high output actuators. If these high output actuators were indeed provided in prior art trip valve operators, then they would suffer from high trigger loads. The high trigger loads in turn can produce lock-up, high frictional loads and binding, or unintended triggering. On the other hand, mechanical sensing devices and other trip actuators such as solenoids typically will produce only a few ounces to a few pounds of trip actuating force because of the practical considerations of keeping these devices relatively small so that they can be compactly integrated into a product package and produced economically. Prior art devices do not take the limited sensor output and the high loads at the trigger into account.

Fourth, when the above second problem is considered in the light of the above third problem it will be seen that the second problem makes the third problem worse, in that the excess spring return actuator output at the reset position will directly result in higher force levels at the trigger with correspondingly higher loads for the sensors, transducers and/or trip actuators to overcome.

Fifth is the problem of large frictional torque arms within the tripping devices. Large frictional torque arms can cause a tripping device to bind, regardless of whether the loads therein are large or small. Associated with the problem of large frictional torque arms is the uncertainty surrounding the magnitude of static frictional forces. It will be noted that a static friction coefficient is not a precise design parameter. Repeated measurements of static friction coefficients between any two materials of a given surface finish typically produces a rather wide scatter in the data. Furthermore, effects such as wear, contamination, corrosion, and improper maintanence (i.e. such as never doing any maintanence resulting in the eventual disappearance or gumming or varnishing of the lubricants or perhaps putting lubricants on parts which should not have any lubricant) will lead to wide variations in the level of static frictional forces. Hence, any tripping device dependent upon a precise level of static frictional forces for proper operation, will in fact be subject to trip failure where the trip will not actuate when it is supposed to release the return actuator due to high-side variations in static friction or will lead to nuisance actuations where the trip actuates when it is supposed to continue to hold the return actuator due to low-side variations in static friction.

Sixth is the problem of compactness. The size of prior art trip type valve operators for quarter turn valves tend to be large in comparison to the size of the valve being controlled.

Seventh, many of the devices proposed in the prior art are not capable of a single action reset as might be accomplished manually with a simple lever handle or in a power assisted manner with for example a hydraulic cylinder. These prior art devices tend to require the manual reassembly and realignment of various arms and other parts thus making them difficult to use and perhaps inviting tampering with their internal workings.

Eighth is the problem of scaling up a trip valve operator so that it can operate larger sized valves without having to increase the trip actuating output and therefore size and cost of the sensors, transducers, and/or trip actuators. (Aside from size and cost, increases in sensor and transducer sizes can result in reduced sensitivity and slower response times.) The prior art, however, does not address or contemplate this scaling problem and a solution appears to be beyond its capabilities. My analysis of various valve manufacturer's operating torque specifications indicates that many make and models of intermediate to larger sized ball valves have operating torque requirements which scale approximately as the nominal valve size squared. In some series of smaller ball valves operating torque scales roughly with the valve size to the 1.3 to 1.5 power. At least one intermediate sized line of ball valves shows nearly a cubic relationship. In some butterfly valve series, operating torque scales approximately as the valve size squared while in some other series the operating torque scales approximately as the valve size cubed. In attempting to scale up prior art trip valve operators to accomodate larger sized valves where the valve operating torque is increasing as the second or third power of the valve size and also attempting to keep the trigger load constant so that the sensors and transducers and their trip actuating outputs can remain constant, one finds that prior art trip valve operators grow in size, and therefore weight and cost, so as to be completely out of proportion to the valves that they are intended to operate. Just taken alone, this problem indicates that prior art trip valve operators are, at best, impractical for application to anything more than the smallest valving.

It will be noted that the commercially available fusible link trip type valve operators for quarter turn valves have drawbacks in that, due to the above noted problems, other typical trip actuators such as a solenoid or a vibration sensor can not be substituted for the fusible link. Such a valve operator, therefore, lacks versatility. Also, these valve operators and the valves operated thereby are subjected to the same heat or fire which destroys the fusible link to cause triggering and can, therefore, be severely damaged by said heat or fire.

Some trip type valve operators in the prior art incorporate a simple toggle. Simple toggles have the property of providing mechanical advantage or leverage, thus reducing to some extent the load imposed on the tripping devices. Simple toggles, however, are subject to some debilitating tradeoffs. For a simple toggle to produce more leverage in order to reduce the trip or trigger load, the knee of the toggle must be brought closer to being straight. But, the straighter the knee of the toggle becomes, the lower the releasing forces and torques become. If the releasing torques are less than the frictionally induced holding torques, then the toggle binds and will not self release. My analysis of the friction effects in a simple toggle with some conservative assumptions about static friction coefficients ($u=1$), indicates that the knee pivot should remain at least two pivot radii from the straightened position in order to reliably self release when tripped, thereby limiting the leverage obtainable by straightening the toggle. Alternatively, increased leverage can be obtained from a toggle by increasing the length of the toggle links, but this is not desireable either because the size of the valve operator is increased, whereas compactness is generally sought. A further problem to the use of simple toggles in trip type valve operators is that simple toggles do not have the scaling properties to allow trip actuating sensors and transducers to trip progressively larger valve loads in a practically sized trip valve operator, as described above. Simple toggles in the prior art are used on sliding stem type valves and therefore, for a given pressure rating, valve load will scale as the valve size squared. For reasons of material strength, pivot shear area would have to scale with the valve load. If the toggle was scaled up in the same proportion as the valve size then the length of the toggle links would increase which would provide increased leverage, but the enlarged pivots also must be positioned further away from the straightened position (in order to provide a reliable self release when tripped) which would provide decreased leverage. The two opposing changes in leverage cancel out and the result is that as the toggle is scaled up, there is no increase in leverage. Hence, the trip actuating output and therefore the size and cost of the sensors and transducers would have to scale up as the valve size to the second power. Alternatively, if the sensors and transducers were not to be scaled up, then to reduce the trip actuating load, the length of the toggle links would have to be scaled up as the valve size cubed which is not desireable as, again, compactness is sought. Either way or splitting the scaling between the toggle size and the sensor trip actuating output, this scaling problem is a major limitation to the application of a simple toggle to trip valve operators. The above problems are made worse when the toggle is made to self lock rather than self release as the trip actuator, in order to produce triggering, has to do work against the friction in the toggle in order to actuate the toggle to a point where the toggle will self release.

Other trip type valve operators in the prior art incorporate disengageable arms and/or levers. These devices suffer variously from insufficient leverage, large operating area requirements, large frictional torque arms and consequent unreliable release from the reset position upon tripping, lack of a single action reset capability, and inability to scale up in proportion to the size of the valve and provide a trip load which does not increase.

Some trip type valve operators in the prior art are termed 'free handle' manual reset valves and contain a solenoid trip actuator and a manually operated handle type reset actuator. Once tripped, the 'free handle' effect causes the valve to be incapable of being reset until the condition which caused tripping is cleared. None of these are based on quarter turn valve technology.

Other trip type valve operators in the prior art are spring returned electric gear motor valve operators. The purpose of the spring return actuator is to provide a failsafe. In some of these valve operators, the electric gear motor actuator first retensions the spring return actuator and then actuates the valve rather than actuating both simultaneously. Some of these use large and costly arrangements of gears, splines, and leadscrews. Others have return actuators and tripping devices which must move as a mounted unit with respect to the valve thereby causing such valve operators to be about twice as large as valve operators where the return actuator and tripping device are mounted to a stationary frame and necessitating the movement of the control connections to the tripping device. Such movement can cause electrical wire type connections to eventually fail and can make the connection of many kinds of remote sensors through mechanical transmission means very difficult and impractical.

The need for seismic sensitive trip valves or just seismic valves is apparent. Fires and conflagrations resulting from earthquake shake damage have been known to be a cause of major property losses, sometimes many times larger than the direct shake damage. In the 1906 San Francisco Earthquake and Fire, the subsequent fires are reported to have caused as much as ten times the damage directly attributable to earthquake shaking. Leakage of flammable, explosive, and/or toxic fluids from broken piping and broken piping connections to various equipment significantly contributes to the fire and conflagration danger after a strong earthquake. Recent projections by seismologists, as reported in various scientific journals and news reports, indicate the likelihood of a magnitude 7.5-8+(Richter Scale) earthquake on the San Andreas Fault in Southern California within the next 30 years. Current estimates of property losses vary quite a bit, but tend to be in the 10 to 30 billion dollar range. Similar projections have been made for a magnitude 7-7.5 earthquake on the Hayward Fault near the San Francisco Bay Area. (It is interesting to note by comparison, however, that most estimates of damage due to the Loma Prieta earthquake of 10/17/89, magnitude 7.1, on the San Andreas Fault near Santa Cruz, but not particularly close to the Bay Area as a whole, have been put at 7 billion dollars.) If, however, numerous fires were to start and spread following these projected earthquakes, aided and abetted by leaking flammable or exposive fluids, and the fire fighting response were sufficiently hampered, as could be caused by broken water mains or leaking toxic fluids, then large fire and conflagration losses relative to the amount of shake damage would be possible, in which case the above loss estimates may well be low.

Experience in previous earthquakes (e.g. San Fernando 1971 and Whittier 1987) has shown that utilities, including natural gas pipes, water pipes, sewer pipes, and electrical lines, both those within buildings and those buried in the ground are subject to many breaks. Escaping natural gas is obviously an explosion and fire hazard and, in fact, numerous news reports of the Whittier 1987 quake indicated that there were about 65 natural gas fires just in the City of Los Angeles due to broken piping. Piping within chemical and hydrocarbon processing plants, airport fuel storage facilities, water treatment plants and sewerage treatment plants, to name a few, can also be broken as a result of strong ground motion with subsequent release of toxic gases (e.g. chlorine) and various explosive and flammable gases and liquids.

Manual shut-off of valves and switches is the currently planned method for dealing with the above situation. However, earthquakes give no warning and as yet are considered unpredictable in any relatively short time frame. Thus, no last minute emergency preparations, such as utility shut-offs, can be made. Further, most buildings are unoccupied or only lightly occupied during a substantial fraction of a day (businesses at night, residences during the day, often both on weekends). Hence, these important shut-offs will probably not be made in anything like a timely manner, thus increasing the chances of losses. If persons were in a particular building at the time of a strong quake, conceivably they could be injured or incapacitated and be unable to deal with the emergency. Lastly, there is always the chance of a panicked reaction during such situations. To put the matter plainly, any scheme for the manual securing of critical fluid lines during the emergency following a large or a great earthquake will be unreliable and invites enormous losses.

ANSI and the State of California have both issued standards determining minimum levels of acceptable construction and performance for seismic shutoff valves for natural gas service, ANSI Z21.70 and California Standard No. 12-23-1 respectively. In fact, the California standard is now state law. These standards call for a seismic shutoff valve to actuate when exposed to simple harmonic motion of 0.3 g amplitude at a period of 0.4 sec and not to actuate when exposed to simple harmonic motion of 0.4 g amplitude at a period of 0.1 sec, 0.08 g amplitude at a period of 0.4 sec, and 0.08 g amplitude at a period of 1.0 sec. It should be noted, however, that seismic ground motion is not simple harmonic motion.

Prior art seismic shutoff valves suffer from a number of various problems including the type of sensor used, the predictability of the sensor setpoint (not only when exposed to test stand simple harmonic motion but also when exposed to seismic motion), the sensitivity of the sensor to being out of level, and the ability of the sensor to generate sufficient force and displacement output to actuate a trigger. Additionally, prior art devices suffer from the problems of trip valve operators already noted and also encounter problems concerning the type of valving used.

Prior art devices use a variety of means for sensing ground vibration of which a ball or balls rolling or hopping over a lip seems to be the most common. Several problems tend to occur in these type of devices. First, the setpoint for triggering in response to horizontal earthquake ground motion can be interfered with by the vertical component of the earthquake ground motion. Second, the trip actuating output depends on the weight of the ball which for a relatively compact device will be small. Third, resetting a freely moveable ball requires either manual replacement of the ball (which is generally undesirable because the valve operator or valve must then be entered thereby increasing the chances for misuse, malfunction, and tampering) or the provisioning of extra mechanisms so that the ball may be restored to its seat. Fourth, small deviations from level will interfere with the setpoint.

A few prior art devices use sensing elements which are based on pendulums or on inverted pendulums. These devices also encounter problems. First, pendulums have a gravity based restoring force due to the arcuate nature of pendulum motion. Therefore, the response of a pendulum to horizontal seismic ground motion can be interfered with by the vertical component of the seismic ground motion thereby either degrading the accuracy of the triggering setpoint or making the triggering setpoint unpredictable. Second, pendulums tend to be rather long in vertical height which consequently causes the seismic sensitive trip valves into which they are integrated to not be particularly compact devices. It will be noted that attempting to impose size constraints on a pendulum type sensor undesireably affects basic setpoint parameters of the pendulum, as the length of the pendulum determines its natural frequency. Third, pendulums configured for sensing horizontal motion can not additionally function as a vertical motion sensor.

Problems are encountered by those attempts in the prior art to provide an inertia mass type sensor which is supported by bearing balls or rollers. In one such device, bearing balls are loosely located in sockets. Such bearings are likely to fail because no means are provided for retaining and aligning the bearing balls with respect to the inertia mass or supporting plane. It is to be expected that alignment would be lost after a few oscillations of the sensor. When a bearing ball reaches the edge of its socket it will stop rolling and start sliding with respect to the surfaces with which it is in contact thereby creating substantial friction. Also, if the valve is tipped or inverted, as is likely during shipping, handling, and installation, then the bearing balls will most likely come out their sockets, thereby producing bearing failure.

Most prior art seismic trip valves do not incorporate or have the ability to operate an industry standard valve, in particular a quarter turn ball valve or butterfly valve, which has high flow capacity, ample pressure ratings, tight shut-off, a proven track record of trouble free operation, and commercially available with ratings for use in various pertinent services such as natural gas, crude oil, gasoline, aircraft fuel, and chlorine and other toxic gases. Lack of such features in any safety valve would be a serious drawback to commercialization.

SUMMARY OF THE INVENTION

The primary objectives of the invention are:

1. provide universal trip valve operators for use on standard quarter turn valving, such as ball valves and butterfly valves. Said trip valve operators are to provide reliable triggering, and be relatively compact, single action resettable, and of a relatively simple and low cost construction.

Said trip valve operators and the trip valves formed therefrom are to be universal or general purpose in nature with respect to:

(a) the types of sensors, transducers or trip actuators and logic combinations thereof which can be used to control the triggering of said trip valve operators;

(b) whether said trip valves are used as a dedicated final control element, or as a stand-alone control, or both;

(c) the type and number of controlled actuators used in or with said trip valve operators;

(d) the fluid service to which said trip valves can be applied.

Said trip valve operators are to be of such design as to be capable of being provided for any size quarter turn valve.

2. provide triggerable devices, for use in universal trip valve operators of the above character, which generate a high degree of leverage at the reset position thereof for reducing the trigger load while generating minimal frictional torque. Said triggerable devices are to provide multiple stages of leverage, have at most minimal friction torque arms therein, be self releasing from the reset position thereof, be quarter turn compatible, be single action resettable, acheive a high degree of compactness through overlapping areas of operation of component parts, and be capable of being scaled up in proportion to the size of quarter turn valving while providing only slow or no growth of the trigger load.

3. provide compact and efficient spring return actuators for use in trip valve operators of the above character.

4. provide by-pass devices for use in universal trip valve operators of the above character. Such by-pass devices are to be based on a two or more degree of freedom multiple bar type linkage which enables all actuators and the triggering device to be mounted to a stationary support structure. Said by-pass devices are not to significantly distort actuation characteristics.

5. provide logic means for use in trip valve operators of the above character which enable multiple sensors, transducers, and/or trip actuators to operate said trigger element.

6. provide specific combinations of the above devices in trip valve operators of the above character in order to form:

(a) manual reset valves;

(b) 'free handle' manual reset valves;

(c) electric gear motor, spring returned failsafe valve operator;

(d) remote sensing fusible link type safety valves;

(e) valve operators (double acting or spring returned, powered or manual) with a trip type safety override;

(f) valve operators with non-cycling spring return actuators;

(g) seismic sensitive trip valve operators both with and without other sensors and trip actuators;

(h) seismic sensitive trip valve operator with a multiple stage of leverage device and a by-pass device;

7. provide seismic sensitive trip actuators for valve actuation applications as well as other applications such as door or electrical switch operators.

8. provide a vibration responsive device for detecting seismic motion and to be used in trip valve operators of the above character and other devices, which provide:

(a) a predictable and accurate acceleration, frequency triggering setpoint;

(b) omnidirectional sensing in a horizontal plane;

(c) transduction of said omnidirectional response motion into a simple trigger throw motion;

(d) a sensing element response that is amplified at the triggering setpoint;

(e) damping for switching the response of the sensing element so as to reduce sensitivity to minor vibrations but leave the amplification factor unchanged;

(f) a transducer which trades said amplified response for an amplified actuating force to be applied to a trigger;

(g) relatively wide leveling tolerances;

(h) vertical motion sensing and transducing capability; and in which, (i) the horizontal response is independent of and immune to seismic motion in the vertical direction.

9. provide vibration responsive devices of the above character which are compact, simple, reliable and low cost.

10. provide a vibration responsive device of the above character in combination with a trip valve operator of the above character and a quarter turn valve which meets or exceeds the California 12-23-1 and ANSI Z21.70 standards.

One of the main points of the invention is to provide novel trip load reducing devices for overcoming the previously described triggering problems of the prior art and thereby enable relatively small output sensors and transducers to reliably trip the relatively high output actuators which are necessary for operating quarter turn valves. These trip load reducing devices then produce a high degree of leverage at the reset position which is used to reduce the trigger load, will not bind or stick due to friction, operate within small space requirements, are single action resettable, accomodate a quarter turn actuation, and can be scaled up to handle larger quarter turn valve actuation loads without growing out of proportion to the dimensions of the valving. The construction of the trip load reducing devices is based on relatively simple, and hence inexpensive, rotatably connected arm, lever and link type components which are interconnected and arranged so that levers act in series to provide multi-staged leveraging. Overall these trip load reducing devices can assume the form of novel four bar linkages, novel concatenated four bar linkages, and novel leveraging release levers.

The terms trip and trigger are used interchangably and generally refer to some means for controllably holding and releasing a force or torque load (i.e. as produced by the return actuator). Such a trip or trigger can be a moveable element operatable between a hold position and a release position or can be immovable means (e.g. a solenoid) which provide a controllable force which acts directly to restrain the trip load. The term thrust pivot will be used to refer to the rounding or pointing of a pin or shaft end for providing a low frictional torque thrust bearing. The term mechanism, as used herein, refers to a device having one kinematic degree of freedom. Those devices, linkages, or mechanisms having two degrees of freedom will specifically be referred to as two degree of freedom mechanisms, linkages, etc. The term linkage refers to a closed kinematic chain. The term multiple bar linkage refers a linkage constructed from bar type simple links, arms and levers and from bar or plate type compound links, arms and levers. The term leverage is used generally and is synonymous with mechanical advantage. The term quarter turn should not be taken as meaning exactly 90 degrees. Many quarter turn ball valves, although intended to have a 90 degree actuation stroke, actually can be actuated from a full open position to a barely closed position in as little as about 80 degrees.

The novel multistaged leverage devices for reducing the trip load are able to provide high leverage in a relatively small space as the total leverage generated thereby is the product of the leverage of each of the stages of leverage while the size of the leverage device is related to the sum of the lengths of the various levers. Reliable self-release from the reset position is assured by minimizing the frictional torques within the leverage device and leaving sufficient releasing torques within the leverage device to overcome the largest credible frictional torques therein. Frictional torques are minimized by using relatively small diameter interconnecting pivots, with due regard to providing sufficient strength in the pivots however, and by minimizing other frictional torque arms. When actuating between the reset position and the returned position, the leverage device is a novel quarter turn capable mechanism which enables a single reset action, as provided by the reset actuator, to reset the leverage device and tripping means along with the valve and return actuator. In some embodiments a novel last stage of leverage, which disengages from the other leverage stages after triggering, has intermeshing means for re-engaging itself during reset. The ability of the multi-staged leverage device to operate within a small space is enhanced by having the operating areas of the various elements of the second stage overlap with the operating area of the first stage. Where many stages of leverage are provided, space is conserved by stacking the stages atop each other so that the chain of pivotal interconnections roughly follows a helical pattern. Scalability of the multi-stage leverage device at substantially the same rate as the size of the valve while preserving a substantially constant trip actuation load or only allowing growth of the trip actuation load which is proportionally smaller than the growth of the valve size (e.g. trip actuation load scales as the square root of the valve size) is provided by scaling the long torque arms at the same rate as the valve size while scaling up the pivot diameters and short torque arms at a slower rate (e.g. as the square root of the valve size), scaling up the number of shear areas on the pivots, and increasing the number of stages of leverage. With this number of scalable design parameters, even valve torque which scales as the valve size cubed can be overcome to maintain a constant trip load.

The trip valve operator according to the invention for operating quarter turn valves such as ball valves or butterfly valves, generally comprises a return actuator, a reset actuator, novel leveraging means for reducing trip actuation loads which comprise at least two stages of leverage which are connected by a rotatable connection and form a one degree of freedom mechanism, and means for triggering which, for example, can include a movable trigger element and various sensors, transducers, trip actuators or logic combinations thereof or can be a direct acting solenoid.

The return actuator couples to the quarter turn valve and is for actuating the quarter turn valve from the reset position to the returned position. The returned position will generally correspond to either the opened or closed position of the valve but, it will be understood could be some intermediate position. The return actuator is either a spring return actuator or some other type of stored energy actuator (e.g. weight actuator, compressed gas actuator or 'gas spring'), but preferably and advantageously is a spring return actuator of the type disclosed in my U.S. Pat. No. 4,869,459, issued Sept. 26, 1989, having a bias transmitting and transforming device in which the natural output of the spring elements is transformed by varying torque arm devices in the form of eccentric spools and flexible elements or in the form of four bar linkage so that the spring return actuator is more closely loadmatched to the quarter turn valve torque load and the preload in the spring elements is minimized. This loadmatching and preload reduction enables the spring return actuator to be relatively compact and low in cost, and in particular enables the spring return actuator to provide an output which is approximately equal to, instead of much greater than, the valve load at the reset position which directly produces lower trigger loads. Torsion springs, perhaps nested, are the preferred spring elements.

The novel multi-stage leveraging means for reducing the trip load connects to the return actuator and enables the triggering means, by acting therethrough, to reliably hold and release the return actuator. First novel multi-stage leveraging means for reducing the trip load are comprised of pivotally interconnected levers in series which produce at least two stages of leverage at the reset position and which form a one degree of freedom mechanism when actuating between the reset position and the returned position thereof. The first stage lever connects to the output shaft of the return actuator, preferably by a direct coupling thereto, but could also be through some mechanism which couples to the output shaft, and is used to generate a first torque arm at the reset position. The second stage lever connects to the first stage lever through means providing a rotatable connection and is used to produce a second stage relatively short torque arm and a second stage relatively long torque arm at the reset position. The second stage short torque arm interconnects with the rigid frame of the trip valve operator while the second stage long torque arm interconnects with the tripping means. The stages of leverage can be directly connected by a rotatable connection, as in the first embodiment, or can be connected by a connecting link and rotatable connections as in the third embodiment. Preferably, all stages of leverage are self-releasing from the reset position thereof, as opposed to self-locking, so that the triggering means only have to provide a restraining force rather than having to do work against frictional loads in actuating the stages of leverage from a locked position to a point where the stages of leverage finally release.

Where the stages of leverage are directly connected by a rotatable connection, the second stage short torque arm can connect to the frame through a connecting link and rotatable connections to produce a novel four bar linkage, as in the first and second embodiments, or through a pin and track device, as in the third alternate embodiment thereto. The second stage short torque arm can be produced by a distinct arm in the second stage lever which has a shorter length, as measured between pivot centers, than the first stage torque arm and the second stage long torque arm, or the short torque arm can be the result of angles within the four bar linkage which produce a short torque arm at the reset position.

Where the stages of leverage are connected by a connecting link and rotatable connections, the second stage lever is connected to the rigid frame by a direct rotatable connection, thus forming a four bar linkage. Such four bar linkages can be repeatedly chained together or concatenated to form many stages of leverage. Preferably, as in the third embodiment, at the reset position the first four bar linkage maximizes the first stage torque arm while permitting the second stage short torque arm to be suitably small. (That is, small enough to provide high leverage, but sufficiently large to overcome the induced frictional torques within the linkage. According to my analysis of this particular four bar linkage, when using plain sleeve bearing type pivots the minimumm short torque arm, Rs, which can cause release of the linkage from the reset position is related to the pivot radii, Rp, and coefficient of friction, u, thereon as follows:

$$Rs \geq 2uRp$$

It is desirable to set the short torque arm to be large enough to overcome the largest credible coefficient of friction which can be expected times some reliability factor. For instance, if the largest credible friction coefficent is $u=1$ and a safety factor of 2 is desired, then $Rs=4 Rp$. While the first stage lever actuates a quarter turn, the second stage tends to actuate approximately in the range of 130 to 140 degrees. Preferably, subsequent stages and interconnections are based on symmetric four bar linkages which use the second stage actuation angle because the design and manufacturing of the subsequent stages is simplified. The term symmetric four bar linkage refers to a four bar linkage used between the reset and returned positions where the orientation of the four bar linkage at the reset position is the mirror image of the orientation of the four bar linkage at the returned position. The two frame pivots of a symmetric four bar linkage, therefore, have the same actuation angle. This symmetry feature has the advantage of simplifying the kinematics of concatenated four bar linkages.

Second novel leveraging means for reducing the trip load, which will be termed a leveraging release lever and which are preferably used with the first novel leveraging means as a final stage of leverage, are comprised of a lever which is rotatably connected to the rigid frame of the trip valve operator at a frame pivot and which has a long arm, a short arm and a reset arm. The short arm has a radially oriented contact area or land, with respect to the frame pivot, which engages the long arm of the previous stage of leverage. The land, therefore, directs the frictional forces produced by the contact of the previous stage with the short arm substantially through the center of rotation of the frame pivot thereby producing no frictional torque. Therefore, the only torque arm on which any frictional forces act is the radius of the frame pivot which in general will be rather small. Very reliable release can be assured with the small torque arm being some small multiple (e.g. two times) of the frame pivot radius. The long arm engages the tripping means. When triggered the leveraging release lever rotates and releases the previous stage of leverage. A light positioning spring holds the leveraging release lever against a stop to define the returned position thereof. During reset actuation intermeshing means on the previous stage of leverage engage the reset arm and cause the leveraging release lever to rotate back to the reset position and re-engage the triggering means.

The triggering means engage the final stage of leverage at the reset position and maintain the final stage of leverage at the reset position thereof. Upon the actuation of a sensor or transducer, the triggering means cause the release of the final stage of leverage and consequently the valve operator actuates to the returned position. As the final stage moves quickly from the reset position, pulsed triggering will work just as well as stepped triggering. Pulsed triggering refers to a trigger motion which is oscillatory in nature between the hold position and the release position. Pulsed triggering is used to advantage with the seismic sensor and transducer as the sensor itself does not have to be reset. Stepped triggering refers to a trigger which moves to the release position and remains there until the sensor or transducer is reset or the sensed condition is cleared. The term transducer, as used herein, refers to a device or perhaps series of devices which converts or transduces the raw output of a sensor into a simple displacement type motion which is capable of actuating a trigger. Those sensing devices which commonly go by the name transducer (e.g. pressure transducer, temperature transducer) wherein the raw output of a sensing element is transduced into an electrical signal of analog or digital nature, will be termed electrically transduced sensors herein.

Preferably the triggering means is comprised of a pivoted arm with an anti-friction bearing (i.e. miniature ball bearing) or roller at its end. The bearing contacts a land on the final stage of leverage. The pivoted arm is lightly spring loaded to maintain the engagement with the final stage of leverage. During the reset actuation, a ramp on the final stage of leverage enables the deflection of the pivoted arm, against the spring bias, so that the final stage of leverage can reach the reset position.

As the trip valve operators according to the invention can be used with a wide variety of trip actuators including various sensors and transducers, and because the triggering loads and hence actuation requirements are low, and as the return actuator output torque can reliably actuate standard quarter turn valving, the trip valve operators according to the invention, therefore, are of a general purpose or universal nature. For instance, a solenoid is used for converting or transducing an electrical signal from, for example, a programmable controller or computer into a trip actuating output. The solenoid can be configured for no voltage release, low power intrinsically safe no voltage release, or applied voltage release. Additionally, manual trip actuators for remote manual or local manual tripping can be provided. Other sensors which could be used with said trip valve operator include fusible link sensors for detecting fire or overtemperature, or a seismic sensor for detecting damaging seismic ground motion. Still other conditions which could be sensed as a basis for actuating said trip valve operator, just to name a few, include high or low flow rates, high or low pressures, high or low temperatures, vibration, displacement, velocity, acceleration, shock or impact as might be caused by an explosion, and tilt as might be caused by vehicle rollover.

Multiple sensors, transducers, and other trip actuators can be used in or with the trip valve operator according to the invention. Devices for mechanically implementing AND/OR logic enable any one or combination of sensors to cause triggering. A mechanical OR device enables the trigger to respond, for example, to a solenoid transduced electrical signal 'or' manual local tripping. A mechanical AND device enables the trigger to respond, for example, to a low water level 'and' a high temperature condition.

When the trip valve operator is used with an electrical trip actuator or an electrical signal to mechanical trigger actuation motion type trip actuator such as a solenoid, then the trip valve operator can function as an output device or final controlling element for a control system. Such control systems include programmable controllers, computers, instruments with switched outputs, hard wired digital circuits, manually switched circuits, etc. Electrically transduced sensors providing inputs to such systems can be logically combined therein to produce an output signal for, among other things, one or more trip valve operators according to the invention.

When used with mechanically transduced sensors, it will be noted, the trip valve operator according to the invention functions independently of other control systems or power sources and can be considered a 'stand-alone' control.

When a sensor is used to sense the presence of the power source for operating a powered controlled actuator, such as an electric gear motor then the trip valve operator according to the invention functions as a 'fail-safe' control.

It will be noted that the capabilties possessed by the trip valve operator according to the invention make possible applications thereof which heretofore have been impractical or impossible with prior art devices. For example, when the trip valve according to the invention is configured as a fusible link fire sensing shutoff valve, the relatively small trip actuation load enables the fusible link sensors to be remotely located with respect to said trip valve through the use of a tensioned light cable connection. This produces several advantages. First, and additionally through the use of the AND/OR capability, fire sensing can be done at more than one location which generally increases the performance capabilities and versatility of said shutoff valve. Second, with the remote sensing capability, said shutoff valve can be located in a relatively fire protected location to avoid the need for expensive, metal seated, fire survivable quarter turn valving while the sensors can be located at various remote locations therefrom, particularly along the pipe controlled by said shutoff valve and downstream thereof.

Other applications of the trip valve according to the invention include an automatic trip valve for use in sprinkler systems of, for example, the dry system or deluge type; the seismic sensitive shutoff valve to be discussed; an emergency overpressure vent valve which would use a pressure sensing element (bourdon tube for example); manual reset valve; etc.

A controlled actuator of some form (e.g. manual handle or gear box, pneumatic or hydraulic cylinder, electric gear motor, etc.) will generally be used in or with the trip valve operator according to the invention as a reset actuator to actuate the quarter turn valve from the returned position to the reset position, to retension the spring return actuator, and to actuate the multi-stage leveraging device from the returned position to the reset position where it re-engages the triggering means. When needed, bias transmitting and transforming devices can be provided for more closely load-matching the reset actuator to the retensioning load of the spring return actuator and the valve load as shown in my U.S. Pat. No. 4,869,459. In addition, the controlled actuator can either be a fixed component in the overall trip valve operator according to the invention or can advantageously be a removable component considered apart from the trip valve operator according to the invention. Where the controlled actuator for reset actuation is a relatively expensive component such as a hydraulic cylinder actuator, removability has an economic advantage in that one controlled actuator can be used to reset many trip valves according to the invention either of the same size or perhaps a range of sizes. A removable controlled actuator can also be a security feature by making unauthorized resetting of the trip valve difficult. Where a trip valve(s) is remotely located, as for example in a pipeline, and no utilities are available for powering the controlled actuator, then the controlled actuator is preferably a compact, light weight and high output actuator, such as a hydraulic cylinder actuator, which along with some powering means, such as a small engine driven hydraulic pump unit or even a manual pump unit, can be easily transported to the remotely located trip valve and used to reset the trip valve.

A second main point of the invention is to provide an omnidirectional seismic vibration sensor and transducer which produces a predictable response to strong seismic motion in the range of amplitudes and frequencies where the onset of damage is likely and thus triggering is desired (e.g. California 12-23-1 and ANSI Z21.70 call for triggering between 0.08 g. and 0.3 g. at 2.5 hz.). This result is accomplished by a seismic vibration sensor which is based on a spring-mass system for sensing the horizontal components of seismic motion, which is second order and approximately linear in terms of the differential equations which describe its motion, and which operates omnidirectionally in a substantially horizontal plane. The spring-mass system can be used to produce a response which is amplified over that of the forcing amplitude or advantageously, said spring-mass system can be combined with a sliding friction damper in which the sliding friction provided thereby causes the seismic vibration sensor to produce a response which is a switched and then amplified over that of the forcing amplitude (i.e. below the switching setpoint there is no response and above the switching setpoint there is a response with an amplification factor which is greater than one). The response amplitude at which triggering is set to occur, hereinafter referred to as the response triggering setpoint, advantageously is an amplified response with respect to the seismic ground motion.

The seismic vibration sensor response is amplified with respect to the horizontal components of the ground motion as the spring-mass system is used as a resonator, the natural frequency of the seismic vibration sensor being selected to fall approximately in the middle of a typical earthquake spectrum. The spring-mass system is comprised of a mass element which is supported by a substantially flat and horizontal surface through novel friction reducing means that accomodate two degree of freedom motion by the mass element and which is connected to an associated support structure or frame by a network of springs that also accomodates two degree of freedom motion by the mass element. In general, a two degree of freedom spring-mass system of this sort will have two distinct modes of resonant vibration, each mode with its own distinct resonant frequency and direction for that resonance to occur with respect to some coordinate frame. Advantageously, however, spring networks are provided in which the spring-mass system will have only one resonant mode which has one resonant frequency and is direction independent or omnidirectional. These spring networks are comprised of standard coil type extension springs which substantially act in a horizontal plane and their combined effect is to produce a horizontal omnidirectional restoring force. For any particular direction then, the response of the spring-mass system of the seismic vibration sensor is the same as a single degree of freedom spring-mass system which is aligned in that direction. The response of mathematically single degree of freedom systems to seismic ground motion is well documented in the published response spectra for various earthquakes (see for example California Institute of Technology Earthquake Engineering Research Laboratory, Analysis of Strong Motion Earthquake Accelerograms, Vol. III-Response Spectra). Typical amplification factors for seismic motion which can be expected for lightly damped systems are given in the consolidated response spectra (see M. Paz, Structural Dynamics Theory and Computation, Van Nostrand Rheinhold, 1980, pp. 143-145) or can be estimated from the published response spectra and accelerograms. The use of the spring-mass system as a resonator, as opposed to a vibrometer or an accelerometer, has several important advantages. First, amplification produces higher response displacements of the mass element which can be more accurately measured than smaller unamplified or deamplified response displacements. Second, amplification allows the use of a transducer for converting the horizontal two degree of freedom motion of the mass element into a simple trigger throw which provides mechanical advantage for swapping the high displacement of the mass element for a higher trip actuating force output. Third, the use of resonant amplification makes the spring-mass system relatively insensitive to small constant forces, most particularly those forces caused by the sensor being out of level by several degrees. Thus, the higher the amplification factor, the wider the leveling tolerance can be in order to maintain a desired amount of accuracy for a particular setpoint. Fourth, the use of resonant amplification makes the seismic vibration sensor relatively insensitive to high frequency background vibration as might be caused by machinery and insensitive to small ground jolts as might be caused by truck traffic or nearby heavy construction activity. A particular advantage to the use of the spring-mass system is that, if all the horizontal restoring forces are spring based, then it is not possible for the vertical component of seismic motion to interfere with the horizontal restoring forces, unlike the pendulums of the prior art.

The sliding friction damper produces the switching effect previously described because the sliding friction provided thereby essentially causes said spring-mass system to make a transition from being heavily damped to being lightly damped as the forcing amplitude increases. As the forcing amplitude increases, the response amplitude of the seismic vibration sensor, therefore, is caused to switch from providing essentially no response to providing a response with an amplification factor which is greater than 1 and subsequently to an amplified response (that is, a response which is greater than the forcing amplitude). Below the switching setpoint, the friction provided by the sliding friction plunger will hold the seismic vibration sensor stationary with respect to the seismic sensor base. Above the switching setpoint, the small amount of viscous like or linear type damping present in the spring-mass system determines the amplification factor (that is, the slope or rate of change of the response curve with respect to the forcing amplitude). The linear damping in the spring-mass system is due to structural type hysteresis damping in the spring network produced by the flexing of the springs therein and is due to the rolling action of the supporting two degree of freedom ball bearing. According to my measurements and using ordinary commercial springs and ordinary commercial quality bearing balls against cold finished mill quality surfaces, a typical amount of linear damping is about 1% to 1.5% of critical damping. Based on my tests, the sliding friction damper also contributes to the linear type damping (probably due to a slight amount of abrasion) and can raise the amount of linear damping to 3% to 4% of critical damping.

Advantageously, the sliding friction damper makes the seismic vibration sensor relatively insensitive to seismic motion of a minor nature, which causes no damage, and insensitive to minor background vibrations from sources other than earthquakes thereby minimizing the chances of inadvertant triggering. Further advantageously, the sliding friction damper comprises a spring loaded contact element which presses on a horizontal surface. As a spring generated force will not be influenced or changed by the vertical component of the seismic motion, then the frictional damping forces produced from a spring generated force will not be influenced by the vertical component of the seismic motion either.

In construction, the seismic vibration sensor is comprised of a mass element which is supported by a two degree of freedom ball bearing and which in turn rests on a flat substantially horizontal surface or sensor base. The ball bearing consists of four balls which are loosely retained in a cage. The center of the cage has a clearance hole somewhat greater in diameter than the maximum radial displacement which the mass element is allowed. A spring loaded contact element (i.e. a plunger) projects from the bottom of the mass element, through the clearance hole in the cage, and against the flat support surface or sensor base in order to create the sliding friction damping. The contact element material is preferably a plastic such as TFE. A setscrew type adjustment can be provided for varying the spring load on the contact element and hence the amount of friction generated thereby in order to enable the switching point to be an adjustable setpoint. A short columnar support or stand-off projects from the top of the mass element and serves to connect a conically shaped transducer cam to the mass element. A transducer follower or tracking probe is pivotally mounted to a support structure above the transducer cam. The follower approximates vertical motion as would be provided by having mounted the follower in a slide. The pivotal mounting has the advantage of assuring low frictional effects between the follower and the support structure. The follower is lightly spring biased so that the tip of the follower rests on the transducer cam. The tip is preferably made from some relatively low friction material such as TFE or other thermoplastic with similar low friction properties. The trigger arm can be one in the same as the follower arm, or be distinct but rigidly connected to the follower arm, or be distinct and separately pivoted. The spring network, which forms a resonator with the mass element, is connected between the mass element or the transducer cam (which is rigidly connected to the mass element) and the surrounding support structure in an equally spaced radial manner and comprises springs of equal spring rate. Preferably three identical extension springs are used which are pretensioned. The pretensioning or preloading is advantageous as it improves the linearity of the restoring force at large deflections provided by the spring network.

As the supporting ball bearing has two degrees of freedom and moves one half the displacement of the mass element, alignment preserving means are provided which connect between the support structure, the bearing cage, and the mass element. These means comprise cage extension arms which are connected, through some simple swivel capable type joints, to the center coils of the three extension springs in the resonator spring network. The center coil of each of these springs move with two degrees of freedom in the same direction as the mass element but with one half the displacement thereof and therefore has the same displacement as the two degree of freedom ball bearing. Connecting the cage of the ball bearing to the center coils of the spring network enables the spring network to additionally serve as means for preserving the alignment of the ball bearing with respect to the mass element. The essential properties of such alignment preserving means is to provide two degrees of freedom and divide the displacement of the mass element in half. The use of the spring network as the alignment preserving means is effective because the two degree of freedom ball bearing is much lighter than the mass element and by connecting to the spring centers, the ball bearing effectively is aligned by six springs formed by each half of the three extension springs in the spring network where each of these six effective springs has twice the spring rate of the extension springs. Thus the spring network has a second function, namely preserving the alignment of the two degree of freedom ball bearing. It will also be seen that the preferred alignment preserving means, as described above, has the advantage of requireing no additional parts or components of major consequence.

The transducer, comprising the conical cam and the follower or tracking probe, connects the mass element with the trigger of the trip valve operator according to the invention or other device and converts the two degree of freedom horizontal motion of the mass element into a simple trigger throw motion. When the seismic vibration sensor is at rest and is at its equilibrium point, the follower contacts the conical cam at its apex. As the mass element and conical cam are displaced from the equilibrium point in any direction, the cam displaces the follower vertically. When sufficient horizontal displacement of the mass element and cam and therefore vertical displacement of the follower takes place, then triggering occurs. The conical cam is advantageously given a shallow slope or gradient with respect to the horizontal plane. This gradient produces a mechanical advantage or leverage between the horizontal displacements and forces of the seismic vibration sensor and the vertical displacements and forces of the follower, such that the relatively large displacements of the mass element are swapped for smaller displacements and higher forces in the follower and trigger thus enabling said seismic vibration sensor to actuate a trigger having a relatively heavier trigger spring than otherwise. Thus, the transducer additionally functions to amplify the trip actuating force output of the seismic vibration sensor which is then used to meet the trip actuation load. This enables a given size seismic vibration sensor to meet higher trip actuation loads or a given trip actuation load to be met by a smaller sized seismic vibration sensor.

The seismic vibration sensor can also be made to sense the vertical accelerations present in seismic motion. The spring loaded contact element, which is used to implement the sliding friction damper, is located so as to be substantially in line with the center of mass of the mass element and the downward spring generated force of the contact element produces a lifting force which is a fraction of the weight of the mass element. When the contact element is made of TFE or some other low friction material and triggering due to horizontal components is to be effected in the range of amplitudes given in the California or ANSI specifications, then the lifting force can be an appreciable fraction of the weight of the mass element. Further lifting force is provided by giving the three pretensioned extension springs of the resonator spring network a shallow vertical elevation angle which can be set or adjustably set to provide a vertical acceleration setpoint. When the accelerations of the vertical component of the seismic motion exceed the weight fraction of the mass element which is acting through the two degree of freedom ball bearing, then the mass element will lift off of the ball bearing thereby acquiring a third degree of freedom in its motion. The vertical displacement of the mass element and transducer cam produces direct vertical displacement of the follower which, if sufficient, will produce triggering.

Further switching effects in the response of said seismic vibration sensor are produced by switching the damping therein. This is accomplished by limiting the amplitude over which said sliding friction damper can act and is most simply implemented by a raised land in the sensor base which is the only portion of the sensor base against which the contact element or plunger of the sliding friction damper can act. Still other switching effects can be provided by a detent comprising a spring loaded plunger in said mass element which acts against a raised conical depression in the sensor base.

The seismic vibration sensor and transducer according to the invention is combined with the trip valve operator according to the invention to produce a seismic shutoff valve. Said seismic vibration sensor, with or without said transducer, can also be combined with other motion receiving devices or receivers, besides a trigger or a trip valve, such as various electrical switches or response recording devices. The addition of a recording device such as a tracing surface and a marking or scribing device to the seismic vibration sensor would form a simple seismoscope.

A third main point of the invention is to provide a three way actuation by-pass device for use in the universal trip valve operators for quarter turn valves, according to the invention. Said by-pass device:

(1) advantageously enables the controlled actuator (e.g. pneumatic or hydraulic cylinder, electric gear motor, manual handle, manual worm gear or gear box, etc.) for resetting the multi-stage leverage device with the trigger and for retensioning the spring return actuator to additionally be able to double actingly actuate the quarter turn valve between the reset position and the returned position thereof by providing an actuation path between the controlled actuator and the quarter turn valve which by-passes the reset actuation of the multi-stage leverage device and trigger and, in the preferred configuration, advantageously also by-passes the retensioning actuation of the spring return actuator. In relation to those universal trip valve operators incorporating a by-pass device, a controlled actuator which can operate the quarter turn valve in a double acting manner will also be referred to as a double acting actuator.

(2) advantageously causes the trigger, multi-stage leverage device and the spring return actuator to by-pass the controlled actuator and actuate the quarter turn valve to its returned position, even though the controlled actuator is at its reset position, by providing an actuation path therebetween which by-passes the controlled actuator.

(3) advantageously causes the controlled actuator to leave the quarter turn valve at the returned position thereof during the reset actuation of the multi-stage leverage device and, in the preferred configuration, the retensioning actuation of the spring return actuator by providing an actuation path therebetween which by-passes the quarter turn valve.

In construction, the preferred by-pass device is comprised of a two degree of freedom linkage which has a multiple bar pin joint type construction or which has an element which is variously referred to as a floating lever or a differential lever. The floating lever can be embedded in a multiple bar pin joint type construction or alternatively, can be embedded in various other mechanical constructions which use spools and cables or gears and racks, for example, instead of arms and connecting links. (In general, I have observed that any device which provides two degrees of freedom could serve as a by-pass device. The multiple bar pin joint construction is advantageous for its relatively low cost and simplicity of manufacture and for its general ruggedness and relatively high reliability.) Said two degree of freedom linkage provides two control points and a load point. These control and load points are actuatable connections with respect to a stationary structure or rigid frame and preferably are rotary shaft or socket type connections having a quarter turn actuation stroke with respect to the stationary structure. Such a connection scheme advantageously enables the multi-stage leverage device and trigger, the spring return actuator, the controlled actuator, and the quarter turn valve to all be mounted to the stationary structure and actuatably interconnect via the by-pass device and the control points and load point thereof which thereby eliminates the need, as in some prior art valve operators, for the return actuator and the triggering means to move as a mounted unit. The multi-stage leverage device is connected to one of the control points (hereinafter referred to as the trigger control point) and, through the action of the sensors and transducers, the logic means, and the trigger, thereby controls the trigger control point. The controlled actuator is connected to and controls the other control point (hereinafter referred to as the controlled actuator control point). The quarter turn valve is connected to the load point (hereinafter also referred to as the valve point). In a preferred configuration, the spring return actuator, which incorporates a bias transmitting and transforming device as described in my U.S. Pat. No. 4,869,459, connects to the trigger control point along with the multi-stage leverage device thereby forming a valve operator (hereinafter termed a non-cycling spring return trip valve operator) in which the spring return actuator does not cycle with the actuations of the quarter turn valve by the controlled actuator and in which the retensioning actuation of the spring return actuator by the controlled actuator does not coincide with the actuation of the quarter turn valve. Such a sequence of actuations advantageously enables the size of the controlled actuator to be reduced from those spring returned valve operators in which the valve and the spring return cycle together. An alternative connection of the spring return actuator to the valve point forms a cycling spring return trip valve operator in which the spring return actuator cycles with actuations of the quarter turn valve by the controlled actuator.

The by-pass device enables the universal trip valve operator according to the invention to provide many advantageous results and to undertake many applications, such as:

(1) by using a solenoid type trip actuator to operate the trigger and by using a manual handle or manual gear box or worm gear type controlled actuator, then a type of valve operator is formed which is generally termed a 'free handle manual reset valve' the essential features of which are that:

(a) the valve can not be actuated back to its reset position until the solenoid and trigger are reset as caused by the clearing of the condition which caused triggering; and, (b) the accidental, negligent, or willfully reckless or malevolent restraint of the manual handle at the operating position does not prevent the spring return actuator from actuating the valve to its returned position upon the occurence of a sensed condition and triggering.

(2) enables the provisioning of a spring returned electric gearmotor valve operator which is responsive to the loss of electric power (i.e. failsafed). This is done by providing a solenoid trip actuator or transducer which is connected to the power source for operating the double acting electric gear motor actuator. Similarly, any other controlled actuator which is geared or wormed down and therefore can not be directly spring returned, can be spring returned by incorporating that actuator into the universal trip valve operator according to the invention as the controlled actuator therein and providing a trip actuator or transducer which is connected to the power source for that actuator.

(3) enables the use of geared or wormed down manual controlled actuators for resetting universal trip valve operators sized for operating high actuation torque quarter turn valves without the otherwise need for clutches or other disengaging devices which could accidentally be left engaged and thereby prevent the return actuation of the valve upon triggering.

(4) enables the provisioning of a more efficient spring returned valve operator. The non-cycling spring return actuator feature enables significant reductions in torque or force output of, and therefore size of, the controlled actuator as the retensioning of the spring return actuator and actuation of the valve are not simultaneous, but sequential which beneficially allows reductions in the size of the controlled actuator. Compared with standard prior art spring return valve operators, even greater reductions result due to the use of bias transmitting and transforming devices. Additionally, the non-cycling spring return feature beneficially will extend the life of the spring return actuator as a function of the number of valve cycles as the spring return can be expected to cycle much less frequently than the valve.

(5) enables the provisioning within a valve operator of both a double acting controlled actuator and a safety condition sensing override actuator therefor. The double acting actuator could, for instance, be under the control of a primary control system while the safety override actuator could be under the control of any combination of the following: mechanically transduced sensors, the primary control system, a safety control system separate from the primary control system, or a power source failsafe sensor for the double acting actuator.

Other objects and advantages of the invention will in part be obvious and will in part appear hereinafter.

The invention accordingly comprises features of construction, combinations of elements, and arrangements of parts which will be exemplified in the embodiments hereinafter set forth, and the scope of the invention will be indicated in the claims.

THE DRAWINGS

FIG. 1 is a partial schematic view of a first embodiment of the trip valve operator according to the invention.

FIG. 1-A is a sectional view taken along line B—B in FIG. 1.

FIG. 2 is a partial schematic view taken along line A—A in FIG. 1 showing the various sensors and other trip actuators.

FIGS. 3-A through 3-C are a series of diagrams showing the leverage and motion of two stage leverage mechanism 4 and leveraging release lever 5 of FIG. 1.

FIGS. 4-A through 4-H are a series of enlarged views showing the reset motion of the leveraging release lever 5 of FIG. 1.

FIG. 20 is a second alternate multi-stage leverage device.

FIG. 21 is a sectional view taken along line G—G in FIG. 20.

FIGS. 25-A and 25-B are partially schematic views of a third embodiment of the trip valve operator according to the invention. The leverage mechanism of FIG. 25-A connects with the rest of the trip valve operator in FIG. 25-B at points X and Y of shaft 444.

Figure 26:
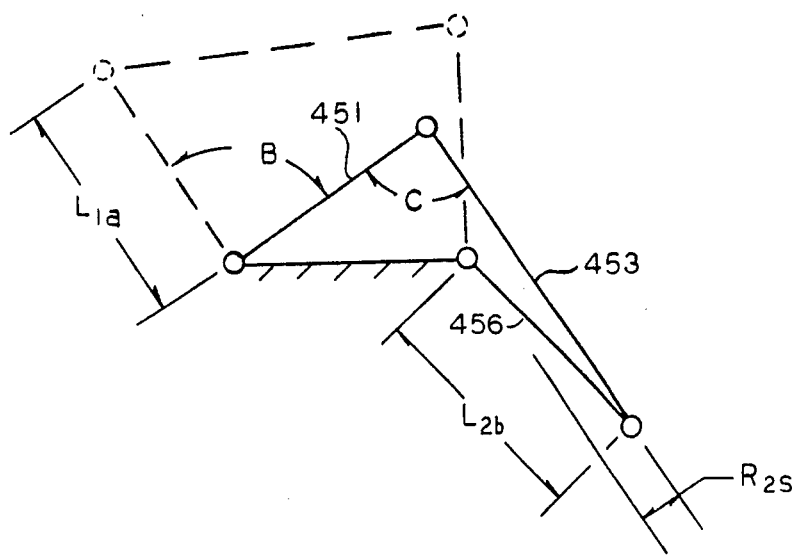
Figure 27:
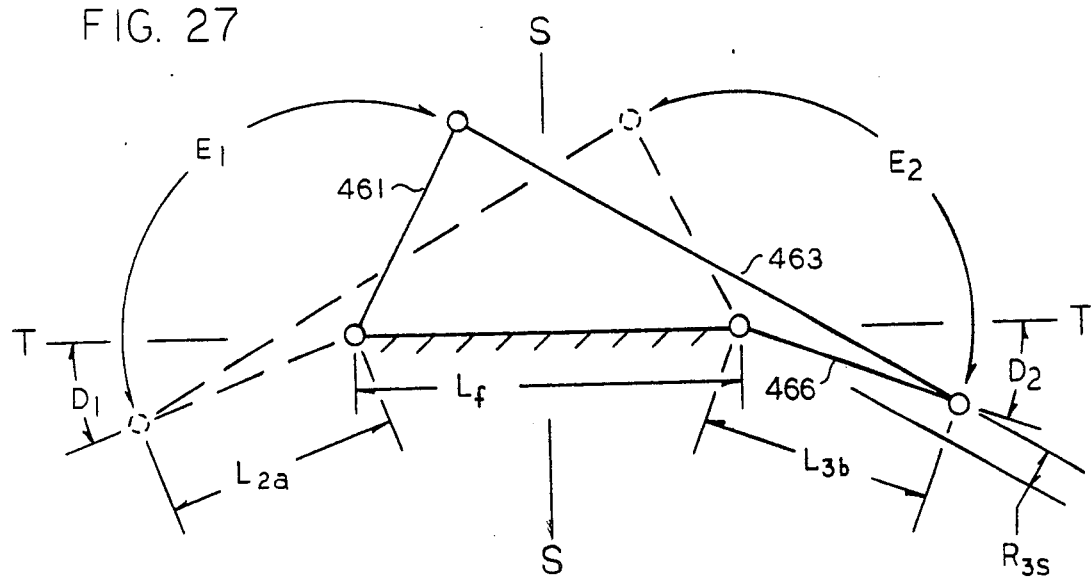

FIGS. 26 and 27 are diagrams which show the reset position (solid lines), the returned position (dashed lines) and several design parameters of the first four bar linkage 450 and of the symmetric second four bar linkage 460 respectively, of FIG. 25-A.

Figure 28:
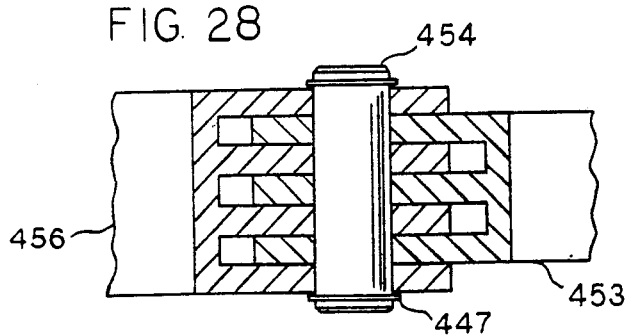

FIG. 28 is a sectional view taken along line J—J in FIG. 25-A.

Figure 29:
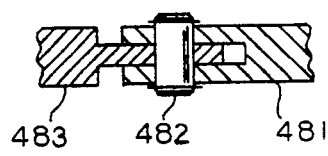

FIG. 29 is a sectional view taken along line K—K in FIG. 25-A.

Figure 30:
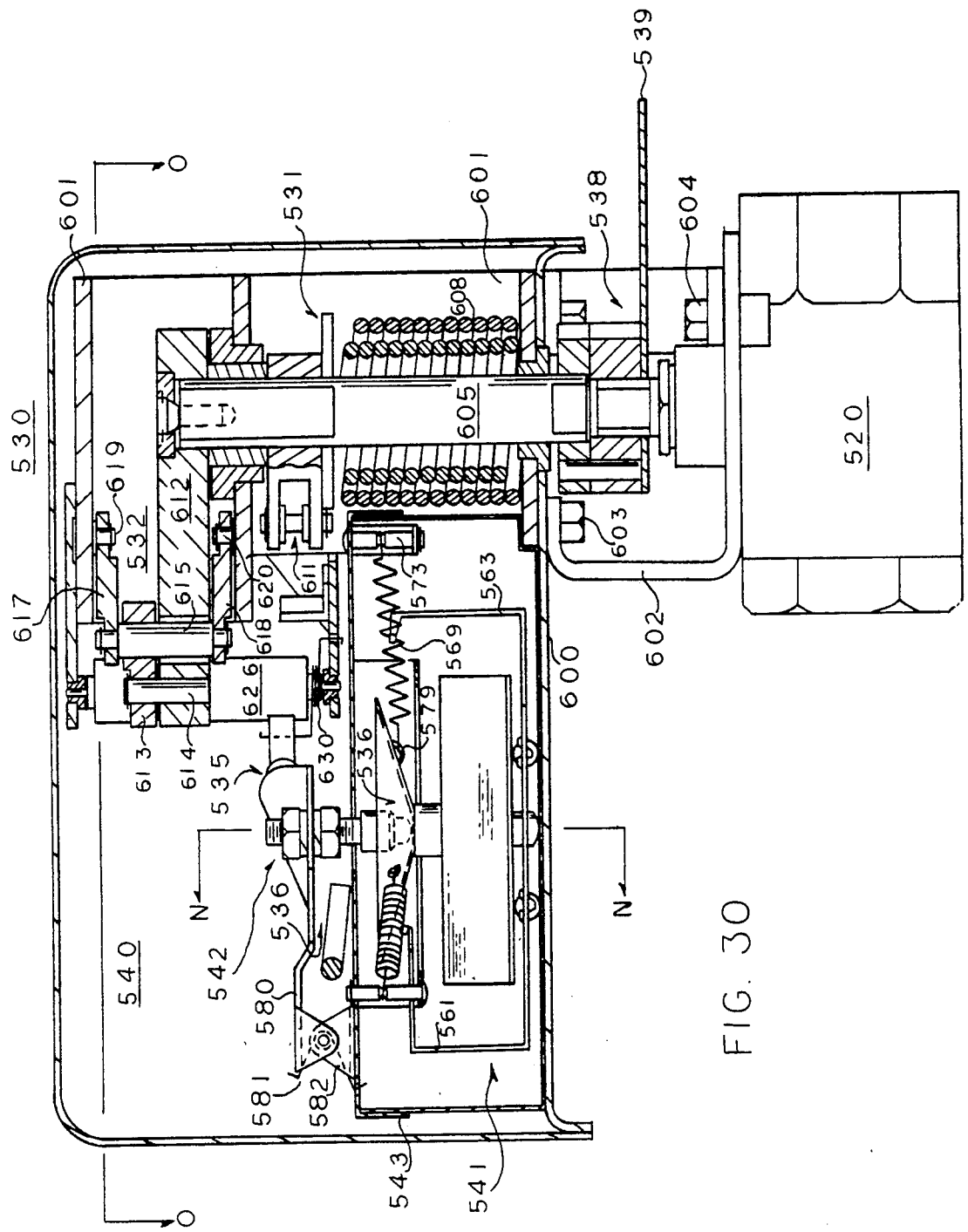

FIG. 30 is a partially sectioned side view of a fourth embodiment of the invention, a seismic sensitive trip valve.

Figure 31:
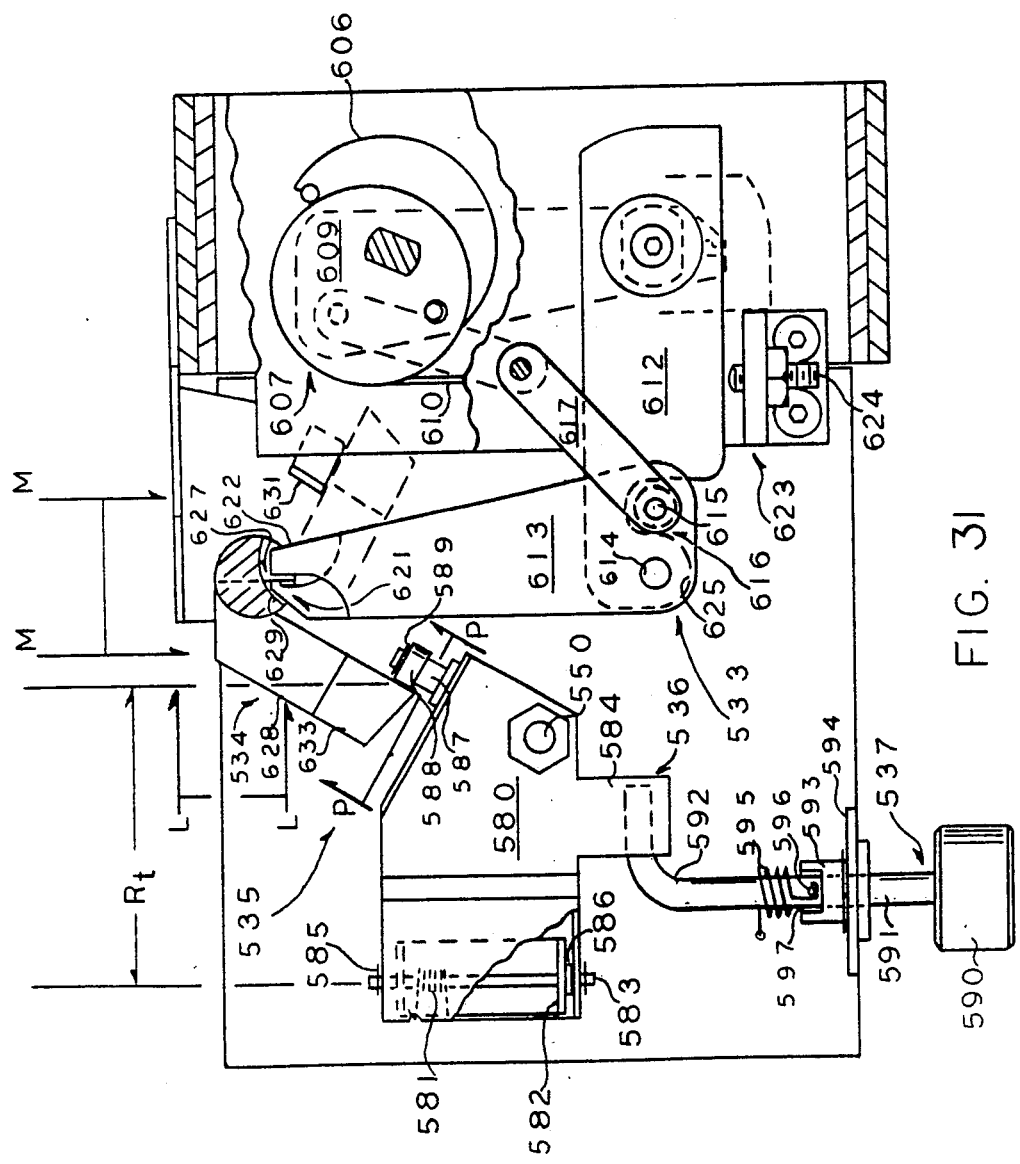

FIG. 31 is a top view taken along line O—O in FIG. 30.

Figure 32:
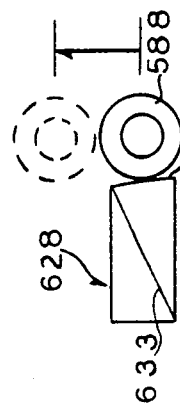

FIG. 32 is a side view taken along line P—P in FIG. 31.

Figure 33:
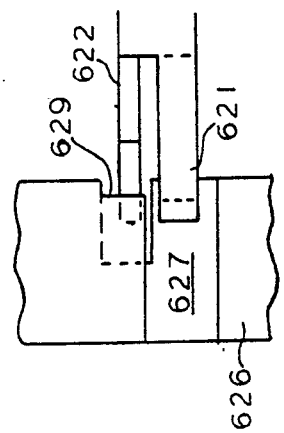

FIG. 33 is a side view taken along line L—L in FIG. 31.

Figure 34:
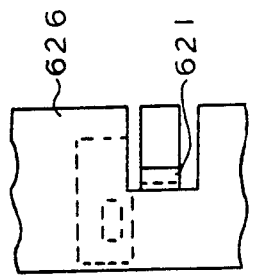

FIG. 34 is a side view taken along line M—M in FIG. 31.

Figure 35:
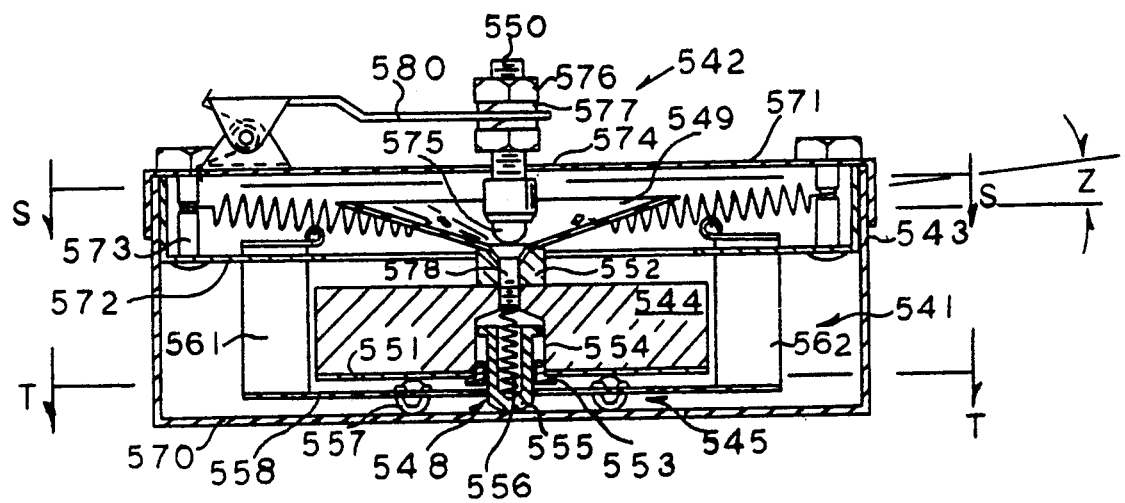

FIG. 35 is a sectional view from along line N—N in FIG. 30 and shows a seismic sensor and transducer according to the invention.

Figure 36:
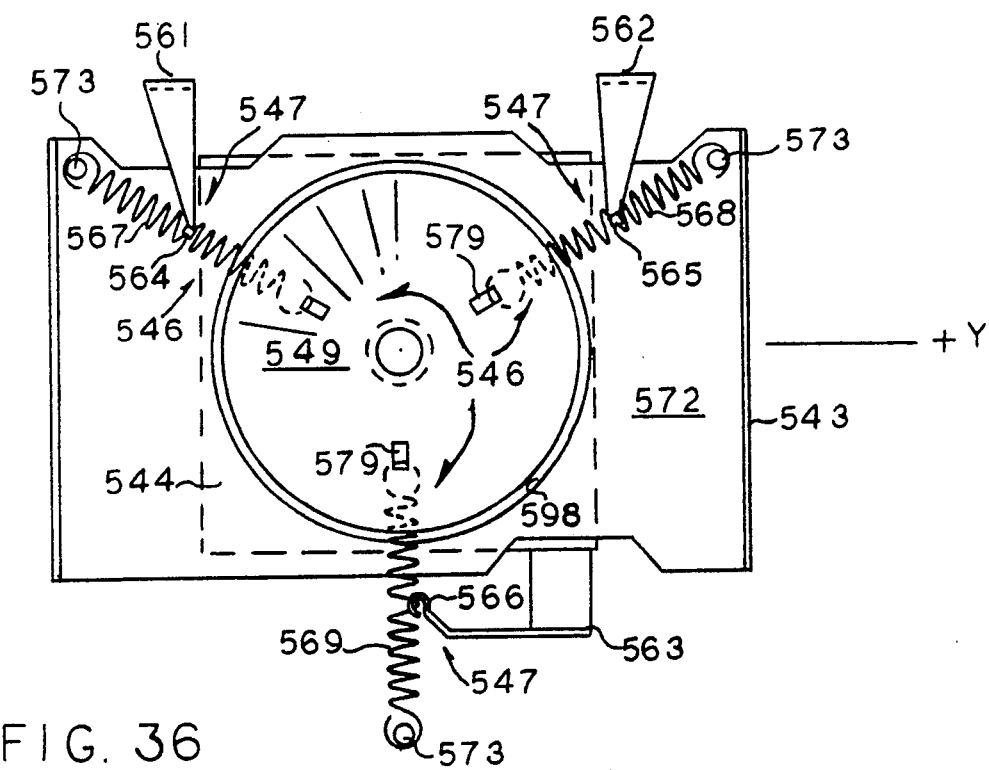

FIG. 36 is a top view taken along line S—S in FIG. 35.

Figure 37:
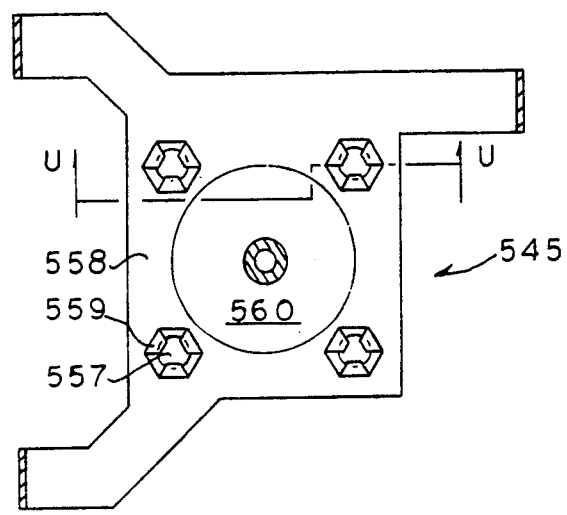

FIG. 37 is a top view taken along line T—T in FIG. 35.

Figure 38:
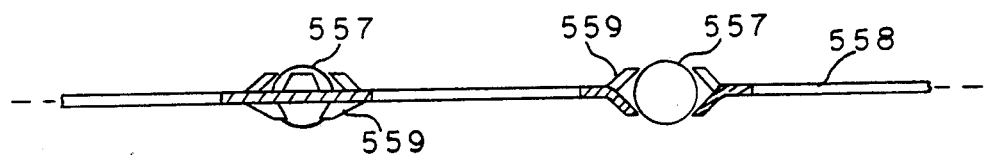

FIG. 38 is an enlarged sectional view taken along line U—U in FIG. 37.

Figure 39:
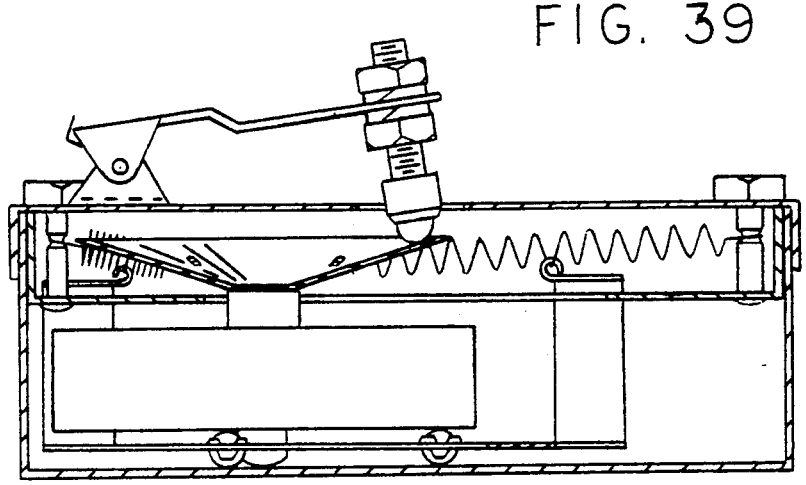
Figure 40:
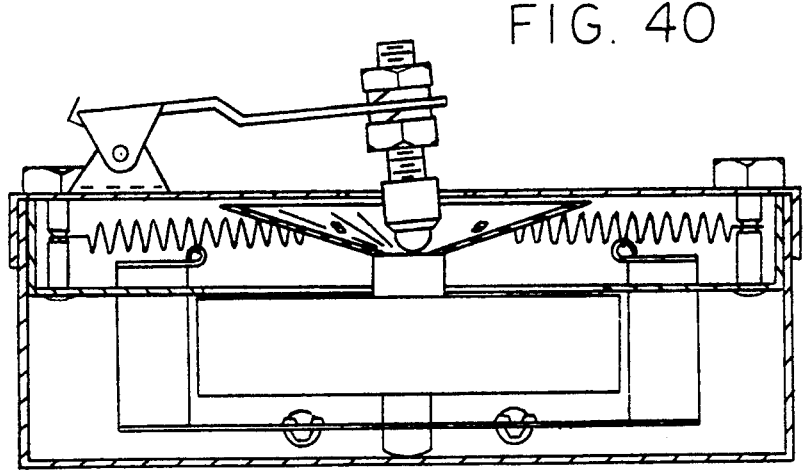

FIGS. 39 and 40 show the motion of the seismic vibration sensor and transducer with respect to FIG. 35.

Figure 41:
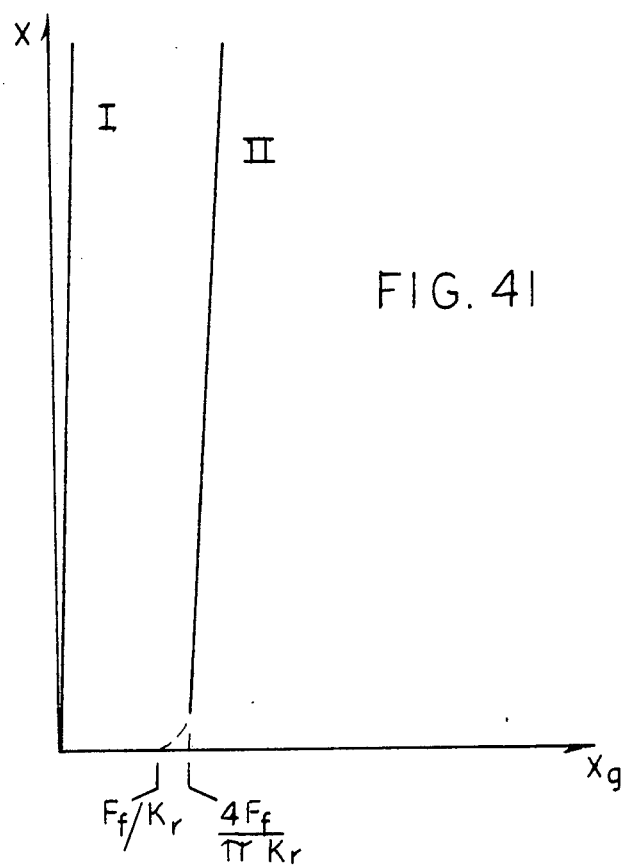
Figure 42:
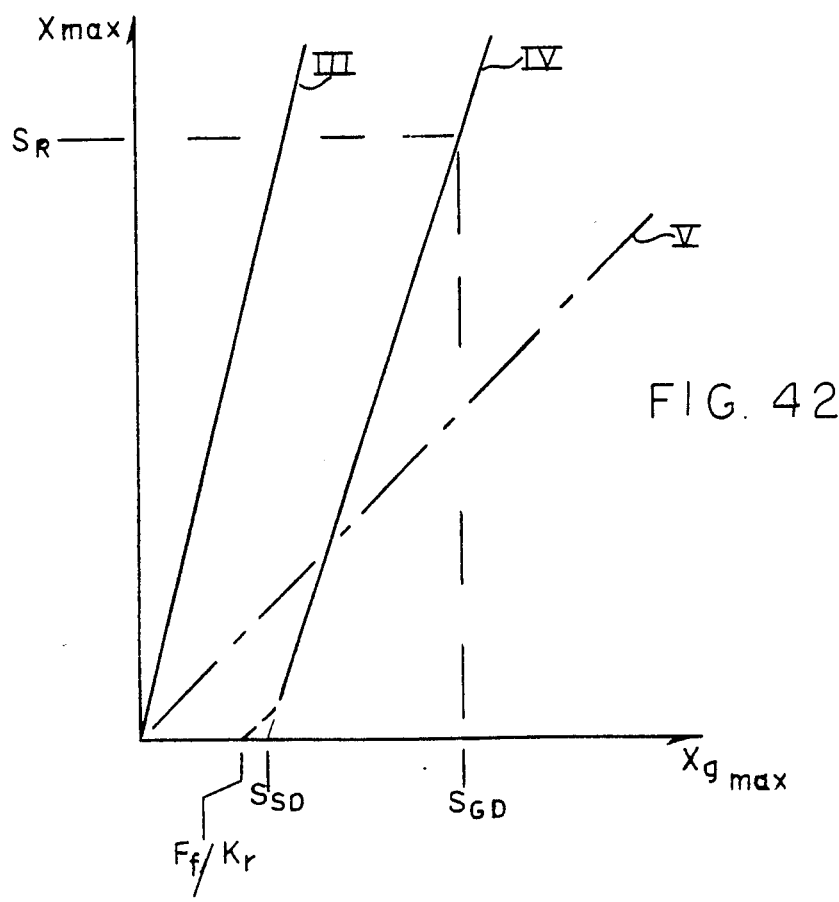

FIGS. 41 and 42 are graphs of the response of the seismic sensor to simple harmonic and seismic motion, respectively.

FIG. 43 shows a first alternate seismic vibration sensor.

FIG. 44-A is a top view taken along line Q—Q in FIG. 43.

FIG. 44-B is an enlarged partial view from FIG. 43.

FIG. 45 is a graph of the response of the first alternate seismic vibration sensor to seismic motion.

FIG. 46 shows a second alternate seismic vibration sensor.

FIG. 47-A is a top view taken along line R—R in FIG. 46.

FIG. 47-B is an enlarged partial view from FIG. 46.

FIG. 48 is a graph of the restoring force present in the second alternate seismic vibration sensor.

Figure 49:
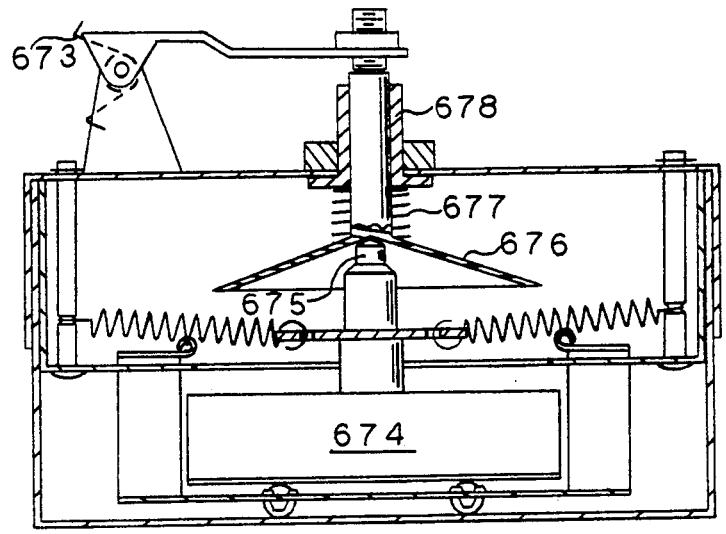

FIG. 49 shows a third alternate seismic vibration sensor and transducer.

Figure 50:
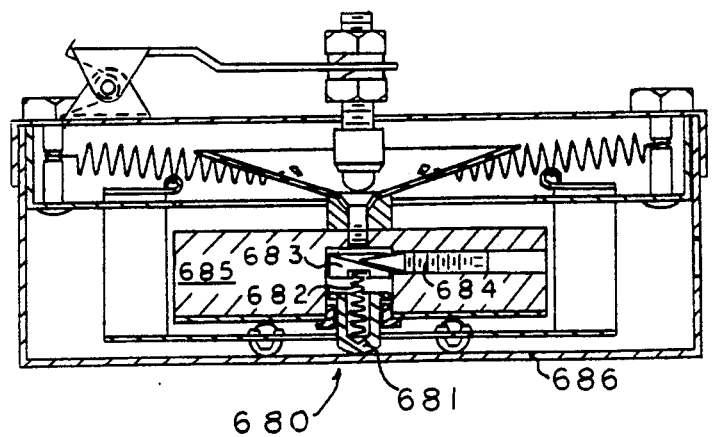

FIG. 50 shows a fourth alternate seismic vibration sensor.

Figure 51:
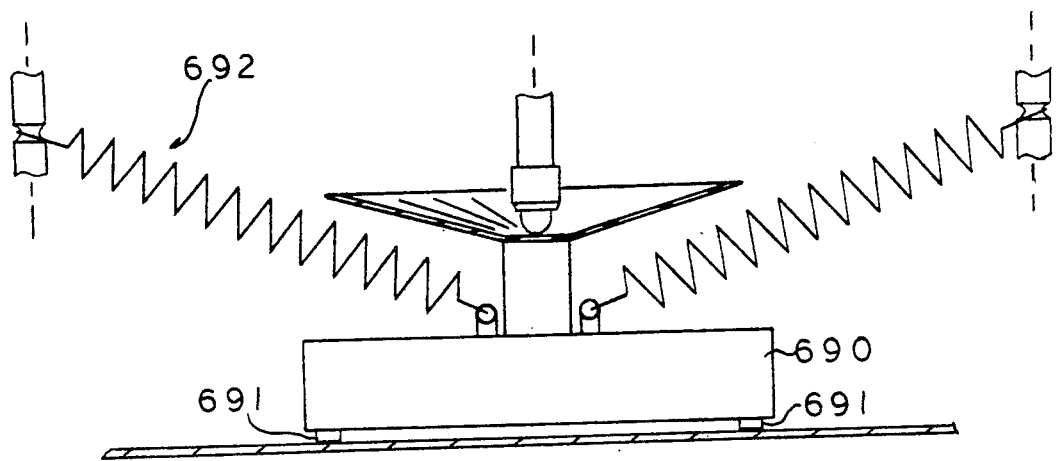

FIG. 51 is a side view of a fifth alternate seismic vibration sensor.

Figure 52:
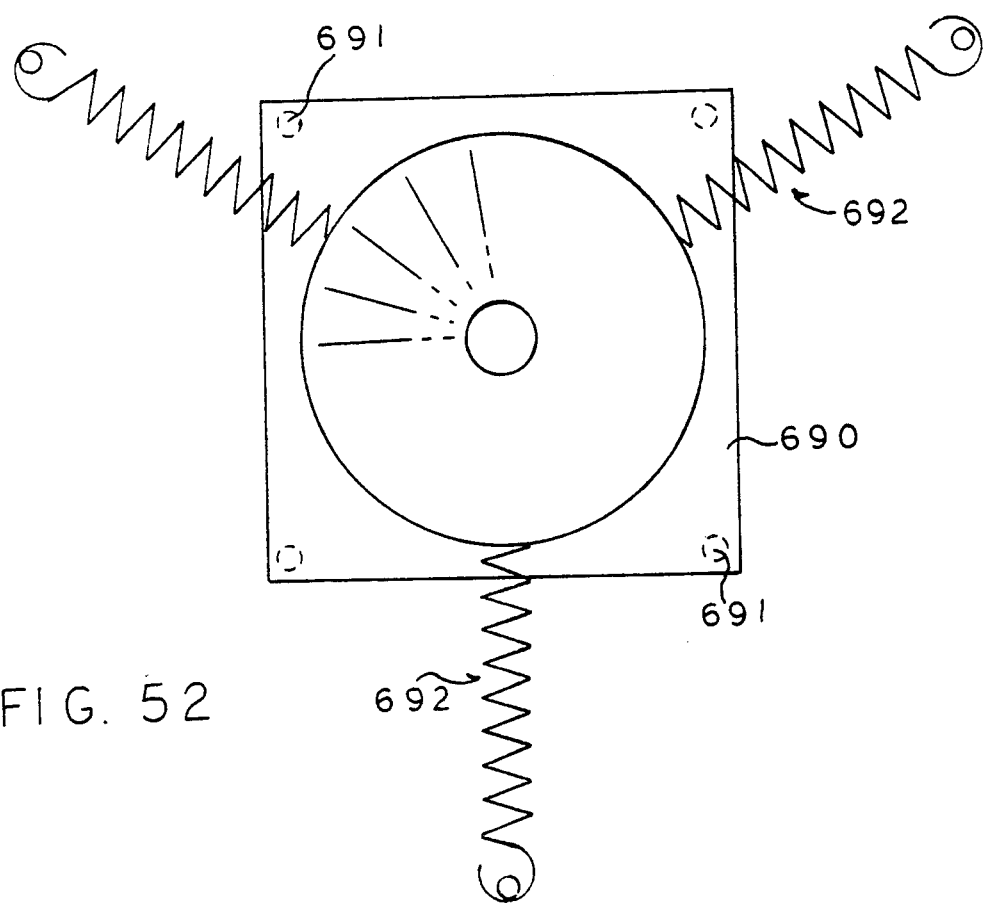

FIG. 52 is a top view of said fifth alternate seismic vibration sensor.

Figure 53:
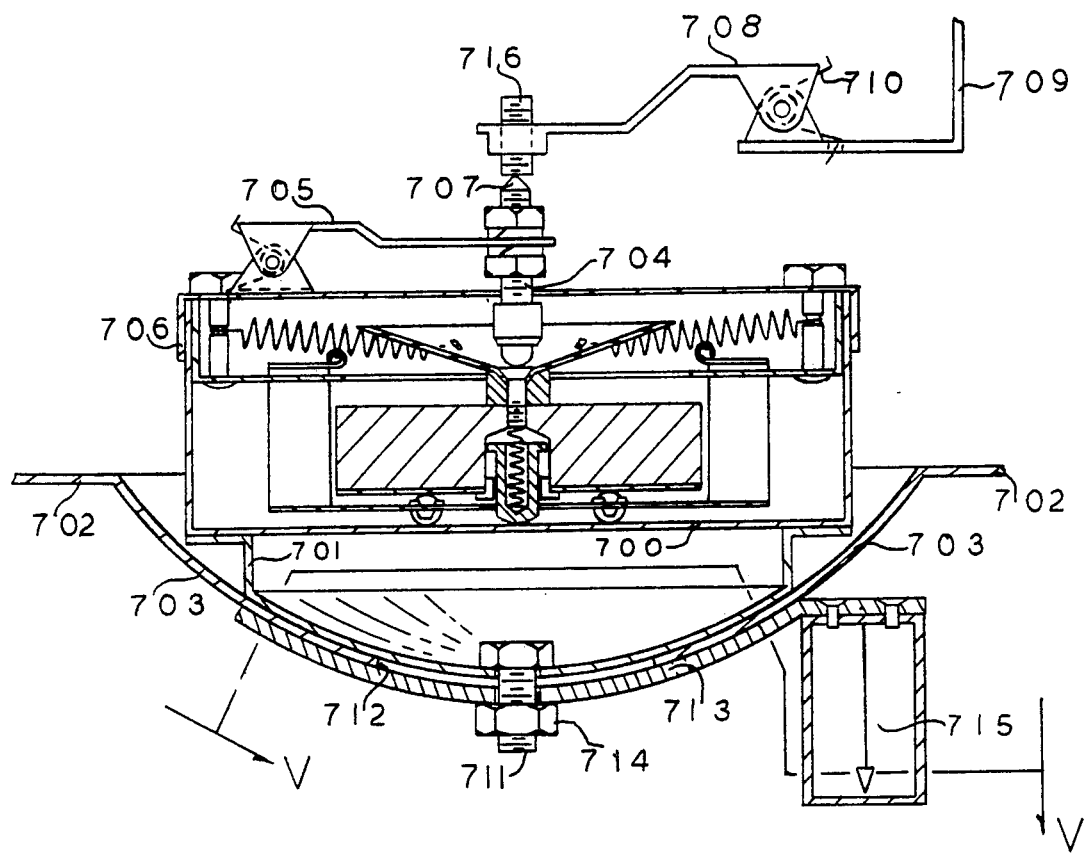

FIG. 53 is side view of a sixth alternate seismic vibration sensor.

Figure 54:
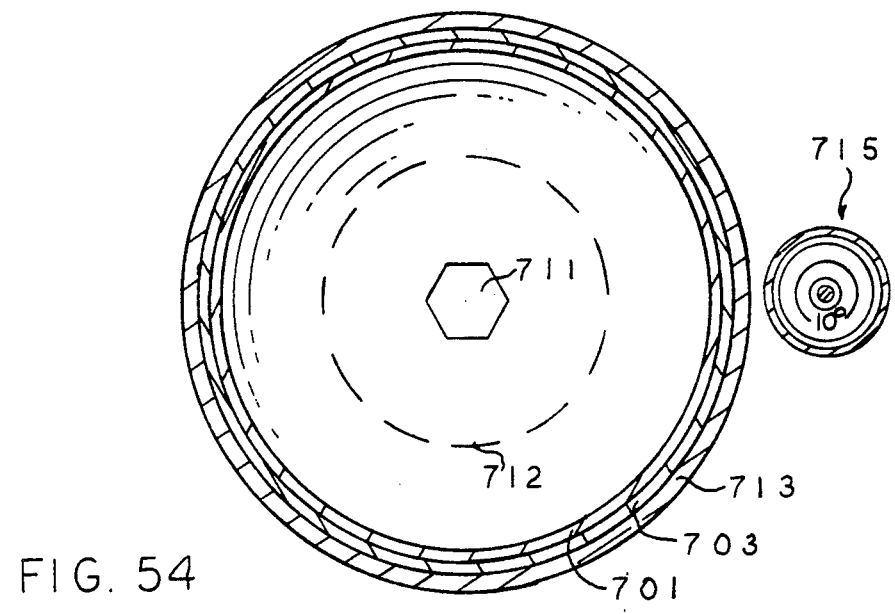

FIG. 54 is a sectional view taken along line V—V in FIG. 53.

Figure 55:
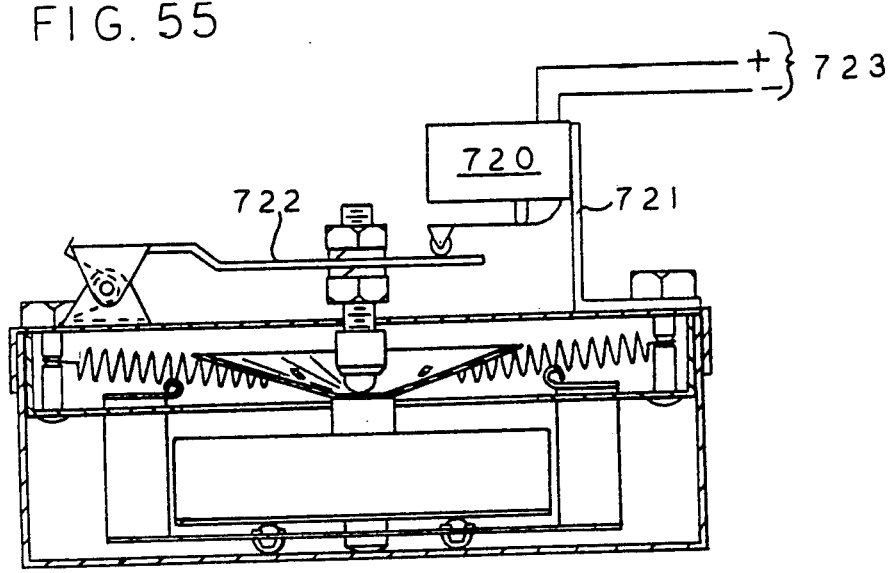
Figure 56:
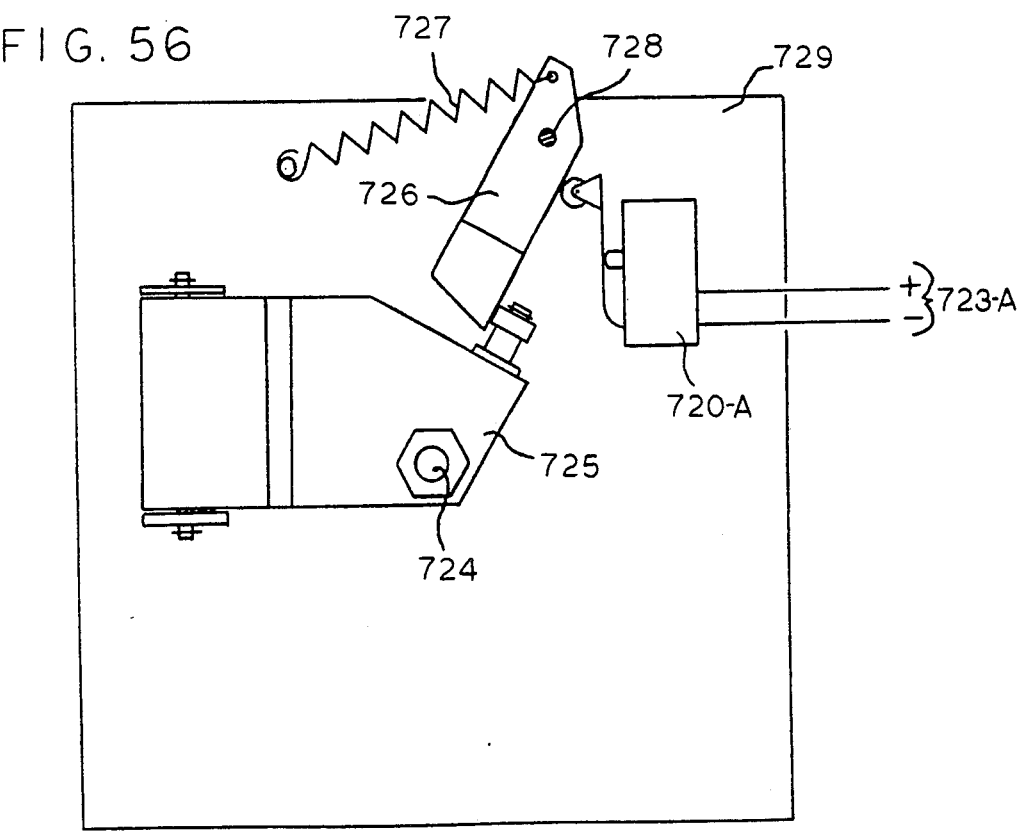

FIGS. 55 and 56 show side and top views respectively of the seismic vibration sensor and transducer of the invention in alternative applications.

FIG. 57 is a schematic view of a fifth embodiment of the trip valve operator according to the invention.

FIG. 58 is a graph of a typical torque load of butterfly valve 730 in FIG. 57.

Figure 59:
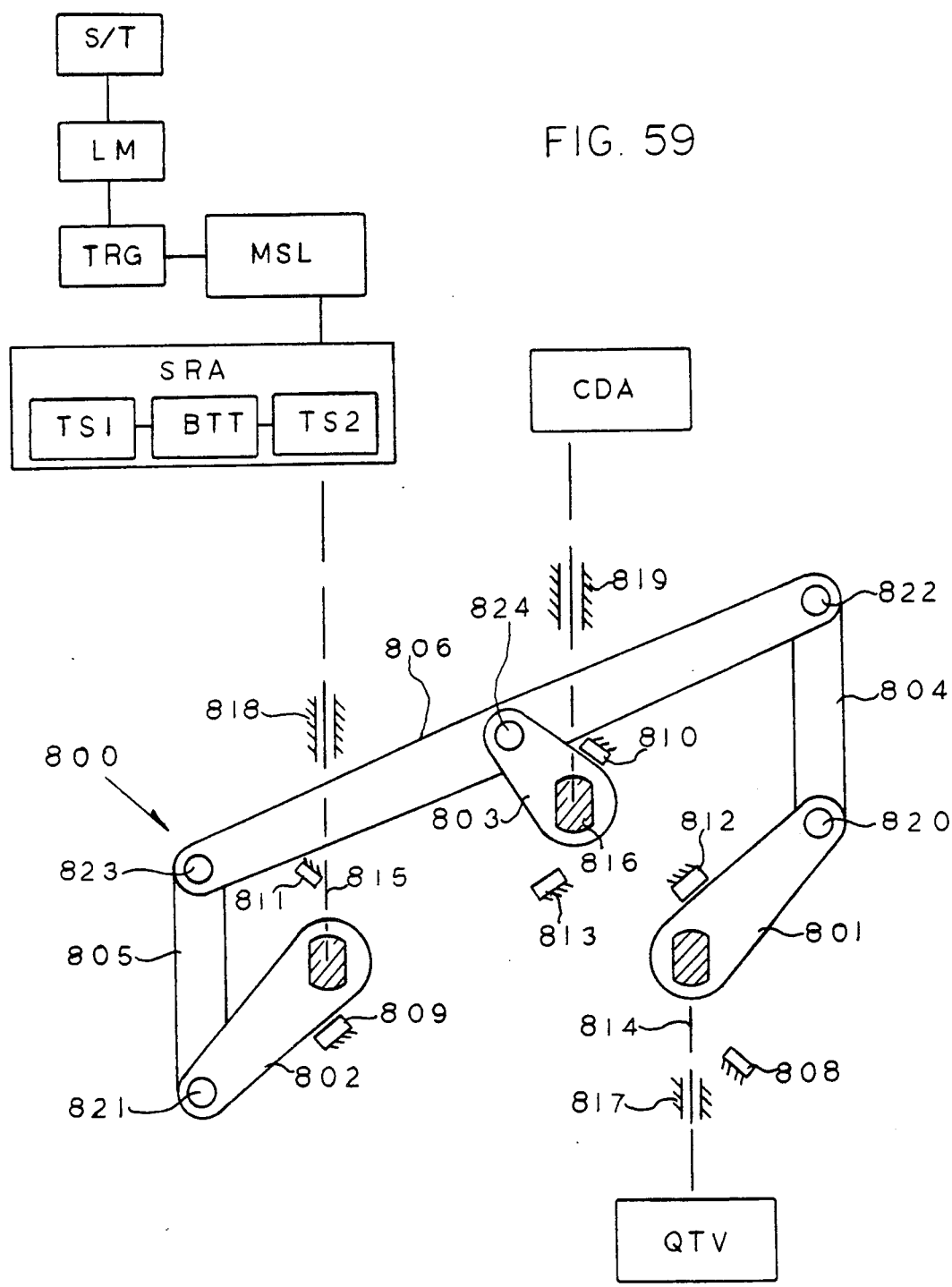

FIG. 59 is a schematic view of a sixth embodiment of the trip valve operator with a by-pass device, according to the invention.

Figure 60:
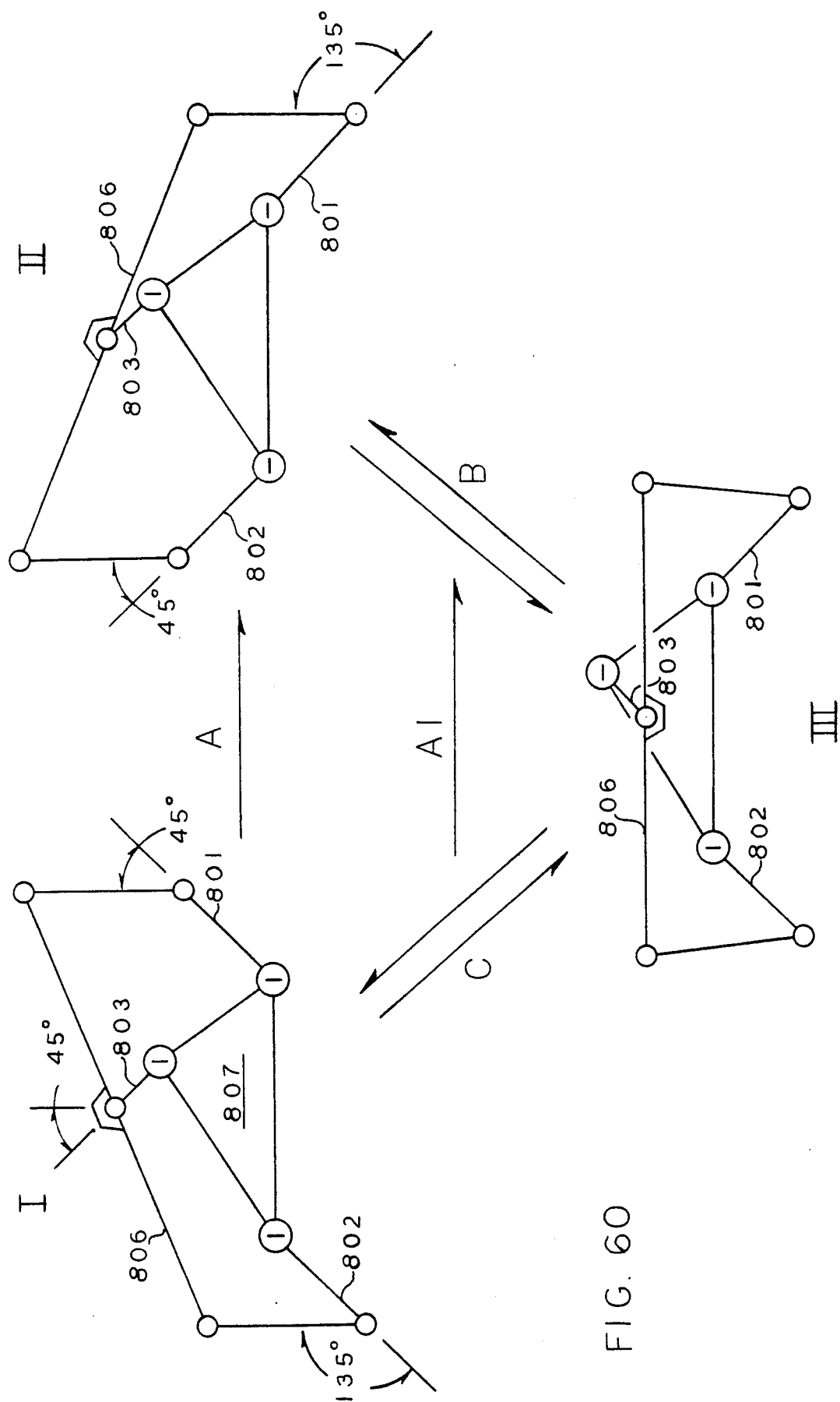

FIG. 60 is a series of diagrams showing the positions of the by-pass device 800 of FIG. 59.

Figure 61:
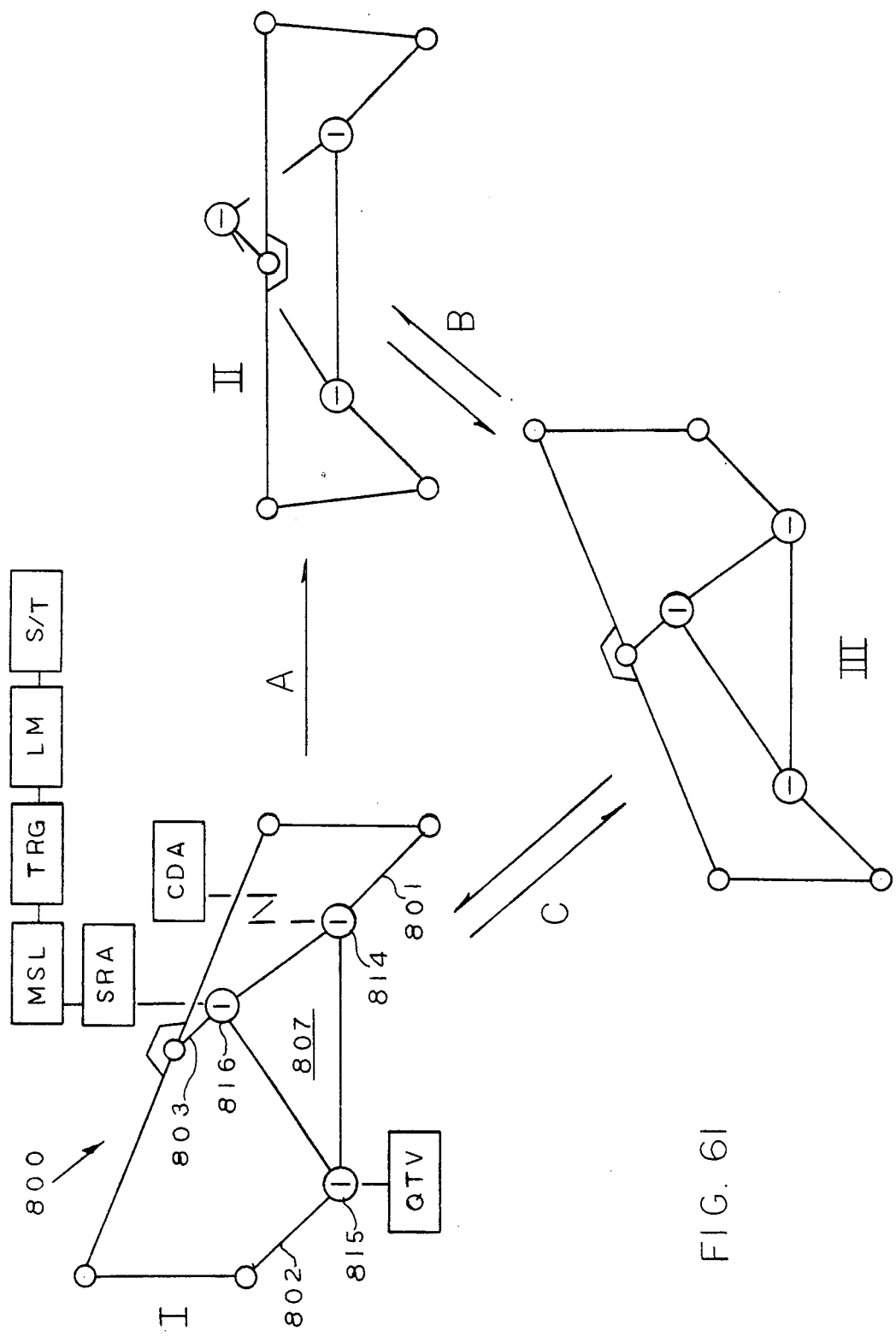
Figure 62:
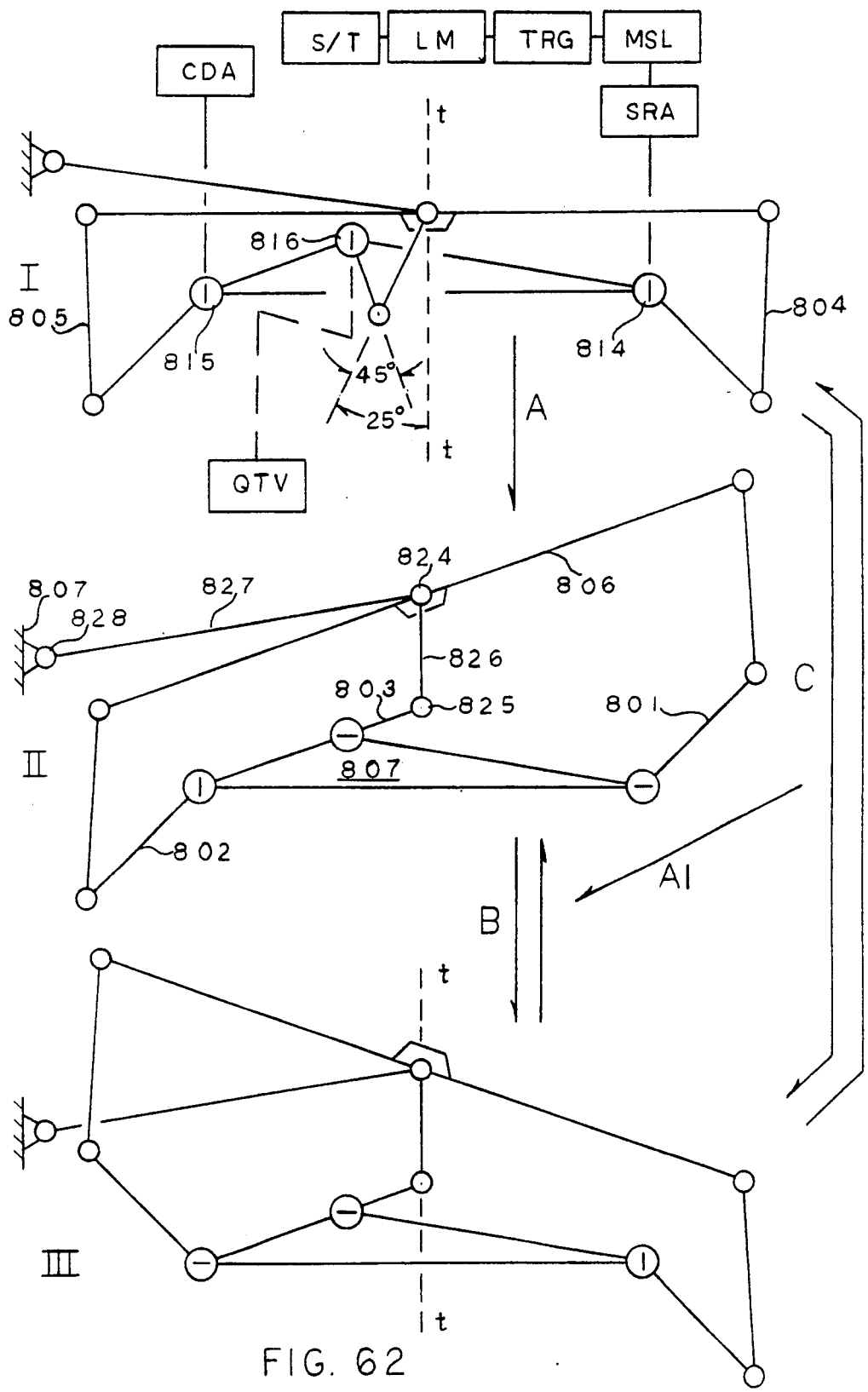

FIGS. 61 and 62 are a series of diagrams showing the positions of by-pass devices for modifications to the sixth embodiment.

Figure 63:
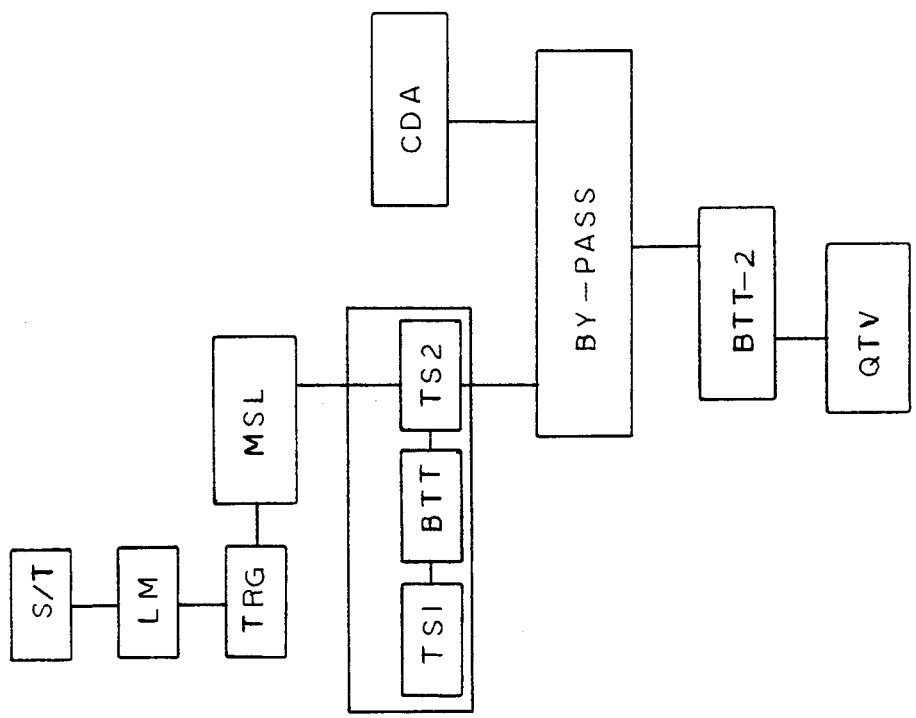

FIG. 63 shows a third modification of the sixth embodiment.

Figure 64:
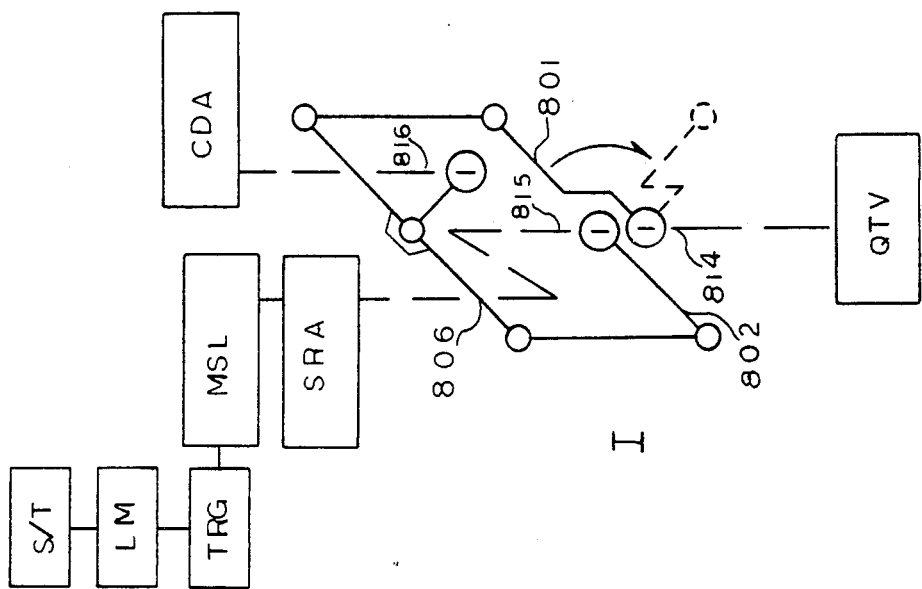
Figure 66:
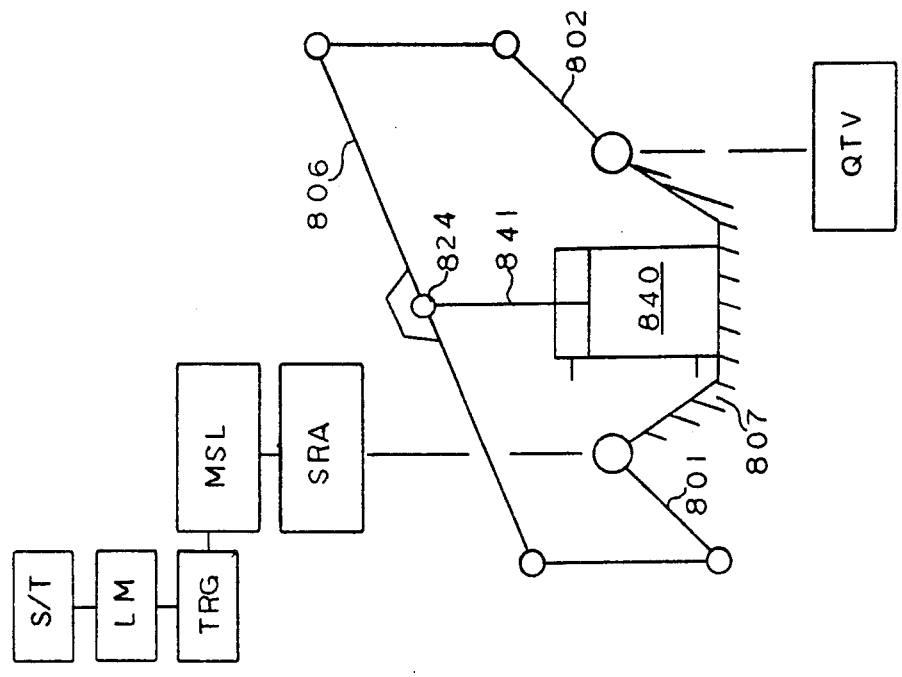
Figure 65:
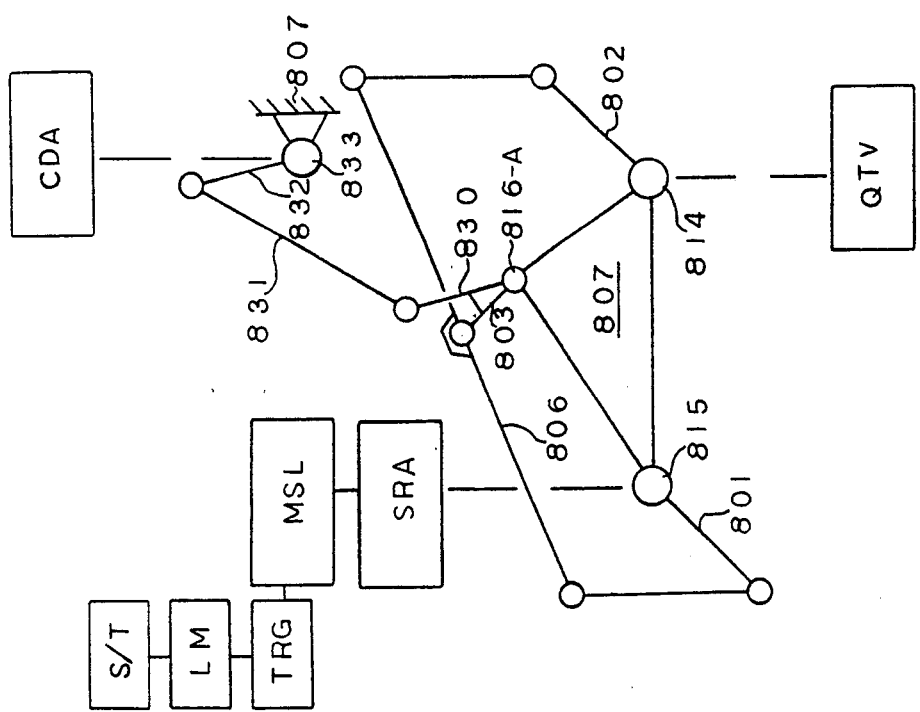

FIGS. 64–66 show some variations on the by-pass device 800 of FIG. 59.

Figure 68:
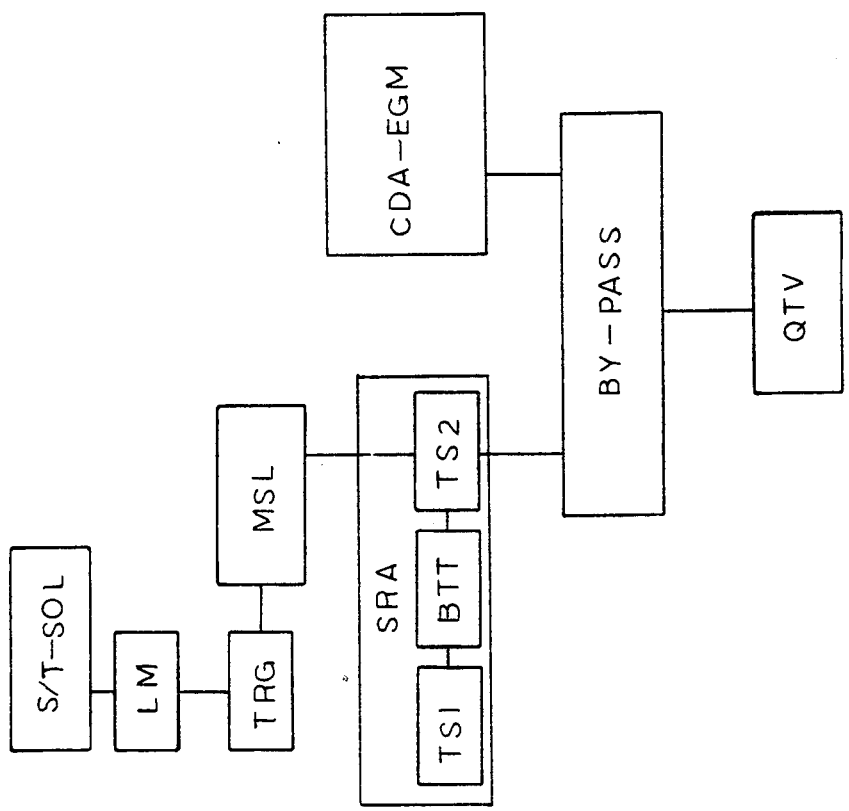
Figure 67:
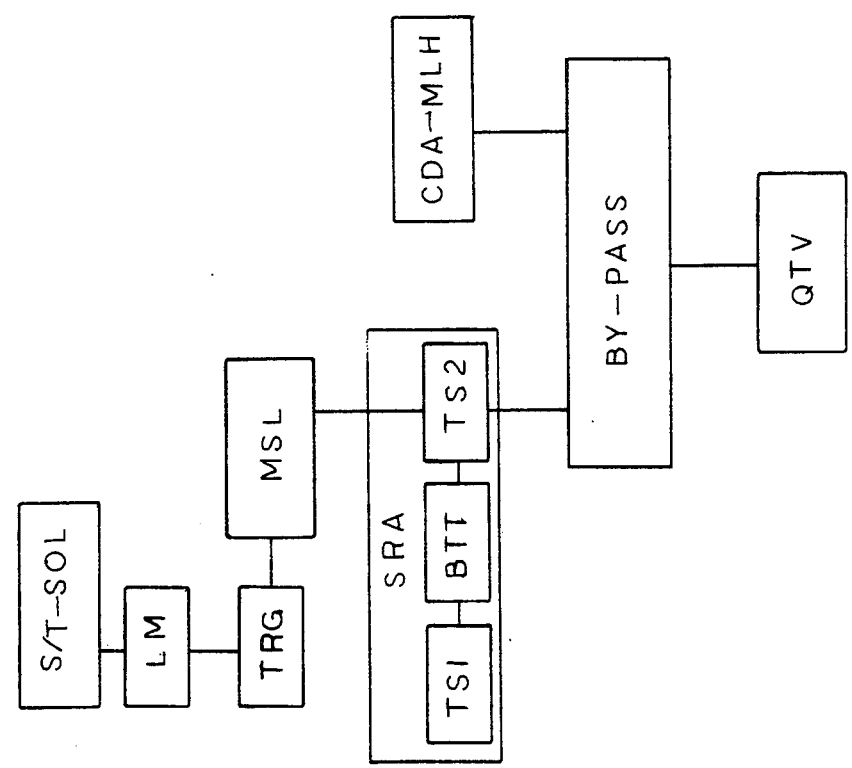
Figure 69:
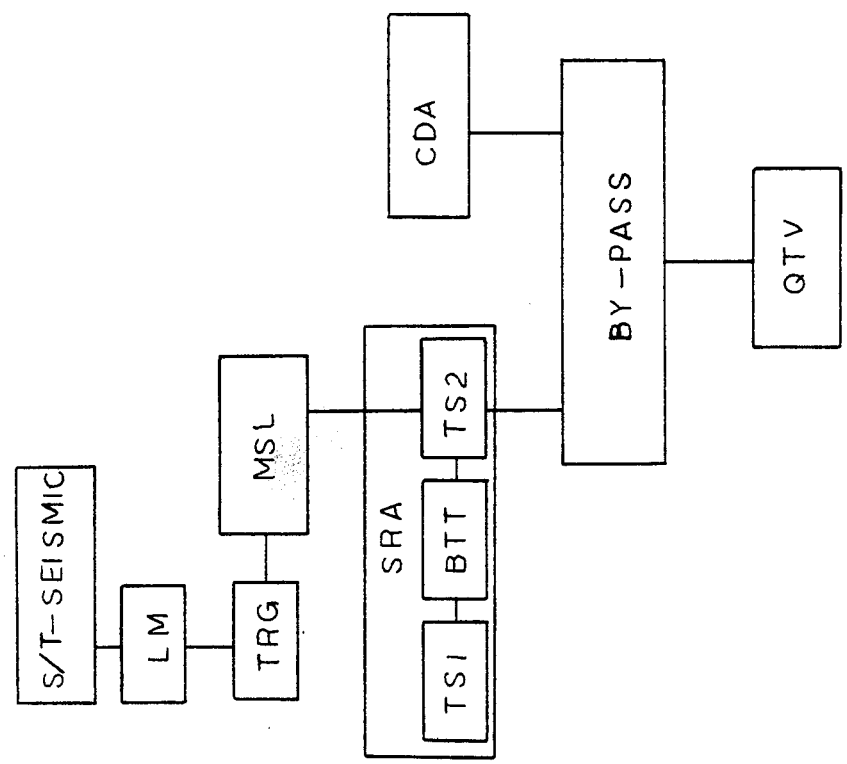

FIGS. 67–69 schematically show the sixth embodiment configured as a free handle manual reset valve, a spring returned electric gear motor, and a seismic valve, respectively.

Figure 70:
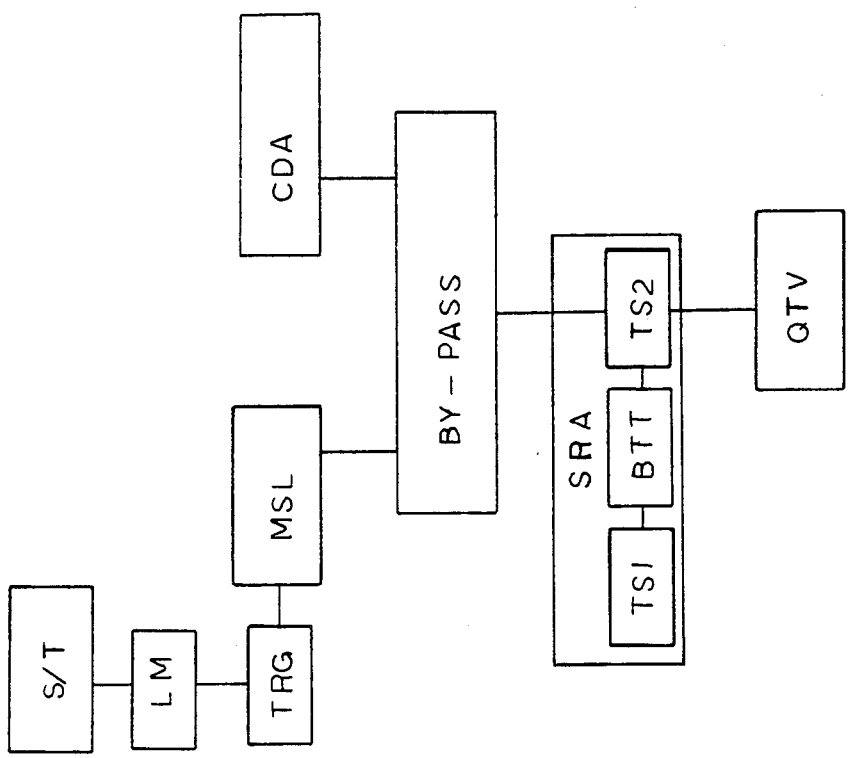

FIG. 70 shows a cycling spring return alternate of the sixth embodiment.

Figure 71:
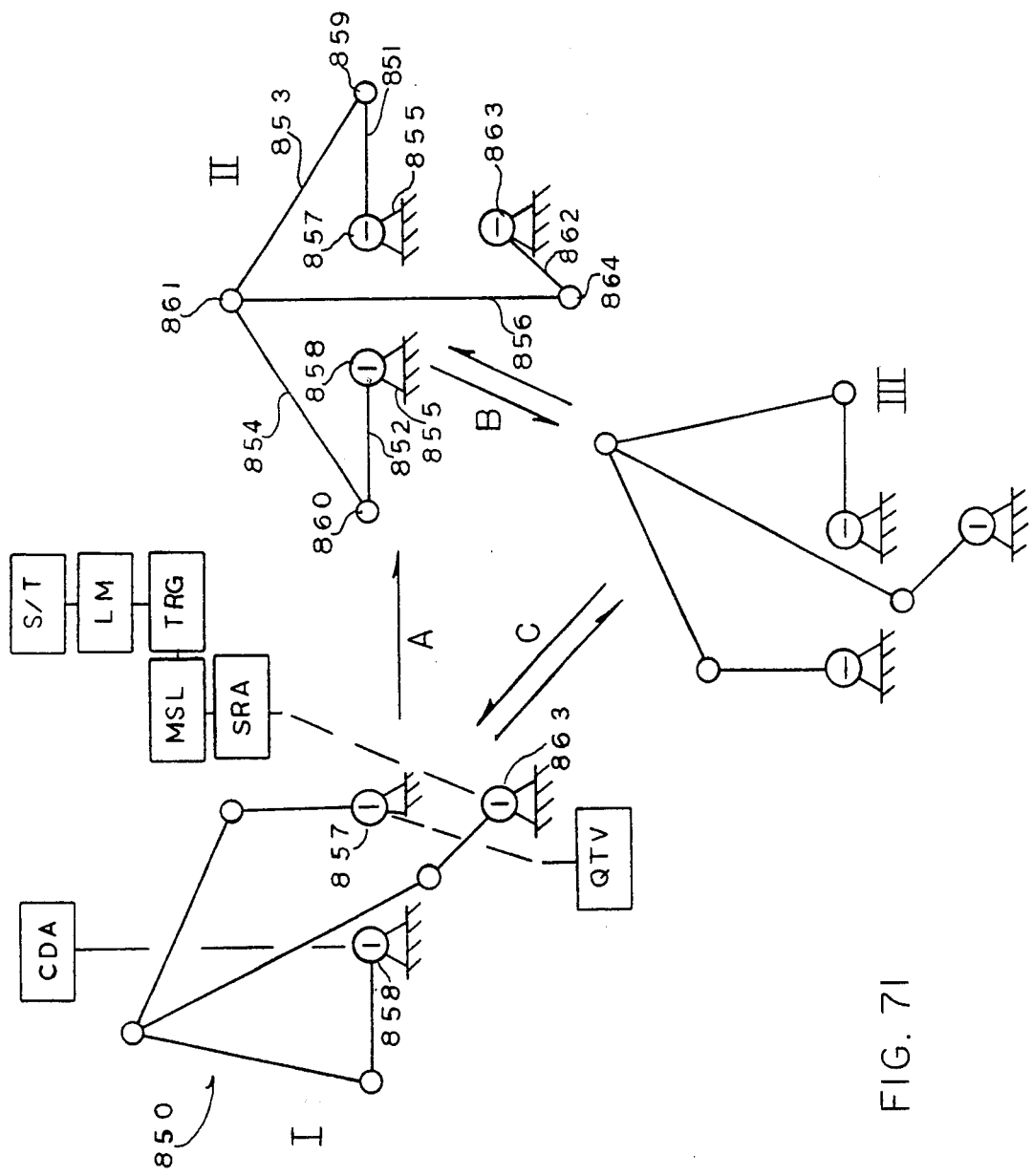

FIG. 71 shows an alternate five bar linkage by-pass device.

FIG. 72 shows an alternate expanded three degree of freedom by-pass device.

DESCRIPTION OF THE PREFERRED EMBODIMENTS FIRST EMBODIMENT-CONSTRUCTION

Figure 1:
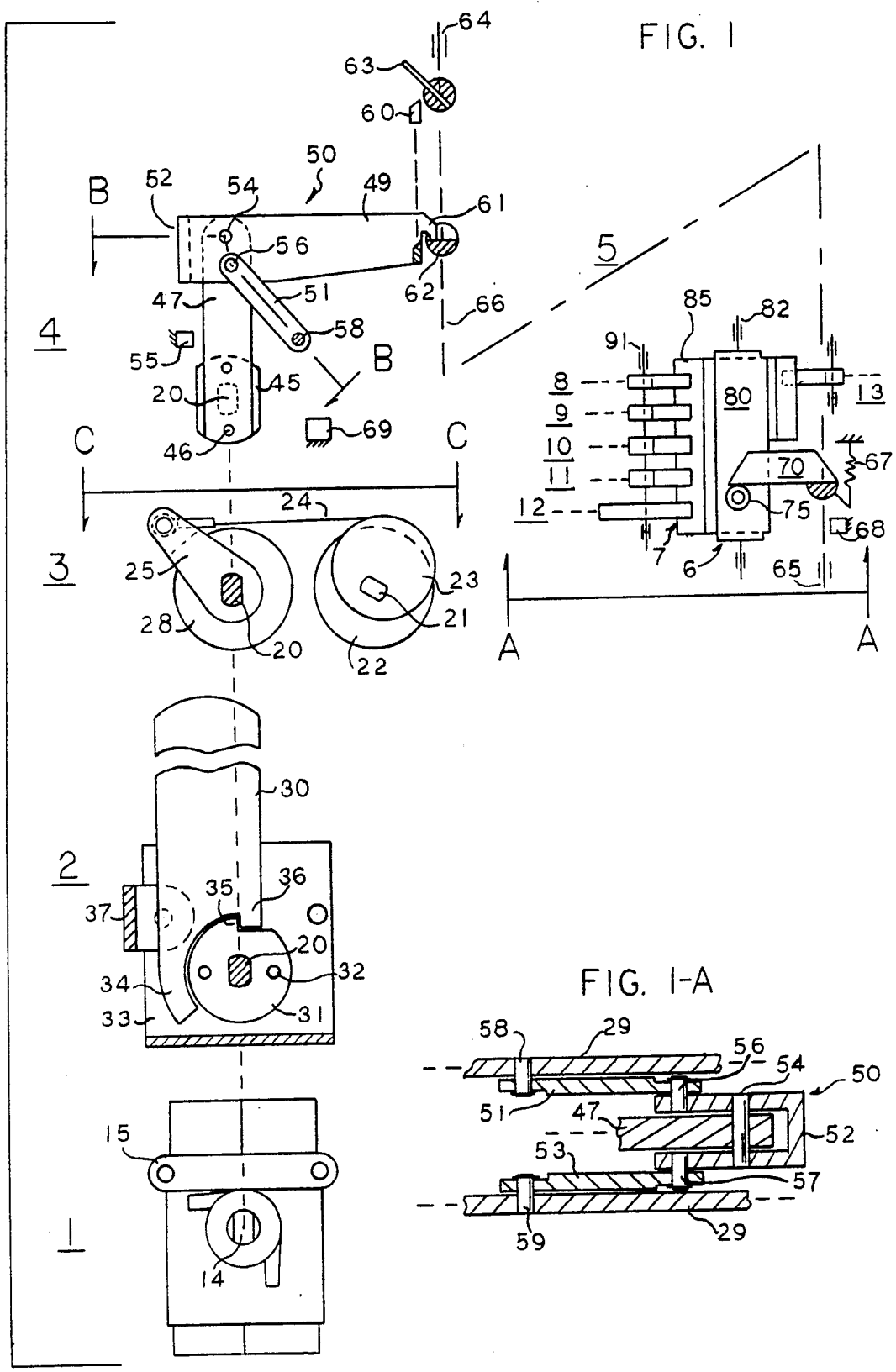

FIGS. 1 through 10 illustrate a first embodiment of a universal trip valve operator according to the invention which is generally comprised of two stage leverage mechanism 4, third stage leveraging release lever 5, trigger 6, OR logic device 7, a trip actuator section which comprises the various sensors, transducers and other trip actuators 8–13, spring return actuator 3, and controlled actuator 2. Said universal trip valve operator connects to and operates quarter turn ball valve 1. FIG. 1 shows said valve operator at the reset position while FIG. 3 shows said two stage leverage mechanism and said third stage at the reset position, the return position, and the transition therebetween.

Output shaft 20 is rotatably mounted in a rigid frame 29 (shown partially in FIG. 10) by bearings 18 and 19. Said shaft has a pair of flats at both ends forming double dee shaft ends which mate with respective double dee holes in hub 45, arm 25, spring connector plate 28, and coupling 31 thereby coupling said hub, said arm, said spring connector plate, and said coupling together. The upper end of said output shaft terminates in said hub while the lower end of said shaft terminates in said coupling. Said coupling thence couples to valve stem 14. Said rigid frame is rigidly connected to bracket 33 which thence is rigidly connected through bolts (not shown) to valve body actuator pad 15. Said coupling is comprised of an upper half (shown) and a lower half (not shown) which are connected and coupled by pins 32, said upper half being adapted to mate with said output shaft while said lower half being adapted to mate with said valve stem.

Within said two stage leverage mechanism, a first stage lever 47 is coupled at one end to said hub by a pair of screws 46. Pivot pin 54 is located at the opposite end of said first stage lever. The distance between said shaft 20 and said pivot pin 54 defines a relatively long first stage lever arm or first stage long arm of length Llg which is used to produce a relatively long torque arm Rlg at the reset position. As said first stage lever is coupled to said shaft 20 and thereby to said spring return actuator and said quarter turn valve, said first stage lever will move through a quarter turn between the reset position and the return position, the quadrant therebetween being its area of operation.

A second stage lever 50 rotatably connects to said first stage lever through said pivot pin 54. Said second stage lever has a relatively long arm structure 49 which extends from said pivot pin 54. At the reset position, said long arm structure 49 is preferably oriented so as to be substantially perpendicular to said first stage lever. Said long arm structure 49 has, at its end, contact pad 61 and projection 60 and operates above said first stage lever in an adjacent parallel plane. The distance between said contact pad 61 and said pivot pin 54 defines a second stage long arm of length L2g which is used at the reset position to produce a relatively long torque arm of length R2g. Advantageously, L2g is about the same length as or somewhat longer than L1g. At the reset position, said contact pad 61 contacts and is restrained by the short arm 62 of said third stage leveraging release lever. Said projection 60 projects above said long arm structure 49 and, when said second stage is near the reset position, intersects the area of operation of reset arm 63 so as to engage said reset arm 63, said projection and said contact pad intermeshing between said reset arm 63 and short arm 62.

Said second stage lever also has a rigid yoke structure 52 (see FIG. 1-A) which wraps around said first stage lever thus forming upper and lower portions of said second stage lever with respect to said first stage lever, which rotatably connects with said pivot pin 54 both above and below said first stage lever, and which allows said second stage lever to additionally and advantageously operate in an adjacent parallel plane below said first stage lever. Pivot pin 56 is rigidly connected to the upper portion of said second stage lever and extends up into an adjacent parallel plane while pivot pin 57 is rigidly connected to the lower portion of said second stage lever and extends down into an adjacent parallel plane. Said pivot pins 56 and 57 are located in line and define a common axis which is parallel to the axis defined by said pivot pin 54. Such a yoke structure reduces bending moments in said pivot pins and provides two shear areas per pivot axis, both of which advantageously enable the use of smaller diameter pivots for reasons of minimizing load induced frictional torques in said two stage leverage mechanism. The distance between said pivot pin 54 and said pivot pins 56 and 57 defines a second stage short arm of length L2s. L2s is small in comparison to either L1g or L2g in order to be able to produce a high leverage at the reset position. Connecting links 51 and 53 are rotatably connected to said second stage lever by said pivot pins 56 and 57 respectively and operate in the adjacent parallel planes extended into by respective said pivot pins 56 and 57. Said rigid frame lies both above and below the planes of operation of said connecting links and said connecting links thence rotatably connect to said rigid frame through pivot pins 58 and 59 respectively. Said pivot pins 58 and 59 are in line and define a common axis which is parallel to the axis defined by said pivot pin 54. The distance between said axis of said pivot pins 56 and 57 and said axis of said pivot pins 58 and 59 defines the length of said connecting links, Lc. Said second stage short arm in combination with said connecting links is used to generate a relatively short torque arm of length R2s, at the reset position, which acts between said first stage of leverage and said rigid frame. Advantageously, L2s is small in comparison to Lc for reasons of minimizing rotational movement on said pivot pins 58 and 59 and reducing rotational movement on said pivot pins 56 and 57 at the point of release from the reset position which advantageously lowers frictional losses and enables higher leverage to be obtained at the reset position. Said pivot pins 56 and 57 and said pivot pins 58 and 59 are located in an advantageous manner with respect to said pivot pin 54 and said output shaft 20 for reasons of quarter turn compatibility and being substantially as shown. The distance between said output shaft 20 and said pivot pins 58 and 59 define frame links 29L of length Lf in said rigid frame. In this embodiment, and according to my calculations, the lengths of the various arm lengths observe the following relationships so that said two stage leverage mechanism is able to actuate through a quarter turn and the area of operation of said connecting links 51 and 53 are completely overlapped by the area of operation of said first stage lever 47 and said second stage short arm of said second stage lever in order that said two stage leverage mechanism is compact.

$(Lf+Lc)$ is slightly less than $(L2s+L1g)$ $2(L2s+Lc)$ is slightly greater than $$\sqrt{2(L1g)}$$

It will be noted that the combination of said first stage lever, said second stage lever, said connecting links, and said frame links forms a four bar mechanism generally indicated at 48 in FIG. 3-B.

Said third stage leveraging release lever is comprised of an arm mounting element 66 which is rotatably mounted to said rigid frame by pivots 64 and 65, said short arm 62 which comprises a land or flat surface which advantageously lies in a substantially radial plane extending from the axis of rotation of said arm mounting element for reasons of minimizing frictionally induced torques in said third stage, a long arm 70 which rigidly connects to said arm mounting element, and a reset arm 63 comprising an elongated pin which rigidly connects to said arm mounting element and extends therefrom in a substantially radial direction and at approximately a 45 degree relationship to said short arm 62 as shown. At the reset position, said contact pad 61 of said second stage lever contacts said short arm 62. The distance between the axis of rotation of said arm mounting element and said contact pad defines a third stage short torque arm of length R3s. Said long arm comprises a land 71 at its end for engaging trigger bearing 75 and a ramp 72 also at its end for deflecting said trigger bearing during reset actuation. At the reset position, said long arm 70 contacts said trigger bearing. The distance between the axis of rotation of said arm mounting element and said trigger bearing defines a third stage long torque arm of length R3g. Spring 67 lightly torques said third stage in the counterclockwise direction as seen from FIG. 1. Stop 68 is rigidly mounted to said rigid frame. After triggering, said third stage spring holds said long arm against said stop to define the returned position of said third stage leveraging release lever, the reset and returned position thereof being a quarter turn or somewhat less apart.

Figure 2:
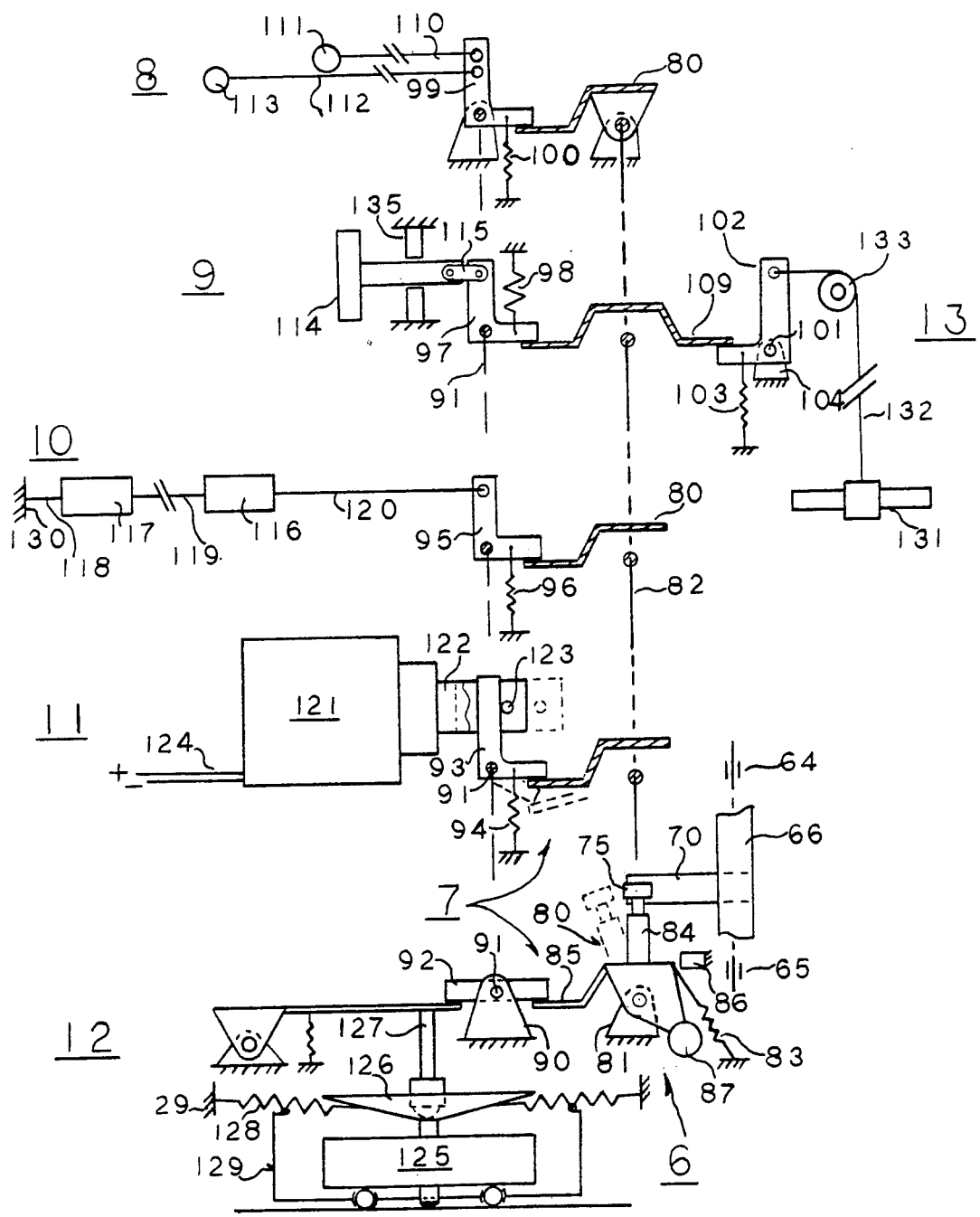

Said trigger comprises a trigger lever 80 which is rotatably mounted to said rigid frame through pivot connection 82 and bracket 81. Said trigger lever has a trigger arm 84 and contact arm 85. Said trigger bearing is a miniature ball bearing, although as will be seen said trigger bearing can also be a plain roller or a sliding surface as the trigger load can be made rather low, on the order of a few ounces of force for example. The inner race of said trigger bearing is rotatably mounted to said trigger arm thereby providing rotational redundancy in that said trigger bearing can rotate either through the rolling action of said ball bearing or, failing that, the sliding action between said inner race and said trigger arm. The axis of rotation of said trigger lever is substantially perpendicular to the plane containing said long torque arm land 71 so that there are substantially no force components of the trigger load force in the direction of the trigger throw either tending to hold or release said trigger. A spring 83 lightly torques said trigger lever to maintain the trigger hold position. In FIG. 2, said trigger arm is shown in solid lines and dashed lines which indicate the trigger hold position and release position, respectively. The hold position of said trigger lever can be determined either by stop 86 or by the reset or hold positions of said sensors, transducers, and other trip actuators. Said trigger lever can include a balancing mass 87 so that translatory accelerations will not produce any direct torqueing of said trigger lever through inertial forces acting thereon, thereby minimizing the possibility of false triggering in high acceleration or high vibration environments.

Means for implementing OR logic between said sensors, transducers, and other trip actuators 8 through 13 to produce an OR output thereof for operating said trigger is generally indicated at 7. Said OR means comprise the said contact arm and redirection levers 92, 93, 95, and 99 which are rotatably mounted to pivot shaft 91 which thence connects to said frame bracket 90. Redirection lever 102 is rotatably mounted to pivot shaft 101 which thence connects to frame bracket 104. Said redirection levers are rotatably independent of each other. Said redirection levers are each able to make a surface contact type connection with said contact arm 85. Springs 94, 96, and 100 torque said redirection levers 93, 95, and 99, respectively, in the clockwise direction while springs 98 and 103 torque said redirection levers 97 and 102 in the counterclockwise direction, as seen from figure 2. Said contact connections between said redirection levers and said contact arm 85, which are in parallel, implements the OR logic between said sensors, transducers or other trip actuators.

FIG. 2 shows a sample of said sensors, transducers, and other trip actuators which can be used with said universal trip valve operator and demonstrate the capability and versatility of said universal trip valve operator.

A fusible link sensor for detecting fire or high temperatures is generally indicated at 10 and comprises fusible links 116 and 117 and light cable connections 118, 119, and 120. Said fusible links and said cable connections are connected in series between said redirection lever 95 and a securing point 130. Said fusible link sensors may be remotely located. Said fusible links restrain said redirection lever against the action of said spring 96 and cause said redirection lever to maintain a hold or reset position.

A solenoid trip actuator or transducer for enabling some electrical or electronic control system to effect triggering is generally indicated at 11 and comprises solenoid 121 which is mounted to said rigid frame. Plunger 122 and crosspin 123 restrain said redirection lever 93 against the action of said spring 94 and cause said redirection lever to maintain a hold or reset position when voltage is applied to wire leads 124.

A local manual control trip actuator, generally indicated at 9, comprises a pushbutton 114 which is slidably mounted in bracket 135. Connecting link 115 connects said pushbutton with redirection lever 97. Spring 98 biases redirection lever 97 counterclockwise so as to return said pushbutton to the left as seen from FIG. 2.

A remote manual control trip actuator is generally indicated at 13 and comprises a pull handle 131, cable 132, and one or more cable guide roller(s) 133. Said cable 132 connects said pull handle, which is remotely located, with said redirection lever 102. Said cable guide roller is a cable routing aid. Such a cable routing aid could be used in any sensor or transducer utilizing a cable connection, such as said fusible link sensor 10.

Means for mechanically implementing AND logic between mechanically transduced sensors is generally indicated at 8. Sensors 111 and 113 are connected in parallel to said redirection lever 99 through tensioned cable connections 110 and 112 respectively. For example, said sensors 111 and 113 might be a fusible link sensor and a liquid level float sensor, respectively.

A seismic vibration sensor and transducer is generally indicated at 12 and has a mass element 125, a spring network 128, a ball bearing 129, a conical transducer cam 126 and follower 127. Said mass element rests on said ball bearing. Said conical transducer cam is rigidly connected to said mass element while said spring network connects said mass element and said conical transducer cam with said rigid frame. Lateral and/or vertical deflections of said mass element due to ground vibrations result in deflection of said follower which through said redirection arm 92 results in deflection of said trigger, sufficient deflection of said trigger causing triggering of said universal trip valve operator. Said seismic vibration sensor and transducer is discussed in detail in the fourth embodiment.

Figure 9:
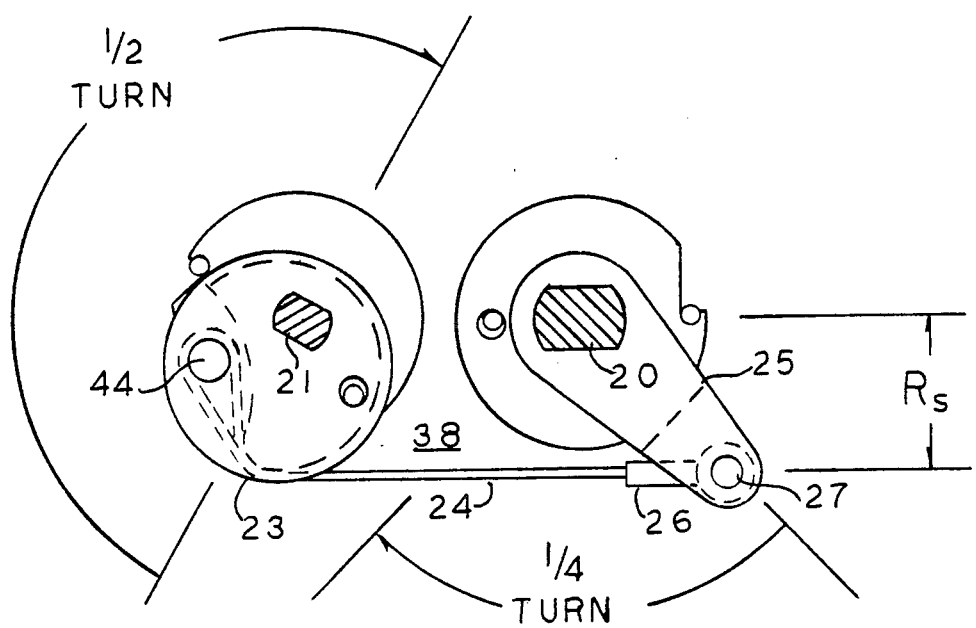
FIG. 9 is an enlarged top view of the spring return actuator 3 in FIG. 1.
Figure 10:
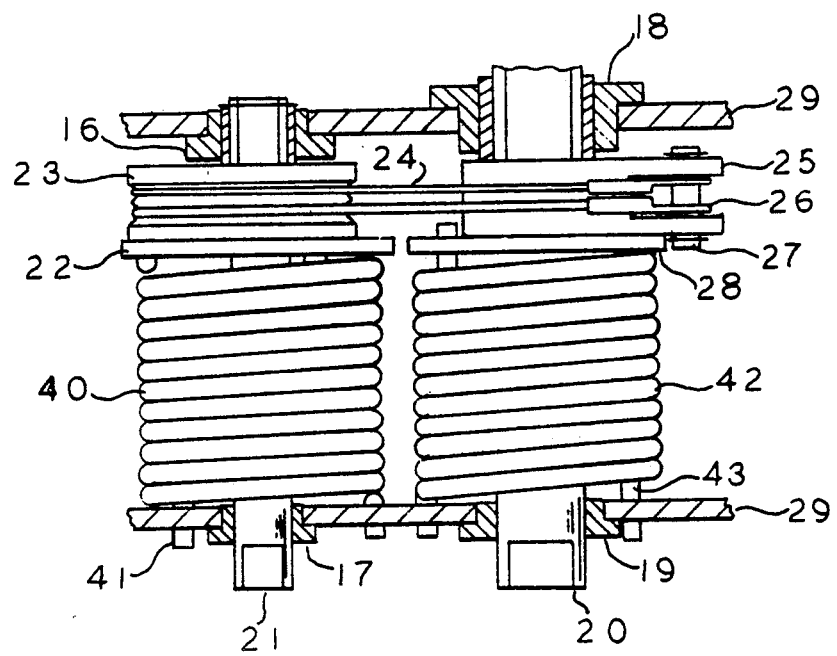
FIG. 10 is a side view of the spring return actuator 3 taken along line C—C in FIG. 1.

Said spring return actuator, shown in FIGS. 1, 9, and 10, is of the type disclosed in my U.S. Pat. No. 4,869,459. Reference should be had thereto for further detailed descriptions of this type of spring return actuator and its relation to typical quarter turn valve loads, spring return actuator efficiency and controlled actuator torque output. Generally, said spring return actuator comprises a bias transmitting and transforming device, generally indicated at 38, nested torsion springs 40 and 41 which act through said bias transmitting and transforming device to apply a transformed torque output to said output shaft 20, and nested torsion springs 42 and 43 which act directly on said output shaft 20. Said bias transmitting and transforming device comprises eccentric spool 23, cable 24, and said arm 25. In detail, said spring return actuator comprises a second shaft 21 which is rotatably mounted in said rigid frame by bearings 16 and 17. Said second shaft 21 has a pair of flats at its top end forming a double dee shaft end which mates with corresponding double dee holes in spring connector plate 22 and said eccentric spool 23. Said nested torsion springs 40 and 41 are connected between said rigid frame and said spring connector plate 22 and create torque about said shaft 21 in a clockwise direction as seen from FIG. 9. As already noted, said arm 25 and said spring connector plate 28 are coupled to said output shaft 20. Nested torsion springs 42 and 43 are connected between said rigid frame and said spring connector plate 28 and create torque about said output shaft 20 in the clockwise direction as seen from FIG. 9. Cable 24, having terminals 26, connects through said terminals and pin 27 to the end of said arm 25. Said cable contacts the periphery of said eccentric spool in two grooves and connects thereto by forming a loop around pin 44, the loop allowing equal tensioning of the two cable legs formed thereby as caused by the forces due to said torsion springs 40 and 41.

Said controlled actuator, see FIG. 1, comprises a removable handle 30 which mates with the periphery of said coupling 31 for manually resetting said ball valve and said universal trip valve operator. Said coupling has a notch 35 in which one edge is oriented in a substantially radial direction and the other edge is oriented in a substantially tangential direction. Said handle has a projection 36, which fits into said notch substantially as shown, and a curved jaw 34 of substantially the same radius of curvature as said coupling and fitting thereover substantially as shown. Said handle is made of sufficient length so that a moderate application of force produces the requisite torque to effect the reset of said ball valve and said universal trip valve operator.

FUNCTIONS AND OPERATION

The overall operation of said universal trip valve operator is as follows.

At the reset position, which is shown in FIG. 1, said spring return actuator is fully tensioned in order to provide a torque output for actuating said valve to the returned position. Said light spring 83 biases said trigger to maintain the hold position thereof. Said trigger restrains said third stage leveraging release lever which in turn restrains said two stage leverage mechanism which thence restrains said spring return actuator and said valve, thus maintaining the reset position. Said two stage leverage mechanism and said third stage function to reduce the load on said trigger. Said sensors, transducers and trip actuators conditionally maintain their hold positions and, through said OR logic device, allow said trigger to maintain the hold position. Further OR logic is implemented in said sensor 10 where said fusible link sensors connect in series between said securing point 130 and said redirection lever 95. AND logic is implemented in said sensor 8 where said sensors 111 and 113 connect in parallel to said redirection lever 99.

In the triggering and return actuation of said universal trip valve operator, if sensor 111 'and' 113, 'or' said pushbutton 114, 'or' said remote manual grip, 'or' said fusible link 116 'or' 117, 'or' said solenoid, 'or' said seismic sensor produce a trip actuating output, then said trigger lever 80 is rotated counterclockwise to the release position and said trigger bearing clears said land 71 of said third stage long arm 70. As shown in FIG. 3, when said trigger bearing releases said third stage long arm, said third stage long arm rotates approximately 90 degrees, so that said contact pad can clear said third stage short arm, and releases said second stage long arm and, hence, said two stage leverage mechanism. (For clarity in FIGS. 3-A to 3-C, said third stage long arm and said trigger are shown 180 degrees out of place from that of FIG. 1.) Said third stage is self releasing, that is, the release of said third stage is a result of the load placed thereon by said second stage long arm, no additional actuating devices being needed to rotate said third stage to release said second stage long arm. While said light spring 67 contributes in a minor way to the releasing of said third stage, the primary purpose of said spring 67 is to position said third stage long arm against said stop 68 in preparation for reset actuation. Said two stage leverage mechanism is also self releasing from the reset position. Therefore, under the action of said spring return actuator, said valve and said two stage leverage mechanism are actuated from the reset position to the returned position. As can be seen in FIG. 3-C, said first stage lever undergoes a quarter turn actuation, consistent with said valve and said spring return actuator, and said second stage lever accomodates this quarter turn motion. Advantageously, the operating area of said connecting links is completely overlapped by the operating area of said first stage lever and said second stage short arm thereby eliminating the need for additional operating area to accomodate said connecting links. Also advantageously, said second stage long arm operates over or overlaps with substantially the same quadrant of operation as said first stage lever and at the returned position said second stage long arm folds up over said first stage lever, thus substantially eliminating the need for additional operating area to accomodate said second stage long arm. The returned position is preferably defined by a frame stop 69 which acts on said first stage lever.

To reset said universal trip valve operator and said valve, said removable handle 30 is mated with the periphery of said coupling, said projection 36 fitting into said notch 35. Said handle and coupling are manually torqued and rotated counterclockwise as seen from FIG. 1, thus actuating said valve, said spring return actuator, and said two stage leverage mechanism from the returned position to the reset position, said spring return actuator being retensioned thereby. As said two stage leverage mechanism approaches the reset position, said projection 60, of said second stage long arm 49, engages said reset arm 63 of said third stage and actuates said third stage back to the reset position, as shown in FIG. 4. If all said redirection levers are at their trigger hold positions as shown in FIG. 2, then said trigger and trigger bearing will also be at the hold position. Then, and as shown in FIGS. 4-F through 4-H, as said third stage approaches the reset position, said ramp 72 contacts said trigger bearing 75 and deflects said trigger bearing and said trigger lever out of the way of said third stage long arm and against the bias of said light spring 83. The reset actuation continues until said first stage lever contacts stop 55, said stop 55 determining the maximum rotation of said handle. At this point, said third stage long arm is past said trigger bearing and said light spring causes said trigger lever to actuate back to the trigger hold position. As said handle is released, said first stage lever and said second stage lever each rotate a small amount in the clockwise direction thus permitting said third stage to return through a small rotation until said long arm land 71 contacts said trigger bearing. Said second stage long arm thence returns through a subsequent small rotation until said contact pad contacts said third stage short arm land. Said valve, said spring return actuator, said two stage leverage mechanism, said third stage, and said trigger are now reset and said handle can now be removed and perhaps stored in a secure location and only issued to authorized personnel. In reference to said notch and said handle, it will be noted that the geometry of said notch is such that said handle can not be used to produce a clockwise actuation which is a preferable feature in order to prevent said handle from being used to force said trip valve operator from the reset position toward the return position and thus prevent possible damage to said trigger, said third stage, or said two stage leverage mechanism. If, during the reset actuation, one or more of said redirection levers had been at the release position (as caused for example, by voltage having not been reapplied to said solenoid for whatever reason), then said trigger lever and said trigger bearing would still be at the release position. As said third stage approaches said reset position, it does not re-engage said trigger bearing. When said handle is released, said spring return actuator actuates said valve and said two stage leverage mechanism back to the returned position.

Within said spring return actuator, said eccentric spool, said cable, and said arm 25, which form said bias transmitting and transforming device, act to transform the basic actuation characteristics of said nested torsion springs 40 and 41 (a declining output as described by the rotary form of Hooke's Law) into an increasing torque output at said output shaft 20 and extract most of the spring energy storage capacity of said springs 40 and 41 in producing said increasing output. Said increasing output is such that when added to the declining output produced by said nested torsion springs 42 and 43 the combined output is approximately a constant torque over the quarter turn actuation stroke. Such an output is efficiently loadmatched to the relatively constant torque load of said ball valve. Additionally, the net retensioning characteristics of said spring return actuator are also approximately a constant torque which is efficiently loadmatched to the approximately constant torque output of said manual handle controlled actuator. As noted in my U.S. Pat. No. 4,869,459, the output of said spring return actuator is not limited to a constant torque output but is capable of many outputs, the form of said output being a design parameter. Also, as noted in my U.S. Pat. No. 4,869,459, there are other bias transmitting and transforming devices aside from those discussed above which alternatively could be used in said spring return actuator.

Quarter turn valve loads and, therefore, said spring return actuator output torque are relatively high. Depending on size and other factors, these loads and outputs can range from several tens of inch pounds to over several thousand foot pounds of torque. However, the trip actuating outputs, which can be provided by sensors or transducers that are reasonably compact and inexpensive, are low and generally are on the order of a few ounces to a few pounds. Therefore, the primary functions, properties and requirements of the three stage trigger load reducing device comprising said two stage leverage device and said third stage leveraging release lever are:

(1) provide sufficient leverage at the reset position for reducing the trigger load to a low level so that said sensors or transducers can reliably operate said trigger;

(2) when triggered, reliably release from the reset position to allow said spring return actuator to actuate said valve to the return position;

(3) be compact;

(4) be compatible with the quarter turn requirements of said valve and said spring return actuator;

(5) be single action resettable;

(6) be capable of being scaled up to handle the larger loads of larger versions of said valve and said spring return actuator, while allowing little or no growth of the trigger load and dimensionally not scaling substantially any faster than quarter turn valve dimensions.

At the reset position, said three stage leverage device generates a total leverage, N, which is the product of the leverage of said first stage, N1, said second stage, N2, and said third stage, N3, where;

$$N = N1 \, N2 \, N3$$
$$N1 = R1g$$
$$N2 = R2g/R2s$$
$$N3 = R3g/R3s$$

The force impressed on said trigger bearing, F3, due to the torque output, M, of said spring return actuator, is;

$$F3 = M(1/R1g)(R2s/R2g)(R3s/R3g)$$

Although the above equations do not include a factor for the short torque arm of said first stage lever, as the output of said spring return actuator is conveniently considered as a torque, it will be noted that the short torque arm associated with said first stage lever can be taken as an average spring torqueing radius about said output shaft 20 or can be taken as one of the spring torqueing radii about said output shaft 20 (i.e. the radius of said torsion springs 42 or 43 or dimension Rs in FIG. 9). Said first stage lever is made sufficiently long so that R1g is greater than the various spring torqueing radii in order to provide a stage of leverage for reducing the trigger load.

By making R1g, R2g, and R3g relatively long and making R2s and R3s relatively short, then it can be seen that high leverages and hence low trigger loads result. For example, if R1g=1.4 in., R2g=2.5 in., R3g=1.25 in, R2s=0.18 in., and R3s=0.12 in., then according to my calculations N=203. If, furthermore, said three stage trip load reducing device with these dimensions were used on a ¾ NPT ball valve which typically has a recommended actuation torque of 90 in. lb., then the trigger force is, $$F3 = 90/203 = 0.44 \text{ lb.} = 7 \text{ oz.}$$

which is in a reasonable range for a trigger load.

The compactness of said three stage leverage device is a result of several features. First, while the total leverage of said three stage leverage device is the product of the leverage of each of said stages of leverage, the size of said three stage leverage device is related to the sum of the lengths of said stages of leverage while the operating area of said three stage leverage device is related to the square of the lengths of said stages of leverage. Additionally, said second stage of leverage is so configured as to operate substantially over the same quadrant of operation as said first stage lever and said third stage leveraging release lever is also located so as to operate substantially within the same quadrant as said first stage lever, thus, the operating area of said three stage leverage device is only on the order of L1g squared.

In order that said three stage leverage device can provide high leverage and reliably release from the reset position when triggered, it is necessary to:

(1) minimize the load induced frictional holding torques, and;

(2) provide an ample releasing torque to reliably overcome the largest credible amount of frictional holding torques.

Frictional holding torques within said three stage leverage device are minimized by having the various load induced frictional forces act through small torque arms. In said two stage leverage mechanism, the forces and reactions act through, and therefore the consequent frictional forces and reactions act on, said pivot pins which have relatively small diameters. Said pivot pins, however, are of sufficient cross-sectional area to provide ample strength to carry the loads imposed thereon. It will be noted that said yoke structure 52 of said second stage lever provides two pivot shear areas per pivot axis, thus enabling the use of smaller diameter pivot pins to carry the same load which, in turn, reduces load induced frictional torques. The frictional torque, Mf, developed on any pivot is:

$$Mf = Us\ F\ Rp$$

where,

Us - largest credible coefficient of friction
F - force on pivot
Rp - radius of pivot Said pivot pins can advantageously be coated with a dry lubricant such as molybdenum disulphide or tungsten disulphide in order to obtain lower coeffients of static friction. Said dry lubricants, it is variously claimed, do not oxidize or rub off. It will be apparent to those skilled in the art that the frictional forces on said pivot pins could be reduced through the use of various antifriction bearings, such as ball bearings, or various greases. Ball bearings, however, are costly and are subject to chocking by minor contamination making them less reliable. Greases would require a maintanence interval for relubricating said pivots which if not met would compromise reliablity.

In said third stage leveraging release lever, said contact pad of said second stage lever applies a loading force normal to said short torque arm land. The frictional force developed thereby lies in the plane of said short torque arm land. As said short torque arm land is radially oriented with respect to the axis of rotation of said pivots 64 and 65, said frictional force acts through said axis of rotation of said pivots 64 and 65. With such an orientation, said frictional force acts through no torque arm and hence generates no frictional torque. The reaction to said loading force from said contact pad acts through said pivots 64 and 65. As said pivots 64 and 65 are of relatively small diameter (ample to carry said reaction), frictional torqueing is accordingly minimized. Said third stage long arm applies a relatively small trigger load force to said trigger bearing. Said trigger bearing is a ball bearing and largely eliminates much of the resulting frictional loading of said trigger. That said trigger bearing is a rolling element type bearing, rather than a plain sleeve bearing roller or a simple direct contact sliding surface, is preferred because of its friction reducing properties and the smooth triggering action which results, but is not essential because the trigger load is small. Even with a high coefficient of static friction, the resulting frictional load on said trigger will be small and will be able to be overcome by the trip actuating output produced by said sensors, tranducers or other trip actuators.

Said releasing torque, preferably, is self generated within said three stage leverage device by setting said second stage and third stage small torque arms above a minimum value. According to my analysis using the principle of virtual work, in said two stage leverage mechanism;

| $R2s > 2\ Us\ Rp$ | $R2s$ — | second stage short torque arm |
|---|---|---|
| or $R2s = 2\ Us\ Rp\ K$ | $Us$ — | largest credible coeffient of static friction |
| | $Rp$ — | radius of said pivots 54, 56 & 57 |
| | $K$ — | reliability factor, preferably $\geq 2$ |

It will be noted that at the release from the reset position, the initial rotation of said second stage lever is accompanied by very little initial movement of said connecting links which is a result of having L2s small in comparison to Lc. In fact, if said pivot pins 56 and 57 had been set up to have a reset position location directly in line between said pivot pin 54 and said output shaft 20, then, in the limit of small rotations for said first stage lever and said second stage lever, said connecting links would have no initial rotation. As a result, the initial rotation of said pivot pins 56 and 57 is approximately equal to the initial rotation of said pivot pin 54 and there is no initial rotation on said pivot pins 58 and 59. Thus, although there is frictional torque on said pivot pins 58 and 59, there is no initial motion and such frictional torque does not have to be overcome by the releasing torque hence enabling the reliable use of smaller releasing torque and advantageously obtaining higher leverage. By contrast, if L2s had been made equal to Lc, then as much initial rotation would occur on said connecting links as on said second stage lever thus requiring more releasing torque. In this case:

$$R2s > 4Us\ Rp$$

In said third stage release lever, according to my analysis, said third stage short torque arm should be kept above the following minimum value:

$$R3s > Us\ Rp$$

where,

R3s- third stage short torque arm
Us - largest credible coefficient of static friction
Rp - radius of said pivots 64 & 65

Figure 5:
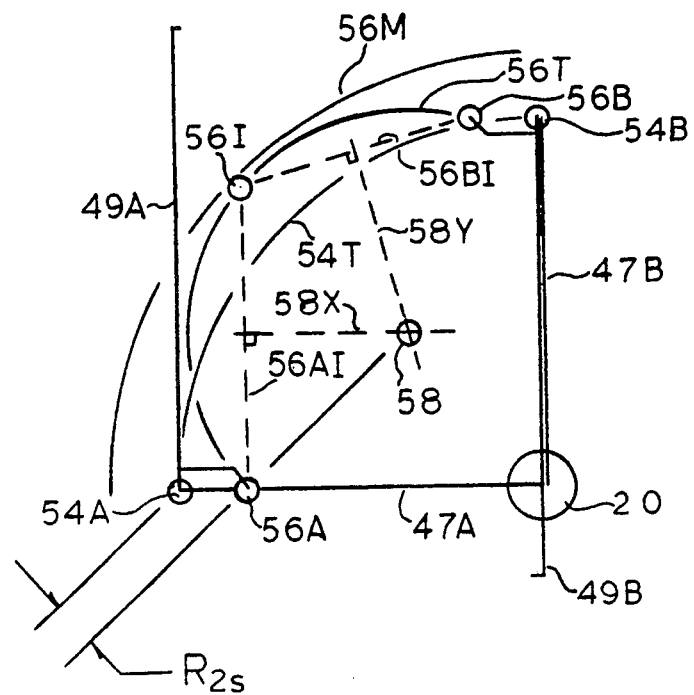
FIG. 5 is a diagram of the two stage leverage mechanism 4 in FIG. 1 with a geometric construction for locating connecting link frame pivot 58.
Figure 6:
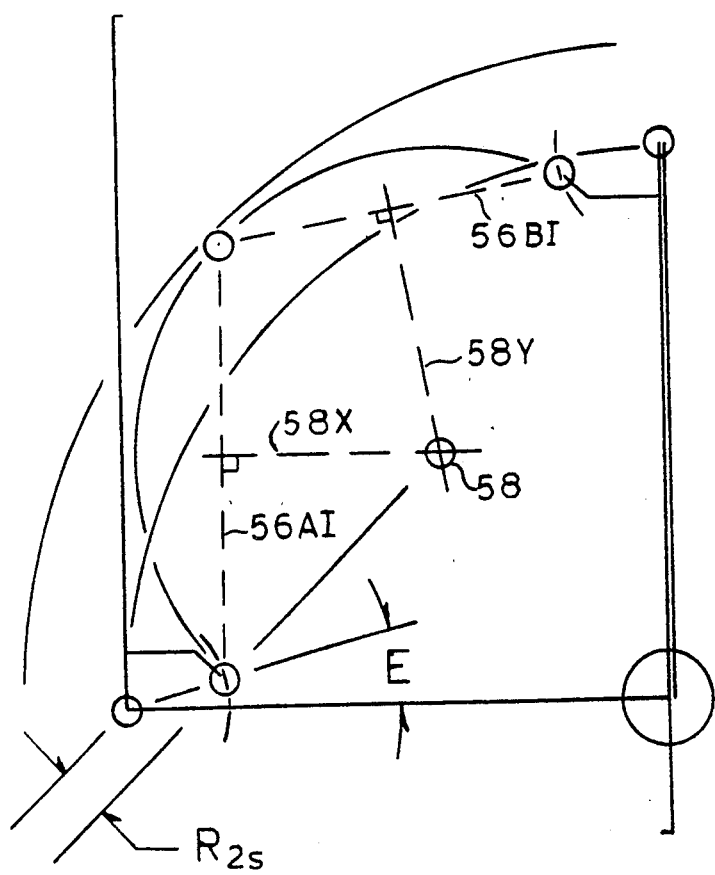
FIG. 6 is a diagram illustrating, with respect to FIG. 5, a scaled up version of the two staged leverage mechanism 4 as well as the geometric construction for locating pivot 58.

Quarter turn compatibility is provided in the following manner. As said first stage lever couples to said shaft 20, said spring return actuator, said coupling, and to said quarter turn valve, then said first stage lever under goes a quarter turn actuation between the reset position and the returned position. Said second stage lever is made compatible with the quarter turn motion of said first stage lever by locating said pivot pins 58 and 59 such that the distance of said pivots 56 and 57 from said shaft 20 is always less than L1g+L2s. Referring to FIG. 5, to determine an acceptable location for said pivot pins 58 and 59 so that said two stage leverage mechanism is quarter turn capable, first the reset and returned position for said first stage lever and said second stage lever are chosen. Said first stage lever determines the position of said pivot 54 at the reset position, returned position, and the trajectory therebetween, indicated by 54A, 54B, and 54T respectively. The reset position of said pivots 56 and 57, indicated as 56A, is selected so as to produce a small said second stage short torque arm dimension, R2s, for the above reasons of generating a high leverage at the reset position, but also large enough to provide ample releasing torque from the reset position. While there are many possible positions for said pivots 56 and 57 which will produce the required leverage and releasing torque, it is advantageous to keep L2s small in comparison to Lc for reasons of minimizing initial rotation on said pivots 58 and 59 as previously discussed. At the returned position, the location for said pivots 56 and 57, indicated as 56B, is preferably chosen so that the returned position of said second stage long arm 49 is substantially within the quadrant of operation of said first stage lever, in this case folding over said first stage lever, thereby minimizing operating space requirements. Arc 54T is the trajectory of said pivot 54. The radius of arc 56M is L1g+L2s which is the maximum distance which said pivots 56 and 57 can get from said shaft 20. As said connecting link is a simple rigid link and said pivot 58 and 59 are rigidly connected to said rigid frame, said pivots 56 and 57 will follow a circular trajectory determined by said connecting links. In order for said pivots 56 and 57, and therefore said two stage leverage mechanism to be able to actuate between the reset position and the return position and thus provide the required quarter turn capability, the circular trajectory of said pivots 56 and 57 is kept within said arc 56M. Therefore, an intermediate point, 56I in the trajectory of said pivots 56 and 57 is chosen to lie slightly within said arc 56M. As three points uniquely determine the center of a circle, said pivot locations 56A, 56I, and 56B determine the location of said pivots 58 and 59. Arc 56T is the resulting trajectory of said pivots 56 and 57 and lies completely within said arc 56M. As shown in FIGS. 5 and 6, said pivot 58 can be found by geometrically constructing line segments 56AI and 56BI and the perpendicular bisectors respectively thereof. The intersection of said perpendicular bisectors locates said pivot 58. Such a location of said pivots 58 and 59 gives rise to the motion of said second stage lever shown in FIG. 3-C. It will be appreciated that several iterations of the above procedure may be necessary in order to locate said pivots 56 and 57 and said pivots 58 and 59 such that a particular value of R2s results. Although the above procedure was described in terms of graphical or geometric analysis, it will be apparent that the above procedure could also be carried out in terms of a mathematical analysis with resulting greater accuracy.

Said third stage leveraging release lever is compatible with the quarter turn actuation of said first stage lever and said second stage lever as said third stage lever simply disengages from said second stage lever during release from said reset position.

Single action resetability of said three stage trip load reducing device by a simple reset actuation through said output shaft 20, as would be caused by said manual handle controlled actuator acting on said coupling, is attained as follows. Said first stage lever is directly coupled to said output shaft 20. Due to the fact that said first stage lever and said second stage lever are part of said two stage leverage mechanism which has one degree of freedom when actuating between the reset position and the returned position and vice versa, said second stage lever is guided, in the particular manner shown in FIG. 3-C, from said returned position back to said reset position. This guiding could also be considered due to said connecting links which cause said first stage lever and said second stage lever to form a mechanism.

Referring to FIGS. 4-A through 4-H as said second stage lever approaches the reset position, said projection 60 contacts said third stage reset arm 63. The continued motion of said second stage and said projection toward the reset position causes the rotation of said third stage back to the reset position against the bias of said light spring 67. Note that said contact pad clears said third stage short arm land. As said third stage approaches the reset position, said ramp 72 contacts said trigger bearing 75 and deflects said trigger bearing and said trigger lever out of the way of said third stage long arm 70. Said trigger lever being deflected out of the way against the light bias of said spring 83. It will be noted that the extra reset actuation bias needed to overcome the bias of said light springs is rather small. The angle of said ramp and the increasing pressure angle with which said projection contacts said reset arm 63 both provide leverage which further reduces said extra reset actuation bias needed to deflect said light spring 83. As said third stage long arm reaches the reset position, said trigger bearing and said trigger lever drops back to the hold position. When said first stage lever contacts said stop 55, which is slightly past the reset position, said second stage lever and said third stage lever will be in the position shown in FIG. 4-G. As the reset actuating bias is removed from said manual handle, said spring return actuator returns said two stage leverage mechanism and said third stage lever to the reset position, shown in FIG. 4-H.

The scaling up of said three stage leverage device to handle larger valve loads and spring return actuator output torques while allowing no growth of the trigger load and hence trip actuation requirements and dimensionally not scaling up any faster than the dimensions of said quarter turn ball valve, can be attained as follows. Reference should be had to FIG. 6 in comparison with FIG. 5. It was previously noted that in some of the larger sized quarter turn valves, the recommended actuation torque requirements, M, typically can scale as the valve size, S, to approximately the second power;

$$M \sim S^2$$

If said first stage lever length, L1g, and said first stage torque arm, R1g, are scaled up as the valve size, then the force, F1, on said pivots 54, 56 & 57, and 58 & 59 scales up as the valve size;

$$F1 \sim M (1/R1g)$$

$$F1 \sim S^2(1/S) = S$$

Therefore, the area, A1, of said pivots are scaled up as F1 in order to maintain their strength, $A1 \sim F1 \sim S$. (Note that the scaling of pivot strength as the area thereof results from either shear strength or bending strength. Shear strength increases as pivot radius squared or $Rp^2$. While bending strength, strictly speaking, increases as $Rp^3$, in fact the thickness of the various levers, connecting links, and pivot bearings which rotatably connect with said pivots will also scale up, thus scaling up the bending moments in said pivots. As a result, bending strength is taken to scale approx. as $Rp^2$.) As the area of said pivots scales with the radius of said pivots to the second power, $$A1 \sim Rp^2, \text{ and therefore}$$

$$Rp \sim S^{\frac{1}{2}}.$$

As noted previously, said second stage small torque arm, R2s, relates to the radii of said pivots in order to produce a reliable release from the reset position. Therefore, $$R2s \sim Rp \sim S^{\frac{1}{2}}.$$

Note that in scaling up from FIG. 5 to FIG. 6, said second stage short arm of length L2s is scaled up with said first stage lever of length L1g so that L2s remains in the preferred range of $\frac{1}{4}$ to 1/6 of L1g. Not scaling up L2s and therefore having L2s less than 1/6 L1g would cause said pivot 58 to, proportionately speaking, become closer to said shaft 20 thus decreasing the angle which said connecting links make with said first stage lever at the reset position which would cause higher forces to be produced therein which in turn would lead to less leverage and the need for heavier pivots. Therefore, $L2s \sim L1g \sim S$. For $R2s$ to scale as $S^{\frac{1}{2}}$ then, the location of said pivots 56 and 57 are angularly relocated toward the line determined by said pivot 54 and said pivot 58 as in FIG. 6 from that of FIG. 5. For example, as $R1g$ in FIG. 6 is about 1.5 times $R1g$ in FIG. 5, then, $R2^2$ in FIG. 6 is about $$\sqrt{1.5}$$

or 1.22 times $R2s$ in FIG. 5.

If said second stage long arm, $R2g$, is scaled as the size of said valve, then the force, F2, acting on said third stage short torque arm and said pivots 64 and 65 scale up as the valve size to the one half power.

$F2 \sim F1(R2s/R2g)$ $F2 \sim S(S^{\frac{1}{2}}/S) \sim S^{\frac{1}{2}}$

Therefore, the area A2 and radius $Rp_2$ squared, of said third stage pivots would then scale with F2 so as to maintain pivot strength.

$A2 \sim F2 \sim S^{\frac{1}{2}}$, and as, $A2 \sim Rp_2$, then, $Rp_2 \sim S^{\frac{1}{4}}$.

As $R3s \sim Rp_2$ for reliable releasing, then $R3s \sim S^{\frac{1}{4}}$. The trigger force, Ft scales as follows.

$Ft \sim F2(R3s/R3g) \sim S^{\frac{1}{2}}(S^{\frac{1}{4}}/R3g)$ $R3g$ only needs to scale as $S^{\frac{3}{4}}$ in order for Ft to remain constant and independent of said valve load and said spring return actuator torque. (If $R3g$ were scaled as S, then Ft would scale as $S^{-\frac{1}{4}}$ in which case Ft would actually get smaller as the valve size and loads increased.) As the trigger load remains constant, it is not necessary to scale up the trip actuating output of said sensors or transducers. As it is not necessary to scale up the trigger throw (the distance moved by said trigger bearing between the hold position and the release position) or the actuation strokes of said sensors or transducers, therefore it is not necessary to scale up the trip actuation work output of said sensors or transducers. Therefore, said sensors, transducers or other trip actuators do not have to be scaled up with the size of said valve.

Figure 7:
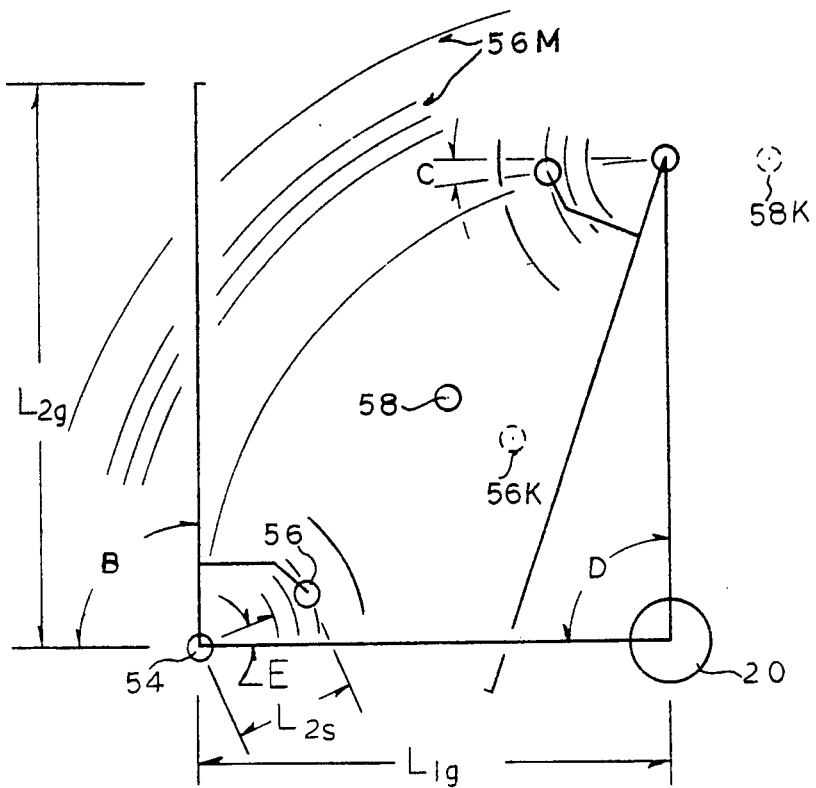
FIG. 7 is a diagram illustrating selectable design parameters of the two stage leverage mechanism 4.
Figure 8:
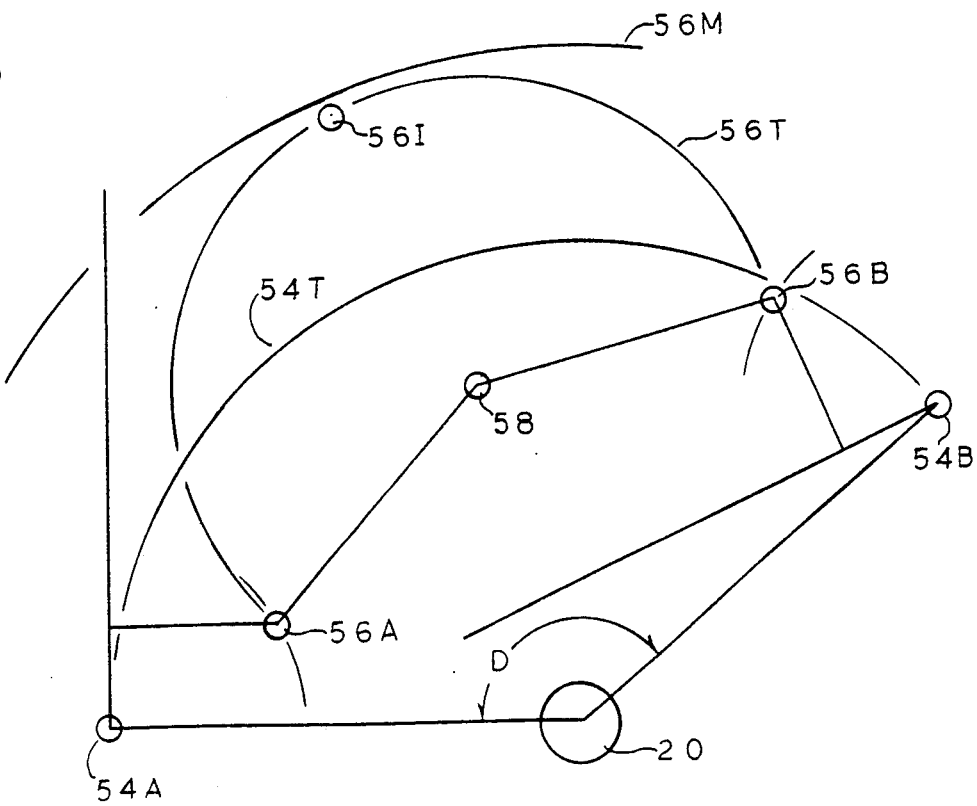
FIG. 8 is a diagram illustrating various other design parameters supplemental to FIG. 7.

Said two stage leverage mechanism has a number of design selectable parameters which are illustrated in FIGS. 7 and 8 and include:

(a) the length of said first stage lever, Lig;

(b) the length of said second stage short arm, L2s, which is preferably made ¼ to 1/6 of Lig but can be larger or smaller;

(c) the angle which said second stage short arm makes with said first stage lever at the reset position, E;

(d) the length of said second stage long arm, L2g, which is preferably about equal to Lig so that both said first stage lever and said second stage lever can have about the same operating area;

(e) the angle which said second stage long arm makes with said first stage long arm, B;

(f) the angular position of said second stage short arm, and therefore said second stage long arm, at the returned position, C;

(g) the angular rotation between the reset and the returned positions, D, which is preferably a quarter turn (in the range of 90 degrees necessary for quarter turn valve actuation), however, said angular rotation can be either more or less.

It will be noted that it is possible to locate said pivots 56 and 58 such that the area of operation of said connecting link 51 only partially overlaps with, to varying degrees, the area of operation of said first stage lever and said second stage short arm. An example of such an alternative location for said pivots 56 and 58 are shown in FIG. 7 at 56K (reset position) and 58K. These alternative locations, which result in partial overlap of said areas of operation, are less preferred than those locations which result in complete overlap because the total operating area is increased, hence increasing the overall size of said two stage leverage mechanism.

FIG. 8 shows a modification of said two stage leverage mechanism wherein said first stage lever undergoes approximately a 135 degree actuation between said reset position and said returned position. Such an actuation might be used where said first stage lever is not directly coupled to said valve stem but couples through some additional mechanism where the additional mechanism also provides a 135 degree to 90 degree actuation conversion. The multi-staged leverage device of the third embodiment is an example of such a mechanism. Said two stage leverage mechanism could be used in combination with the multistaged leverage device of the third embodiment as the final two stages of leverage. Also, said two stage leverage mechanism could be directly coupled to some specialty rotary actuated valve requiring 135 degrees or even 180 degrees of actuation rotation.

Said two stage leverage mechanism could also be adapted to operation on sliding stem type valve through the provision of a rotary to linear motion converting mechanism between said valve stem and said first stage lever. A slider crank, perhaps providing further leverage at the reset position, or a rack and pinion are but two examples of such mechanisms and others will suggest themselves to those skilled in the art.

As previously noted, said sensors and transducers operate said trigger through said OR logic device 7. Basically, said OR logic device combines the individual outputs of said sensors and transducers, in the manner of a logical OR, into a single hold or release type output for operating said trigger. The implementation of said OR logic device is the result of said sensors and transducers each acting in parallel on said trigger through a unidirectional surface contact connection (i.e. transmits compressive forces but not tensile forces) which in this embodiment is provided by the surface contact connection between said trigger contact arm 85 and said redirection levers. The purpose of said redirection levers is to enable simplified mounting of said sensors and transducers with respect to said trigger so that said sensors and transducers do not have to directly form a surface contact connection with said trigger contact arm. Each of said redirection levers is independently rotatable with respect to said pivot shaft 91. At the trigger hold position, each said redirection lever makes or nearly makes surface contact with said trigger contact arm 85. The actuation of any one or more than one of said sensors and transducers from the hold position to the release position causes the respective clockwise rotation of one or more of said redirection levers which in turn, through said unidirectional surface contact connection, causes the counterclockwise rotation of said trigger (shown in dashed lines in FIG. 2) from the hold position to the release position thereby causing the disengagement of said trigger bearing from said third stage long arm, hence triggering. The fact that some of said sensors and transducers did not actuate from the hold position to the release position in no way interferes with the actuation of other said sensors and transducers because said trigger contact arm 85 simply rotates away from those said redirection levers which have not been actuated by their respective said sensors and transducers. It will be noted that, instead of surface contact connections said undirectional connections could have been based on other unidirectional connections such as flexible element connections. A flexible element, such as a light cable, has the opposite property of a surface contact connection (i.e. transmits tensile forces but not compressive forces). Still other unidirectional connections will suggest themselves to those skilled in the art.

An AND logic function can be implemented in the sensor combination generally indicated at 8. Said sensors 111 and 113 are connected in parallel, by said tensioned cable connections 110 and 112, respectively, to a single redirection lever, namely said redirection lever 99. The use of cable in said connections 110 and 112 is preferred particularly when said sensors are remotely located due to the relative ease of routing a cable. It will be noted that said connections 110 and 112 do not have to be unidirectional connections. Both said sensors 111 and 113 restrain, through said respective cable connections, said redirection lever 99 against the bias of said spring 100. When both said sensors 111 and 113 release and no longer restrain said lever 99, then said spring 100 can actuate said lever 99 clockwise and thereby actuate said trigger counterclockwise to the release position thus causing triggering. Thus, it can be seen that the AND logic function can be implemented by two or more sensors or transducers connected in parallel which act to restrain the release of said trigger.

Still other ways of combining sensors and transducers to form OR and AND logic functions through the use of parallel and series type connections and through unidirectional type connections will naturally suggest themselves to those skilled in the art. It will be noted that there are ways of implementing the NOT logic function. For example, in the case of said solenoid, a no voltage release of said solenoid which results in triggering is the logical NOT of an applied voltage triggering. It will also be apparent that with the means for implementing OR, AND, and NOT logic functions, virtually any logical combination of sensor, transducer and other trip actuator outputs can be implemented.

In said local manual control trip actuator 9, if said pushbutton 114 is manually depressed, then said lever 97 rotates clockwise and said trigger is thereby rotated counterclockwise causing triggering. Said local manual control trip actuator 9 constitutes the primary means for manually causing the return of said valve to the return position. When said pushbutton is released, said spring 98 returns said pushbutton and said redirection lever 97 to the hold position.

Similarly, in said remote manual control trip actuator 13, if said grip 131 is pulled, then said redirection lever 102 rotates clockwise thereby causing counterclockwise actuation of said trigger to said release position and triggering. When said grip is released, said spring 103 returns said redirection lever 102 and said grip to the hold position.

In said fusible link sensor 10, if either of said fusible links 117 or 118 are melted due to a high environmental temperature as might be caused by a fire, then said spring 96 would no longer be restrained and would, therefore, rotate said redirection lever 95 clockwise which thereby rotates said trigger counterclockwise causing triggering. Said fusible link sensor will maintain the release position until it is reset by replacing those said fusible links which have melted. The relatively light trip actuating forces needed to operate said trigger and the use of said light cable connections 120, 119, and 118 enable said fusible links to be remotely located with respect said trip valve operator. Thus, for example, far downstream sections of a pipe (perhaps as far as another valve or trip valve) controlled by said trip valve can be sensed for fire. It will be noted that the connection of said fusible links in series forms yet another way of implementing an OR logic function combination of sensors.

Said solenoid transducer or trip actuator 11 is configured for no voltage release. When voltage is applied to said wire leads 124, then said plunger 122 through said crosspin 123 restrains said redirection lever 93 against the bias of said spring 94. When voltage is removed from said wire leads then said redirection lever 93 and said spring 94 will no longer be restrained. Said spring 94 will rotate said redirection lever clockwise thereby actuating said trigger counterclockwise to the release position causing triggering. Until whatever sensed condition which caused the removal of said voltage is cleared, said trigger will remain at the release position. This is an example of what was referred to as a step trigger. Thus, if attempts are made to reset said trip valve before said condition is cleared, then the reset position will not be held by said trigger and as soon as said manual handle is released, said valve will be actuated back to said returned position.

In said seismic vibration sensor and transducer 12, if said mass element is caused by vibratory or perhaps high accelerative motion to deflect from the position shown relative to said follower 127, then said transducer cam causes the vertical deflection of said follower which through said redirection lever 92 results in the counterclockwise actuation of said trigger. If the deflections of said follower are of sufficient magnitude, then triggering results. The vibratory response of said mass element results in an oscillatory actuation motion of said trigger between the hold position and the release position. This is an example of what was referred to as pulsed triggering. Said seismic vibration sensor and transducer does not need to be reset. Said seismic vibration sensor and transducer is described in detail in the fourth embodiment and reference should be had thereto.

Said sensors, transducers and other trip actuators which were described above should be considered illustrative of the versatility and capabilities of said universal trip valve operator and should not be construed as limiting the type or number of sensors, transducers and trip actuators which can be incorporated into or used with said universal trip valve operator. The use of many other sensors, transducers and trip actuators in said universal trip valve will naturally suggest themselves to those skilled in the art. A partial list of other conditions which could be sensed and mechanically transduced to operate said trigger using known sensors is as follows; a bimetallic strip temperature transducer for sensing high or low temperatures; a bourdon tube or small spring loaded diaphragm or piston for sensing high or low pressures (could be static pressure, dynamic pressure or differential pressure across for instance an orifice or venturi tube which correlates with flow rate); high or low flow rates; high or low liquid levels in a tank; displacement; velocity; acceleration; impact; explosive type shocks; attitude or orientation. It will also be apparent that any condition which can be sensed and transduced electrically or electronically can be used, perhaps through intermediary control systems and logic, to control said solenoid transducer and thence said trigger. A partial list of such conditions includes temperature, pressure, flow rate, smoke, fire, toxic or explosive gases, high levels of vibration as from malfunctioning machinery or a seismic distrubance, displacement, velocity, shaft speed, acceleration, etc.

It will be further noted that position sensing electrical limit switches (not shown) can be used to sense the reset and returned position of, for example, said first stage lever or perhaps said valve stem in order to ascertain whether said trip valve operator has been triggered and actuated said valve to the returned position. Such information could be an input to, for example, a central process controller or could be displayed on an annuciator. In some instances such a signal could constitute feedback information indicating for example whether a triggering signal sent to said solenoid transducer in fact resulted in triggering and actuation to the returned position, while in other instances such a signal could constitute an alarm signal to a central process controller indicating that some mechanically transduced sensor has caused triggering of said trip valve operator.

SECOND EMBODIMENT - CONSTRUCTION

Figure 11:
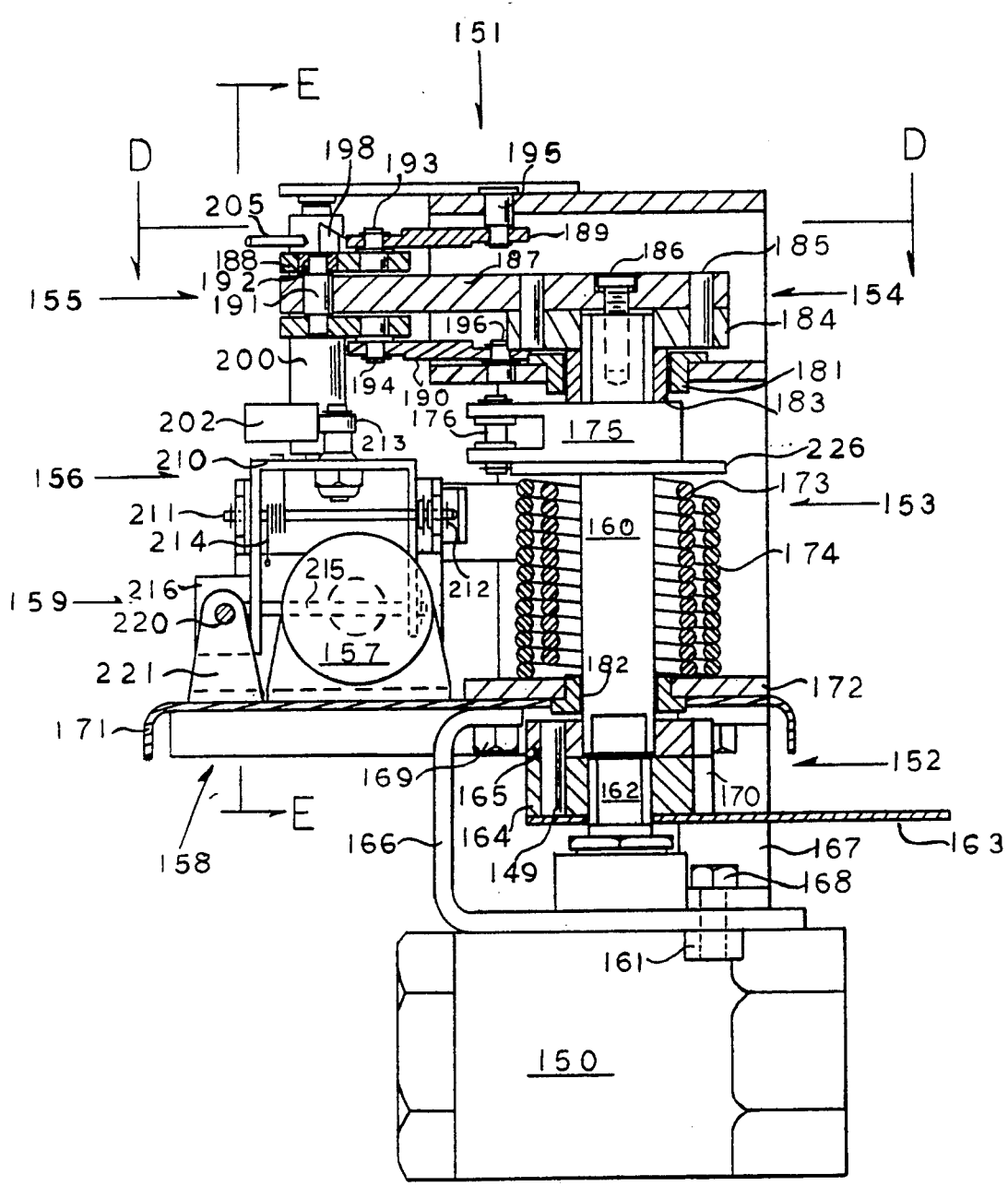
FIG. 11 is a partially sectioned side view of a second embodiment of the trip valve operator according to the invention.
Figure 12:
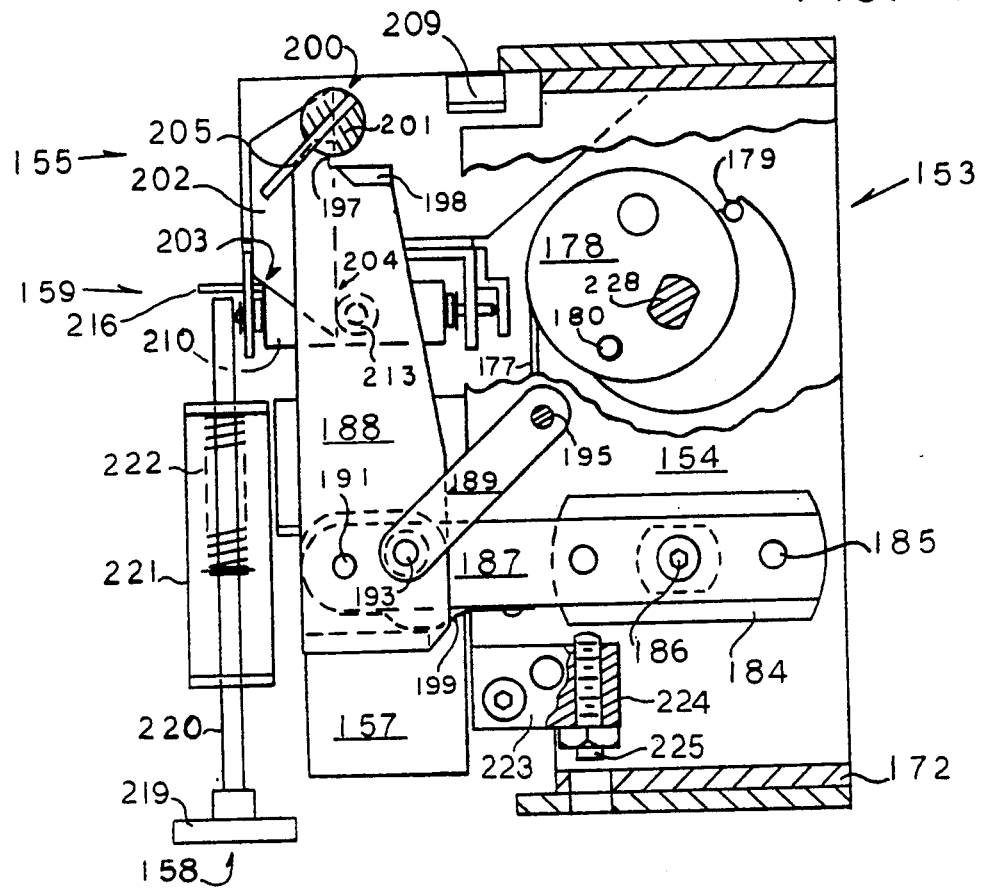
FIG. 12 is a top view taken along line D—D in FIG. 11.
Figure 13:
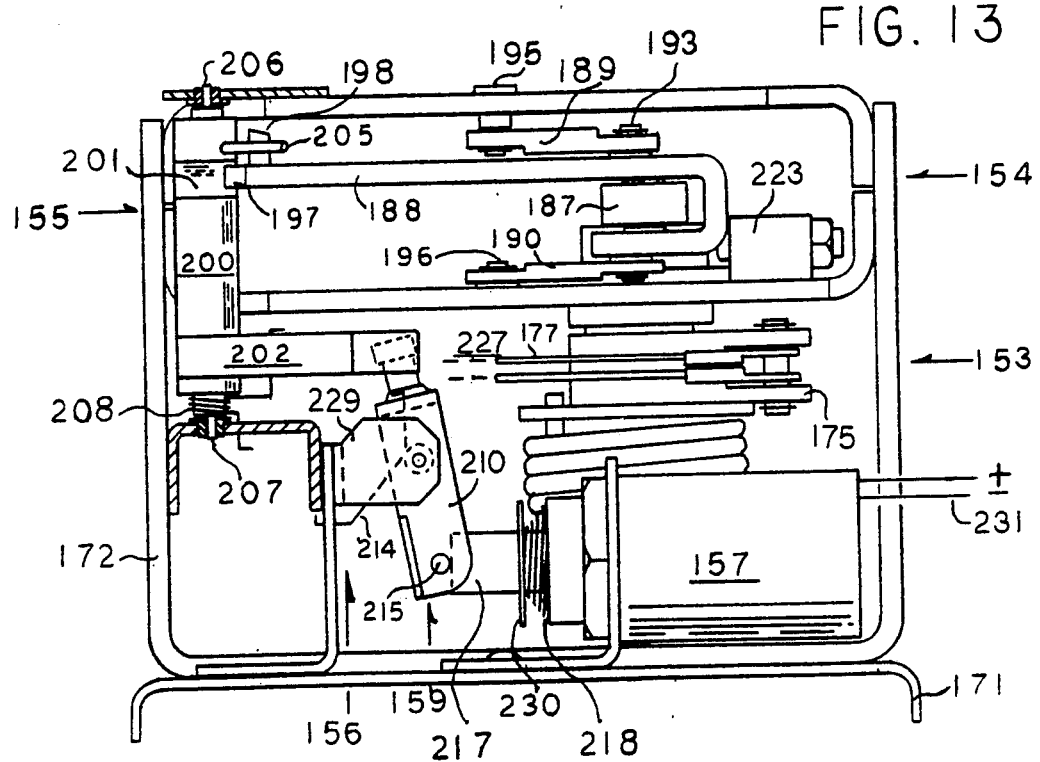
FIG. 13 is a side view taken along line E—E in FIG. 11.

FIGS. 11-13 illustrate a second embodiment of a universal trip valve operator according to the invention, generally indicated at 151, which connects to and operates quarter turn ball valve 150 thus forming a quarter turn trip valve. Said universal trip valve operator is generally comprised of two stage leverage mechanism generally indicated at 154, third stage release lever generally indicated at 155, trigger generally indicated at 156, OR logic device generally indicated at 159, solenoid trip actuator or transducer 157, manual pushbutton trip actuator 158, spring return actuator generally indicated at 153, and coupling/controlled actuator connection generally indicated at 152. The controlled actuator (not shown) is a removable handle for manually resetting said trip valve and is the same as the handle shown and described in the first embodiment. Said trip valve operator is shown at the reset position in FIGS. 11-13. As configured, with said solenoid, said trip valve forms what is commonly known as a manual reset valve. This embodiment is a detailed derivative of the first embodiment and demonstrates the size of said trip valve operator relative to said ball valve.

Shaft 160 is rotatably mounted in a rigid frame 172 by bearings 181 and 182. Said shaft has a pair of flats at both ends forming double dee shaft ends which mate with respective double dee holes in hub 184, arm 175, spring connector plate 226, and said coupling 152 thereby coupling said hub, said arm, said spring connector plate, and said coupling together. The upper end of said shaft terminates in said hub while the lower end of said shaft terminates in said coupling. Said coupling thence couples to valve stem 162. A visual position indicator 163 also couples to said valve stem. Said rigid frame is rigidly connected to mounting plate 171, bracket 166, and strut 167 by bolts 169. Said bracket and strut are connected to valve body actuator mounting pads 161 by bolts 168. Said coupling is comprised of an upper half 165 and a lower half 164 which are connected and coupled by pins 149 (only one shown). Said upper half is adapted to mate with said shaft while said lower half is adapted to mate with said valve stem. First stage lever 187 is coupled to said hub by pins 185. Screw 186 compresses and retains said first stage lever, said hub, sleeve 183, said arm 175, and said spring connector plate against the shoulder formed by said upper double dee shaft end. Said sleeve has a cylindrical outer surface which forms a rotatable connection with said bearing 181.

Said spring return actuator, shown only with various partial views, and the relation thereof to said controlled actuator and said ball valve is the same as that in the first embodiment and is of the type disclosed in my U.S. Pat. No. 4,869,459. Reference should be had thereto for further detailed descriptions of this type of spring return actuator and its relation to typical quarter turn valve loads, spring return actuator efficiency and controlled actuator efficiency. Generally, said spring return actuator comprises a bias transmitting and transforming device, generally indicated at 227, nested torsion springs 179 and 180 which act through said bias transmitting and transforming device to apply a transformed torque output to said shaft 160, and nested torsion springs 173 and 174 which act directly on said shaft 160. Said bias transmitting and transforming device comprises eccentric spool 178 which is rotatably mounted to said rigid frame by shaft 228, multiple leg cable 177, and said arm 175. Said cable forms a wrapped connection with said eccentric spool and connects to the end of said arm 175 through pin 176.

Within said two stage leverage mechanism, said first stage lever 187 is coupled at one end to said hub by said pins 185. As said first stage lever is coupled to said shaft 160 and thereby to said spring return actuator and said quarter turn valve, said first stage lever will move through a quarter turn between the reset position and the return position, the quadrant therebetween being its area of operation. A second stage lever 188 rotatably connects to said first stage lever through pivot pin 191. At the reset position, the long arm structure of said second stage lever is preferably oriented so as to be substantially perpendicular to said first stage lever. Said second stage lever has, at its long end, contact pad 197 and projection 198, and operates above said first stage lever in an adjacent parallel plane. At the reset position, said contact pad contacts and is restrained by the short arm 201 of said third stage leveraging release lever. Said projection 198 projects above the basic plane of operation of said second stage lever and, when said second stage is near the reset position, intersects the area of operation of reset arm 205 and during reset actuation engages said reset arm 205.

Said second stage lever also has a rigid yoke structure (best seen in FIGS. 11 and 13) which wraps around said first stage lever thus forming upper and lower portions of said second stage lever with respect to said first stage lever, which rotatably connects with said pivot pin 191 both above and below said first stage lever, and which allows said second stage lever to additionally operate in an adjacent parallel plane below said first stage lever. The center section of said pivot pin 191 has an enlarged diameter for extra strength against bending moments while the pivot ends have been kept smaller in order to minimize frictional torques. Pressed in bearing collar 192 enables the insertion of said enlarged diameter pivot pin 191 from above, which is then followed by the pressing of said bearing collar into said second stage lever, said bearing collar and said pivot pin 191 forming a rotatable connection. Pivot pin 193 is rigidly connected (pressed, staked, riveted, etc.) to the upper portion of said second stage lever and extends up into an adjacent parallel plane while pivot pin 194 is similarly rigidly connected to the lower portion of said second stage lever and extends down into an adjacent parallel plane. Said pivot pins 193 and 194 are located in line and define a common axis which is parallel to the axis defined by said pivot pin 191. Connecting links 189 and 190 are rotatably connected to said second stage lever by said pivot pins 193 and 194, respectively, and operate in the adjacent parallel planes extended into by respective said pivot pins 193 and 194. Said rigid frame lies both above and below the planes of operation of said connecting links and said connecting links thence rotatably connect to said rigid frame through pivot pins 195 and 196 respectively. Said pivot pins 195 and 196 are in line and define a common axis which is parallel to the axis defined by said pivot pin 191. It will be noted that the combination of said first stage lever, said second stage lever, said connecting links, and said rigid frame forms a four bar mechanism. A stop 223 is rigidly connected to said rigid frame. Stop set screw 225 is threaded into said stop 223 and makes contact with said hub when said hub and said two stage mechanism are rotated slightly past the reset position in order to effect the resetting of said third stage leveraging release lever and said trigger. Said stop set screw, therefore defines, and permits minor adjustments to, the maximum counterclockwise position of said two stage leverage mechanism, as seen from FIG. 12, which as noted is slightly past the reset position. Stop face 224 makes contact with said hub when said trip valve operator actuates to and reaches the returned position, said stop face and said hub defining the returned position. Leaf spring 199 is fastened to said first stage lever, has first and second ends which can press against said first stage lever and a bowed center section which can press against said yoke section of said second stage lever when said second stage lever is at or past the reset position. When said two stage leverage mechanism actuates passed the reset position, in order to effect the resetting of said third stage leveraging release lever and said trigger, said second stage compresses said leaf spring. As the amount of releasing torque in said two stage leverage mechanism diminishes as positions beyond the reset position are assumed, said leaf spring provides supplemental torque to said second stage lever in the same direction as the releasing torque (in the clockwise direction as seen from FIG. 12). Said supplemental torque enables said second stage lever to operate further beyond the reset position than otherwise possible, thereby enhancing said two stage leverage mechanism's capability for resetting said third stage leveraging release lever and said trigger, with the assurance that frictional binding in said two stage leverage mechanism will not take place and thus that said two stage leverage mechanism will return to the reset position when the reset actuation torques due to said manual handle are removed.

Said third stage leveraging release lever comprises an arm mounting element 200 that is rotatably mounted to said rigid frame by pivots 206 and 207; said short arm 201 which comprises a land or contact surface which advantageously lies in a substantially radial plane extending from the axis of rotation of said arm mounting element for reasons of minimizing frictionally induced torques in said third stage; a long arm 202 which rigidly connects to said arm mounting element; and, a reset arm 205 comprising an elongated pin which rigidly connects to said arm mounting element and extends therefrom in a substantially radial direction and at approximately a 45 degree relationship to said short arm 201 as shown. At the reset position, said contact pad 197 of said second stage lever contacts said short arm 201. Said long arm comprises a land 204 at its end for engaging trigger bearing 213 and a ramp 203 also at its end for deflecting said trigger bearing during reset actuation. At the reset position, said long arm 202 contacts said trigger bearing. Torsion spring 208 mounts around a lower mandrel portion of said arm mounting element 200 and is connected between said rigid frame and said long arm 202 so as to lightly torque said third stage in the counterclockwise direction as seen from FIG. 12. Stop 209 is rigidly mounted to said rigid frame. After triggering, said torsion spring 208 holds said long arm against said stop 209 to define the returned position of said third stage leveraging release lever, the reset and returned position thereof being about a quarter turn apart.

Said trigger, generally indicated at 156, comprises a trigger lever 210 which is rotatably mounted to said rigid frame through pivot shaft 211 and bracket 229. Said pivot shaft 211 has a rounded thrust pivot end 212 for minimizing frictional holding torques on said trigger produced by the reaction between said trigger and said rigid frame. Said trigger bearing 213 is a miniature ball bearing. The inner race of said trigger bearing is rotatably mounted to said trigger lever thereby providing rotational redundancy, in that said trigger bearing can rotate either through the rolling action of said ball bearing or, failing that, the sliding action between said inner race and said trigger lever. The axis of rotation of said trigger lever is substantially perpendicular to the plane containing said long torque arm land 204 such that there are substantially no force components of the trigger load force in the direction of the trigger throw either tending to hold or release said trigger. A contact pin 215 is mounted to said trigger lever substantially as shown. Also, a contact land 216 is rigidly connected to said trigger lever and is oriented substantially as shown. A torsion spring 214 lightly torques said trigger lever so that said contact pin presses against retracted solenoid plunger 217 to maintain the trigger hold position. The hold position of said trigger lever is determined by the retracted or hold position of said solenoid plunger. Said contact land 216 is for enabling pushbutton plunger 220 to contact and rotatably actuate said trigger lever.

Said solenoid trip actuator 157 is rigidly connected to said mounting plate 171. Said solenoid enables some electrical or electronic control system to effect triggering of said trip valve operator. When voltage is applied to wire leads 231, said solenoid plunger 217 and retaining ring 230 restrain spring 218 and allow said trigger to maintain the hold position.

Said local manual control is generally indicated at 158 and comprises a pushbutton 219, said pushbutton plunger 220, and spring 222. Said spring 222 is connected between said pushbutton plunger and bracket 221. Said bracket is rigidly connected to said mounting plate 171. Said pushbutton plunger is slidably mounted in said bracket.

The unidirectional surface contact type connections between said solenoid plunger and said contact pin and between said pushbutton plunger and said contact land provides the means for implementing an OR logic combination of the trip actuating outputs of said solenoid and said manual pushbutton for actuating said trigger to the release position.

Said controlled actuator (not shown in this embodiment, but is the same as the manual actuator handle shown in FIG. 1 of the first embodiment) comprises a removable handle which mates with the periphery of said coupling 152 for manually resetting said ball valve and said universal trip valve operator. Said coupling has a notch 170 in which one edge is oriented in a substantially radial direction and the other edge is oriented in a substantially tangential direction. Said handle having a projection and curved jaw, as in the first embodiment, for mating with said coupling. Said handle is of sufficient length so that a moderate application of force produces the requisite torque for resetting said ball valve and said universal trip valve operator.

From FIGS. 11-13, it can be seen that said spring return actuator roughly occupies a rectangular shaped volume. Said solenoid, said manual pushbutton, said OR logic, said trigger, and said third stage long arm occupy a similar adjacent volume. Said two stage leverage mechanism, said third stage short arm, and said third stage reset arm occupy a relatively thin volume of roughly square cross section which stacks on top of the previous two said volumes. As a result of this packing, the overall shape of said trip valve operator is roughly a cube which enables a practical and cost efficient enclosure to be used. An enclosure is not shown but could be of any of the usual types of enclosures in common use such as rain, dust, oil or water tight; general purpose; explosion proof; etc.

FUNCTIONS AND OPERATION

The overall operation of the second embodiment of said universal trip valve operator is as follows.

At the reset position, which is shown in FIGS. 11-13, said spring return actuator is fully tensioned in order to provide ample torque output for actuating said valve to the returned position. Said torsion spring 214 lightly biases said trigger to maintain the trigger hold position. Said trigger restrains said third stage leveraging release lever which in turn restrains said two stage leverage mechanism which thence restrains said spring return actuator and said valve, thus maintaining the reset position. Said two stage leverage mechanism and said third stage function to reduce the load on said trigger. Said solenoid and said manual pushbutton conditionally maintain their hold positions and, through said OR logic device, allow said trigger to maintain the hold position.

In the triggering and return actuation of said universal trip valve operator, if solenoid 157, 'or' said pushbutton 158 produce a trip actuating output, as caused by the extension of either said solenoid plunger or said pushbutton plunger, then said trigger lever 210 is rotated clockwise, as seen from FIG. 13, to the release position and said trigger bearing clears said land 204 of said third stage long arm 202. When said trigger bearing releases said third stage long arm, said third stage long arm rotates approximately 90 degrees, so that said contact pad can clear said third stage short arm, and releases said second stage long arm and, hence, said two stage leverage mechanism. Said third stage is self releasing, that is, the release of said third stage is a result of the load placed thereon by said second stage long arm, no additional actuating devices being needed to rotate said third stage to release said second stage long arm. While said torsion spring 208 contributes in a minor way to the releasing of said third stage, the primary purpose of said torsion spring 208 is to position said third stage long arm against said stop 209 in preparation for reset actuation. Said two stage leverage mechanism is also self releasing from the reset position. Therefore, under the action of said spring return actuator, said quarter turn valve and said two stage leverage mechanism are actuated from the reset position to the returned position. Said first stage lever makes a quarter turn actuation, consistent with said quarter turn valve and said spring return actuator, and said second stage lever accomodates this quarter turn motion. It will be noted that the area of operation of said first stage lever and the short arm of said second stage lever completely overlaps or encompasses the area of operation of said connecting links, thereby substantially eliminating the need for additional operating area to accomodate said connecting links. Additionally, the second stage long arm of said second stage lever operates over substantially the same quadrant of operation as said first stage lever and at the returned position said second stage lever folds up over said first stage lever, thus substantially eliminating the need for additional operating area to accomodate said second stage lever. The returned position is defined by said stop face 224 which acts on said hub.

To reset said universal trip valve operator and said valve, said removable manual handle is mated with the periphery of said coupling and said handle and coupling are manually torqued and rotated counterclockwise from the perspective of FIG. 12 thus actuating said valve, said spring return actuator, and said two stage leverage mechanism from the returned position to the reset position, said spring return actuator being retensioned thereby. As said two stage leverage mechanism approaches the reset position, said projection 198, of said second stage lever 188, engages said reset arm 205 of said third stage and actuates said third stage back to the reset position. Simultaneously, said yoke structure of said second stage arm contacts and starts to compress said leaf spring. As said third stage approaches the reset position, said ramp 203 contacts said trigger bearing 213 and deflects said trigger bearing and said trigger lever out of the way of said third stage long arm and against the light bias of said torsion spring 214. The reset actuation continues until said hub contacts said stop set screw 225, said stop set screw determining the maximum counterclockwise rotation of said two stage leverage mechanism. At this point, said third stage long arm has passed said trigger bearing and said torsion spring 214 causes said trigger lever to actuate back to the trigger hold position. As said handle is released, said first stage lever and said second stage lever each rotate a small amount in the clockwise direction, said second stage lever rotating with the supplemental torque provided by said leaf spring, thus permitting said third stage to return through a small rotation until said long arm land 204 contacts said trigger bearing. Said second stage long arm thence returns through a subsequent small rotation until said contact pad contacts said third stage short arm land. Said valve, said spring return actuator, said two stage leverage mechanism, said third stage, and said trigger are now reset and said manual handle can now be removed.

Said two stage leverage mechanism and said third stage leveraging release lever have the same functions, properties, and requirements as described in the first embodiment, namely:

(1) provide sufficient leverage at the reset position for reducing the trigger load to a low level so that said solenoid transducer can reliably operate said trigger;

(2) when triggered, reliably release from the reset position to allow said spring return actuator to actuate said valve to the return position;

(3) be compact;

(4) be compatible with the quarter turn requirements of said valve and said spring return actuator;

(5) be single action resettable;

(6) be capable of being scaled up to handle the larger loads of larger versions of said valve and said spring return actuator, while allowing little or no growth of the trigger load and dimensionally not scaling substantially any faster than the quarter turn valve dimensions.

For a detailed description of these functions, properties, and requirements, reference should be had to the first embodiment.

Within said spring return actuator, said eccentric spool 178, said cable 177, and said arm 175, which form said bias transmitting and transforming device, act (through the varying torque arms and leverage generated thereby during actuation) to transform the basic actuation characteristics of said nested torsion springs 179 and 180 (a declining output as described by the rotary form of Hooke's Law) into an increasing torque output at said shaft 160 and extract most of the spring energy storage capacity of said springs 179 and 180 in producing said increasing output. Said increasing output is such that, when added to the declining output produced by said nested torsion springs 173 and 174, the combined output is approximately a constant torque over the quarter turn actuation stroke. Such an output is efficiently loadmatched to the relatively constant torque load of said quarter turn ball valve. Additionally, the net retensioning characteristics of said spring return actuator are also approximately a constant torque which is efficiently loadmatched to the approximately constant torque output of said manual handle controlled actuator. As noted in my U.S. Pat. No. 4,869,459, the output of said spring return actuator is not limited to a constant torque output but is capable of many outputs, the form of said output being a design parameter. Also, as noted in said patent, there are other bias transmitting and transforming devices which are effective alternatives to said bias transmitting and transforming device 227.

Figure 14:
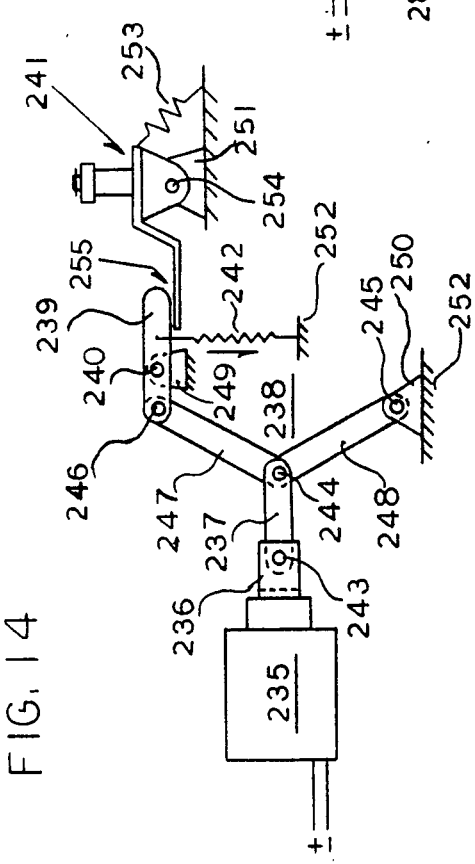

Some alternative solenoid trip actuators or transducers are illustrated in FIGS. 14–17. In FIG. 14 a first alternative solenoid trip actuator is shown which demonstrates the use of a varying leverage transforming device, generally indicated at 238, to more closely loadmatch the output of solenoid 235 to the retensioning characteristics of spring 242 so that said solenoid is used more efficiently and therefore, can be sized smaller. Plunger 236 of said solenoid is connected to connecting link 237 by pivot 243. Said varying leverage transforming device comprises a pair of links 247 and 248 which are rotatably connected by pivot pin 244. Said connecting link thence connects to said varying leverage transforming device at said pivot 244. Said link 248 rotatably connects to a rigid frame, schematically indicated as 252, through pivot pin 245 and frame bracket 250. Said link 247 is rotatably connected to redirection lever 239 by pivot pin 246. Said redirection lever is rotatably connected to frame bracket 249 by pivot pin 240. Said spring 242 is connected between said redirection lever and said rigid frame 252 so as to produce a clockwise torque on said redirection lever about said pivot pin 240. Trigger lever 241 is rotatably mounted to frame bracket 251 by pivot pin 254. Light spring 253 is connected between said trigger lever and said rigid frame 252 so as to produce a light clockwise torque on said trigger lever about said pivot pin 254. Said redirection lever forms a unidirectional surface contact connection with said trigger lever, generally indicated at 255.

When voltage is applied to said solenoid, said solenoid restrains said spring 242 thus causing said trigger to maintain the hold position. When said voltage is removed from said solenoid, said solenoid no longer restrains said spring 242. Said spring 242 then actuates said trigger lever in the counterclockwise direction to the release position, said spring 242 producing sufficient torque output to amply overcome the trigger load which is characterized by a relatively constant frictional load and the load due to said light spring 253. The output of said spring 242 is roughly linear in character as described by Hooke's Law. According to my measurements, however, solenoids have actuation characteristics which are roughly exponential in nature. Thus, the basic outputs of said spring 242 and said solenoid are not loadmatched, in and of themselves.

As said spring 242 is retensioned from the release position to the hold position, the force output thereof increases linearly from some initial preload. As said solenoid actuates from the release position to the hold position, said solenoid force output increases in an approximately exponential manner to a final maximum force where said plunger is fully retracted. At the release position where the force output of said solenoid is smallest, said varying leverage transforming device initially generates a high leverage through which said solenoid can act on said spring 242. As said varying leverage transforming device actuates from the release position to the hold position, said transforming device provides progressively decreasing leverage thus providing a better loadmatch between the roughly exponentially changing forces of said solenoid and the linearly changing forces of said spring 242.

Figure 15:
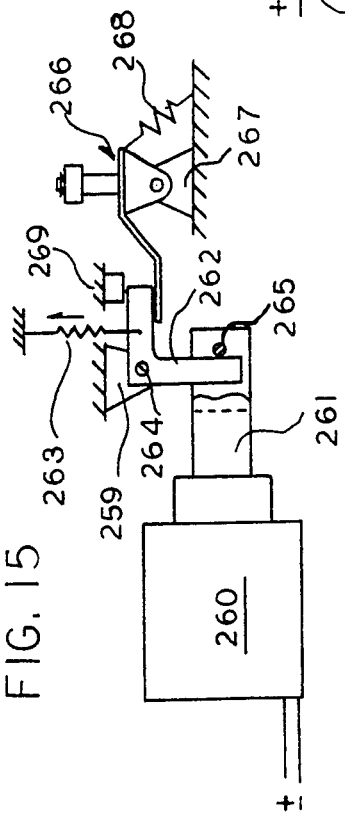

In FIG. 15 a second alternative solenoid trip actuator is shown which demonstrates applied voltage release. At the trigger hold position (shown) plunger 261 of solenoid 260 is extended. Redirection lever 262, which is rotatably connected to frame bracket 259 by pivot pin 264, contacts crosspin 265 which is mounted to said plunger. Spring 263 biases said redirection lever in the counterclockwise direction against stop 269. Trigger lever 266 is rotatably mounted to frame bracket 267 and is lightly biased in the clockwise direction by spring 268 so that said trigger lever contacts said redirection lever thus determining the trigger hold position. When voltage applied to said solenoid, said plunger retracts and said redirection lever is rotated clockwise against the bias of said spring 263 thereby rotating said trigger lever counterclockwise against the bias of said spring 268 to the trigger release position. When voltage is removed from said solenoid, said spring 263 causes the counterclockwise rotation of said redirection lever up to said stop and the extension of said plunger. Said spring 268 returns said trigger lever to the trigger hold position.

Figure 16:
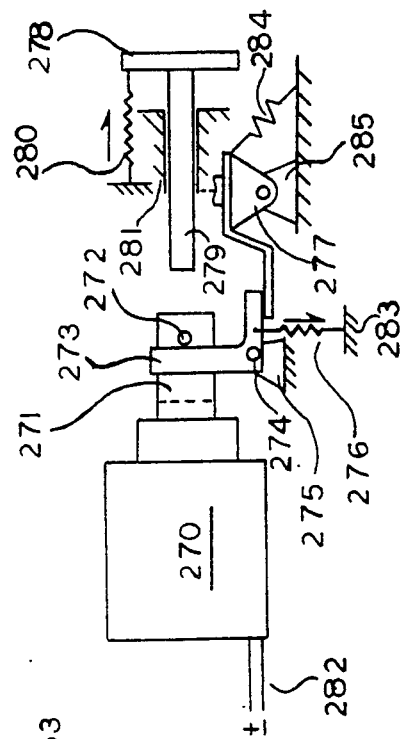
FIGS. 14-17 show alternate solenoid trip actuators.

In FIG. 16 a third alternative solenoid trip actuator is shown which demonstrates a configuration for an intrinsically safe no voltage release solenoid trip actuator. The term intrinsically safe refers to an electrical device being used in a hazardous area (such as where the presence of explosive gases could possibly occur) where the power levels in that electrical device are kept below a critical power level (generally quoted as 0.35 watt) so that any malfunction of that electrical device could not result in sparking of sufficient energy to initiate an explosion. Such electrical devices are used with a current limiting device such as a zener diode barrier that is located in a safe area. When relatively small solenoids are used at such low power levels, their actuation characteristics are feeble. However, when the solenoid plunger is fully retracted and in contact with the pole piece located within the solenoid, the holding force generated is still considerable (upwards of a pound or so). Such a small solenoid used at low power levels, therefore, has the ability to hold and release a spring of sufficient output to reliably operate the trigger in said universal trip valve operator. The retraction of the plunger and the retensioning of the spring is provided by a manual reset pushbutton.

At the trigger hold position (shown), low power is applied to solenoid 270 through wire leads 282 and said solenoid holds plunger 271 at its fully retracted position. Redirection lever 273 is rotatably mounted to frame bracket 275 through pivot 274. Spring 276 is connected between the frame 283 and said redirection lever and biases said redirection lever in the clockwise direction. Crosspin 272, which mounts to said plunger, enables said plunger to restrain said redirection lever against the bias of said spring 276. Trigger lever 277 (shown only partially) is rotatably mounted to frame bracket 285. Spring 284 connects between said trigger lever and said frame and biases said trigger lever in the clockwise direction so that said trigger lever makes surface contact with said redirection lever in order to implement OR logic so that other trip actuators, sensors, or transducers can additionally operate said trigger lever. When power is cut to said solenoid, then said plunger is no longer restrained and said spring 276 actuates said redirection lever clockwise thereby causing counterclockwise actuation of said trigger lever to the trigger release position. Manual pushbutton 278 is rigidly connected to pushbutton plunger 279 which in turn is slidably mounted in frame guide 281. Spring 280 is connected between said frame and said pushbutton and biases said pushbutton to the right and away from said solenoid plunger 271. When power is restored to said solenoid, said solenoid plunger 271 and said redirection lever can be reset to the trigger hold position and said spring 276 retensioned by manually pressing said pushbutton which causes said pushbutton plunger to contact said solenoid plunger and actuate said solenoid plunger and said redirection lever to the left. Said trigger lever simultaneously returns to the trigger hold position under the action of said spring 284. When said pushbutton is released, said spring 280 retracts said pushbutton to the right.

Figure 17:
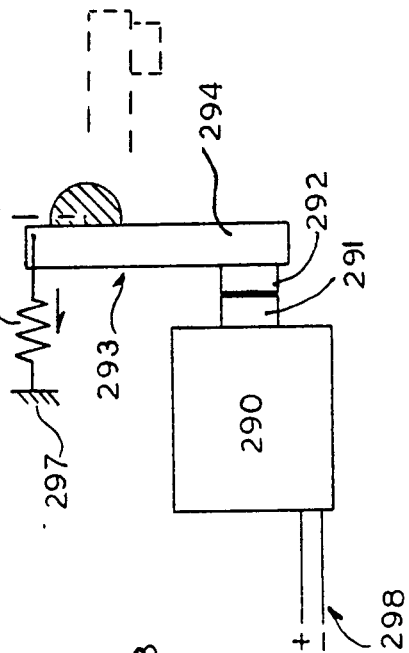

In FIG. 17, a fourth alternative demonstrates the direct use of a solenoid, in the form of a simple electromagnet with an exposed pole piece, as a trigger. A leveraging release lever (shown in part), generally indicated at 293, is of similar construction and function to that shown in the second embodiment and is rotatably mounted with respect to pivot axis 295, has a long arm 294 intended to be restrained by a trigger and a short arm radially oriented land for engaging a prior stage of leverage (not shown). Spring 296 connects between said leveraging release lever and frame 297 and biases said leveraging release lever counterclockwise. Solenoid or electromagnet 290 has an exposed pole piece 291. Contact piece 292 is made of soft iron or some other ferromagnetic material and is rigidly connected to said long arm 294. When power is applied to wire leads 298 of said solenoid, said solenoid attracts and holds said contact piece 292 and thence said leveraging release lever thereby causing the reset position to be maintained. When power is removed from said solenoid, then said contact piece is no longer held and actuation to the returned position occurs. When power is reapplied to said solenoid and reset actuation occurs, then said leveraging release lever is rotated clockwise to the position shown where said contact piece comes back into contact with said solenoid pole piece and is directly held thereby to maintain the reset position.

Figure 18:
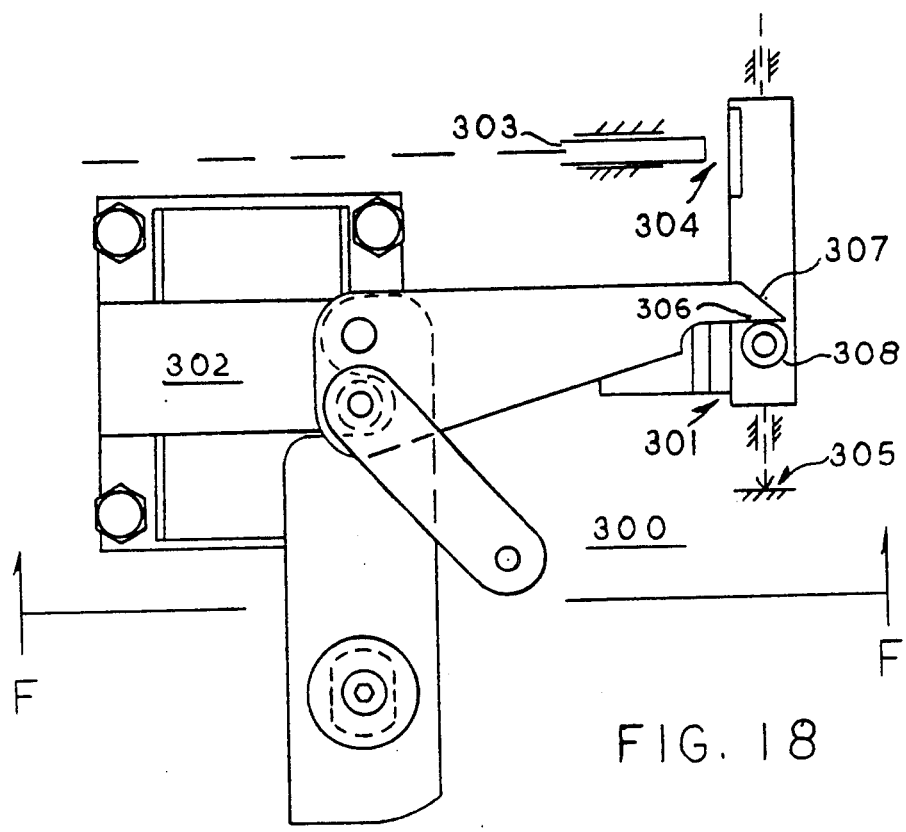
FIG. 18 is a first alternate multi-stage leverage device.
Figure 19:
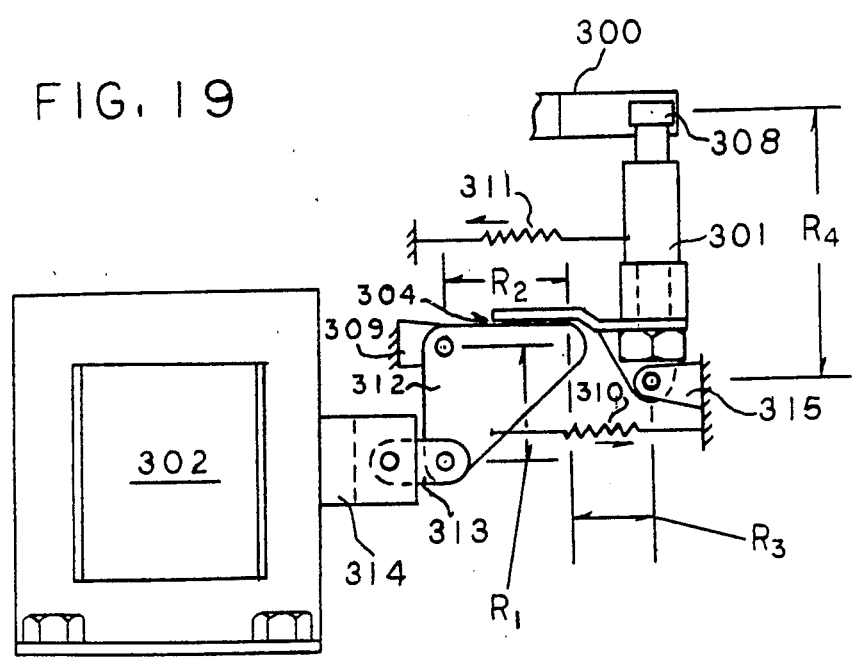
FIG. 19 is a partial side view from line F—F in FIG. 18.

FIGS. 18 and 19 illustrate an alternative to said first and second embodiments. This alternative uses two stages of leverage versus the three stages of leverage used in the first and second embodiments, to reduce the trigger load. A two stage leverage mechanism, generally indicated at 300, is of similar construction, operation, and function to the two stage leverage mechanisms shown in the first and second embodiments. Said two stage leverage mechanism, instead of having means for engaging a third stage lever, has a land 306 and a ramp 307 for respectively contacting and deflecting trigger bearing 308 of trigger 301. Said trigger bearing is a miniature ball bearing. Said trigger is pivotally mounted to frame bracket 315, has a thrust pivot 305 for minimizing frictional torqueing on said trigger due to the frame reaction, and is lightly biased by spring 311 to maintain the trigger hold position. A solenoid trip actuator is generally indicated at 302 and a manual pushbutton trip actuator is generally indicated at 303. A redirection lever 312 is pivotally mounted to frame bracket 309 and is biased toward the trigger release position (in the counterclockwise direction) by spring 310. Solenoid plunger 314 connects to said redirection lever through connecting link 313. Unidirectional surface contact connections for implementing OR logic between said solenoid and said manual pushbutton are generally indicated at 304. Said solenoid restrains said redirection lever and said spring 310, when voltage is applied thereto, and thereby causes said trigger to maintain the trigger hold position. The removal of said voltage from said solenoid causes the clockwise rotation of said trigger to the trigger release position.

Although the use of two stages of leverage versus three stages results in a higher trigger load, all other things being equal, a reduction in the number of parts is gained. The otherwise higher trigger load can be compensated for and reduced by increasing the size and leverage of said two stage leverage mechanism, or by increasing the size and output of said solenoid, or both. In this alternative, said solenoid 302 is of larger construction and force output than those solenoids of the first and second embodiments controlling the same valve load. When used on quarter turn valves, such as many make and models of ball valves, where the actuation torque requirements scale up approximately as the valve size squared, then the trigger load scales up as the valve size to the one half power (see the first embodiment description of force scaling up through the second stage of leverage). Given such slow scaling of the trigger load and considering that said two stage leverage mechanism is self releasing from the reset position upon triggering, then generally speaking it is not necessary to scale up the trigger throw distance. Therefore, the work output of said solenoid only needs to be scaled up as the valve size to the one half power. As larger solenoids will generally have longer strokes as well as higher force outputs, these actuation characteristics can be converted to match the trigger actuation load characteristics (i.e. where only the actuation force scales and the actuation stroke does not scale) by scaling either up or down the various torque arm lengths in said redirection lever and said trigger. If, for example, in selecting a larger version of said solenoid in which both the stroke and the force output increase in the same proportion, and considering that said solenoid work output needs to scale with the valve size to the one half power, then said solenoid force output would need to scale as the valve size to the one quarter power and said solenoid stroke would scale as the valve size to the one quarter power. As the scaling of said solenoid stroke is unnecessary, it is, therefore, traded off for additional force scaling by for example having the torque arm of dimension R1 of said redirection lever scale up as the valve size to the one quarter power, $$R1 \sim S^{\frac{1}{4}};$$

or alternatively by having any one of the various other torque arms indicated in FIG. 19 scale as follows;

$$R2 \sim S^{-\frac{1}{4}};$$

$$\text{or, } R3 \sim S^{\frac{1}{4}};$$

$$\text{or, } R4 \sim S^{-\frac{1}{4}},$$

It will be apparent that the above torque arm dimensions can each be more slowly scaled in combination to provide the desired conversion.

Further, while having to scale up said solenoid work output (or indeed any other trip actuator work output which might be used to operate said two stage leverage mechanism) as the valve size to the one half power is less desireable that not having to scale said solenoid work output at all as in the first and second embodiments, this relatively small level of scaling still represents a practical option. For example, where the valve size is scaled up by a factor of ten and the valve loads and actuation requirements tended to increase in the vicinity of a factor of 100, the work output of said solenoid trip actuator would only need to increase by about a factor of $10^{\frac{1}{2}} \cong 3.2$.

FIGS. 20 and 21 show a second alternative and illustrate alternative construction features of the two stage leverage mechanism described in the first and second embodiments. This alternative uses a two stage leverage mechanism, generally indicated at 320, of simpler construction and also allows for a 'through' output shaft 329 where the long arm of second stage lever 324 is longer than first stage lever 323. A third stage leveraging release lever is generally indicated at 321 and a trigger bearing is indicated at 322 and are of similar construction and operation to those of the first and second embodiments. Said output shaft couples to hub 331 through a double dee shaft and hole feature. Said first stage lever couples to said hub through pins 330. Pivot pins 326 and 327 are rigidly connected to said second stage lever by pressing, riveting, etc. Said pivot pin 326 rotatably connects with said first stage lever thus rotatably connecting said second stage lever to said first stage lever. Said pivot pin 326 is retained by retaining ring 333. Connecting link 325 is rotatably connected to said second stage lever by said pivot pin 327. Said connecting link is rotatably connected to rigid frame 334 (shown only in part) by pivot pin 328. Said two stage leverage mechanism is shown at the reset position (solid lines) and at the returned position (dashed lines).

It will be noted that the yoke structure of the second stage lever in said first and second embodiments has been dispensed with in this alternative and only one connecting link, connecting link 325, has been used between said second stage lever and said rigid frame. Although said pivot pins 326, 327, and 328 need to be made of larger diameter than otherwise in order to withstand the higher bending loads placed thereon at the reset position which consequently produces higher frictional holding torques at the reset position, this alternative construction has the advantage of having somewhat fewer parts and simplified construction.

It will also be noted that the alignment of said second stage lever with respect to said first stage lever at the reset position and at the returned position, while using more actuation space, results in a motion therebetween which does not take said second stage lever over the location of said output shaft 329. Thus, output shaft 329 is continued above said first stage of leverage, through the plane of operation (but not the area of operation) of said second stage lever, and out through frame bearing 332. This 'through' output shaft feature enables the reset actuator, the spring return actuator, the quarter turn valve, indicators, etc. (all not shown) to be located on either side of said two stage leverage mechanism.

Other ways to provide a 'through' output shaft feature (not shown) include shortening the length of the second stage lever in the first and second embodiments thereby causing the area of operation of the second stage lever to be clear of the output shaft, or providing a second quarter turn shaft which is coupled with (through interconnecting linkage, gears, etc.) and parallel to the output shaft and avoids the area of operation of said second stage lever.

Figure 22:
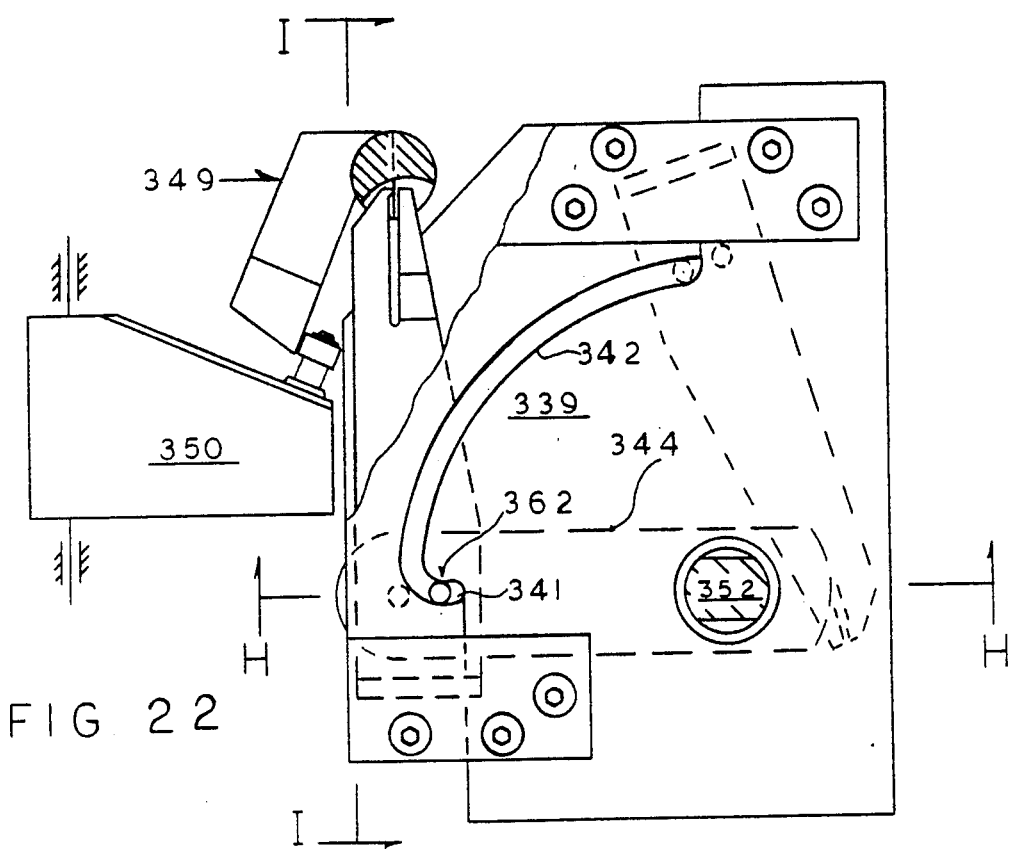
FIG. 22 is a third alternate multi-stage leverage device.
Figure 23:
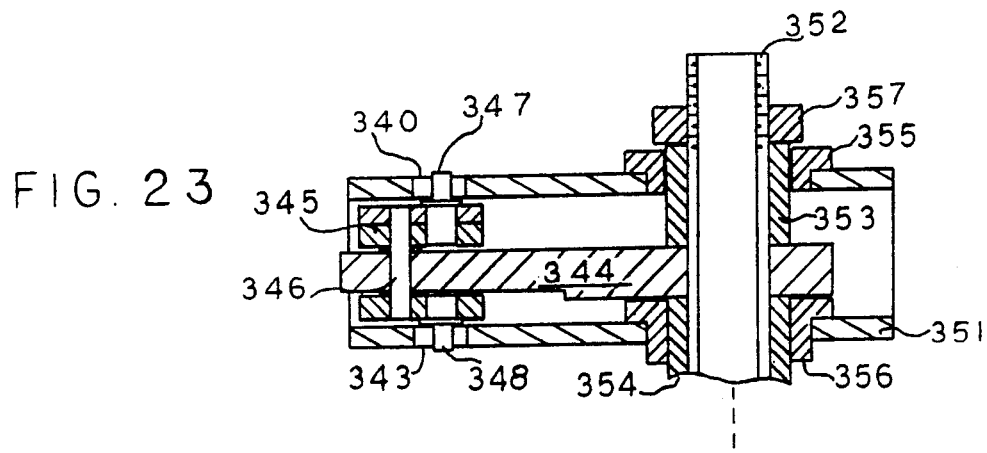
FIG. 23 is a sectional view taken along line H—H in FIG. 22.
Figure 24:
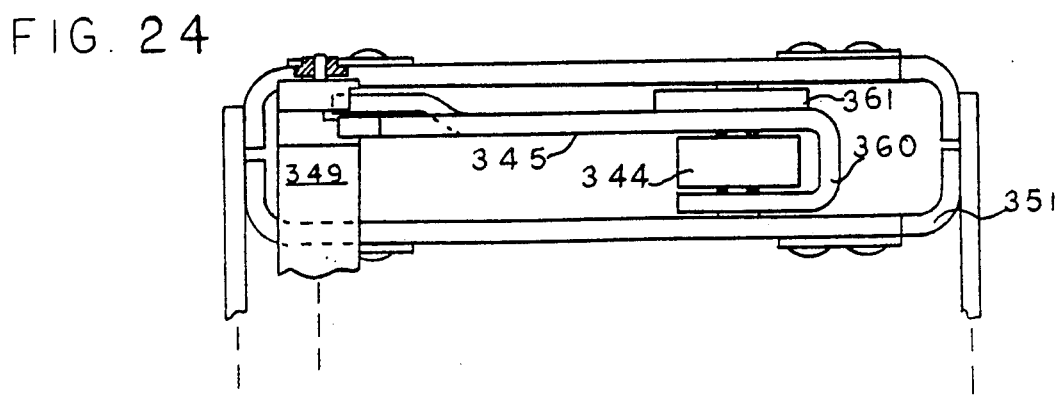
FIG. 24 is a side view from line I—I in FIG. 22.

FIGS. 22–24 illustrate a third alternate two stage leverage mechanism. In said third alternate, a shaped track section, generally indicated at 339, replaces the connecting links which serve as force transmitting means and guiding means between the second stage lever and the rigid frame in the first and second embodiments.

First stage lever 344 couples to shaft 352 through a double dee shaft end and hole feature. Nut 357 compresses sleeve 353, said first stage lever, sleeve 354, and other parts (arm and spring plate, not shown) together and against the shoulder (not shown) of said double dee shaft end. Said sleeves also form a rotatable connection with frame bearings 355 and 356, said bearings being mounted to rigid frame 351. Second stage lever 345 is rotatably connected to said first stage lever by pivot pin 346. Second stage lever 345 has a rigid yoke structure 360 which wraps around said first stage lever thereby forming upper and lower portions of said second stage lever with respect to said first stage lever and is rotatably connected to said first stage lever by pivot pin 346. Spacer piece 361 is rigidly connected to said second stage lever. Preferably, said pivot pin 346 is rigidly held by said first stage lever, as by a pressed fit, and forms said rotatable connection with said yoke structure of said second stage lever. Upper pin 347 and lower pin 348 are rigidly connected to said second stage lever. The distance between said pivot pin 346 and said pins 347 and 348 defines the second stage short torque arm which is kept relatively small in order to provide high leverage at the reset position. Upper track 340 and lower track 343 are identical curvedly shaped slots in said rigid frame. Said upper and lower pins extend into said upper and lower tracks, respectively. Said tracks each consist of a fold up and reset guide section 341 having a fulcrum point or thrust location 362 and an actuation guide section 342. At the reset position, said second stage lever engages third stage leveraging release lever 349 which thence engages trigger 350.

Said fulcrum point is preferably chosen so that, at the reset position, said pins 347 and 348 lie substantially between said pivot pin 346 and said shaft 352. In said section 341, said tracks preferably follow a substantially circular path of relatively small radius which is centered ahead of said pins 347 and 348 (in the direction of the return actuation of said first stage lever), substantially as shown, so that the forces between said pins 347 & 348 and said rigid frame are directed substantially perpendicular to said first stage lever so as to maximize the first stage long torque arm generated thereby. In said section 342, said tracks preferably follow a substantially circular path of relatively large radius which is substantially centered on the axis of rotation of said shaft 352. The radius of said section 341 is also preferably chosen to be smoothly faired with said section 342. The radius of section 342 helps determine the fold up position of said second stage lever with respect to said first stage lever and is chosen so that after triggering said second stage lever will fold up over said first stage lever (in order to use minimum amount of operating area), but stopping just short of coming into contact with said sleeve 353 (in order to enable said shaft 352 to extend through the plane of operation of said second stage lever and out through the top of said rigid frame), and maintain this position relative to said first stage lever throughout most of the actuation between the reset position (shown in solid lines) and the returned position (shown in dashed lines).

The operation of said third alternate two stage leverage mechanism is as follows. Said trigger and said third stage leveraging release lever operate in the same manner as described in the first and second embodiments. When triggering occurs, said third stage releases said second stage lever. Said second stage lever and said first stage lever thence begin simultaneous actuation toward the returned position. Said track section 341 causes said pins 347 and 348 to move from a position of being substantially between said pivot pin 346 and said shaft 352 at the reset position, to a position of substantially trailing said pivot pin 346 thus causing said second stage to fold up over said first stage, but also being slightly radially inboard of said pivot pin 346 by a sufficient amount so that said second stage lever does not contact said sleeve 353, during actuation to the returned position. Said track section 342 maintains said fold up position of said second stage lever over the remainder of the actuation to the returned position. During the reset actuation, said track section 342 causes said second stage lever to remain folded up over said first stage lever until said pins 347 and 348 contact track section 341 which thence causes said second stage lever to unfold and re-engage said third stage leveraging release lever which then re-engages said trigger. The resetting of said third stage and said trigger is the same as in the first and second embodiments.

Thus, it can be seen that said tracks provide means for said second stage lever to thrust against said frame in order to generate high leverage at the reset position, are overlapped by the area of operation of said first stage lever and the short arm of said second stage lever, provide means for causing the long arm of said second stage lever to operate over the same area as said first stage lever thereby minimizing operation area requirements, and provide means for uniquely guiding said second stage lever between the reset and returned positions (said first stage lever, said second stage lever, said tracks, and said frame form a one degree of freedom mechanism during actuation between the reset and returned positions).

THIRD EMBODIMENT-CONSTRUCTION

FIGS. 25-29 illustrate a third embodiment of a universal trip valve operator according to the invention which connects to and operates quarter turn ball valve 400. The third embodiment is directed toward a five stage leverage mechanism for reducing the trigger load, generally indicated at 440, which is particularly suited to the operation of those larger sized quarter turn valves where the scaling up of the actuation torque is severe (i.e. actuation torque scales as the valve size cubed). Said universal trip valve operator is generally comprised of said five stage leverage mechanism generally indicated at 440, trigger generally indicated at 500, OR logic device generally indicated at 510, sensors, transducers, and other trip actuators which are symbolically indicated as S1, S2, T1, T2, and TA but otherwise not shown, spring return actuator generally indicated at 430, dashpot 420, and a controlled actuator for providing the reset actuation which is symbolically indicated as CA but otherwise not shown. FIGS. 25-A and 25-B show said trip valve operator at the reset position. Said five stage leverage mechanism in FIG. 25-A connects with the remainder of said trip valve operator in FIG. 25-B at points X and Y of shaft 444. FIGS. 26 and 27 illustrate the kinematics of the various four bar mechanisms and stages of leverage of said five stage leverage mechanism.

Quarter turn shaft 444 is rotatably mounted in a rigid frame (not shown) by frame bearings which are shown schematically at various locations and indicated as 402. Said rigid frame is fastened to valve operator mounting flange 403 of said ball valve. Said shaft is of square cross section and is coupled to valve stem 401 by a coupling (not shown). Said square cross section shaft couples together said controlled actuator, said dashpot, said spring return actuator, and said five stage leverage mechanism. It will be noted that said shaft could be of other noncircular cross sections such as double dee, splined, hexagon, keyed, etc.

Said five stage leverage mechanism comprises a first four bar linkage generally indicated at 450, a symmetric second four bar linkage generally indicated at 460, a symmetric third four bar linkage generally indicated at 470, a symmetric fourth four bar linkage generally indicated at 480, and fifth stage lever generally indicated at 490. Said four bar linkages are concatenated or trained in series so as to form a one degree of freedom mechanism. Said first and second four bar linkages lie in a first horizontal plane generally indicated at 441. Said third four bar linkage lies in a second horizontal plane generally indicated at 442. Said fourth four bar linkage lies in a third horizontal plane generally indicated at 443. Said planes and said four bar linkages contained therein stack on top of each other, said four bar linkages having overlapping areas of operation. Said shaft 444, the location of which is shown in each said plane in FIG. 25-A, is substantially vertical and provides the relative alignment of said four bar linkages when viewed from the top.

Within said five stage leverage mechanism, first stage lever 451 couples to said shaft 444 through said square shaft and hole feature. Pivot pin 452 rotatably connects said first stage lever with connecting link 453. The distance between said shaft and said pivot pin 452 defines the length, L1a, of said first stage lever arm. The distance between said shaft 444 and the line of action determined by said pivot pin 452 and pivot pin 454 defines a relatively long torque arm of length R1g at the reset position. Advantageously, R1g is made substantially equal to L1a, by configuring said first four bar linkage such that the line of action of said connecting link 453 is substantially perpendicular to said first stage lever at the reset position, for reasons of maximizing the leverage provided by said first stage lever. As said first stage lever is coupled to said shaft 444, said first stage lever will actuate through a quarter turn between the reset position and the returned position. Preferably, R1g is made greater than the various spring return actuator torqueing radii about said shaft 444 so that said first stage lever provides a stage of leverage for reducing the load on said trigger.

Second stage lever 455 is a bell crank having arms 456 and 461. Said second stage lever is rotatably mounted to frame bracket 457 by pivot pin 458. Said frame bracket is rigidly connected to said frame. Said pivot pin 454 rotatably connects said connecting link 453 with said arm 456. As shown in FIG. 28, retaining rings 447 retain said pivot pin 454 against axial displacement and said connecting link has a double clevis type end which interleaves with the triple clevis type end of said second stage arm 456. Said interleaving multiple clevises advantageously create multiple shear areas in said pivot pin 454 which advantageously enables the diameter of said pivot pin 454 to be made smaller, for reasons of minimizing load induced frictional torque, without sacrificing the load carrying capacity of said pivot pin 454. The particular clevis structure shown in FIG. 28 creates six shear areas, which should not be construed as a preferred number of shear areas as various other numbers of interleaving clevises can be provided. By selecting the number of interleaving clevises and the diameter of said pivot pin 454, ample load carrying capacity can be provided and load induced frictional torque on said pivot pin 454 can be suitably minimized. Advantageously, said rotatable connections formed by said pivot pins 458 and 452 also incorporate interleaving multiple clevises which create multiple shear areas in said pivot pins 458 and 452 for the same reasons as discussed above. It will be noted that said first four bar linkage 450 is formed by said first stage lever 451, said connecting link 453, said second stage arm 456 and said frame. The distance between said pivot pin 458 and said pivot pin 454 defines the length, L2b, of said second stage arm 456. L2b is shown substantially equal to L1a but could be somewhat shorter or longer. The distance between said pivot pin 458 and the line of action determined by said pivot pins 452 and 454 defines a second stage short torque arm of length R2s at the reset position. R2s is made less than R1g in order to provide high leverage at the reset position. Pivot pin 462 rotatably connects said second stage arm 461 with connecting link 463. The distance between said pivot pin 458 and said pivot pin 462 defines the length, L2a, of said second stage lever arm. The distance between said pivot pin 458 and the line of action determined by said pivot pin 462 and pivot pin 464 defines a second stage long torque arm of length R2g at the reset position. Advantageously, R2g is made substantially equal to L2a, by configuring said second four bar linkage such that the line of action of said connecting link 463 is substantially perpendicular to said second stage arm 461 at the reset position, for reasons of maximizing the leverage provided by said second stage lever. R2g is greater than R2s for reasons of providing high leverage at the reset position.

Third stage lever 465 is a bell crank having arms 466 and 471. Said arm 466 lies and operates in said first plane 441 while said arm 471 lies and operates in said second plane 442. Said arms 466 and 471 are rigidly connected to each other by a vertically extending center section 445 (shown in dashed lines). Said third stage lever is rotatably mounted to said frame by pivot pin 468 and pivot frame bearings 467 and 469. Said pivot pin 464 rotatably connects said connecting link 463 with said arm 466. It will be noted that said symmetric second four bar linkage 460 is formed by said second stage arm 461, said connecting link 463, said third stage arm 466 and said frame. The distance between said pivot pin 468 and said pivot pin 464 defines the length, L3b, of said third stage arm 466. L3b is substantially equal to L2a so that said second four bar linkage can advantageously be symmetric. The distance between said pivot pin 468 and the line of action determined by said pivot pins 462 and 464 defines a third stage short torque arm of length R3s at the reset position. R3s is less than R2g in order to provide high leverage at the reset position. Pivot pin 472 rotatably connects said third stage arm 471 with connecting link 473. The distance between said pivot pin 468 and said pivot pin 472 defines the length, L3a, of said third stage arm 471. The distance between said pivot pin 468 and the line of action determined by said pivot pin 472 and pivot pin 474 defines a third stage long torque arm of length R3g at the reset position. Advantageously, R3g is made substantially equal to L3a, by configuring said third four bar linkage such that the line of action of said connecting link 473 is substantially perpendicular to said third stage arm 471 at the reset position, for reasons of maximizing the leverage provided by said third stage lever. R3g is greater than R3s for reasons of providing high leverage at the reset position.

Fourth stage lever 475 is a bell crank having arms 476 and 481. Said arm 476 lies and operates in said second plane 442 while said arm 481 lies and operates in said third plane 443. Said arms 476 and 481 are rigidly connected to each other by a vertically extending center section 446 (shown in dashed lines). Said fourth stage lever is rotatably mounted to said frame by pivot pin 478 and pivot frame bearings 477 and 479. Said pivot pin 474 rotatably connects said connecting link 473 with said arm 476. It will be noted that said symmetric third four bar linkage 470 is formed by said third stage arm 471, said connecting link 473, said fourth stage arm 476 and said frame. The distance between said pivot pin 478 and said pivot pin 474 defines the length, L4b, of said fourth stage arm 476. L4b is substantially equal to L3a so that said third four bar linkage can advantageously be symmetric. The distance between said pivot pin 478 and the line of action determined by said pivot pins 472 and 474 defines a fourth stage short torque arm of length R4s at the reset position. R4s is less than R3g in order to provide high leverage at the reset position. Pivot pin 482 rotatably connects said third stage arm 481 with connecting link 483. The distance between said pivot pin 478 and said pivot pin 482 defines the length, L4a, of said fourth stage arm 481. The distance between said pivot pin 478 and the line of action determined by said pivot pin 482 and pivot pin 484 defines a fourth stage long torque arm of length R4g at the reset position. Advantageously. R4g is made substantially equal to L4a, by configuring said fourth four bar linkage such that the line of action of said connecting link 483 is substantially perpendicular to said fourth stage arm 481 at the reset position, for reasons of maximizing the leverage provided by said fourth stage lever. R4g is greater than R4s for reasons of providing high leverage at the reset position.

Fifth stage lever 490 comprises link arm 485 and a sector shaped arm 491. Said fifth stage lever is rotatably mounted to said frame by pivot pin 488 and pivot frame bearings 487 and 489. Said pivot pin 488 also provides a thrust pivot 486. Said pivot pin 484 rotatably connects said connecting link 483 with said arm 485. It will be noted that said symmetric fourth four bar linkage 480 is formed by said fourth stage arm 481, said connecting link 483, said fifth stage arm 485 and said frame. The distance between said pivot pin 488 and said pivot pin 484 defines the length, L5b, of said fifth stage arm 485. L5b is substantially equal to L4a so that said fourth four bar linkage can advantageously be symmetric. The distance between said pivot pin 488 and the line of action determined by said pivot pins 482 and 484 defines a fifth stage short torque arm of length R5s at the reset position. R5s less than R4g in order to provide high leverage at the reset position. Said sector shaped arm 491 comprises a land 494 for engaging trigger bearing 501 at the reset position, a ramp 493 for deflecting said trigger bearing and said trigger during reset actuation, and concentric surface 492 which is substantially concentric with said pivot pin 488 and is for maintaining said trigger at a constant deflection over a portion of the reset actuation. The distance between said pivot pin 488 and said trigger bearing defines a long arm torque arm of length R5g. R5g is greater than R5s for reasons of providing high leverage at the reset position. The weight of said sector shaped arm is reduced by sector shaped holes 497 and 498. Stop 495 is rigidly mounted to said rigid frame. Stop set screw 496 is threaded into said stop and adjustably determines the maximum clockwise rotation of said sector shaped arm and thereby said five stage leverage mechanism, said maximum clockwise rotation being slightly passed the reset position.

A second stop (not shown) determines the maximum counterclockwise rotation of said shaft 444 and the returned position. Said second stop could be located so as to act against said first stage lever as in the first embodiment.

It will be noted that the loads on said pivot pins in said fourth four bar mechanism are less than the loads on said pivot pins in said third four bar mechanism which in turn are less than the loads on said pivot pins in said second four bar mechanism, etc. Therefore, said pivot pins 488, 484, and 482 are of smaller diameter than said pivot pins 478, 474, and 472 which in turn are of smaller diameter than said pivot pins 468, 464, and 462 which in turn are of smaller diameter than said pivot pins 458, 454, and 452. Decreasing the diameter of said pivots in the succesive said four bar linkages advantageously reduces induced frictional torques in said successive four bar linkages. The reduction in load in successive stages of leverage is also used to reduce the number of interleaving clevises acting on said pivot pins. FIG. 29 shows a cross section of said pivot 482 which can be compared with FIG. 28 and pivot 454.

Said trigger is constructed in subtantially the same manner as the trigger shown and described in the first embodiment. Said trigger comprises a trigger lever 502 which is rotatably mounted to said rigid frame through pivot 503. Said trigger lever provides an arm for mounting said trigger bearing and provides a contact arm 504 for implementing said OR logic device. Said trigger bearing is preferably a miniature ball bearing. The inner race of said trigger bearing is rotatably mounted to said trigger lever thereby providing rotational redundancy, in that said trigger bearing can rotate either through the rolling action of said ball bearing or, failing that, the sliding action between said inner race and said trigger lever. The axis of rotation of said trigger lever is substantially perpendicular to the plane containing said land 494 so that there are substantially no force components of the trigger load force in the direction of the trigger throw either tending to hold or release said trigger. A trigger spring (not shown) lightly torques said trigger lever to maintain the trigger hold position which can be determined by a stop (not shown) or by the reset or hold positions of said sensors, transducers, and other trip actuators.

Means for implementing OR logic between said sensors, transducers, and other trip actuators S1, S2, T1, T2, and TA to produce an OR output thereof for operating said trigger is generally indicated at 510. Said OR logic means comprise said contact arm 504 and redirection levers generally indicated at 511 which are rotatably mounted to pivot shaft 512 and are independently rotatable. Said sensors and transducers can connect to said redirection levers in a manner similar to that shown in the first embodiment. Said redirection levers are each able to make a surface contact type connection with said contact arm.

Said spring return actuator 430 is similar to the spring return actuator of the first and second embodiments and is of the type disclosed in my U.S. Pat. No. 4,869,459. Said spring return actuator is generally comprised of substantially identical nested torsion spring actuators 436 and 437 which respectively connect to substantially identical bias transmitting and transforming devices 431 and 432. Said bias transmitting and transforming device 431 comprises eccentric spool 433, looped multiple leg cable 434, and concentric spool 435. Said bias transmitting and transforming device 432 is constructed similarly to 431, as shown. Said concentric spool couples to said shaft 444. A third nested torsion spring actuator 438 is located under said concentric spool, around said shaft 444 and connects to said concentric spool. Said spring return actuator torques said shaft 444 in the counterclockwise direction as seen from FIG. 25-B.

Said dashpot 420 is a hydraulic dashpot for controlling the rate with which said spring return actuator actuates said valve. Said dashpot comprises a crank arm 421 which couples to said shaft 444 and which is rotatably connected to pushrod 422 by pin 419. Said pushrod is rigidly attached to piston 423. O-rings 429 form a seal between cylinder housing 424 and said piston and between end cap 414 and said pushrod. Said cylinder housing is rotatably mounted to said rigid frame by clevis 425. The two cylinder chambers 415 & 416 formed by said piston and said cylinder housing are completely filled with hydraulic fluid. Hydraulic lines 417 and 418 and an adjustable flow control with by-pass 426 form a fluid passage between said cylinder chambers. Said flow control comprises an adjustable restriction 427, such as a needle valve, and a check valve 428. During actuation to the returned position, said crank arm and said pushrod operate over a quarter turn and generate a generally increasing torque arm, from a generally increasing cross product angle, as shown.

Said controlled actuator, which is symbolically indicated as CA and which connects to and can torque said shaft 444 in the clockwise direction as seen from FIG. 25-B, provides the means for resetting said universal trip valve operator. Said controlled actuator can be any of a variety of manual actuators or powered actuators. Said controlled actuator can either be a permanent component of said universal trip valve operator or can be removable therefrom. Where said ball valve is of a relatively large size and therefore presents high torque loads, said controlled actuator can take the form of a declutchable manual gear box or worm gear type actuator, a declutchable electric motor driven gear box or worm gear type actuator, or various pneumatic or hydraulic actuators, etc. In the case where said valve is remotely located and power is therefore generally not available, as for example on a transmission pipeline, and said valve is impractical to reset with a manual handle type controlled actuator because of high actuation torque, said controlled actuator can advantageously comprise a removable hydraulic cylinder actuator which acts on said shaft 444 through some linear motion to quarter turn rotary motion converter mechanism such as a concentric spool and flexible element, a crank arm, a rack and pinion, a scotch yoke, etc. Said linear to quarter turn rotary converter mechanism can be either removeable or permanently installed. Additionally, said hydraulic cylinder actuator could be powered by a portable hydraulic power unit (e.g. a small engine and hydraulic pump combination) which can be transported to remote sites. As ordinary typical operating pressures for hydraulic equipment start at 500 psi and can exceed 2500 psi for stock hydraulic components, said removable hydraulic controlled actuator would be relatively small, light in weight, and therefore, relatively easy for operating personnel to handle. Being removable, said hydraulic cylinder controlled actuator can be used to reset more than one said trip valve thereby effecting a saving in the number of controlled actuators needed to service a group of said trip valves.

FUNCTION AND OPERATION

The overall operation of said third embodiment of a universal trip valve operator according to the invention is as follows.

At the reset position, shown in FIGS. 25-A and 25-B, said spring return actuator is fully tensioned in order to provide ample torque for actuating said valve to the returned position. Said trigger restrains said fifth stage of leverage and thereby said five stage leverage mechanism. Said five stage leverage mechanism thence restrains said spring return actuator and said valve, thus maintaining the reset position. Said five stage leverage mechanism functions to reduce the load on said trigger. Said sensors, transducers, and other trip actuators conditionally maintain their trigger hold positions and, through said OR logic device, allow said trigger to maintain the hold position.

In the triggering and return actuation of said universal trip valve operator, if any one of said sensors, transducers, or other trip actuators produces a trip actuating output, then said trigger lever 502 is rotated to the release position and said trigger bearing clears said land 494. Said five stage leverage mechanism is self releasing so that when the restraining force provide by said trigger bearing is removed then the torque on said shaft 444, which is provided by said spring return actuator, will cause said five stage leverage mechanism to be actuated to the returned position. Therefore, under the action of said spring return actuator and said dashpot, said valve and said five stage leverage mechanism are actuated from the reset position to the returned position. The basic function of said dashpot is to control the rate at which said valve is actuated to the returned position. As can be seen in FIG. 26, said first stage lever 451 undergoes a quarter turn actuation along with said shaft 444 and said valve. As a result of the quarter turn actuation of said first stage lever and the choice of various other design parameters such as the approximately perpendicular alignment of said first stage lever and said connecting link 453 at the reset position, the comparatively small size of said second stage short torque arm at the reset position, the choice of $L2b = L1a$, and the relative spacing of said pivot 458 from said shaft in relation to the lengths $L2b$ and $L1a$, it can be seen that said second stage lever goes through a second stage actuation angle of approximately 137 degrees between the reset position and the returned position. It will be noted that if $L2b$ and $L1a$ were not equal or the relative spacing of said pivot 458 from said shaft 444 were proportionately longer or shorter from what is shown, then said second stage actuation angle could be larger or smaller than 137 degrees. Said second four bar linkage is preferably symmetric and is shown diagramatically in FIG. 27. The term symmetric indicates that the reset position (solid lines) and returned position (dashed lines) of said second four bar linkage are symmetric across line S—S or are mirror images of each other which implies that the third stage actuation angle equals the second stage actuation angle and that $L2a = L3b$. Given the relative spacing of said pivots 458 and 468 in relation to the lengths $L2a$ and $L3b$, and a suitably small size for said third stage short torque arm R3s at the reset position, it is apparent from FIGS. 27 and 25-A that said connecting link 463 is approximately perpendicular to said second stage arm 461 at the reset position thereby maximizing the leverage produced by said second stage arm 461. Said third and fourth four bar linkages are also symmetric. Therefore the fourth stage actuation angle and the fifth stage actuation angle are both approximately 137 degrees. It will be apparent that if said second stage actuation angle is made larger or smaller than 137 degrees, then said symmetric second, third, and fourth four bar linkages can be configured to operate through a larger or smaller actuation angle equal to said second stage actuation angle. In addition, said third four bar linkage operates above the area of operation of said first four bar linkage and said fourth four bar linkage operates over the same area as said second four bar linkage thereby substantially eliminating the need for additional operating area to accomodate said third four bar linkage and said fourth four bar linkage.

To reset said trip valve operator, said controlled actuator actuates said shaft 444 clockwise thereby actuating said valve, said spring return actuator, said dashpot, and said five stage leverage mechanism from the returned position to the reset position. If all said sensors, transducers, and other trip actuators are at their trigger hold positions, then said trigger will also be at the hold position. As said controlled actuator actuates toward the reset position, said ramp 493 of said fifth stage lever 490 contacts said trigger bearing and deflects said trigger bearing and said trigger lever out of the way of said sector shaped arm 491 and against the bias of said trigger spring. Said ramp is located so that said trigger bearing is deflected during the initial portion of the reset actuation of said fifth stage lever which enables said controlled actuator to easily deflect said trigger through five stages of leverage because, near the returned position, the leverage provided by said five stage leverage mechanism is roughly the inverse of the leverage provided at the reset position. At and near the returned position, the reset actuation torques present at shaft 444 result in a relatively high force capability at said fifth stage of leverage for deflecting said trigger, whereas near the reset position, either reset or return actuation torques at said shaft 444 result in a low force capability at said fifth stage of leverage for deflecting said trigger. As said fifth stage lever actuates to the reset position, said concentric surface maintains said trigger at a constant deflection and said trigger bearing produces only minor amounts of friction. Therefore, said controlled actuator sees only minor increases in loading due to resistance from said trigger acting back through said five stage leverage mechanism near the reset position. As said fifth stage lever reaches the reset position, said trigger spring causes said trigger lever to actuate back to the hold position. The reset actuation continues slightly past the reset position until said sector shaped arm contacts said stop 495 which prevents further clockwise actuation. When the reset actuation torque from said controlled actuator are removed, then under the action of said spring return actuator, said fifth stage lever rotates counterclockwise by a slight amount until said land 494 contacts said trigger bearing. Said valve, said spring return actuator, said dashpot, said five stage leverage mechanism, and said trigger are now reset.

Within said spring return actuator, said bias transmitting and transforming devices 431 and 432 act to transform the basic actuation characteristics of said nested torsion spring actuators 436 and 437 (a declining output as described by the rotary form of Hooke's Law) into an increasing torque output at said shaft 444 and extract most of the spring energy storage capacity of said nested torsion spring actuators in producing said increasing output. Said increasing output is such that, when added to the declining output produced by said third nested torsion spring actuator 438 which acts directly on said shaft 444, the combined output is approximately a constant torque over the quarter turn actuation stroke. Such an output is efficiently loadmatched to the relatively constant torque load of said ball valve. Additionally, the net retensioning characteristics of said spring return actuator are approximately a constant torque which is efficiently loadmatched to the approximately constant torque output of many types of controlled actuators. As noted in my U.S. Pat. No. 4,869,459, the output of said spring return actuator is not limited to a constant torque output but is capable of many different outputs, the form of said output being a design parameter. Also, as noted in said patent, there are other bias transmitting and transforming devices aside from those discussed above.

The basic purpose of said dashpot is to control the rate at which said valve is actuated. Such actuation rate control is useful in many applications (particularly where the pipe controlled by said valve is very long, such as a transmission pipeline, and the fluid therein is incompressible) for minimizing hydraulic shocking or hammering on the closure of said valve or limiting initial flow rates on the opening of said valve. (It will be apparent that in applications where actuation rate control of said valve is unimportant, said dashpot could be eliminated from said trip valve operator.) When said controlled actuator is rate limited (e.g. a manually powered gear box or worm gear actuator) or separately rate controlled (e.g. a fluid powered actuator with a metering valve) it may be desired to have said dashpot not control the reset actuation rate. To this end, said check valve 428 enables said hydraulic fluid to freely flow from said cylinder chamber 416 to cylinder chamber 415 during reset actuation. During actuation to the returned position, the action of said crank arm and said piston pressurizes the hydraulic fluid in said cylinder chamber 415 thereby forcing said hydraulic fluid to flow through said adjustable restriction in order to reach said cylinder chamber 416. Said adjustable restriction creates a pressure drop and thereby adjustably limits the flow rate between said cylinder chambers which thereby controls the actuation rate of said shaft 444 and said valve. When the returned position is the closed position of said valve, it may be desired to have a relatively fast initial actuation of said valve toward the closed position in order to effect a more rapid overall actuation toward the closed position but have a relatively slow final sealing off actuation near the closed position in order to minimize hydraulic shocking or hammering in the pipe being controlled by said valve. While this generally decreasing actuation rate can be accomplished by more elaborate flow controls which are known, a generally decreasing actuation rate can also be provided by novel configuration of said crank arm and said pushrod. During actuation to the returned position, said crank arm and said pushrod form a bias transmitting and transforming device which enables said piston to act on said shaft 444 through an increasing leverage. It can be seen that the varying torque arm generated by said crank arm and said pushrod 422 is generally increasing as the returned position is approached and the torque arm at the returned position Rd1 is considerably greater than the torque arm at the reset position Rd2. This increasing leverage enables said valve to initially actuate relatively quickly toward the returned position when released from the reset position and then progressively slow down as the returned position is approached. It will be apparent that when the returned position is the open position of said valve and a slow initial opening actuation is desired followed by a relatively more rapid actuation to the full open position, then said transforming device would be configured to produce an initially high leverage which then decreases as actuation toward the returned position progresses. It will be noted that said transforming device could alternately comprise any of the transforming devices described in relation to said spring return actuator.

The torque load presented by said quarter turn ball valve and, consequently, the torque output of said spring return, are relatively high. Depending on size and other factors, said valve torque load and therefore the torque output of said spring return actuator can range up to several thousand foot pounds of torque or more. However, the trip actuating outputs, which can be provided by said sensors, transducers, or other trip actuators that are reasonably compact and inexpensive, are low and generally are on the order of a few ounces to a few pounds. Therefore, the primary functions, properties and requirements of said five stage leverage mechanism are:

(1) provide sufficient leverage at the reset position for reducing the trigger load to a low level so that said sensors or other trip actuators can reliably operate said trigger;

(2) when triggered, reliably release from the reset position to allow said spring return actuator to actuate said valve to the return position;

(3) be compact;

(4) be compatible with the quarter turn requirements of said valve and said spring return actuator;

(5) be single action resettable;

(6) be capable of being scaled up to handle the larger loads of larger versions of said valve and said spring return actuator (in particular valve loads which scale as the valve size cubed), while allowing little or no growth of the trigger load and dimensionally not scaling substantially any faster than quarter turn valve dimensions.

At the reset position, said five stage leverage mechanism generates a total leverage, N, which is the product of the leverage of said first stage, N1, said second stage, N2, said third stage, N3, said fourth stage, N4, and said fifth stage, N5, where;

$$N = N1 \, N2 \, N3 \, N4 \, N5$$
$$N1 = R1g$$
$$N2 = R2g/R2s$$
$$N3 = R3g/R3s$$
$$N4 = R4g/R4s$$
$$N5 = R5g/R5s$$

The force impressed on said trigger bearing, F5, due to the torque output, M, of said spring return actuator, is;

$$F5 = M/N$$

Although the above equations do not include a factor for the short torque arm associated with said first stage lever, as the output of said spring return actuator is conveniently considered as a torque, it will be noted that the short torque arm associated with said first stage lever can be taken as an average spring torqueing radius about said shaft 444 or can be taken as one of the various spring torqueing radii about said shaft 444 (i.e. the radii of said torsion springs 438 which surround said shaft 444 or dimension Rs in FIG. 25-B.). Said first stage lever is preferably made sufficiently long so that R1g is greater than the various spring torqueing radii in order to provide a stage of leverage for reducing the trigger load.

By making R1g, R2g, R3g, R4g, and R5g relatively long and making R2s, R3s, R4s, and R5s relatively short, then it can be seen that high leverages and hence low trigger loads result. The multiple shear areas in said pivot pins 452, 454, and 458 which result from the provision of multiple interleaving clevises in said first four bar linkage enables said pivot pins 452, 454, and 458 to be of smaller diameter which advantageously enables R2s to be made smaller. For example, if R1g=R2g=R3g=R4g=6 in., and R5g=6.5 in., R2s=1.0 in., R3s=0.7 in., R4s=0.375, and and R5s=0.375 in., then according to my calculations N=85577. If, furthermore, said five stage leverage mechanism with these dimensions were used on, for example, a 20 inch ball valve or a 30 inch butterfly valve which can typically have a recommended actuation torques of 2500 ft.-lb. or 30,000 in.-lb., then the trigger force is:

$$F5 = 30,000/85577 = 0.35 \text{ lb.} = 6 \text{ oz.}$$

which is in a reasonable range for a trigger load.

The compactness of said five stage leverage mechanism is a result of several features. First, while the total leverage of said five stage leverage mechanism is the product of the leverage of each of said stages of leverage, the size of said five stage leverage mechanism is related to the sum of the lengths of said stages of leverage. In addition, said four bar linkages are vertically stacked with the interconnection path between said first stage lever and said fifth stage lever following a roughly helical pattern centered about said shaft 444 which results in said third four bar linkage overlapping or operating substantially over much the same area of operation as said first four bar linkage and said fourth four bar linkage overlapping or operating over the same area of operation as said second four bar linkage.

In order that said five stage leverage mechanism can provide high leverage and reliably release from the reset position when triggered, it is necessary to:

(1) minimize, the load induced frictional holding torques, and;

(2) provide an ample releasing torque to reliably overcome the largest credible amount of frictional holding torques.

Frictional holding torques within said five stage leverage mechanism are minimized by having the various load induced frictional forces act through small torque arms. In said five stage leverage mechanism, the forces and reactions act through, and therefore the consequent frictional forces and reactions act on, said pivot pins which have relatively small diameters. Said pivot pins, however, have sufficient diameter in order to provide ample strength to carry the loads imposed thereon. It will be noted that said multiple interleaving clevises surrounding said pivot pins 452, 454, and 458 lever provides six pivot shear areas per pivot pin, thus enabling the use of smaller diameter pivot pins to carry the same load as a larger pivot pin with fewer imposed shear areas, which, in turn, reduces load induced frictional torques. The frictional torque, Mf, developed on any pivot is:

$$Mf = UsFRp$$

where
$U_s$ - largest credible coefficient of friction,
$F$ - force on pivot,
$R_p$ - radius of pivot.

Said pivot pins can advantageously be coated with a dry lubricant such as molybdenum disulphide or tungsten disulphide in order to obtain lower coefficients of static friction. Said dry lubricants, it is variously claimed, do not oxidize or rub off. It will be apparent to those skilled in the art that the frictional forces on said pivot pins could be reduced through the use of various antifriction bearings, such as ball bearings, or various greases. Ball bearings, however, are costly and, even if sealed, can be subject to chocking by minor contamination making them less reliable. Greases would require a maintanence interval for relubricating said pivots which if not met would compromise reliability.

Said fifth stage lever applies a relatively small trigger load force to said trigger bearing. Said trigger bearing is a ball bearing and largely eliminates much of the resulting frictional loading of said trigger. As said trigger bearing is a rolling element type bearing, rather than a plain sleeve bearing roller or a simple direct contact sliding surface, is preferred because of its friction reducing properties and the smooth triggering action which results, but not essential because the trigger load is small. Even with a high coefficient of static friction, frictional loading of said trigger could still be overcome by the trip actuating output produced by said sensors or said tranducers.

Said releasing torque, preferably, is self generated within said five stage leverage mechanism by setting said second, third, fourth, and fifth stage small torque arms above a minimum value. According to my analysis using the principle of virtual work, in said five stage leverage mechanism:

$$R2s > 2\ Us\ Rp_1 \quad \text{or} \quad R2s = 2\ Us\ Rp_1\ K$$
$$R3s > 2\ Us\ Rp_2 \quad \text{or} \quad R3s = 2\ Us\ Rp_2\ K$$
$$R4s > 2\ Us\ Rp_3 \quad \text{or} \quad R4s = 2\ Us\ Rp_3\ K$$
$$R5s > 2\ Us\ Rp_4 \quad \text{or} \quad R5s = 2\ Us\ Rp_4\ K$$

where:
  $R2s$, etc. - are the various short torque arms previously defined
  $Us$ - largest credible coefficient of static friction
  $Rp_1$ - radius of said pivot pins 452, 454, and 458
  $Rp_2$ - radius of said pivot pins 462, 464, and 468
  $Rp_3$ - radius of said pivot pins 472, 474, and 478
  $Rp_4$ - radius of said pivot pins 482, 484, and 488
  $K$ - reliability factor, preferably 2 or more it will be noted that at the release from the reset position, the initial rotation on said pivot pin 458 is approximately equal to the sum of the initial rotations on said pivot pins 452 and 454. The same rotational relationships occur in said second, third and fourth four bar linkages and lead to the above results.

Quarter turn compatibility of said five stage leverage mechanism is provided in the following manner. That said first four bar linkage enables said first stage lever to actuate through a quarter turn can be seen in FIG. 26. Although the length of said second stage arm, $L2b$, is made equal to the length of said first stage lever, $L1a$, it will be apparent that $L2b$ could be somewhat less than $L1a$ or could be greater than $L1a$ and still accomodate the quarter turn actuation of said first stage lever. As previously noted, said second stage lever actuates over approximately 137 degrees between the reset and returned position. As said second, third and fourth four bar linkages are symmetric and are configured to preserve said second stage actuation angle, in this case 137 degrees, then when said first, second, third and fourth four bar linkages are concatenated or trained together in series, said third, fourth, and fifth stage actuation angles will be equal to approximately 137 degrees. As said first four bar linkage accomodates quarter turn motion of said first stage lever, said second four bar mechanism accomodates the actuation angle of said second stage lever, said third four bar mechanism accomodates actuation angle of said third stage lever, and said fourth four bar mechanism accomodates the actuation angle of said fourth stage lever, then said five stage leverage mechanism is quarter turn compatible. It will be apparent that six or more stage leverage mechanisms could be provided by the concatenation of more four bar mechanisms, preferably symmetric four bar mechanisms, onto said five stage leverage mechanism with the relocation of said sector shaped arm and said trigger to the last stage of leverage.

Single action resetability of said five stage leverage mechanism by a reset actuation, as would be caused by said controlled actuator acting through said shaft 444, is attained as follows. Said first stage lever is directly coupled to said shaft 444. Due to the fact that said first, second, third, fourth, and fifth stage levers are part of said five stage leverage mechanism which has one degree of freedom when actuating between the reset position and the returned position and vice versa, said second, third, fourth, and fifth stage levers are guided from said returned position back to said reset position.

The scaling up of said five stage leverage mechanism to handle larger valve loads and spring return actuator output torques therefor while allowing little or no growth of the trigger load and hence trip actuation requirements and dimensionally not scaling up any faster than the dimensions of either said quarter turn ball valve or various other quarter turn valves, can be attained as follows. For those quarter turn valves which present valve loads that scale as the valve size to the second power or less, the scaling can proceed among the first three stages of leverage in much the same manner as in the first embodiment. Alternatively, all five stages of leverage could be scaled with the scaling of the first three stages being somewhat slower than in the first embodiment.

It was previously noted that some makes and models of quarter turn valves have recommended actuation torque requirements which scale approximately as the valve size to the third power.

$$M \sim S^3$$

If said first stage lever length, $L1a$, and said first stage torque arm, $R1g$, are scaled up as the valve size, then the force, $F1$, on said pivots 452, 454 and 458 scales up as the valve size squared;

$$F1 \sim M(1/R1g)$$

$$F \sim S^3(1/S) = S^2$$

If the number of interleaving clevises acting on said pivot pins 452, 454, and 458, and therefore the number of shear areas therein, $Ns_1$, is scaled up as the valve size to the one half power;

$$Ns_1 \sim S^{\frac{1}{2}}$$

Then the area, $A1$, of said pivot pins 452, 454, and 458 would be scaled up as $F1/Ns_1$ in order to maintain shear strength;

$$A1 \sim F1/Ns_1 \sim S^{1.5}$$

As the area of said pivots scales with the radius of said pivots to the second power, $$A1 \sim Rp_1^2, \text{ and therefore}$$

$$Rp_1 \sim S^{0.75}.$$

As noted previously, said second stage small torque arm, $R2s$, relates to the radii of said pivot pins 452, 454, and 458 in order to produce a reliable release from the reset position. Therefore;

$$R2s \sim Rp_1 \sim S^{0.75}$$

Note that in scaling up said first four bar linkage, changes in said second stage actuation angle can result, which need to be taken in account in configuring said symmetric second, third and fourth four bar linkages.

If said second stage long arm, $R2g$, is scaled as the size of said valve, then the force, F2, acting on said third stage short torque arm and said pivot pins 462, 464, and 468 scales as the valve size to the 1.75 power.

$$F2 \sim F1(R2s/R2g)$$

$$F2 \sim S^2(S^{0.75}/S) \sim S^{1.75}$$

If the number of interleaving clevises acting on said pivot pins 462, 464, and 468, and therefore the number of shear areas therein, $Ns_2$, is scaled up as the valve size to the one half power;

$$Ns_1 \sim S^{\frac{1}{2}}$$

Then the area, A2, of said pivot pins 462, 464, and 468 would be scaled up as $F2/Ns_2$ in order to maintain shear strength.

$$A2 \sim F2/Ns_2 \sim S^{1.25}$$

As the area of said pivots scales with the radius of said pivots to the second power, $$A2 \sim Rp_2^2, \text{ and therefore}$$

$$Rp_2 \sim S^{5/8}.$$

As noted previously, said third stage small torque arm, $R3s$, relates to the radii of said pivot pins 462, 464, and 468 in order to produce a reliable release from the reset position. Therefore, $$R3s \sim Rp_2 \sim S^{\frac{5}{8}}.$$

If said third stage long arm, $R3g$, is scaled as the size of said valve, then the force, F3, acting on said fourth stage short torque arm and said pivot pins 472, 474, and 478 scales as the valve size to the 1.375 power.

$$F3 \sim F2(R3s/R3g)$$

$$F3 \sim S^{1.75}(S^{\frac{5}{8}}/S) \sim S^{1.375}$$

If the number of interleaving clevises acting on said pivot pins 472, 474, and 478, and therefore the number of shear areas therein, $Ns_3$, is scaled up as the valve size to the one half power.

$$Ns_3 \sim S^{\frac{1}{2}}$$

Then the area, A3, of said pivot pins 472, 474, and 478 would be scaled up as $F3/Ns_3$ in order to maintain shear strength.

$$A3 \sim F3/Ns_3 \sim S^{\frac{7}{8}}$$

As the area of said pivots scales with the radius of said pivots to the second power, $$A3 \sim Rp_3^2, \text{ and therefore}$$

$$Rp_3 \sim S^{7/16}$$

As noted previously, said fourth stage small torque arm, $R4s$, relates to the radii of said pivot pins 472, 474, and 478 in order to produce a reliable release from the reset position. Therefore, $$R4s \sim Rp_3 \sim S^{7/16}.$$

If said fourth stage long arm, $R4g$, is scaled as the size of said valve, then the force, F4, acting on said fifth stage short torque arm and said pivot pins 482, 484, and 488 scales as the valve size to the 0.8125 or 13/16 power.

$$F4 \sim F3(R4s/R4g)$$

$$F4 \sim S^{1.375}(S^{7/16}/S) \sim S^{13/16}$$

If the number of interleaving clevises acting on said pivot pins 482, 484, and 488, and therefore the number of shear areas therein, $Ns_4$, is scaled up as the valve size to the one half power.

$$Ns_4 \sim S^{\frac{1}{2}}$$

Then the area, A4, of said pivot pins 482, 484, and 488 would be scaled up as $F4/Ns_4$ in order to maintain strength.

$$A4 \sim F4/Ns_4 \sim S^{5/16}$$

As the area of said pivots scales with the radius of said pivots to the second power, $$A4 \sim Rp_4^2, \text{ and therefore}$$

$$Rp_4 \sim S^{5/32}.$$

As noted previously, said second stage small torque arm, $R5s$, relates to the radii of said pivot pins 482, 484, and 488 in order to produce a reliable release from the reset position. Therefore;

$$R5s \sim Rp_4 \sim S^{5/32}$$

If said fifth stage long arm, $R5g$, is scaled as the size of said valve, then the force, F5, acting on said trigger bearing scales as the valve size to the $-0.03$ power which is essentially constant.

$$F5 \sim F4(R5s/R5g)$$

$$F5 \sim S^{13/16}(S^{5/32}/S) \sim S^{-1/32} \cong \text{constant}$$

As the trigger load remains constant, it is not necessary to scale up the trip actuation force or torque output of said sensors and transducers with increases in the size of said valve. As it is not necessary to scale up the trigger throw or, therefore, the actuation strokes of said sensors, transducers, or other trip actuators it is not necessary to scale up the trip actuation work output of said sensors, transducers, or other trip actuators. (The work output of a particular said sensor or trip actuator is the integral of its force curve through its actuation stroke.) Therefore, said sensors, transducers, or other trip actuators do not have to be scaled up with the size of said quarter turn valve.

In addition, there are other ways in which the scaling could be carried out. For example, the number of interleaving clevises could be scaled at a higher rate (e.g. $N \sim S^{\frac{3}{2}}$) or at a lower rate (e.g. $N \sim S^{\frac{1}{2}}$). Further, in order to keep the trigger load constant the number of stages of leverage, Ln, could be scaled up to accomodate increases in the size and loads of said quarter turn valve (e.g. $Ln \sim S^{\frac{1}{2}}$).

Said first four bar linkage, said symmetric four bar linkages, and therefore, said five stage leverage mechanism have a number of selectable design parameters which are illustrated in FIGS. 26 and 27.

A set of independently selectable design parameters in said first four bar linkage can include:

(a) B, the first stage actuation angle (generally will be a quarter turn, however, if said first stage lever is not directly coupled to said quarter turn valve but couples to said valve through some additional mechanism where said additional mechanism provides an actuation angle conversion from another actuation angle, G, for example 120 degrees, to a quarter turn, then B would be selected to be equal to G);

(b) L1a, the length of said first stage lever;

(c) L2b, the length of said second stage arm 456;

(d) R2s, the second stage short torque arm;

(e) C, the angle between said connecting link 453 and said first stage lever at the reset position which with L1a determines R1g, alternatively R1g could be selected and C be determined as a result.

It will be noted that the specification of the above independent parameters will determine various other dependent parameters or characteristics of said first four bar linkage such as the second stage actuation angle, the length of said connecting link 453, and various other reset position and returned position angles. It will be noted that if, alternatively, it is desired to independently specify, one of the above parameters described as dependent, for instance said second stage actuation angle, then one of the above design parameters described as independent would become dependent and would be replaced by the formerly dependent parameter.

A set of independently selectable design parameters in said symmetric second four bar linkage includes:

(a) L2a, the length of said second stage arm 461;

(b) Lf, the separation of said frame pivots 458 and 468;

(c) E1, the actuation angle of said third stage arm 461;

(d) D2, the angle which said third stage arm 461 makes with the frame link T—T at the reset position.

It will be noted that the symmetric nature of or the symmetry condition imposed on said second four bar linkage establishes the following relations:

(1) L3b = L2a;
(2) E2 = E1;
(3) D1 = D2;

Note that D2 and L3b determine R3s rather directly. Given L3b, D2 would be selected so that R3s = 2 Us Rp2 K in order to provide high leverage at the reset position and assure a reliable release therefrom when triggering occurs, as previously noted.

As noted in relation to said first four bar linkage, the above parameters which have been described as independent could be replaced by otherwise dependent parameters. For example the specification of R3s could replace the specification of D2.

Said symmetric third and fourth four bar linkages each have a set of independently selectable design parameters which are basically the same as that described for said second four bar linkage.

It will be noted that in concatenating said first, second, third and fourth four bar linkages to form said five stage leverage mechanism that the number of independently selectable design parameters is reduced. For example, in this embodiment said second, third, fourth and fifth stage actuation angles are equal and the selection of one said actuation angle determines the other said actuation angles.

FOURTH EMBODIMENT - CONSTRUCTION

FIGS. 30-42 illustrate a seismic sensitive trip valve, or just seismic valve, according to the invention and generally comprises a seismic vibration sensor and transducer generally indicated below 540, which connects to a universal trip valve operator generally indicated below 530, which in turn connects to a quarter turn ball valve 520. Said universal trip valve operator generally comprises spring return actuator 531, three stage leverage device generally indicated around 532, trigger 535, and OR logic means 536. Said three stage leverage device in turn comprises two stage leverage mechanism 533 and third stage leveraging release lever 534. Said seismic vibration sensor and transducer connects to said OR logic device which thence connects to said trigger. A manual control 537 also connects to said OR logic means. The controlled actuator for resetting said seismic sensitive trip valve (hereinafter referred to as the reset actuator) is a removable handle (not shown) which can mate with coupling 538 and is for manually resetting said seismic sensitive valve. Said reset actuator is the same as the handle shown and described in the first embodiment. A position indicator 539 visually indicates the position of said valve. Said seismic valve is shown at the reset position in FIGS. 30 and 31. The returned position of portions of said three stage leverage device is also shown in FIG. 31 (dashed lines).

Said seismic vibration sensor and transducer generally comprises seismic vibration sensor 541, transducer 542, and sensor frame 543. Said seismic vibration sensor generally comprises mass element 544, two degree of freedom bearing 545, spring network 546 (best seen in FIG. 36), bearing alignment preserver 547, and sliding friction damper generally indicated at 548. Said transducer generally comprises conically shaped cam 549 and tracking probe or follower 550.

Within said seismic vibration sensor and transducer, sensor base 570 of said sensor frame 543 is oriented so as to lie substantially in a horizontal plane although, as will be seen, said sensor base does not have to be held to a particularly tight leveling tolerance. Said mass element rests on and is supported by said two degree of freedom bearing which in turn rests upon and is supported by the sensor base 570 of said sensor frame 543. Said mass element is preferably made of a relatively dense material such as steel. As shown, said mass element is of square horizontal cross section and is of relatively low vertical height. Attached to the lower surface of said mass element is a thin bearing sheet 551 that is made of a corrosion resistant material such as stainless steel or aluminum. Said two degree of freedom bearing comprises four bearing balls, indicated as 557, and a cage 558. Said cage is preferably made from thin sheet metal or other thin sheet material of substantial rigidity such as some plastics. Said bearing balls are each located in a respective hole in said cage and are retained therein by multiple retaining tabs, indicated as 559. Said cage has a plunger clearance hole 560 therein through which said sliding friction damper extends from said mass element to said sensor base. The radius of said plunger clearance hole is made slightly greater than one half of the maximum radial displacement amplitude of said mass element relative to said sensor frame. Said cage also comprises rigid extension arms 561, 562, and 563 which have swivel joints 564, 565, and 566 at the ends thereof, respectively. Cylindrical hole 554 is located substantially concentric with the vertical center line through the center of mass of said mass element. Located within said hole 554 and forming said sliding friction damper are plunger 555 and compression spring 556. Said compression spring 556 is preloaded and forces said plunger against said sensor base. Advantageously, said plunger is preferably made of a material which resists corrosion and other forms of material degradation over a long time span. Said plunger 555 is preferably made of a plastic such as TFE, TFE reinforced with fiberglass, etc. Press collar 553 retains said plunger in said mass element. Fastener 578 rigidly connects said conical cam 549, cylindrical stand-off 552, and said mass element together. Said conical cam is a relatively thin conical shell of shallow angle or gradient which is oriented with respect to said mass element such that the axis of said conical cam is substantially vertical and the concave side of said conical cam preferably points upward as shown. The base diameter of said conical cam is made slightly larger than the maximum peak to peak amplitude of said mass element relative to said sensor frame. Said conical cam has three relatively small attachment eyes 579 which preferably have been formed into said conical cam. Said attachment eyes are equidistant from the apex of said conical cam and angularly are equally spaced (120 degrees) with respect to each other. Three frame pins, indicated as 573, are mounted in said sensor frame. Said spring network is comprised of three substantially identical extension springs 567, 568, and 569 which are connected between said attachment eyes of said conical cam and said frame pins such that said extension springs are equally spaced by substantially 120 degrees and are substantially equally pretensioned. Additionally, said extension springs are given a relatively shallow vertical elevation angle Z as indicated in FIG. 35. Said swivel joints 564, 565, and 566 of said cage connect to the middle coil of said extension springs 567, 568, and 569 respectively thereby forming said bearing alignment preserver. Note that each said swivel joint simply comprises a substantially closed rigid loop on the end of each said extension arm which fits rather loosely around the spring wire of each said middle coil thereby allowing a limited rotational degree of freedom between said cage and said extension springs. Said mass element and said two degree of freedom bearing are vertically located between said sensor base and horizontal limit stop 572. Said stand-off 552 is vertically located at substantially the same elevation as said horizontal limit stop. Said conical cam is vertically located between said horizontal limit stop and sensor top 571 of said sensor frame 543 as shown. Said horizontal limit stop has a centrally located hole 598 the diameter of which determines the maximum peak to peak amplitude of said mass element relative to said sensor frame. The vertical separation between said conical cam and said sensor top and the vertical separation between said mass element and said horizontal limit stop determines the maximum vertical displacement of said mass element. When said seismic vibration sensor is not subject to vibratory motion, said spring network establishes an equilibrium position for said mass element and said conical cam. Said tracking probe or follower 550 is located directly above the equilibrium position of the apex of said conical cam and follower tip 575 makes surface contact with the concave surface of said conical cam. Said follower tip is preferably made of a material providing a low coefficient of friction such as TFE or TFE reinforced with fiberglass. Said follower passes through clearance hole 574 of said sensor top 571, has a threaded shank, and is connected to trigger lever 580 by nuts 576 and lock washers 577. Said threaded shank of said follower and said nuts advantageously enable the adjustment of the distance between the hold and release positions (the trigger throw) of said trigger.

Said trigger comprises said trigger lever 580 which is rotatably mounted to said sensor frame by frame bracket 582 and pivot shaft 583. The location of said pivot shaft is selected to be horizontally set off from said follower a sufficient distance so that horizontal displacements of said cam will result in displacements of said follower tip which approximate a straight line vertical displacement. Therefore, horizontal radial deflections of a given magnitude of said mass element and said transducer cam from the equilibrium position are transduced into a trigger throw which is substantially independent of the direction of the radial deflection thereof. Said trigger is preferably mounted to the top of said sensor frame, as shown, as said top mounting does not increase the lateral dimensions of said seismic valve. Said trigger lever is separated from said frame bracket 582 by spacer washers 586 which are preferably made of a material having a low coefficient of friction such as TFE. Said pivot shaft is retained in said frame bracket by retaining rings 585. Said trigger lever has a surface contact arm 584 and mounting stud 587, both of which are rigidly connected to said trigger lever. Trigger bearing 588 is a miniature ball bearing although it could alternately be a plain roller or even a simple sliding surface as the load on the trigger is low, on the order of a few ounces of force for example. The inner race of said trigger bearing is rotatably mounted to said mounting stud in order to provide rotational redundancy. Retaining ring 589 retains said trigger bearing on said mounting stud. A light torsion spring 581 torques said trigger lever in the clockwise direction as seen from FIG. 30 and lightly forces said follower tip against said conical cam. Said trigger bearing, said low coefficient of friction follower tip, and said rotatable mounting of said trigger lever by said pivot shaft all serve to minimize the frictional effects produced by the various forces and reactions which act on said trigger lever.

Said manual control or trip actuator comprises a twist knob 590 which is fastened to shaft 591. Said shaft 591 is rotatably mounted in sleeve 593 which in turn is fastened to frame bracket 594. The end of said shaft 591 is formed to produce an arm 592 substantially as shown. The end of said arm 592 is located slightly below said surface contact arm 584. A pin 596 rigidly connects to said shaft 591. Torsion spring 595 torques said shaft 591 so that said arm 592 presses against said sensor top. When said twist knob and said shaft 591 are rotated counterclockwise thereby causing said arm 592 to raise off of said sensor top and lift said trigger lever, the maximum counterclockwise rotation is determined by the contact of said pin 596 with the shoulder stop 597 in said sleeve 593.

Said seismic vibration sensor and transducer and said manual control both connect to said trigger through said OR logic means. Said OR logic means is implemented by the surface contact of said follower with said conical cam and by the surface contact of said arm 592 with said contact arm 584.

It will be apparent that in order to enhance the reliability and life of said seismic vibration sensor and transducer, particularly when located in outdoor locations, and reduce the need for maintenance thereon, that the various said springs and those elements mentioned above which have surfaces engaged in sliding, rotating, or rolling type motion, such as said bearing balls, said cage, said sensor base, said conical cam, etc., are preferably made of corrosion resisting materials such as stainless steel or aluminum or are corrosion protected as by plating or anodizing, etc.

Said sensor frame 543 and frame 601 of said universal trip valve operator are rigidly fastened to baseplate 600. Bracket 602 is fastened to said baseplate and said frame 601 by bolts 603 and is fastened to the body of said quarter turn ball valve by bolts 604. Shaft 605 is rotatably mounted in said frame 601 and couples to the valve stem of said quarter turn ball valve through coupling 538. The details of said coupling are the same as those described in the first and second embodiments.

Said spring return actuator couples to said shaft 605 and torques said shaft 605 in the clockwise direction as seen from FIG. 31. Said spring return actuator is similar to the spring return actuator described in the first and second embodiments and is of the type disclosed in my U.S. Pat. No. 4,869,459. Said spring return actuator comprises nested torsion spring actuator 606 which connects to bias transmitting and transforming device 607 which thence couples to said shaft 605. A second nested torsion spring actuator 608 also couples to said shaft 605. Said bias transmitting and transforming device comprises eccentric spool 609, multiple leg cable 610 and arm 611, the details of which are the same as those described in the first embodiment.

Said three stage leverage device is similar to the three stage leverage device described in the first embodiment. Said three stage leverage device demonstates some alternate details of construction with respect to the first and second embodiments. It will be noted that the multi-stage leverage devices of the first, second, and third embodiments are also well suited to use in said seismic valve.

Within said two stage leverage mechanism, first stage lever 612 is coupled to said shaft 605 by a double dee shaft and hole feature. A second stage lever 613 rotatably connects to said first stage lever through pivot pin 614. Said second stage lever has contact pad 621 and first reset arm 622 at its end. Said second stage lever operates above said first stage lever in an adjacent parallel plane. Pivot pin 615 is rigidly connected to said second stage lever. Said pivot pin 615 extends into an adjacent parallel plane above said second stage lever and extends through clearance slot 616 in the end of said first stage lever and into an adjacent parallel plane below said first stage lever. Said clearance slot and clearance radius 625 enables said pivot pin 615 to operate through the plane of operation of said first stage lever without interfering with said first stage lever. Pivot pins 619 and 620 are fastened to said frame 601 and define a common rotation axis. Connecting link 617 is rotatably connected at one end to said pivot pin 615 and is rotatably connected at the opposite end to said pivot pin 619. Connecting link 618 is rotatably connected at one end to said pivot pin 615 and is rotatably connected at the opposite end to said pivot pin 620. It will be noted that the combination of said first stage lever, said second stage lever, said connecting links, and said frame 601 forms a four bar mechanism. Stop 623 is rigidly connected to said frame 601 and has a stop set screw 624 threaded therein. Said stop makes contact with said first stage lever to determine the returned position (shown in dashed lines). Said stop set screw makes contact with said first stage lever to determine the maximum counterclockwise rotation of said first stage lever, as seen from FIG. 31, which is slightly beyond the reset position.

Said third stage leveraging release lever is comprised of an arm mounting element 626 which is rotatably mounted to said frame 601, short arm radial land 627, long arm 628, and second reset arm 629. Said second reset arm comprises a curved land or concave cylindrical surface in said arm mounting element, the end portion of which is oriented to be approximately at a 45 degree relationship to said short arm radial land, substantially as shown. At the reset position, said contact pad 621 of said second stage lever contacts said short arm 627. Said long arm has a land 632 at its end for engaging said trigger bearing and has a ramp 633 at its end for deflecting said trigger bearing during reset actuation. Said land 632 is preferably curved, as shown, so that during actuation of said trigger substantially no deflection of said third stage long arm occurs until said trigger bearing starts to clear the edge of said land 632 and there are substantially no force components of the trigger load force in the direction of the trigger throw either tending to hold or release said trigger. According to my analysis, the radius of curvature of said land 632 would be approximately equal to the radial distance from said pivot shaft 583 of said trigger lever to said land 632 and indicated as dimension Rt in FIG. 31. In the particular configuration shown in FIG. 31 said land 632 should, strictly speaking, be a section of a conical surface. However, the difference between an approximating cylindrical surface and said conical surface is negligible and therefore said land 632 can advantageously be a cylindrical surface which is easier to manufacture. It will be noted that the shorter the radial distance of said trigger bearing from said pivot shaft 583 in comparison to the trigger throw, the more desirable it is that said land 632 be curved as described above. Conversely, it will be noted, when the radial distance of said trigger bearing from said pivot shaft 583 is large in comparison to said trigger throw then, alternatively, said land 632 can be flat without unduly affecting the performance of said trigger. At the reset position, said long arm contacts and is held by said trigger bearing. Torsion spring 630 mounts around a lower mandrel portion of said arm mounting element and is connected between said frame 601 and said long arm 628 so as to lightly torque said third stage leveraging release lever in the counterclockwise direction as seen from FIG. 31. Stop 631 is rigidly mounted to said frame 601. After triggering, said torsion spring 630 holds said long arm 628 against said stop 631 to define the returned position of said third stage leveraging release lever.

FUNCTIONS AND OPERATION

Concerning the nature of seismic ground motion and the response of linear dynamic systems thereto, the strong earthquake ground motions which have been recorded to date in California and other parts of the western United States all tend to have similarly shaped response spectra. A response spectra is the maximum response as a function of natural frequency and for various percentages of critical damping of a single degree of freedom mathematically linear dynamic system (e.g. a linear spring —mass system) to recorded strong seismic ground motion. Response spectra are generally presented as tripartite log—log plots. The frequencies present in these earthquake ground motions typically range from about 10 hz. to 0.2 hz. Accelerations are highest in the 10 hz. to 1.5 hz. portion of the spectra. Lightly damped dynamic systems experience amplified resonant responses. For various stations and components of the following earthquakes (1933 Long Beach, 1934 Lower California, 1941 Imperial Valley, 1966 Parkfield, and 1971 San Fernando) I calculate average amplification factors of about 3.4, 2.5, 1.9, and 1.4 (all with a standard deviation of about 15%) for 2%, 5%, 10%, and 20% of critical damping, respectively and at a natural frequency of 2.5 hz. Amplification factors given by the consolidated response spectra for lightly damped systems with resonant frequencies between 1.5 and 10 hz. are about 4.3, 2.6, 1.5, and 1.2 for 2%, 5%, 10%, and 20% of critical damping, respectively. Strong ground motion is generally measured along three coordinate axes, in particular two horizontal axes which are perpendicular and a vertical axis. The data taken along said coordinate axes are referred to as horizontal and vertical components, respectively. Response spectra for various components of various earthquakes occuring over roughly the past fifty years are published in such sources as California Institute of Technology Earthquake Engineering Laboratory, Analysis of Strong Motion Earthquake Accelerograms, Vol. III-Response Spectra. Further information on the consolidated response spectra and amplification factors can be found in M. Paz, Structural Dynamics Theory and Computation, Van Nostrand Rheinhold, 1980 pp. 143-145.

Said seismic vibration sensor functions and operates as follows.

Said mass element and said spring network form a two degree of freedom spring-mass system which is used as a resonator by selecting the resonant frequency of said mass element and spring network to fall within the spectrum of typical earthquake ground motion. According to my analysis, the differential equations of motion which describe the motion of said mass element and said spring network over said horizontal sensor base and with respect to a horizontal x, y coordinate system, are:

$$M_a + 1.5(K+P/L)x = 0$$

$$M_a + 1.5(K+P/L)y = 0$$

where,
- x-relative displacement response of said mass element with respect to said sensor base, x direction;
- $_a$-absolute acceleration response of said mass element, x direction;
- y-relative displacement response of said mass element with respect to said sensor base, y direction;
- $_a$-absolute acceleration response of said mass element, y direction;
- M-mass of said mass element;
- K-individual spring rate of said extension springs;
- P-individual preload force in said extension springs at the equilbrium position;
- L-distance between the spring rotation points (i.e. said frame pins 573 and said attachment eyes 579) at the equilbrium position which will generally be the individual length of said extension springs at the equilibrium position unless extensions (e.g. links, cable) are added to either end of said extension springs to make L longer than the length of said extension springs.

Note that:

$$x = x_a - x_g$$

$$y = y_a - y_g$$

where,
- $x_a$, $y_a$-absolute displacement responses of said mass element, x and y directions respectively;
- $x_g$, $y_g$-displacements of said sensor base, x and y directions respectively.

(The restoring force indicated in the above differential equations is a linear approximation. Actual deviations from linear behavior, however, are small. The exact restoring force, $F_x$, in the x direction (the x axis lines up with one of said extension springs as indicated in FIG. 36) is:

$$F_x = -Kx - (2K\Delta L)\sin(30° + \Delta\theta) - (2P)\sin(30° + \Delta\theta) + P$$

where, $$\Delta L = \sqrt{L^2 + x^2 + xL} - L$$

$$\sin(30° + \Delta\theta) = (x + L/2)/(\sqrt{L^2 + x^2 + xL}).$$

According to my computations, with said extension springs being given a preload of about one half of the maximum force rating of said extension springs, deflections in the +x direction equal to 60% of L results in a hardening in the spring rate of about 3% over the linear approximation while 0.6 L deflections in the −x direction results in a softening in the spring rate of about 6%. For the purposes of sensing strong seismic ground motion, deviations from linearity of this magnitude result in negligible effects on the resonant frequency. It will be further noted that alternate equal hardening and softening in the spring rate will leave the average spring rate unchanged. Thus, the above noted 3% hardening and 6% softening tend partially to cancel each other in so far as affecting the spring rate and therefore the resonant frequency. By plotting the terms in the above equation, it will be seen that the second restoring force term $(2K\Delta L)\sin(30° + \Delta\theta)$ contains a nonlinearity which tends to harden the spring rate for +x deflections and soften the spring rate for −x deflections. The third restoring force term $(2P)\sin(30° + \Delta\theta) + P$ contains a nonlinearity which tends to soften the spring rate for +x deflections and harden the spring rate for −x deflections and thus tends to cancel the nonlinearity of the second restoring force term. Hence, it can be seen that the use of tensile preload provides the benefit of improving the linearity of the spring rate, at least in a spring network comprising three equally spaced extension springs. The exact restoring force in the y direction, $F_y$, is:

$$F_y = -(P+K\Delta L_1)\sin\Delta\theta_1 + (P+K\Delta L_2)\sin(60° - \Delta\theta_2) - (P+K\Delta L_3)\sin(60° + \Delta\theta_3)$$

where:

$$\Delta L_1 = l_1 - L$$
$$\Delta L_2 = l_2 - L$$
$$\Delta L_3 = l_3 - L$$

$$l_1 = \sqrt{L^2 + y^2}$$

$$l_2 = \sqrt{L^2 + y^2 - \sqrt{3}\, yL}$$

$$l_3 = \sqrt{L^2 + y^2 + \sqrt{3}\, yL}$$

$$\sin\Delta\theta_1 = y/l_1$$

$$\sin(60° - \Delta\theta_2) = [(\sqrt{3}/2)L - y]/l_2$$

$$\sin(60° - \Delta\theta_3) = [(\sqrt{3}/2)L + y]/l_3$$

According to my computations, with said extension springs being given a preload of about one half of the maximum force rating of said extension springs, deflections in the $\pm y$ direction equal to 60% of L results in a softening in the spring rate of about 4% under the linear approximation. Again, for the purposes of sensing strong seismic ground motion, deviations from linearity of this magnitude produce negligible effects on the resonant frequency. Testing, using simple harmonic motion type forcing, on prototypes of said seismic vibration sensor have shown no 'drop jump' effects in the response near resonance for responses which reach at least 45% of L. Such 'drop jump' effects are characteristic of appreciable nonlinearity in the spring rate.)

It will be noted that the above simultaneous linear differential equations are uncoupled, thus motion along one coordinate axis is independent of any motion along the other coordinate axis which directly leads to the direction independent or omnidirectional properties of said mass element and said spring network. Essentially, said spring network produces an omnidirectional restoring force of substantially equal spring rate in any horizontal direction from said equilibrium position. The radial spring rate of said spring network, $K_r$, is:

$$K_r = 3/2(K+P/L)$$

Therefore, for radial deflections from the equilibrium position in any particular direction, said seismic vibration sensor can be regarded as a single degree of freedom spring-mass system. According to my analysis, from consideration of either of the above differential equations, the natural frequency $w_o$ of said mass element and said spring network along the x-axis, the y-axis, or any direction therebetween is:

$$w_o = \sqrt{(1.5(K + P/L)/M)} = \sqrt{K_r/M}$$

As the percentage of critical damping inherent in said spring-mass system is low, then the resonant frequency $w_r$ will be approximately equal to the natural frequency.

As the dynamic behavior of said mass element and said spring network is linear in terms of the above differential equations which describe the motion thereof and can be considered as a single degree of freedom system, the response of said spring-mass system to horizontal seismic ground motion can be predicted from the published response spectra.

When said seismic vibration sensor, without said sliding friction damper, is subjected to simple harmonic motion at the natural frequency thereof, then the response amplitude can be calculated from the following amplitude relationship.

$$X = A_H X_g$$

$$A_H = 1/(2\zeta)$$

where,
  X-the amplitude of the relative displacement response, x;
  $X_g$-the amplitude of the displacement of said sensor base, $x_g$;
  $A_H$-simple harmonic motion amplification factor when the forcing frequency, $w_f$, equals the natural frequency, $w_o$;
  $\zeta$-fraction of critical damping.

Although the above amplitude relationship and those that follow are for the x coordinate, as said seismic vibration sensor is omnidirectional then it will be apparent that similar amplitude relationships can be written for motion along the y axis or more generally for radial motion from the equilibrium position. In FIG. 41, the response of said seismic vibration sensor (without said sliding friction damper) to resonant harmonic forcing is indicated by line I.

When said seismic vibration sensor with said sliding friction damper is subjected to simple harmonic motion at the natural frequency thereof, then according to my analysis the response amplitude can be found by equating the energy dissipated over one cycle by the sliding friction type damping, $4F_fX$, and those forms of damping which dissipate energy as X squared (hereinafter termed viscous like or linear type damping), $\pi(2\zeta_l)K_rX^2$, to an equivalent viscous type energy dissipation process, $\pi(2\zeta_e)K_rX^2$, and deriving an equivalent viscous type fraction of critical damping that represents the same amount of energy dissipated over one cycle by the sliding friction and various linear types of damping.

$$\pi(2\zeta_e)K_rX^2 = 4F_fX + \pi(2\zeta_l)K_rX^2, \quad w_f = w_o$$

where,
  $\zeta_e$-equivalent fraction of critical damping
  $F_f$-sliding friction force, $F_f = uN$, u-coefficient of friction, N-normal force
  $\zeta_l$-fraction of critical damping due to the various linear type damping processes The linear type damping is attributable to:
  (1) the structural type hysteresis damping inherent in the flexing of said spring network. According to my measurements with said mass element supported by a very long suspension wire rather than said ball bearing, this structural type hysteresis damping typically amounts to about 0.3% of critical damping.

(2) the rolling action of said two degree of freedom bearing against the slightly rough cold finished mill surface of said mass element and the lightly sanded surface of said sensor base. According to my measurements and based on the slope of the response curve, this rolling type linear damping plus the previously noted structural hysteresis damping typically amounts to about 1% to 1.5% of critical damping. I expect that this rolling type linear damping can be reduced by more finely finishing the rolling contact surfaces of said mass element and said sensor base.

(3) a linear sliding damping action (probably minor wearing and abrasion) of said sliding friction damper against said sensor base, particularly when said plunger is made of a relatively soft plastic. After testing, I have noted that minute amounts of debris (seen best with the aid of some magnification but is visible to the unaided eye) on and embedded in said sensor base indicating the trace of said plunger on said sensor base. With said plunger made of TFE and said sensor base made of stainless steel with a commercial brushed finish, according to my measurements and based on the slope of the response curve, this type of linear damping plus the previously noted structural type hysteresis damping and rolling type linear damping can amount to about 3% to 4% of critical damping. As with wearing and abrasion type processes, I expect that this linear sliding damping action is influenced by such parameters as the normal force of said plunger against said sensor base, the surface finish of said sensor base, the relative hardness of said sensor base with respect to said plunger, and the contact area of said plunger against said sensor base. (According to my testing using simple harmonic motion, this linear sliding damping action is influenced by the normal force on said plunger. For $M=1.6$ kg, $K_r=2.18$ lb/in, said plunger made of TFE, and said sensor base being stainless steel sheet with a commercial brushed finish, when I increased N from approximately 0.8 lb to 1.6 lb thereby doubling the ratio $F_f/K_r$, the slope of the response curve decreased from about $15\frac{1}{2}$ to about 13. The corresponding fraction of critical damping therefore increased from about 3.2% to about 3.8%.)

From the above energy dissipation equation, it can be seen that:

$$2\zeta_e = 4F_f/\pi K_r X + 2\zeta_l$$

When said seismic vibration sensor is forced at its natural frequency then, $$X = A_{He} X_g$$

where,
$A_{He} = 1/(2\zeta_e)$ $A_{He}$-equivalent damping amplification factor for simple harmonic motion
and, hence by substitution, $$X = A_{Hl}(X_g - (4F_f/\pi K_r))$$

where,
$A_{Hl} = 1/(2\zeta_l)$ $A_{Hl}$-linear damping amplification factor for simple harmonic motion and frequency ratio, $r = w_f/w_o = 1$.

In FIG. 41, the response of said seismic vibration sensor with said sliding friction damper to being forced with simple harmonic motion at the natural frequency thereof is indicated by line II. It can be seen that the effect of the sliding friction damping, in which energy dissipation increases linearly with X, is to shift the response curve over by $4F_f/\pi K_r$. Such a shift makes said seismic vibration sensor insensitive to forcing displacements less than $4F_f/\pi K_r$. Actually, some slight response motion begins at $X_g = F_f/K_r$ as this corresponds to $g = F_f/M$ (i.e. the acceleration amplitude of said sensor base necessary to equal to the frictional force of said sliding friction damper). It will be noted that the effect of the various linear forms of damping, in which the energy dissipated increases quadratically with X, is to determine the slope or amplification factor of response line II.

When said seismic vibration sensor, without said sliding friction damper, is subjected to seismic ground motion, then the maximum displacement response amplitude can be calculated from the following amplitude relationship.

$$X_{max} = A_s X_{gmax}$$

where,
$X_{max}$-maximum relative displacement response amplitude between said mass element and said sensor base, x direction;
$X_{gmax}$-maximum displacement amplitude of said sensor base (i.e. maximum ground displacement) at the natural frequency of said seismic vibration sensor, x direction;
$A_s$-seismic motion amplification factor In FIG. 42, the response of said seismic vibration sensor, without said sliding friction damper and for a particular fraction of critical damping and amplification factor, to seismic ground motion is indicated by line III.

When said seismic vibration sensor with said sliding friction damper is subjected to seismic ground motion, the maximum response as a function of maximum ground motion can be found by calculating the viscous equivalent fraction of critical damping for several responses, finding the corresponding amplification factor by interpolation, and then calculating the ground motion. In FIG. 42, line IV approximates the results of such a series of calculations using either set of the aforementioned amplification factors.

Alternatively, for the purpose of calculating an approximate response of said seismic vibration sensor with said sliding friction damper to seismic motion, a curve can be fitted to the aforementioned seismic amplification factors (3.4, 2.5, 1.9, and 1.4 for 2%, 5%, 10%, and 20% respectively). For a fraction of critical damping ranging from 5% to 20%, $$A_S = 1/(2.1\zeta + 0.295)$$

gives a good fit. An approximate maximum displacement response can be found by substituting the equivalent fraction of critical damping from above into the above amplitude relationship for seismic ground motion. According to my analysis and from above, $$X_{max} = A_{se} X_{gmax}$$

-continued $A_{Se} = 1/(2.1 \phi_e + .295)$ $2 \phi_e = 4F_f/\pi K_r X + 2\phi_l$.

$A_{Se}$ — equivalent damping amplification factor for seismic motion substituting yields, $X_{max} = A_{Sl}(X_{gmax} - 1.05(4F_f/\pi K_r))$ where, $A_{Sl} = 1/(2.1 \phi_l + .295)$ $A_{Sl}$ — linear damping amplification factor for seismic motion.

In FIG. 42, this approximate response of said seismic vibration sensor with said sliding friction damper to seismic motion is indicated by line IV. It can be seen that the effect of the of the sliding friction damping is to shift the response curve over by $1.05(4F_f/\pi K_r)$. Such a shift in response makes said seismic vibration sensor insensitive to forcing displacements less than $1.05(4F_f/\pi K_r))$. Actually, some interrupted type response motion will begin at $X_{gmax}=F_f/K_r$ as this corresponds to $g_{max}=F_f/M$ (i.e. the acceleration amplitude of said sensor base necessary to equal to the frictional force of said sliding friction damper). It will be noted that the sliding friction type damping results in approximately the same amount of shift in the response curve for either simple harmonic forcing at the natural frequency or seismic motion.

A frequency setpoint, $S_F$, can be defined for said seismic vibration sensor as the natural frequency in cycles per second or hz. of said seismic vibration sensor. $S_F$ is set through the design parameters K, P, and L in said spring network and the mass of said mass element, M.

$S_F = w_o/2\pi$

A response switching setpoint, $S_{SD}$, in terms of maximum ground displacement at the frequency setpoint can be defined for said seismic vibration sensor. $S_{SD}$ is set through the normal force, N, developed in said sliding friction damper by said compression spring 556 or perhaps through a choice of coefficient of friction, u.

$S_{SD} = 1.05(4/\pi)F_f/K_r$

A response switching setpoint in terms of maximum ground acceleration is:

$S_{SA} = 1.05(4/\pi)F_f/M$.

As, $X_{gmax} = w_o^2 X_{gmax}$;

then, $S_{SA} = w_o^2 S_{SD}$.

(It will be noted in relation to said two degree of freedom ball bearing, if said spring network causes said cage to press against said bearing balls, then said bearing will constitute a second source of sliding friction damping which would cause further shifting of the response and could have an appreciable affect on said response switching setpoint which would have to be taken into account in the calculation thereof. Preferably though, said bearing is made and aligned with a sufficient degree of accuracy so that any such pressing and resulting sliding friction is at most of a minor nature. It is to be noted, however, that said cage and bearing balls could be used as an alternative or additional means for providing sliding friction type damping.)

A response triggering setpoint, $S_R$, is the maximum displacement response of said mass element needed to just cause triggering. $S_R$ is set by the adjustment formed by the threaded shank of said follower 550 which determines the trigger throw (distance from the hold position of said trigger bearing when said seismic vibration sensor is at the equilibrium position to the point where said trigger bearing just releases said third stage lever) and is also determined by the gradient of said conical transducer cam and any leverage present in said trigger lever.

A maximum ground displacement triggering setpoint, $S_{GD}$, and a maximum ground acceleration triggering setpoint, $S_{GA}$, can be defined for said seismic vibration sensor and are derived from the above described setpoints.

$S_{GD} = (1/A_{Sl})S_R + S_{SD}$ $S_{GA} = w_o^2 S_{GD}$

Advantageously, $S_R$ is set large enough and $S_{SD}$ small enough so that $S_R > S_{GD}$, in which case the response of said mass element with respect to said sensor base is amplified with respect to the ground motion. Line V in FIG. 42 indicates those maximum displacement responses which equal the maximum ground displacement (i.e. $S_R = S_{GD}$). The region above line V represents those maximum displacement responses which are greater than or amplified with respect to the maximum ground displacement. The region below line V represents those maximum displacement responses which are less than or de-amplified with respect to the maximum ground displacement.

Said frequency setpoint, $S_F$, is set to a value which falls within the band of ground motion frequencies typically produced by earthquakes which makes said seismic vibration sensor particularly sensitive to those vibrational frequencies at and near said frequency setpoint but, advantageously, relatively insensitive to those vibrations substantially differing from said frequency setpoint. Said frequency setpoint could, for example, be set to 2.5 hz. (the previously noted standards call for qualification testing at this frequency) or could be set to other frequencies within the typical seismic motion spectrum.

Said ground motion amplitude setpoints $S_{GD}$ and $S_{GA}$, can be set to values where the onset of significant damage (to buildings or pipelines for example) is expected to start due to the horizontal amplitude of the seismic ground motion. $S_{GA}$ is set as a consequence of setting $S_F$ and $S_{GD}$. $S_{GD}$ is set as a consequence of setting $S_{SD}$ (i.e. through the amount of sliding friction) and setting $S_R$ (i.e. through the trigger throw adjustment formed by the threaded shank of said follower and said nuts). Said trigger throw adjustment enables adjustment of the trigger throw distance required for said trigger bearing to clear said third stage long arm land and thus cause triggering. It will be noted that the threaded shank of said follower provides fine adjustment means for setting said displacement response amplitude setpoint, $S_R$. It will be further noted that the frictional force produced by said sliding friction damper has the advantage of making said seismic vibration sensor insensitive to those seismic vibrations having a frequency at or near said frequency setpoint $S_F$ and having a displacement amplitude less than said displacement response switching setpoint, $S_{SD}$.

If, for example and according to my calculations, said maximum ground motion acceleration setpoint, $S_{GA}$, was to be set to 0.20 g. and for $S_F=2.5$ hz., then $S_{GD}=0.31$ in. If the trigger throw distance was set to, for example 0.21 in. (using the threaded shank of said follower) and given that said transducer cam has a gradient of say 15 degrees and said trigger lever re-amplifies the motion of said follower into the motion of said trigger bearing by, say, a factor of 1.33 (evident from FIG. 31), then $S_R=0.58$ in. Setting $S_{SD}=0.10$ in. at $S_F=2.5$ hz. (corresponds to $S_{SA}=0.064$ g.), and taking $\zeta_l=3.5\%$, then I calculate that $S_{GD}=0.31$ in. It is to be noted that the above setpoint values are only an example and that many other settings for said setpoints are possible.

Said seismic vibration sensor also has a vertical amplitude setpoint. Said vertical amplitude setpoint is determined by the weight of said mass element minus the sum of the vertical force developed in said sliding friction damper due to said compression spring 556 and the vertical force component developed in said spring network due to the preload forces therein and said vertical elevation angle Z. Said vertical amplitude setpoint is set to a value where the onset of significant damage (to buildings or pipelines for example) is expected to start, due to the vertical amplitude of the seismic ground motion. As the force developed by said compression spring 556 forms one of the parameters for setting the frictional forces to be developed by said sliding friction damper in order to set said response switching setpoint, then in relation to said vertical amplitude setpoint it is preferable to regard the force developed by said compression spring 556 as predetermined and to set said vertical amplitude setpoint by setting said vertical elevation angle of said spring network.

The above described characteristics of said seismic vibration sensor produce the following results.

When said seismic vibration sensor is subjected to any horizontally directed vibration, those frequency components thereof which are of substantially higher or lower frequency than said frequency setpoint are not amplified and therefore will not be the cause of triggering.

When said seismic vibration sensor is subjected to horizontal seismic ground motion which is below said response switching acceleration setpoint, said mass element produces no response with respect to said sensor frame and therefore produces no movement of said trigger.

When said seismic vibration sensor is subjected to horizontal ground motion which is above said response switching acceleration setpoint then the response of said mass element increases in proportion to the linear amplification factor and the ground amplitude in excess of the response switching setpoint.

When said seismic vibration sensor is subjected to strong seismic ground motion from any horizontal direction having an amplitude (at the setpoint frequency) which is near said maximum ground displacement or acceleration triggering setpoint, then said seismic vibration sensor behaves in, essentially, a lightly damped manner and said mass element produces a resonantly amplified horizontal response. Said transducer cam, being rigidly connected to said mass element also deflects horizontally with said mass element thereby causing a substantially vertical deflection of said follower and consequent deflection of said trigger lever and said trigger bearing, as shown in FIG. 39. When the ground motion amplitude exceeds said maximum ground displacement or acceleration triggering setpoint then said mass element and said transducer cam reach a horizontal deflection sufficient to cause said trigger bearing to substantially clear said third stage long arm land 632 and triggering occurs. Said third stage leveraging release lever then releases said two stage leverage mechanism and said spring return actuator actuates said quarter turn ball valve to the returned position in the same manner as described in the first and second embodiments.

It will be noted that while the torque actuation requirements of said ball valve and the torque output of said spring return actuator are high, said three stage leverage device reduces the high torque output of said spring return actuator down to a rather small trigger load (on the order of a few ounces for example). Said trigger bearing, due to the friction reducing properties thereof, helps to further minimize the trigger actuation force requirement (the force required from said seismic sensor and transducer to actuate said trigger). As said trigger bearing and said pivot shaft 583 minimize the frictional resistance of said trigger lever and said light torsion spring 595 is sized only to amply overcome said frictional resistance in order that said follower tracks said transducer cam as it deflects, therefore said trigger actuation force requirement is small and can be provided by a seismic vibration sensor of relatively small mass and generally light construction which advantageously enables said seismic vibration sensor to be compact and of low cost. It will be noted however, that the vertical force on said follower produced by said light torsion spring 595 generates a second restoring force on said seismic vibration sensor due to the gradient of said transducer cam and generates a second damping force on said seismic vibration sensor due to the forced sliding contact between said tip 575 and said transducer cam. If said second restoring force and said second damping force are appreciable fractions of the restoring force produced by said spring network and the damping force produced by said sliding friction damper, then the affect thereof on said setpoints will need to be taken into account. Preferably though, said seismic vibration sensor is made sufficiently large so that said second restoring force and said second damping force are negligible in relation to the restoring force provided by said spring network and the frictional damping force provided by said sliding friction damper and therefore have substantially no affect on said setpoints.

When said seismic vibration sensor is subjected to strong seismic vertical ground motion above said vertical amplitude setpoint, then said mass element lifts off said two degree of freedom bearing and deflects said follower (see FIG. 40) thereby causing triggering of said seismic valve.

The manual rotation of said twist knob of said manual control raises said trigger lever and results in triggering. Said manual control comprises the means for manually causing the actuation of said seismic valve to the returned position.

Within said seismic vibration sensor, said two degree of freedom bearing 545 provides omnidirectional friction reducing means, which in and of itself, enables said mass element to move substantially without sliding friction in any horizontal direction with respect to said sensor base. It will be noted that without some sort of friction reducing means, the consequent sliding friction of mass element against said sensor base would interfere with the measurement of ground motion in the range of accelerations at which triggering is desired (e.g. 0.08 g to 0.3 g). Said two degree of freedom bearing, therefore, enables a precise and predictable response motion of said seismic vibration sensor when subjected to strong seismic ground motion.

In response to strong ground motion, the relative displacement of said two degree of freedom bearing with respect to said sensor base is one half the relative displacement of said mass element with respect to said sensor base. Said bearing could be thought of as a two degree of freedom, displacement divide by two device. The base or lower surface of said mass element is made sufficiently broad so as to accomodate the maximum relative displacement of each bearing ball of said two degree of freedom bearing with respect to said mass element. The radius of said cage clearance hole in said two degree of freedom bearing is made one half the maximum radial displacement of the mass element plus an allowance for the radius of said plunger 555.

The alignment of said two degree of freedom bearing is preserved with respect to said mass element at all times by connecting said swivel joints of said extension arms to the center coils of said extension springs of said spring network. The center coil of each said extension spring functions as a two degree of freedom displacement divide by two device. Thus said center coils and said two degree of freedom bearing undergo the same displacements relative to either said mass element or said sensor frame. Said swivel joints allow for the limited side to side rotation of said extension springs during displacement of said mass element. Said extension springs, therefore, take on the added function (in addition to implementing the horizontal omnidirectional restoring force for said mass element to provide a resonant response, and also providing a vertical amplitude setpoint) of preserving the alignment of said two degree of freedom bearing with respect to said mass element. It will be noted that said two degree of freedom bearing, unless provided with alignment preserving means, would quickly loose its alignment with respect to said mass element during shipping, handling, installation, and most likely after just a few vibrations. It will be further noted that other two degree of freedom displacement divide by two devices could be provided to preserve the alignment of said two degree of freedom bearing, such as various two degree of freedom linkages. However, the use of said extension springs to keep said two degree of freedom bearing aligned is particularly advantageous because essentially no extra parts are required and it is compact.

That said seismic vibration sensor can provide a resonantly amplified response has several advantages. First, for the range of ground motion triggering setpoints of interest (e.g. 0.08 g. to 0.3 g. at 2.5 hz. which corresponds to displacement amplitudes of 0.12 in. to 0.48 in.) and without resorting to precision construction of said transducer and said trigger, a larger amplified output is more precisely measured, on a percentage basis, than a smaller unamplified output and hence more precise triggering is obtained. Second, an amplified output can be used to provide a longer trigger throw which helps to prevent accidental actuation of said trigger by sharp jolts. Third, an amplified output enables the use of higher mechanical advantage or leverage in said trigger lever and said transducer cam to produce a given trigger throw. The higher mechanical advantage, in turn, enables said trigger spring 581 to be stiffer or have higher amounts of pretensioning than otherwise, which helps to prevent accidental actuation of said trigger by sharp jolts, while not interfering with the response of said seismic vibration sensor.

It is to be further noted that as said seismic vibration sensor is used as a resonator, then said seismic vibration sensor does not amplify those accelerations having a frequency content which is substantially different from the natural frequency of said seismic vibration sensor or substantially outside the bandwidth of said seismic vibration sensor which has beneficial effects. First, constant accelerations as caused by said seismic vibration sensor being out of level are not amplified. As the static displacements caused by said seismic vibration sensor being out of level by several degrees are small in comparison to the response amplitude used to produce triggering, said seismic vibration sensor can therefore be installed to a rather wide leveling tolerance which will speed installation and be less costly. Second, vibration occuring at frequencies either substantially higher or lower than the resonant frequency of said seismic vibration sensor will not be amplified. Said seismic vibration sensor, therefore will be immune to high frequency background vibration as might be caused by machinery.

It is to be still further noted that as said seismic vibration sensor is used as a resonator, said seismic vibration sensor will not amplify those accelerations coming in the form of occasional impulses or jolts. Thus said seismic vibration sensor will be immune to small ground jolts as might be caused by truck traffic or nearby construction activity.

Another feature of said seismic vibration sensor is that, as the natural frequency of said seismic vibration sensor is determined by the square root of such parameters as the mass of said mass element and the spring rate of said extension spring, etc., said parameters do not have to be held to particularly tight tolerances in order to accurately determine the natural frequency or frequency setpoint of said seismic vibration sensor.

Still another advantageous feature of said seismic vibration sensor, owing to the exclusive use of a spring based restoring force, is that the horizontally directed restoring force provided by said spring network and hence the natural frequency of said seismic vibration sensor in any horizontal direction will not be interfered with by the vertical component of seismic ground motion.

Said sliding friction damper provides an omnidirectional sliding friction damping force for producing the above described response switching effect. Said plunger is preferably made of TFE, TFE reinforced with fiberglass, PVC, or other such materials which are chemically very stable over a long period of time so that the coefficient of friction between said plunger and said sensor base (which is preferably a corrosion resistant material such as stainless steel, aluminum or a plastic) and the damping force produced therebetween can be expected to remain constant over a long period of time which in turn will enable the various switching and triggering setpoints to remain constant over a long period of time.

Still another advantageous feature of said seismic vibration sensor, it will be noted, is that said sliding friction damper helps to make said seismic vibration sensor insensitive to minor background vibrations and to minor earth tremors which produce little or no damage.

Further advantageously, as the force with which said sliding friction damper presses against said sensor base is spring generated (by said compression spring 556), said sliding friction damping force will not be influenced or interfered with by the vertical component of seismic ground motion.

Within said transducer, said transducer cam uniformly converts horizontal deflections of said mass element from the equilibrium position in any horizontal direction into a trigger throw. Said transducer cam provides the same cam shape and slope in all radial directions extending from the equilibrium position. Thus, horizontal deflections of equal magnitude of said mass element and said transducer cam from the equilibrium position result in substantially equal vertical deflections of said follower and said trigger bearing. Therefore said transducer is omnidirectional. It will be noted that said cam can have shapes other than a simple cone. For example, said transducer cam could comprise a generally conical shape with one or more conical steps therein of higher gradient in order to give said trigger bearing a more rapid final movement to the release position. In general, said transducer cam need only be symmetric about the vertical axis through the equilibrium position and provide a gradient. (Other possible alternatives include having a transducer cam with a radially decreasing slope, as opposed to the increasing slope which is illustrated. Also, it is possible to interchange the relationship of said follower tip and said transducer cam wherein said follower tip mounts to said mass element and said transducer cam is connected to said trigger lever through vertical guiding means, which keep the axis of said transducer cam substantially vertical during the vertical deflection thereof. An example of such vertical guiding means is a vertically oriented shank which is rigidly connected to the apex of said transducer cam and which can reciprocate rectilinearly in a bushing. Said shank then would make a unidirectional surface contact type connection with said trigger lever.

Said transducer also provides mechanical advantage through the shallow gradient of said transducer cam which functions to reduce the force requirements which said seismic vibration sensor needs to provide for actuating against said trigger spring 581. In tests, a gradient of as much as 1:4 or about 14 degrees, as shown, has given good results.

The functions and operation of the trip valve operator portion of said seismic valve are the same as those described in the first and second embodiments and reference should be had thereto.

It will be apparent that a seismic sensitive valve could also be provided by combining said seismic vibration sensor and transducer with the third, fifth, or sixth embodiments according to the invention.

An alternative seismic vibration sensor is shown in FIGS. 43 and 44 which provides means for switching the sliding friction damping force in order to produce a second switch point and jump transition in the response curve thereof (shown in FIG. 45). A raised surface 640 is formed into sensor base 641. Said raised surface is generally in the form of a truncated shallow cone and comprises a circular flat top or land 642 of radius R, that is raised above the general level said sensor base by a height H and a shallow sloping flank surface 643. Said land is centered on the equilibrium position of mass element 644. Compression spring 647 forces plunger 645 against said land 642 to form a sliding friction damper. While said plunger is in contact with said land, flange 646 of said plunger is separated from press collar 648 by a small distance T which can be on the order of a several thousandths of an inch to 1/64". Distance T is made less than height H in order that said plunger will not make contact with the lower portion of said sensor base when the response of said mass element exceeds the radius of said land, as shown in dashed lines. Therefore, the provision of damping by said sliding friction damper is limited to the radius of said land. Response amplitudes in excess of R encounter less damping and therefore will be larger than if the sliding friction damper acted over the entire amplitude. The advantage of this alternative seismic vibration sensor is that insensitivity to low level ground motion is provided while more highly amplified responses (nearly equal to those of not having said sliding friction damper in the sensor) can be provided at higher levels of ground motion.

Other features of construction in this alternative are the same as those previously described.

When the response amplitude of said mass element is less than the radius of said land, then the response curve has the same form and characteristics as previously described. In particular and refering to FIG. 45, there is either no response or a slight interrupted type response (curve segment A) up to the response switching setpoint (for seismic ground motion and using the results of the curve fit, $S_{SD}=1.05\ (4F_f/\pi K_r)$ and a response therebeyond (curve segment B) having an amplification factor determined by the amount of linear damping generated in said spring network, by said two degree of freedom bearing, and by said sliding friction damper. Note that the sliding friction damper actually accounts for a major share of the linear damping. When the forcing amplitude becomes of sufficient amplitude to cause the response of said mass element to slightly exceed the radius $R_L$ of said land 642 plus the radius of said plunger $R_p$ and as said plunger does not contact the lower portion of said sensor base for displacements in excess of $R=R_L+R_p$ then the amount of damping energy dissipated by the sliding friction type damping no longer increases with the response amplitude but remains constant therewith. As a result, the response curve shifting effect due to the sliding friction damping begins to disappear and the response starts to approach that of said seismic vibration sensor without said sliding friction damper. The change is response curve can either be quite abrupt and involving a jump transition (curve segment C) followed by a response therebeyond (curve segment D1) which nearly approaches that of said seismic vibration sensor without said sliding friction damper (response curve E1) or can be of a somewhat more gradual nature (curve segment D2) which also nearly approaches the response of said seismic vibration sensor without said sliding friction damper. According to my calculations, if $R \geq S_{SD}A_{Sl}$, then the response of said seismic vibration sensor resembles curve D2 and if $R < S_{SD}A_{Sl}$, then the response of said seismic vibration sensor resembles jump C and then curve D1.

Concerning the linear type damping due to said sliding friction damper, I suspect that this damping source is due to a resistance force which is approximately velocity proportional (as a general observation, cutting forces tend to increase with velocity and slight abrasive type cutting of said plunger tip was previously noted). It will be noted that this abrasion damping source is also constrained by the combined radius, R. However, as the maximum response velocities generally occur at or near the equilibrium position and there is no velocity (or energy dissipation) at the maximum displacement amplitude, it will be apparent that the energy dissipated by this abrasion damping source will continue to have an approximately quadratic relationship to the response amplitude when the response amplitude is slightly greater than R. According to my calculations, this approximation is reasonable for $X<1.1\ R$. As the response amplitude increases, however, the relationship of the energy dissipated to the response amplitude will decrease toward a linear dependence on the response amplitude. As a result, this abrasion damping source ceases to have an effect on the linear amplification factor (slope of response curve) and results only in a slight response curve shifting effect (curve E2 is asymptotically approached by response curves D1 and D2). According to my calculations, the approximation of linear energy dissipation for this abrasion damping source is fairly good once $X>1.4\ R$. It will be noted, therefore, that for $X>1.4\ R$, the amount of linear type damping (quadratic energy dissipation) decreases to the level generated by said spring network and said bearing, hereinafter referred to as the baseline damping, and results in an increase in the amplification factor over that for $X<R$. (For simple harmonic motion, the energy dissipated $\Delta U_a$ by this abrasion damping force $F_a$ ($F_a = cx$ where c -damping constant) as a function of response amplitude X can be found by solving the integral $$\Delta U_a = 4 \int_0^R F_a\ dx.$$

As
$x = X \sin(w_f t - \phi),$
$(F_a/cw_f) = X \cos(w_f t - \phi),$
and the identity
$\cos^2\theta = 1 - \sin^2\theta,$
then $$\Delta U_a = 4cw_f \int_0^R (X^2 - x^2)^{\frac{1}{2}} dx$$

or $$\Delta U_a = 4cw_f[(R\sqrt{X^2-R^2})/2 + (X^2/2)\sin^{-1}(R/X)].$$

For $X >> R$, then $\Delta U_a = 4cw_f RX.$
For X slightly $> R$, then $\Delta U_a = \pi cw_f X^2$.)

Approximate responses can be calculated by formulating an equivalent viscous fraction of critical damping. According to my analysis, when $X<1.1\ R$ then, $$2\zeta_e = (4F_f R)/(\pi K_r X^2) + 2\zeta_l.$$

For seismic motion $$X_{max} = A_{Se} X_{gmax}$$

$$A_{Se} = 1/(2.1\zeta_e + 0.295)$$

Therefore, the amplitude relation for $R<X<1.1\ R$ is, $$X_{max} = \frac{1}{2}[A_{Sl} X_{gmax} \pm \sqrt{(A_{Sl} X_{gmax})^2 - 4 A_{Sl} S_{SD} R}]$$

where, $$A_{Sl} = 1/(2.1\zeta_l + 0.295)$$

$\zeta_l$—linear damping due to said spring network, said two degree of freedom ball bearing, and the abrasion of said plunger It will be observed that when the discriminant=0, then $$X_{max} = \frac{1}{2}[A_{Sl} X_{gmax}] \text{(curve F)}$$

for $(A_{Sl} X_{gmax})^2 - 4 A_{Sl} S_{SD} R = 0$ and as, $$X_{max} = A_{Sl}(X_{gmax} - S_{SD})\ \text{(curve B) for } X<R$$

then curves F and B intersect at $$X_{gmax} = 2S_{SD}$$

and substituting this result back into the discriminant=0 yields $$R = S_{SD} A_{Sl}.$$

The radius R of said land can be given as $$R = f S_{SD} A_{Sl}$$

For $0<f<1$ the discriminant lies above and to the left of curve B. While curve D1 intersects curve B, it does so through forcing amplitudes which are less than the forcing amplitude at the point of intersection of curves F and B. Therefore, as $X_{gmax}$ becomes slightly greater than $R/A_{Sl}+S_{SD}$ then the response jumps (curve C) from the point of intersection of curves B and D1 to a higher level on curve D1. For $f<1$ the discriminant lies below and to the right of curve B and curve D2 is simply followed. Similar results can be worked out for simple harmonic forcing at the natural frequency. In testing such a switched damping seismic vibration sensor with simple harmonic motion at the natural frequency thereof, a large jump in response amplitude which corresponds with the response being forced to exceed the radius of said land have been observed.

When $X>1.4\ R$, $$2\zeta_e = (4F_f R)/(\pi K_r X^2) + 2\zeta_a(4/\pi)(R/X) + 2\zeta_b$$

where, $\zeta_a$—fraction of critical damping due to the abrasion of said plunger $\zeta_b$—fraction of critical damping due to said spring network and said bearing Therefore, for seismic motion the amplitude relation is, $$X_{max} =$$

$$(\frac{1}{2})\ [A_{sb}(X_{gmax} - H) \pm \sqrt{[A_{sb}(X_{gmax} - H)]^2 - 4 A_{sb} S_{SD} R}]$$

where,
$A_{Sb} = 1/(2.1\zeta_b + 0.295)$
$\zeta_b$—baseline damping due to spring network and bearing $$H = 2.1\zeta_a(4/\pi)R$$

The response triggering stepoint $S_R$ can set to correspond to a point along curve D1 or D2. The use of curve D1 or D2 provides a high degree of amplification which is generally of advantage for the reasons outlined previously and which is of particular advantage for producing a sizable response for relatively low ground motion setpoints. The response triggering setpoint could also be set to correspond to the jump transition, curve C. The use of curve C also provides a higher response than curve B which is generally advantageous for the same reasons noted previously. The jump corresponds to one ground motion amplitude is which determined by $\zeta_l$ and choice of $S_{SD}$ (which jointly determine curve B) and R. The viscous equivalent level of damping in effect on curve B where the jump starts is considerably greater than the damping in effect along curve D1. I have noticed, in relation to response spectra for actual seismic motions, that the responses for $\zeta_l < 2\%$ can show considerable fluctuations for small changes in natural frequency while those responses for $\zeta_l > 2\%$ tend to be a relatively smooth function of natural frequency and would therefore provide a more accurate ground motion setpoint. By placing response triggering setpoint $S_R$ within the range of the jump transition (shown in FIG. 45 as $S_{R1}$) then higher levels of amplification and response motion for actuating said trigger are provided while the ground motion triggering setpoint (shown in FIG. 45 as $S_{GD1}$) is more accurately determined by the relatively higher level of damping present at the start of the jump. It will be further noted that another advantage to triggering along curve C is that the accurate setting of $S_R$ or the trigger throw is not essential to the accuracy of the ground motion setpoint $S_{GD}$. Thus, the threaded shank of said follower could be dispensed with without impairing ground motion setpoint accuracy.

Another alternative seismic vibration sensor is shown in FIGS. 46 and 47 which provides means for switching the response of said seismic vibration sensor. A raised surface 660 is formed into sensor base 661. Said raised surface is generally in the form of a conical depression 662 centered in a truncated shallow cone 663 that rises above the remainder of said sensor base and producing a crest of radius $R_c$. Said raised surface is centered on the equilibrium position of mass element 664. Compression spring 667 forces plunger 665 against said raised surface to form a detent. Said plunger is preferably made of some low coefficient of friction material such as TFE. At the equilibrium position, said conical depression holds said plunger a height H above the general level of said sensor base and flange 666 of said plunger is separated from press collar 668 by a small distance T. Distance T is made less than height H in order that said plunger will not make contact with said sensor base when the response of said mass element exceeds the radius of said detent, R, as shown in dashed lines. Therefore, when the response of said mass element takes said plunger outside of said raised surface, no sliding friction will be generated thereby. Thus, any sliding friction type damping generated by said plunger and said raised surface is limited to radius R.

Other features of construction in this alternative are the same those previously described.

Said detent produces a holding force, $F_d$, which is related to the normal force of said plunger, N, and the gradient of said conical depression, tan $\alpha$, as follows $$F_d = N \tan \alpha$$

and constitutes an extra restoring force of substantially constant magnitude. The total restoring force present in said seismic vibration sensor as a function of displacement is shown in FIG. 48. Said detent adds to the restoring force up to $R_c$, the radius of the crest of said detent. When the response is greater than, R, the radius of said detent (the point where contact between said plunger and said raised surface is made and broken) then said detent has no effect on the restoring force for those displacements greater than R and it will be apparent that the average spring rate over a full cycle is just the spring rate of spring network 669 and therefore the restoring force in said seismic vibration sensor can be regarded as linear. The overall effect of said detent on the operation of said seismic vibration sensor is as follows. For an initial range of forcing amplitudes, from 0 up to a forcing amplitude related to $F_d$, hereinafter the first response switching point, there is no response or only a slight interrupted type of response. For forcing amplitudes between the first response switching point and the forcing amplitude which corresponds with a response equal to $R_c$, hereinafter the second response switching point, the response is a rather steeply increasing function of the forcing amplitude. When the forcing amplitude exceeds the second response switching point, then a large jump in response takes place. For forcing amplitudes beyond this, the effects of the detent are negligible and the response can be calculated as a typical linear oscillator for either simple harmonic motion or seismic motion. The response triggering setpoint can be set to correspond to the jump portion of the response or can be set to the substantially linear response beyond the jump.

In regard to said first response switching point, it will be apparent that for forcing amplitudes that result in inertial forces on said mass element which are less than $F_d$, then there will be no response. Testing with simple harmonic motion (and for the holding force $F_d$ being about twice as great as the sliding friction forces that are also produced by said plunger and said raised surface) indicates that the development of a steeply increasing response is shifted even further, about twice as much. According to my analysis, this extra factor of two in the determination of the first response switching point is a result of the way in which potential energy is stored in said detent as opposed to said spring network. When compression spring 556 is given sufficient preload and the deflection of said plunger over said detent is sufficiently small, then N and $F_d$ can be taken as approximately constant while said plunger is acting in said shallow depression. Therefore, the potential energy $U_d$ stored in compression spring 556 $U_d = F_d X$ is a linear function of response amplitude while the potential energy stored in said spring network $U_S = (\frac{1}{2}) K_r X^2$ is a quadratic function of response amplitude. When said mass element deflects a sufficient distance from the equilibrium position so that the restoring force of said spring network equals the restoring force of said detent, then it will be noted that the detent has stored twice as much potential energy as said spring network. By equating the potential energy stored in said detent and in said spring network to the potential energy, $U_e$, stored by an equivalent linear restoring force having an equivalent spring rate $K_e$, then an equivalent natural frequency, $w_e$, and an equivalent frequency ratio, $r_e$, can be found.

$$U_e = (\tfrac{1}{2})K_e X^2 = (\tfrac{1}{2})K_r X^2 + F_d X$$

or $\quad K_e = K_r + 2F_d/X$ from which $\quad w_e = \sqrt{K_e/M} = \sqrt{(K_r + 2F_d/X)/M}$ and $\quad r_e = w_f/w_e$ Plugging this into the well known amplitude relation for a linear oscillator forced by its oscillating base with simple harmonic motion, $$X/X_g = r_e^2/\sqrt{(1 - r_e^2)^2 + (2\phi r_e)^2}$$

then amplitude relations for said spring network and said detent can be found. For $\zeta = 0$, I get $$X = (r^2/(1-r^2))(X_g - 2F_d/(M w_f^2))$$

where, $r = w_f/w_o$.

For $w_f = w_o$, I get $$X = \sqrt{(\tfrac{1}{2}\phi)^2(X_g^2 - (2X_B)^2) + X_B^2} - X_B$$

where, $X_B = F_d/(M w_o^2) = F_d/K_r$

In either case, a switching point or shifting effect related to $2F_d$ is apparent. The additional effects of the sliding friction force in said detent can be found by additionally substituting an equivalent damping factor into the above amplitude relation. It will be seen that the shifting of the start of a steeply increasing response or switching point is related to $(2F_d)^2 + (4F_f/\pi)^2$ (the two shifting effects approximately add like perpendicular vectors). This is a result of the fact that the sliding friction force is 90 degrees out of phase with the detent holding or restoring force. For sliding friction forces which are a fraction of the detent holding force, say less than half, the amount of additional shifting in the response due to the presense of sliding friction forces is relatively small and in my opinion can be neglected.

When said seismic vibration sensor with said detent is subjected to seismic motion a similar shifting effect on the response is to be expected. The slope of the subsequent response curve up to the second response switching point would be related to the typical amplification factors for seismic motion. It will be appreciated, however, that the exact nature of the response curve up to the second response switching point is best determined by actual testing with seismic motion.

The advantage of this alternative seismic vibration sensor is that insensitivity to low level ground motion is provided while more highly amplified responses (nearly equal to those of not having a detent or a sliding friction damper in the sensor) can be provided at higher levels of ground motion.

As another alternative, said spring network could be implemented by other spring configurations than said three equally spaced extension springs. For example, the spring network could be implemented by four or more equally spaced extension springs. The spring network could also could be implemented by two pre- loaded extension springs which are spaced 180 degrees apart in which the spring rate thereof provides a first restoring force in line with said two extension springs and the angular deflection of the preload therein provides a second restoring force perpendicular to said two extension springs. Said first and second restoring forces can be made equal by restricting the the distance between the spring rotation points, L, to something less than the fully tensioned length of said springs. Means of simple construction for restricting the rotation length of said springs include clamping the ends of said springs or various guides mounted to the sensor frame (e.g. a pin on either side of each of said springs) for causing said springs to bend or flex over an intermediate position between the ends thereof. It is also possible to implement the spring network by using two compression springs spaced 90 degrees apart which are not preloaded. Although these two spring alternatives involve a greater degree of non-linearity at large deflections and therefore would preferably be used over a smaller range of deflection than spring networks having three or more springs, they reduce the number of spring elements in the spring network.

Also alternatively, it will be noted that said two degree of freedom bearing could be implemented with only three said bearing balls.

Further alternatively, it will be noted that said sliding friction damper could be omitted from said seismic vibration sensor. Although such a seismic vibration sensor would have a higher degree of sensitivity to minor vibrations, it would simply function as a constant amplification factor seismic vibration sensor and would have fewer parts.

Also alternatively, it will be noted that by increasing the normal force between said follower and said transducer cam that said transducer cam and follower can be made to supply all of the forces (sliding friction and detent type forces) for shifting the response of the seismic vibration sensor. In order to avoid any minor twisting action on the mass element and possible setpoint inaccuracies, the order of the transducer cam and the follower tip is reversed from those described previously so that the higher friction force always act through a point vertically in line with the center of mass of the mass element. As shown in FIG. 49, the follower tip 675 is mounted to mass element 674 and the transducer cam 676 is mounted to vertical sliding guide 678. The bulk of the normal force between said transducer cam and said follower tip can be generated by compression spring 677 or by trigger spring 673 (in which case said compression spring 677 could be omitted) or by both.

A further alternative is shown in FIG. 50 and demonstrates a means for adjusting the amount of normal force and hence friction provided by sliding friction damper 680 which thereby provides a second means for adjusting the horizontal ground motion setpoint $S_{GD}$ (in addition to the threaded shank of said follower). A cone point set screw 684 threadably mates with mass element 685 substantially as shown. The cone point of said set screw makes contact with an inclined surface on slidable plug 683. Compression spring 682 is preloaded and contained between said slidable plug and plunger 681. Said compression spring causes said plunger to press against sensor base 686 in order to create a frictional force. When an appropriate tool, such as an Allen wrench, is used to rotate and advance said setscrew into said mass element, then said setscrew acts on said inclined surface of said slidable plug and moves said slidable plug downward from the position shown which increases the preload force in said compression spring and the frictional force produced between said plunger and said sensor base thereby raising the switching setpoint and the horizontal ground motion setpoint. When said set screw is rotated so as to retract from the position shown, then said compression spring moves said slidable plug upward thereby releasing some of the preload force in said compression spring and lowering the switching setpoint and horizontal ground motion setpoint.

Another alternative is shown in FIGS. 51 and 52, and demonstrates a seismic vibration sensor in which the friction reducing means comprise three or more friction reduction pads 691, which support mass element 690 and spring network 692. Said friction reduction pads are preferably made from TFE or another such low friction coefficient material. Said spring network comprises three extension springs which provide a horizontal omnidirectional restoring force to said mass element and enables said seismic vibration sensor to provide a resonantly amplified response. Said spring network is given a higher level of preload than those seismic vibration sensors which have previously been described and is given a vertical elevation angle, the combined purpose of which is to remove a fraction of the weight of said mass element which would otherwise act through said friction reduction pads 691 and produce higher levels of frictional damping force. Adjustments to the response switching setpoint are made by changing the preload in or vertical elevation angle of said spring network or both. Although the frictional damping force is generated by the fractional weight of said mass element acting through said friction reduction pads and therefore is affected by the vertical component of seismic ground motion thereby resulting in some setpoint accuracies, according to my testing which was done with simultaneous horizontal and vertical simple harmonic motion using various phase relationships therebetween, variations in the horizontal ground motion setpoint due to the effect of the vertical component are not of such a size as to prevent this alternate seismic vibration sensor from being able to meet the previously noted standards. And although this alternate seismic vibration sensor is of somewhat greater lateral dimensions, due to the higher levels of preload in and therefore greater length of the springs comprising said spring network, the overall construction is somewhat simpler than the previously described seismic vibration sensors.

Another alternative is shown in FIGS. 53 and 54 which demonstrates a leveling adjustment for the seismic vibration sensor and transducer according to the invention which is installed in a seismic valve operator according to the invention. A bracket 701 is rigidly attached to the bottom of seismic sensor base 700. The lower portion of said bracket is formed in the shape of a spherical shell. Baseplate 702 has a spherical shell section therein which is indicated as 703. Follower 704 is guided by arm 705 which is rotatably mounted to sensor frame 706. The upper end of said follower is a slightly rounded point 707. Trigger lever 708 is rotatably mounted to the rigid frame 709 (shown in part) of a universal trip valve operator according to the invention (otherwise not shown). A set screw 716 threads into the end of said trigger lever and forms a trigger throw adjustment. Said point 707 makes surface contact with the end of said set screw. Said baseplate 702 is also rigidly connected to said rigid frame 709. Said trigger lever is torqued clockwise by torsion spring 710 so as to lightly press against said follower. The radius of curvature of said spherical shell sections of said bracket 701 and said baseplate 703 are made to coincide with said point 702. Said spherical shell section of said bracket 701 has a hole therein through which the shank of bolt 711 passes with a small amount of clearance. Said sherical shell section 703 of said baseplate has a hole 712 therein through which the shank of said bolt passes, the diameter of said hole 712 being considerably larger than the diameter of said bolt. A concave spherical washer 713 has a hole therein through which the shank of said bolt passes with with a small amount of clearance. Said spherical washer has radius of curvature which matches said spherical shell 703. When tightened, said bolt and nut 714 compress and lock said spherical shells and said spherical washer together such that said sensor base is rigidly connected to said frame 704. A plumb bob type level indicator 715 is rigidly connected to a rigid projection extending from said spherical washer and is visible from outside of the seismic valve operator into which this alternative seismic vibration sensor is incorporated. As said sensor base and said bracket 701, said bolt, and said spherical washer will all move together in relation to said baseplate, it will be apparent that said level indicator indicates the orientation of said seismic vibration sensor even though it is attached to said spherical washer. (Alternatively, a bulls eye type level could be used.)

When said seismic valve is installed in a pipe which is substantially out of level, then said seismic vibration sensor and transducer is leveled by loosening said nut 714, rotating or 'gimbaling' said seismic vibration sensor in the appropriate direction until said plumb bob indicates that said seismic vibration sensor is level, and then retightening said nut 714. It will be noted that as center of curvature of said spherical shell sections corresponds with said point 702, then leveling adjustments to said seismic vibration sensor do not change the position of said trigger lever and therefore do not affect the trigger throw or the various setpoints. It will be further noted that as said seismic vibration sensor and transducer are gimbaled further from the centered position, the angle between said follower and said trigger lever changes away from a perpendicular orientation and will start to produce a slight camming effect. The deflection of said trigger lever is equal to the deflection of said follower times the cosine of the number of degrees of gimbaling from the centered position. For gimbaling angles of say less than 15 to 20 degrees, the cosine can be taken as approximately 1 without any significant loss in the accuracy of the setpoints and this camming effect is therefore negligable. For larger gimbaling angles, up to say 45 degrees, this camming effect can be compensated for by shortening the trigger throw using said set screw 716 to maintain the same response triggering setpoint as for a perpendicular orientation. Such a level adjustment system, therefore, can provided leveling adjustments up to about ±15 to 20 degrees without having to provide additional adjustments to the trigger lever to compensate for angular changes away from perpendicular between said follower and said trigger lever.

It will be noted that said seismic sensor and transducer has applications beyond the direct mechanically transduced triggering of the universal trip valve operator according to the invention. For example and as shown in FIG. 55, a miniature limit switch 720 can be mounted to sensor frame bracket 721 so as to sense the vertical displacement trigger lever 722. Electrical lines 723 which are pulsed by said miniature limit switch, could form a seismic indicating input to logic and control devices such as a programmable controller, a process control computer, or a general purpose control relay (preferably with a rated maximum drop out time owing to the pulsed nature of the signal). Said logic and control device could then initiate appropriate actions such as shut down of electrically powered equipment, shutdown of furnaces and burners, operation of valves in a particular shutdown sequence, etc. Alternatively and as shown in FIG. 56, a release lever 726 is rotatably mounted to sensor frame 729 by pivot 728 and is torqued in the counterclockwise direction by spring 727 which is connected between said sensor frame and said release lever. When transducer follower 724 is vertically deflected a sufficient distance by seismic motion, then trigger lever 725 releases said release lever which then rotates counterclockwise under the action of said spring and causes miniature limit switch 720-A to switch electrical signal lines 723-A. The switched signal, it will be noted in this alternative, is steady and can be used to directly switch electrical devices on or off or form a steady switched input to a control device such as those mentioned above. It will be apparent that heavier duty switch gear can be switched using a larger spring actuator and more stages of leverage between said larger spring actuator and said trigger.

FIFTH EMBODIMENT - CONSTRUCTION

FIG. 57 illustrates a fifth embodiment of a universal trip valve operator according to the invention for efficiently operating quarter turn butterfly valves which have an increasing torque load as the closed position is approached and in which the reset position corresponds to the open position and the returned position corresponds to the closed position. FIG. 58 illustrates such a torque load. Basic spring return valve operators which use two bias transmitting and transforming devices for efficiently dealing with such loads were presented in my U.S. Pat. No. 4,869,459. In this embodiment, the trigger and multi-stage leverage device are novelly interconnected with two such bias transmitting and transforming devices in a universal trip valve operator such that a lower trigger load or a reduction in size or number of stages of leverage or size of the multi-stage leverage device is provided.

This fifth embodiment is generally comprised of a second bias transmitting and transforming device BTT-2, a multi-stage leverage device of the type described in the previous embodiments symbolically indicated as MSL, a trigger of the type described in the previous embodiments symbolically indicated as TRG, OR logic means symbolically indicated as OR, various sensors and/or other trip actuators symbolically indicated as S/T, a controlled actuator for actuating said universal trip valve operator back to the reset position symbolically indicated as CA, and a spring return actuator of the type used in the previous embodiments and disclosed in my U.S. Pat. No. 4,869,459 generally indicated as SRA. Said universal trip valve operator connects to and operates quarter turn butterfly valve 730. FIG. 57 shows said universal trip valve operator at the reset position and said butterfly valve at the corresponding open position.

In this embodiment, said second bias transmitting and transforming device BTT-2 takes the form of a symmetric four bar linkage. The reset position is shown in solid lines and the returned position is shown in dashed lines. Said four bar linkage is comprised of first arm 733, second arm 735, connecting link 734, and a frame link (not shown). Said first arm is coupled to first shaft 732 which thence couples to valve stem 731 and said multi-stage leverage device. Said second arm is coupled to second shaft 736 which thence couples to said reset actuator and said spring return actuator. Said connecting link is rotatably connected to said first arm and said second arm by pin joints 737 and 738, respectively. As said four bar linkage is symmetric and said first arm operates through a quarter turn, then said second arm also operates through a quarter turn. At the reset position, said first arm and said connecting link generate a relatively small torque arm and said second arm and said connecting link generate a relatively large torque arm which reduces the biasing torque of said spring return actuator which reaches said shaft 732. At the returned position, said first arm and said connecting link generate a relatively large torque arm and said second arm and said connecting link generate a relatively small torque arm which increases the biasing torque of said spring return actuator which reaches said shaft 732.

Said spring return actuator is of the type described in the previous embodiments. Said spring return actuator comprises nested torsion spring actuator 741 which connects to the first bias transmitting and transforming device, generally indicated at 740, which thence couples to said second shaft 736. A second nested torsion spring actuator 742 couples to said second shaft 736. Said first bias transmitting and transforming device 740 comprises eccentric spool 743, multiple leg cable 744, and concentric spool 745.

Said controlled actuator can be either of a manually operated type or a power operated type (e.g. pneumatic). Also, said controlled actuator can either be a removable component or be a permanently mounted component in said universal trip valve operator.

Said multi-stage leverage device can be of the type described in the first, second or fourth embodiments or can be of the type described in the third embodiment. At the reset position, said multi-stage leverage device connects to and is restrained by said trigger which thence connects to said OR means and said sensors and/or other trip actuators in the manner described in previous embodiments.

FUNCTIONS AND OPERATION

Said spring return actuator is configured to produce a substantially constant torque at said second shaft 736 during actuation from the reset position to the returned position. Said second bias transmitting and transforming device BTT-2 transforms said substantially constant torque into an increasing torque at said first shaft 732 and said valve stem as the returned position is approached (owing to the varying torque arms generated therein during actuation between the reset position and the returned position) which is substantially load-matched to the load presented by said butterfly valve. Therefore, the actuation torque developed in said first shaft 732 at the reset position is much less than the actuation torque developed at the returned position. Advantageously then, said multi-staged leverage is coupled to said first shaft 732 in order to take advantage of the lower actuation torque present in said first shaft 732 at the reset position which thereby enables said multi-stage leverage device to produce a smaller trigger load than the same multi-stage leverage device coupled to said second shaft 736 or to be smaller and/or have fewer stages of leverage than an equivalent multi-stage leverage device which produces the same trigger load and is coupled to said second shaft 736. It will be noted alternatively that said spring return actuator could also be configured to produce an increasing torque at said second shaft 736 in which case the action of said second bias transmitting and transforming device BTT-2 would be to transform the output biasing torque of said spring return actuator at said second shaft 736 into a more steeply increasing biasing torque at said first shaft 732 as said butterfly valve is actuated to the closed position.

Preferably, said controlled actuator produces an output biasing torque for retensioning said spring return actuator and actuating said butterfly valve back to the open position which is substantially loadmatched to the retensioning load of said spring return actuator (e.g. a substantially constant torque output) and, through said second bias transmitting and transforming device BTT-2, is loadmatched to the decreasing load presented by said butterfly valve as the open position thereof is approached.

The operation of said fifth embodiment is as follows. Said trigger and said multi-stage leverage device restrain said spring return actuator (through said second bias transmitting and transforming device BTT-2) and said butterfly valve at the reset position (open position of said butterfly valve). When one or more sensors or other trip actuators, acting through said OR logic means, cause said trigger to release said multi-stage leverage device, then said spring return actuator is no longer restrained and thus actuates said butterfly valve and all other said components coupled to either said first shaft 732 or said second shaft 736 to the returned position. Said controlled actuator retensions said spring return actuator, actuates said butterfly valve back to the open position, and actuates said multi-stage leverage device back to the reset position. Providing that the sensed conditions or tripping signals have been cleared, then said trigger will re-engage said multi-stage leverage device at the reset position and said trigger will thereby restrain, through said multi-stage leverage device, said spring return actuator at the reset position and said butterfly valve at the open position.

Alternatively, it will be noted that if said universal trip valve operator and said butterfly valve had been configured so that the reset position corresponded to the closed position of said valve and the open position corresponded to the open position of said valve so that when triggering occurs, said valve is actuated to the open position and therefore presents a decreasing torque load, then it would be preferable to couple said multi-stage leverage device to said second shaft 736, rather than said first shaft 732 because in this case said second shaft 736 would present a lower torque load to said multi-stage leverage device at the reset position than said first shaft 732.

SIXTH EMBODIMENT - CONSTRUCTION

FIGS. 59-72 illustrate a sixth embodiment of a universal trip valve operator according to the invention and is directed toward a universal trip valve operator which incorporates a three way actuation by-pass device. Refering to FIG. 59, said sixth embodiment is generally comprised of a three way actuation by-pass device generally indicated at 800, a controlled double acting actuator under external control symbolically indicated as CDA, a spring return actuator which is symbolically indicated as SRA, a multi-stage leverage device symbolically indicated as MSL, a trigger symbolically indicated as TRG, logic means (e.g. OR logic) symbolically indicated as TRG, logic means (e.g. OR logic) symbolically indicated as LM, and sensors and/or other trip actuators symbolically indicated as S/T. Said spring return actuator is of the type used in the previous embodiments and is comprised of a first nested torsion spring actuator symbolically indicated as TS1, a first bias transmitting and transforming device symbolically indicated as BTT, and a second nested torsion spring actuator symbolically indicated as TS2. Said universal trip valve operator connects to and operates a quarter turn valve symbolically indicated as QTV.

Said three way actuation by-pass device comprises a first arm 801, a second arm 802, a third arm 803, a first connecting link 804, a second connecting link 805, floating lever 806, rigid frame (partially shown at various locations and indicated as 807), and stops 808-810. Optionally, stops 811-813 can also be included. Said first arm is coupled to shaft 814 and is rotatably mounted to said rigid frame by said shaft 814 at frame bearing 817. Said shaft 814 thence couples to the valve stem of said quarter turn valve through various coupling means. Said second arm is coupled to shaft 815 and is rotatably mounted in said rigid frame by said shaft 815 at frame bearing 818. Said shaft 815 thence couples to said spring return actuator and said multi-stage leverage device through various coupling means and shaft connections. Said third arm is coupled to shaft 816 and is rotatably mounted in said rigid frame by said shaft 816 at frame bearing 819. Said shaft 816 thence couples to said controlled double acting actuator through various coupling means and shaft connections. Said shaft 816 extends vertically from said third arm 803 towards said controlled double acting actuator but does not penetrate the plane of operation of said floating lever. Said first connecting link is rotatably connected to said first arm by pivot pin 820. Said second connecting link is rotatably connected to said second arm by pivot pin 821. Said floating lever is rotatably connected to said first connecting link, said second connecting link and said third arm by pivot pins 822, 823, and 824 respectively. Preferably and as shown, the length of said first arm 801 is substantially equal to the length of said second arm 802; the length of said third arm 803 is substantially one half the length of said first arm 801 or said second arm 802; in said floating lever, said pivot pin 824 is located half way between said pivot pin 822 and said pivot pin 823; the length of said first connecting link 804 is substantially equal to the length of said second connecting link 805; said stops are located such that said first, second and third arms are each able to actuate through substantially a quarter turn; and said first arm, said second arm 802, and said third arm all operate through the same range of linkage angles (approximately 45 degrees to 135 degrees as shown).

Said spring return actuator, said multi-stage leverage device, said trigger, said logic means, and said sensors and other trip actuators are preferably constructed and interconnected in the manner shown and described in the previous embodiments.

Said multi-stage leverage device can, for example, be constructed as in the first, second, and fourth embodiments or as in the third embodiment.

Within said spring return actuator, said first nested torsion spring actuator, said bias transmitting and transforming device, and said second nested torsion spring actuator are constructed and interconnected in the manner shown and described in the previous embodiments or in my U.S. Pat. No. 4,869,459.

Said controlled double acting actuator can be any of a variety of powered or manually operated actuators with a rotary output. (e.g. a pneumatic actuator; a hydraulic actuator; an electric gear motor actuator perhaps with an additional worm gear, perhaps driven by a servo motor or a stepping motor; a manually operated lever handle, or a manually operated gear or worm gear actuator).

FUNCTIONS AND OPERATION

Said arms, said connecting links, said floating lever, and said rigid frame link of said by-pass device form a two degree of freedom multi-bar pin joint linkage. Through said shaft 815, one degree of freedom of said two degree of freedom linkage is under the control of said trigger, through said multi-stage leverage device, and said spring return actuator. Said shaft 815 is the trigger control point of said by-pass device. The other degree of freedom is under the control of said controlled double acting actuator. Said shaft 816 is the controlled actuator control point of said by-pass device. Said shaft 814 is the load point or valve point of said by-pass device. Said two degree of freedom linkage is used in conjunction with said stops to cause said by-pass device, and therefore said universal trip valve operator, to have three basic states with three actuation paths therebetween. FIG. 60 illustrates said three basic states of said by-pass device, indicated as I, II, and III, and the three actuation paths therebetween, indicated as A, B, and C. Said multi-stage leverage device and said spring return actuator are coupled together and therefore jointly actuate between a reset position and a returned position. Said controlled double acting actuator actuates between its own reset position and returned position. It is also possible for said controlled double acting actuator to actuate to and hold various intermediate operating positions. Said quarter turn valve operates between its own reset position and returned position. In state I said multi-stage leverage device and said spring return actuator are at their joint reset position, said controlled double acting actuator is at its reset position, and said quarter turn valve is at its reset position. In state II said spring return actuator and said multi-stage leverage device are at their joint returned position, said controlled double acting actuator is at its reset position and said quarter turn valve is at its returned position. In state III said spring return actuator and said multi-stage leverage device are at their joint reset position, said double acting actuator is at its returned position, and said quarter turn valve is at its returned position. There are five possible transitions from one state to another. From state I, a transition to state II along actuation path A or a transition to state III along actuation path C can be made. From state II, a transition to state III along actuation path B can be made. From state III, a transition to state II along actuation path B or a transition to state I along actuation path C can be made.

Starting from state I and upon triggering, actuation path A is followed to state II during which said spring return actuator by-passes said controlled double acting actuator and actuates said quarter turn valve to its returned position. In detail during actuation along actuation path A, said spring return actuator and said multi-stage leverage device move to their joint returned position. Additionally, said spring return actuator actuates said arm 802 a quarter turn clockwise which in turn and through said connecting link 805 causes the clockwise actuation of said floating lever 806 about said pivot pin 824, thus resulting in the by-passing of said double acting actuator. Along actuation path A, it will be noted, said pivot pin 824 is the fulcrum for said floating lever as said arm 803 is pressed against said stop 810 and therefore does not move. Said floating lever thence causes, through said connecting link 804, the quarter turn clockwise rotation of said arm 801 and said quarter turn valve to the returned position. Said stop 808 determines the returned position of said arm 801 and said quarter turn valve and also determines the returned position of said spring return actuator and said multi-stage leverage device. The provision of said stop 811 provides redundant means for determining the returned position of said arm 802, said spring return actuator, said multi-stage leverage device, and said quarter turn valve and is therefore optional.

From state II and upon actuation of said controlled double acting actuator from its reset position to its returned position, actuation path B is followed to state III during which said controlled double acting actuator by-passes said quarter turn valve and actuates said spring return actuator and said multi-stage leverage device back to their joint reset position. In detail during actuation along actuation path B, said double acting actuator actuates said arm 803 a quarter turn counter-clockwise which in turn causes the counterclockwise rotation of said floating lever 806 about said pivot pin 822, thus resulting in the by-passing of said quarter turn valve. Along actuation path B, it will be noted, said pivot pin 822 is the fulcrum for said floating lever as said arm 801, through said connecting link 804, is pressed against said stop 808 and therefore said pivot pin 822 experiences very little movement in comparison to said pivot pins 824 and 823. Said floating lever thence causes, through said connecting link 805, the quarter turn counterclockwise rotation of said arm 802 and the consequent retensioning of said spring return actuator and actuation of said multi-stage leverage device back to its reset position. Said stop 809 determines the reset position of said spring return actuator and said multi-stage leverage device and along with said stop 808 also determines the returned position of said controlled double acting actuator. The provision of said stop 813 is redundant and therefore optional.

At state III, if the trigger is still at its release position (i.e. not all the sensed conditions or tripping signals, which initially caused said sensors or other trip actuators to actuate said trigger to its release position, have been cleared), then said multi-stage leverage device and consequently said spring return actuator will not be restrained at their reset position. Then, upon the actuation of said controlled double acting actuator back to its reset position, actuation path B will be followed back to state II. Note that said quarter turn valve is by-passed and thus remains at its reset position while said spring return actuator and said multi-stage leverage device actuate back to their returned position.

At state III, if the trigger has resumed its hold position (e.g. due to the clearing of the sensed conditions or tripping signals which initially produced triggering), then said multi-stage leverage device and consequently said spring return actuator will be restrained at their reset position. Then, upon the actuation of said controlled double acting actuator back to its reset position, actuation path C will be followed to state I during which said controlled double acting actuator by-passes said multi-stage leverage device, said trigger, and said spring return actuator and actuates said quarter turn valve to its reset position. In detail during actuation along actuation path C, said controlled double acting actuator actuates said arm 803 a quarter turn clockwise which in turn causes the counterclockwise rotation of said floating lever 806 about said pivot pin 823, thus resulting in the by-passing of said multi-stage leverage device, said trigger, and said spring return actuator. Along actuation path B, it will be noted, said pivot pin 823 is the fulcrum for said floating lever as said arm 802 is restrained at its reset position and therefore said pivot pin 823 experiences very little movement in comparison to said pivot pins 822 and 824. Said floating lever thence causes, through said connecting link 804, the quarter turn counterclockwise rotation of said arm 801 and the consequent actuation of said quarter turn valve to its reset position. Said stop 810 determines the reset position of said controlled double acting actuator and along with the reset position of said multi-stage leverage device and said arm 802 also determines the reset of said quarter turn valve. The provision of said stop 812 is redundant and therefore optional.

From state I and upon actuation of said controlled double acting actuator from its reset position to its returned position, actuation path C is followed back to state III thus by-passing said multi-stage leverage device, said trigger, and said spring return actuator and actuating said quarter turn valve back to its returned position.

Said controlled double acting actuator can be used to position said quarter turn valve at various intermediate positions between its returned and reset positions along actuation path C. Upon triggering then, said spring return actuator will actuate to an intermediate position between its reset and returned positions which is determined by the intermediate position of said controlled double acting actuator and said quarter turn valve will be actuated to its returned position. Actuation path A1 typifies such an actuation.

It will be noted that while said stops have been shown as acting directly on said first arm, said second arm, and said third arm, said stops 809 and 811 could alternatively be incorporated into said multi-stage leverage device or said spring return actuator and said stops 810 and 813 could alternatively be incorporated into said controlled double acting actuator. Either said stop 808 or 812 could inherently be present in said quarter turn valve. For instance in a quarter turn butterfly valve, the contact of the butterfly with the valve seat can be used to produce one of said stops 808 or 812.

It will be further noted that the differential effect produced by said floating lever, which causes said pivot pin 824 to actuate about one half as far as either said pivot pin 822 or said pivot pin 823, is compensated for by having made the length of said third arm 803 about one half as long as the length of said first arm 801 or said second arm 802. This shorter compensating length of said third arm 803 enables said third arm 803 to actuate through a quarter turn which in turn allows any quarter turn controlled double acting actuators to be connected thereto.

It will be still further noted, and as shown in FIGS. 61 and 62, that the connections between said shafts 814, 815, and 816 and said quarter turn valve, said controlled double acting actuator, and the combination of said spring return actuator, said multi-stage leverage device and said trigger can be interchanged. As a result, the correspondence between the various positions of said two degree of freedom linkage which forms said by-pass device and the various states are interchanged. In FIG. 61, states I, II, and III correspond to the same respective positions of said multi-stage leverage device and spring return actuator, said controlled double acting actuator, and said quarter turn valve as previously described (i.e. at state I these respective positions are MSL & SRA - reset, CDA - reset, and QTV - reset; at state II these respective positions are MSL & SRA - returned, CDA - reset, QTV - returned; at state III these respective positions are MSL & SRA - reset, CDA - returned, QTV - returned). It will be seen that the position of said two degree of freedom linkage which corresponds to state III in FIG. 60 now corresponds to state II in FIG. 61 and roughly to state I in FIG. 62. The basic function of said universal trip valve operator and said by-pass device incorporated therein, remains unchanged by such interchanging. The ability to interchange the connections of said valve and said actuators without altering the basic functions of said by-pass device allows extra design freedom in designing a particular version of said universal trip valve operator with a by-pass device to be compact.

Efficiency is provided in said universal trip valve operator by loadmatching said spring return actuator to said quarter turn valve and extracting most of the energy stored in said nested torsion spring actuator TS1 at reset position thereof, by loadmatching said controlled double acting actuator to the retensioning load of said spring return actuator, and by loadmatching said controlled double acting actuator to the actuation load of said valve. Said loadmatching is accomplished by said first bias transmitting and transforming device BTT and, in certain cases, a second bias transmitting and transforming device symbolically indicated as BTT-2 in FIG. 63. Said second bias transmitting and transforming device can be a symmetric four bar linkage of the sort described in the fifth embodiment and indicated as BTT-2 in FIG. 57. As said controlled double acting actuator actuates to its reset position in order to reset said quarter turn valve and actuates in the reverse direction to its returned position in order to retension said spring return actuator, and as said spring return actuator is loadmatched to said quarter turn valve, then for said controlled double acting actuator to be loadmatched to both said spring return actuator retensioning load and said quarter turn valve actuation load then, most simply, the actuation torques applied to said shafts 815 and 816 and the load torque at said shaft 814 are made approximately constant over a quarter turn. (Actually, it is only necessary that the actuation and load torques be symmetric about the midpoints of the respective actuation strokes thereof. That is, if said arm 803 and said shaft 816 are taken as actuating over a quarter turn between 0 and 90 degrees, then the torque applied at angle x equals the torque applied at angle 90 - x. Examples of such torque characteristics include constant torque and torque curves with peaks or valleys located symmetrically in the middle thereof.) If a particular quarter turn valve does not inherently present a constant torque load or at least approximate it (i.e. quarter turn butterfly valves which produce an increasing load as they are closed), then a second bias transmitting and transforming device BTT-2, as shown in FIG. 63, is incorporated into said universal trip valve operator as shown in order to produce a substantially constant load torque at said shaft 814. Put another way, said second bias transmitting and transforming device acts to transform a constant torque delivered to said shaft 814 into an increasing actuation torque at shaft 830 and the stem of said valve which is substantially loadmatched thereto as said valve closes and acts to transform a constant torque delivered to said shaft 814 in the reverse direction into a decreasing actuation torque at the stem of said valve which is substantially loadmatched thereto as said valve opens. In relation to FIG. 63, the two degree of freedom linkage of the previous figures is symbolically indicated as BY-PASS.

Referring to FIG. 60, during the operation of said by-pass device it will be noted that the particular arrangement of said arms, said connecting links and said floating lever is such that the torque arms generated by said first arm and said first connecting link, by said second arm and said second connecting link, and by said third arm and the forces produced through the interaction thereof with said floating lever through said pivot pin 824, all vary in a similar manner due to the approximately 45 degree cross-product angles at the returned and reset positions and the approximately 90 degree cross-product angles at the midpoints positions therebetween. Therefore, for actuation along actuation paths A, B, and C between states I, II, and III, the effects of these varying torque arms substantially cancel out. Hence, the actuation characteristics of said spring return actuator at said shaft 815 (i.e. constant torque) are substantially replicated at said shaft 814 and the loadmatch between said spring return actuator and said quarter turn valve is preserved. Also, the actuation characteristics of said controlled double acting actuator at said shaft 816 (i.e. constant torque) are substantially replicated at said shaft 815 and the loadmatch between said controlled double acting actuator and the retensioning load of said spring return actuator is preserved. Further, the actuation characteristics of said controlled double acting actuator at said shaft 816 (i.e. constant torque) are substantially replicated at said shaft 814 and the loadmatch between said controlled double acting actuator and said quarter turn valve is preserved.

FIG. 62 demonstates an alternatively constructed by-pass device that includes a third connecting link 826 and a stabilzer link 827. This alternative construction provides relatively efficient overall actuation characteristics when actuation along an intermediate actuation path A1 can be expected such as when said controlled double acting actuator is regularly used to provide actuation to intermediate positions along actuation path C and said controlled double acting actuator can not be reverse driven from its output shaft (e.g. said controlled double acting actuator is an electric gear motor, a manually operated worm gear, or a manual handle which can be locked at an intermediate position as with a detent). (It is to be noted in relation to FIG. 60 that during actuation along actuation path A1, the variation of the torque arms between said spring return actuator and said quarter turn valve are not 'synchronised' and do not exactly cancel out which leads to some loss of torque output at said quarter turn valve, at most about 29% by my calculations, as the returned position thereof is approached.) Said third connecting link is rotatably connected to said third arm 803 by pivot pin 825. Said stabilizer link is rotatably connected to said rigid frame 807 by pivot pin 828. Said floating lever 806 is rotatably connected to said third connecting link and to said stabilizer link by pivot pin 824. Advantageously, at state I said shaft 814 and said third arm 803 are located with respect to said shafts 815 and 816 such that said third connecting link 826 makes a 20–25 degree angle (angle B) with the reference line t—t (at state I, reference line t—t intersects said pivot pin 825 and is perpendicular to said floating lever 806 and nearly parallel to said connecting links 804 and 805) and makes a 45 degree angle with said third arm 803, substantially as shown. Said stabilizer link is relatively long so that the trajectory of said pivot pin 824 is approximately rectilinear and generally along said reference line t—t, as shown. According to my calculations which are based on equilibrium equations and torque arms and angles which were measured directly from linkage diagrams for various linkage positions, when a constant input torque is applied to either said shaft 815 or 816, then the output torque produced at said shaft 814 is never more than about 10% below the input torque when B=20 degrees and never more than about 7% below the input torque when B=25 degrees for actuations along any actuation path and this includes actuations along actuation path A1. In my opinion, torque losses of this magnitude are negligible.

Many variations of said by-pass device are possible. A few of these are shown in FIG. 64–66. For example and as shown in FIG. 64, said by-pass device can be alternately constructed so that said shafts 814 and 815 are mounted in said rigid frame so as to be vertically in line or collinear which can help to make said universal trip valve operator more compact.

As shown in FIG. 65, the location of said controlled double acting actuator can be relocated to various points removed from said shaft 816 through the provision of an arm 830, which with said arm 803 forms a bell crank which is rotatably mounted to said rigid frame at 816-A, a connecting link 831, and a fourth arm 832 which is coupled to shaft 833. Said shaft 833 is rotatably mounted in said rigid frame. Said arms 830 and 832, said connecting link, and said rigid frame form a parallelogram four bar linkage. Said controlled double acting actuator couples to said shaft 833. By setting the angle between said arms 803 and 830 in said bell crank and by setting the distance between said shaft 833 and said bell crank rotation point 816-A, said controlled double acting actuator can be located at any point removed from 816-A without modification to said by-pass device. Said spring return actuator and multi-stage leverage device can be relocated with respect to said shaft 815 in the same manner. Also, said quarter turn valve can be relocated with respect to said shaft 814 in the same manner.

As shown in FIG. 66, said third arm 803 can be removed and a controlled double acting actuator with a rectilinear output, such as pneumatic cylinder 840 (shown schematically) can be connected directly to said pivot pin 824. The body of said pneumatic cylinder is rigidly mounted to said rigid frame and piston rod 841 is rotatably connected to said floating lever 806 by said pivot pin 824.

As shown in FIG. 67, said universal trip valve operator, including said by-pass device, and said quarter turn valve form a 'free handle manual reset valve' when a solenoid trip actuator, symbolically indicated as S/T - SOL, is included in said sensor and trip actuator section and said controlled double acting actuator is a manual lever handle, symbolically indicated as CDA-MLH. Said by-pass device which comprises said two degree of freedom linkage is symbolically indicated as BY-PASS.

It will be noted that if said sensor and other trip actuator section consists solely of said solenoid trip actuator then the logic means section LM could be omitted.

Such a combination satisfies the requirements for a free handle manual reset valve because:

(1) upon triggering and regardless of whether said controlled double acting actuator is restrained (for whatever reason) or not, said spring return actuator effects the actuation of said quarter turn valve to its returned position (from state I to state II along actuation path A) as said controlled double acting actuator is by-passed;

(2) Until all the conditions which caused actuation of said solenoid and consequent triggering are cleared, said quarter turn valve can not be reset as said trigger remains at its release position and therefore actuation from state III only results in actuation back to state II along actuation path B.

As another variation, it will be noted that said universal trip valve operator enables said controlled double acting actuator to be a manually operated geared down or wormed down double acting actuator (or other actuator which is inherently incapable of being reverse actuated from its output shaft) without the otherwise need for clutches or other disengaging devices because upon triggering and during actuation of said quarter turn valve from its reset position to its returned position by said spring return actuator (from state I to state II along actuation path A), said controlled double acting actuator is by-passed and does not need to be return actuated.

As shown in FIG. 68, when said controlled double acting actuator is a reversible electric gear motor (with limit switches for determining the reset and returned positions thereof) symbolically indicated as CDA-EGM, said sensors and trip actuators section includes solenoid trip actuator, symbolically indicated as S/T - SOL, having the electrical connections thereof connected to the power source for operating said reversible electric gear motor, then a failsafe spring return electric gear motor type valve operator results. Said by-pass device which comprises said two degree of freedom linkage is symbolically indicated as BY-PASS. It will be noted that if said sensor and other trip actuator section consists solely of said solenoid trip actuator then the logic means section LM could be omitted. Said universal trip valve operator enables said controlled double acting actuator to be an electrically powered gear motor (perhaps with a worm gear) type actuator without the otherwise need for clutches or other disengaging devices because upon triggering and during actuation of said quarter turn valve from its reset position to its returned position by said spring return actuator (from state I to state II along actuation path A), said controlled double acting actuator is by-passed and does not need to be return actuated.

It will be generally noted that said universal trip valve operator can be used to provide a more efficient spring returned valve operator because said controlled double acting actuator retensions said spring return actuator along actuation path B and actuates said quarter turn valve along actuation path C. Therefore, said controlled double acting actuator needs only to be sized to the spring return actuator load or the quarter turn valve load (which are approximately equal when said spring return actuator is loadmatched to said quarter turn valve load by said bias transmitting and transforming device) rather than said spring return actuator load plus said quarter turn valve load.

As another variation it will be noted that said universal trip valve operator can be used to provide a safety condition sensing override actuator for said controlled double acting actuator. By configuring said sensors and other trip actuators section and said logic means for sensing the appropriate safety conditions and operating said trigger, then said controlled double acting actuator will be overriden by the combination of said trigger, said multi-stage leverage device and said spring return actuator and said quarter turn valve will be actuated by said spring return actuator to the returned position due to the fact that along actuation path A said controlled double acting actuator is by-passed. In particular and as shown in FIG. 69, said sensor and trip actuator section includes a seismic sensor and transducer, symbolically indicated as S/T - SEISMIC, thereby resulting in a seismic sensitive valve in which said seismic sensor and trigger can override a controlled double acting actuator and actuate a quarter turn valve to the returned position thereof. Said seismic sensor and transducer, the trigger, the multi-stage leverage device, and the spring actuator would be the same as described in the fourth embodiment. Said controlled double acting actuator can be any of the double acting actuators previously referred to in this embodiment (e.g. various manual, pneumatic, or electrically powered actuators). Said by-pass device which comprises said two degree of freedom linkage is symbolically indicated as BY-PASS.

An alternate is shown in FIG. 70. By relocating said spring return actuator from the trigger control point (shaft 815) to the valve point (shaft 814) of said by-pass device so as to couple to said shaft 814 and said quarter turn valve as shown symbolically, then a universal trip valve operator with a cycling spring return can be provided. Said spring return actuator now cycles with each actuation of said quarter turn valve. This particular construction enables said spring return actuator to be controlled by said trigger and said multi-stage leverage device and to additionally function as a direct acting failsafe spring return actuator for those said double acting actuators which can be reverse driven from their output shaft (e.g. a pneumatic actuator). During actuation between states I and III, said controlled double acting actuator actuates both said quarter turn valve and said spring return actuator toward state I to their joint reset position and said spring return actuator causes actuation back to state III. Said trigger and said multi-stage leverage device are by-passed. If at any time power is lost to said controlled double acting actuator, then said spring return actuator causes actuation to state III at which said quarter turn valve is at its returned position. During actuation from state II to state III, said controlled double acting actuator only actuates said multi-stage leverage device to its reset position during which said quarter turn valve and said spring return actuator are by-passed. Upon triggering, actuation from state I to state II occurs in which said spring return actuator actuates said quarter turn valve to its returned position while said controlled double acting actuator is by-passed.

Another alternate is shown in FIG. 71 and illustrates a different type of two degree of freedom multi-bar pin joint linkage for implementing said by-pass device which does not use a floating lever. Said alternate two degree of freedom linkage comprises a five bar linkage generally indicated at 850 and third connecting link 856.

Said five bar linkage in turn is comprised of a rigid frame indicated as 855 at various places, first arm 851, second arm 852, first connecting link 853, and second connecting link 854. Said first and second arms are coupled to shafts 857 and 858, respectively. Said arms and links are rotatably connected by pivot pins 859, 860, and 861. Said third connecting link is rotatably connected to said five bar linkage through said pivot pin 861. Third arm 862 couples to shaft 863 and is rotatably connected to said third connecting link by pivot pin 864. Said shafts 857, 858, and 863 are rotatably mounted in said frame link. Multi-stage leverage device MSL and spring return actuator SRA couple to said shaft 863. Controlled double acting actuator CDA couples to said shaft 858. Quarter turn valve QTV couples to said shaft 857. Stops are not shown but act to limit each of said arms to a substantially quarter turn actuation stroke. States I, II, and III correspond to the same respective positions of said multi-stage leverage device and spring return actuator, said double acting actuator, and said quarter turn valve as previously described (i.e. at state I these respective positions are MSL & SRA - reset, CDA - reset, and QTV - reset; at state II these respective positions are MSL & SRA - returned, CDA - reset, QTV - returned; at state III these respective positions are MSL & SRA - reset, CDA - returned, QTV - returned). Said alternate by-pass device provides the same by-pass functions as the by-pass device originally described in the sixth embodiment, but does so without a floating lever.

Another alternate is shown in FIG. 72 which illustrates a universal trip valve operator incorporating a by-pass device comprising a three degree of freedom linkage generally indicated at 870 for enabling three actuators, specifically a first controlled double acting actuator CDA-1, a second controlled double acting actuator CDA-2, and the combination of a multi-stage leverage device MSL and spring return actuator SRA to independently control a quarter turn valve. Said three degree of freedom linkage can be formed by concatenating or training together two previously described two degree of freedom linkages generally indicated at 880 and 890. In the first said two degree of freedom linkage 880 shaft 881 couples to said quarter turn valve and couples to first arm 886. Said first arm connects to first floating lever 889 through connecting link 884 and pin joints as shown. Shaft 882 couples to said first controlled double acting actuator CDA-1 and couples to second arm 887. Said second arm thence connects to said first floating lever through a pin joint as shown. In the second said two degree of freedom linkage 890 shaft 891 couples to second controlled double acting actuator CDA-2 and couples to third arm 894. Said third arm thence connects to second floating lever 896 through a pin joint as shown. Shaft 892 couples to spring return actuator SRA and multi-stage leverage device MSL and couples to fourth arm 895. Said fourth arm thence connects to said second floating lever through connecting link 898 and pin joints as shown. Said first and second floating levers are connected by connecting link 899 and pin joints as shown. Said multi-stage leverage device can be engaged by trigger TRG which thence connects to logic means LM and various sensors other trip actuators S/T. Upon triggering, said spring return actuator by-passes both said controlled double acting actuators to actuate (from state I to state II along actuation path A) said quarter turn valve to the returned position. Either said first controlled double acting actuator (actuation path B to state III) or said second controlled double acting actuator (actuation path D to state IV) can be used to retension said spring return actuator and reset said multi-stage leverage device. State IV is similar to state III in that said multi-stage leverage device and said spring return actuator are at their joint reset position and said quarter turn valve is at its returned position. At state III said first controlled double acting actuator is at its returned position while said second controlled double acting actuator remains at its reset position. At state IV said first controlled double acting actuator remains at its reset position and said second controlled double acting actuator is at its returned position. As before, actuation on to state I can only occur if said trigger re-engages said multi-stage leverage device. Otherwise, reverse actuation of whichever said controlled double acting actuator was used to reach either state III or state IV results in actuation back to state II. From state III and assuming that said trigger re-engages said multi-stage leverage device, said first controlled double acting actuator can actuate (along actuation path C) said quarter turn valve back to its reset position. Or if said second controlled double acting actuator was used to reach state IV, then said second controlled double acting actuator can be used to actuate (along actuation path E) said quarter turn valve back to its reset position. Said first and second controlled double acting actuators can be configured in a number of advantageous ways with the combination of said spring return actuator, said multi-stage leverage device and said trigger being able to by-pass and override either of said controlled double acting actuators to actuate said quarter turn valve to its returned position. For example:

(1) Said second controlled double acting could be a redundant backup actuator for said first controlled double acting actuator in a critical fluid power or fluid handling application.

(2) Said first controlled double acting actuator could be a powered actuator (e.g. electric, pneumatic, etc.) under the control of, for example, a process control system while said second controlled double acting actuator could be a manually operated actuator (e.g. a worm gear or a lever handle perhaps with positioning detents) for enabling personnel to manually operate said quarter turn valve as needed.

(3) Said second controlled double acting actuator could be a simple 'ON - OFF' actuator for actuating said quarter turn valve between its reset and returned positions without the ability to stop at an intermediate position and which is used to reset said multi-stage leverage device and said spring return actuator, to reset said quarter turn valve, and to 'ON - OFF' actuate said quarter turn valve. Said first controlled double acting actuator could be a servo-actuator used to operate along actuation path C for positioning said quarter turn valve at various intermediate positions between its reset and returned positions perhaps in a throttling application. Said first controlled double acting actuator could comprise, for example, a servo-hydraulic actuator, or a servo-motor and gearbox, or perhaps a stepping motor and gearbox.

It will be noted that three or more two degree of freedom linkages could be concatenated in the manner described above to form a four or more degree of freedom multi-bar pin joint linkage for said by-pass device which would then allow four (e.g. three controlled double acting actuators and one combination spring return actuator, multi-stage leverage device and trigger) or more actuators to control said quarter turn valve. It will be apparent that in general an n degree of freedom by-pass device enables n actuators to control said quarter turn valve (where n is a whole number).

It will be seen that the objectives of the invention have been met and the problems of the prior art overcome.

Since many alternatives to and variations in the above embodiments are possible without departing from the scope of the invention, it is intended that the above descriptions and drawings, which contain many specific features, should be interpreted in an illustrative sense and should not be construed as limiting the scope of the invention. Accordingly, the scope of the invention should not be determined from the above descriptions and drawings, but from the following claims and their legal equivalents.

I claim:

1. A universal trip valve operator for operating a quarter turn valve between a reset position and a returned position, comprising:
   (A) return actuating means which interconnect with a quarter turn valve and which are for actuating said quarter turn valve from a reset position to a returned position;
   (B) triggering means;
   (C) multiple stage of leverage means for reducing the load on said triggering means which provide at least two stages of leverage at the reset position thereof, namely:
   (1) a first stage of leverage means for reducing the load on said triggering means; and,
   (2) a second stage of leverage means for reducing the load on said triggering means; wherein:
   (3) said first stage of leverage means comprise a first lever which is rotatably mounted with respect to a support structure;
   (4) said second stage of leverage means connect to said first lever through pivotal connecting means, thereby minimizing the frictional torque arm between said second stage of leverage means and said first stage of leverage means;
   (5) said second stage of leverage means comprise guiding means for guiding said second stage of leverage means, in coordination with said first stage of leverage, during actuation between the reset position and the returned position thereof thereby making said first stage of leverage means and second stage of leverage means single action resettable;
   (6) at the reset position thereof, said second stage of leverage means intrinsically generate a force which biases said second stage of leverage means toward the returned position thereof thereby tending to cause the release of said second stage of leverage means upon triggering;
   (7) said triggering means interact with and releasably maintain said multiple stage of leverage means at the reset position thereof; said multiple stage of leverage means thence interconnect with said return actuating means and are able to restrain said return actuating means at the reset position thereof.

2. A universal trip valve operator as described in claim 1 wherein said first stage of leverage means has a connection point which is capable of actuating through at least substantially a quarter turn and which interconnects with said return actuating means.

3. A universal trip valve operator as described in claim 1 wherein said second stage of leverage means comprise a second lever having means defining a long arm and a short arm; said second lever is pivotally mounted to said first lever; said triggering means interact with said long arm to releasably restrain said second stage of leverage means.

4. A universal trip valve operator as described in claim 1 wherein said second stage of leverage means comprise a second lever which is pivotally mounted to said support structure and which connects to said first lever through a connecting link and pivotal connecting means, said first stage of leverage means and said second stage of leverage means thereby comprising a four bar linkage.

5. A universal trip valve operator as described in claim 1 additionally comprising by-pass means that provide a trigger control point, a controlled actuator control point, and a valve point; said by-pass means interconnect said multiple stage of leverage means, said return actuating means, and said quarter turn valve; said multiple stage of leverage means connect to said trigger control point and said quarter turn valve connects to said valve point.

6. A universal trip valve operator for operating a quarter turn valve between a reset position and a returned position, comprising:
   (A) return actuating means which interconnect with a quarter turn valve and which are for actuating said quarter turn valve from a reset position to a returned position;
   (B) triggering means;
   (C) multiple stage of leverage means for reducing the load on said triggering means and providing at least three stages of leverage at the reset position thereof, namely:
   (1) a first stage of leverage means for reducing the load on said triggering means;
   (2) a second stage of leverage means for reducing the load on said triggering means; and,
   (3) a third stage of leverage means for reducing the load on said triggering means; wherein:
   (4) said first stage of leverage means comprise a first lever which is rotatably mounted with respect to a support structure;
   (5) said second stage of leverage means connect to said first lever through pivotal connecting means, thereby minimizing the frictional torque arm between said second stage of leverage means and said first stage of leverage means;
   (6) said second stage of leverage means comprise guiding means for guiding said second stage of leverage means, in coordination with said first stage of leverage means, during actuation between the reset position and the returned position thereof thereby making said first stage of leverage means and second stage of leverage means single action resettable;
   (7) additionally comprising third stage resetting means for resetting said third stage of leverage means from said second stage of leverage means, said first, second and third stage of leverage means thereby being single action resettable;
   (8) said triggering means interact with and releasably maintain said multiple stage of leverage means at the reset position thereof; said multiple stage of leverage means thence interconnect with said return actuating means and are able to restrain said return actuating means at the reset position thereof.

7. A universal trip valve operator as described in claim 6 wherein said first stage of leverage means has a connection point which is capable of actuating through at least substantially a quarter turn and which interconnects with said return actuating means.

8. A universal trip valve operator as described in claim 6 wherein said second stage of leverage means comprise a second lever having means defining a second stage long arm and a second stage short arm; said second lever is pivotally mounted to said first lever; said third stage of leverage means comprise a leveraging release lever which engages said second stage long arm to releasably restrain said second lever at the reset position thereof; said leveraging release lever is pivotally mounted and comprises a third stage first arm, a third stage second arm, engaging means for resetting said leveraging release lever from said second stage of leverage means, and means for positioning said leveraging release lever at a returned position, wherein said third stage first arm is longer than said third stage second arm and said third stage second arm comprises a land having a contact area thereon which lies in a predominantly radial direction with respect to the axis of rotation of said leveraging release lever.

9. A universal trip valve operator as described in claim 6 wherein:
said second stage of leverage means comprise a second lever which is pivotally mounted to said support structure and which connects to said first lever through a connecting link and pivotal connecting means, said first stage of leverage means and said second stage of leverage means thereby comprising a first four bar linkage;
said third stage of leverage means comprise a third lever which is pivotally mounted to said support structure and which connects to said second lever through a connecting link and pivotal connecting means, said second stage of leverage means and said third stage of leverage means thereby comprising a second four bar linkage which is concatenated onto said first four bar linkage.

10. A universal trip valve operator as described in claim 6 wherein:
said triggering means comprise a movably mounted trigger element which is actuatable from a hold position to a release position; and,
seismic motion responsive means for actuating said trigger element from said hold position to said release position.

11. A universal trip valve operator for operating a quarter turn valve between a reset position and a returned position, comprising:
(A) return actuating means which interconnect with a quarter turn valve and which are for actuating said quarter turn valve from a reset position to a returned position;
(B) triggering means;
(C) multiple stage of leverage means for reducing the load on said triggering means, providing at least two stages of leverage at the reset position thereof, namely and comprising:
(1) a first stage of leverage means for reducing the load on said triggering means which comprises a leveraging release lever;

(2) a second stage of leverage means for reducing the load on said triggering means which comprise a rotatably mounted lever and which is interconnected between said first stage of leverage means and said return actuating means; and,
(3) engaging means for resetting said leveraging release lever from said second stage of leverage means;
(4) means for positioning said leveraging release lever at a returned position;
(5) said leveraging release lever is pivotally mounted and comprises a first arm and a second arm; wherein:
 (a) said first arm is longer than said second arm;
 (b) said second arm comprises a land having a contact area thereon which lies in a predominantly radial direction or faces in a predominantly tangential direction with respect to the axis of rotation of said leveraging release lever, whereby any frictional torque arm generated by said land is less than the relatively short torque arm associated with said land which is for reducing the load on said triggering means and which produces a releasing torque;
(6) at the reset position of said multiple stage of leverage means:
 (a) said second stage of leverage means contacts said land at the contact area thereof and is releasably restrained therethrough; and,
 (b) said triggering means interact with and releasably restrain said first arm of said leveraging release lever at the reset position thereof;
(7) said engaging means comprise a first engaging member which is mounted to said second stage of leverage means and a second engaging member which is mounted to said leveraging release lever wherein, as said second stage of leverage means approaches the reset position thereof said first engaging member engages said second engaging member and actuates said leveraging release lever from the returned position thereof to the reset position thereof.

12. A universal trip valve operator as described in claim 11 wherein said contact area of said land lies in a substantially radial direction or faces in a substantially tangential direction with respect to the axis of rotation of said leveraging release lever, whereby substantially no frictional torque arm is generated by said land.

13. A universal trip valve operator as described in claim 11 wherein said multiple stage of leverage means further comprise a third stage of leverage means which is interconnected between said second stage of leverage means and said return actuating means thereby providing at least three stages of leverage for reducing the load on said triggering means at the reset position thereof; said third stage of leverage means and said second stage of leverage means comprise a mechanism of a pivotally connected multiple bar construction.

14. A universal trip valve operator for operating a quarter turn valve between a reset position and a returned position, comprising:
(A) return actuating means which interconnect with a quarter turn valve and are for actuating said quarter turn valve from a reset position to a returned position; said return actuating means are mounted to a support structure which in turn is rigidly connected to the body of said quarter turn valve;

(B) triggering means;
(C) multiple stage of leverage means for reducing the load on said triggering means which provide at least two stages of leverage at the reset position thereof, namely:
  (1) a first stage of leverage means for reducing the load on said triggering means; and,
  (2) a second stage of leverage means for reducing the load on said triggering means;
(D) by-pass means which comprise a multiple bar linkage and which provide at least two degrees of freedom thereby providing at least two control points and a load point; said by-pass means are mounted to said support structure; said quarter turn valve connects with said by-pass means through said load point;
(E) said multiple stage of leverage means are mounted to said support structure and connect to one of said control points of said by-pass means, hereinafter referred to as the trigger control point; said triggering means interact with and releasably maintain said multiple stage of leverage means at the reset position thereof; said multiple stage of leverage means thence interconnect with said return actuating means and are able to restrain said return actuating means at the reset position thereof.

15. A universal trip valve operator as described in claim 14 wherein said return actuating means connect to said trigger control point along with said multiple stage of leverage means thereby forming a valve operator in which said return actuating means do not cycle with actuations of said quarter turn valve from the second said control point.

16. A universal trip valve operator as described in claim 14 wherein said return actuating means connect to said load point along with said quarter turn valve thereby forming a valve operator in which said return actuating means cycle with actuations of said quarter turn valve from the second said control point.

17. A universal trip valve operator for operating a quarter turn valve between a reset position and a returned position, comprising:
(A) return actuating means which interconnect with a quarter turn valve and are for actuating said quarter turn valve from a reset position to a returned position; said return actuating means are mounted to a support structure which in turn is rigidly connected to the body of said quarter turn valve;
(B) triggering means;
(C) multiple stage of leverage means for reducing the load on said triggering means which provide at least two stages of leverage at the reset position thereof, namely:
  (1) a first stage of leverage means; and,
  (2) a second stage of leverage means;
(D) by-pass means which comprise a floating lever and which provide at least two degrees of freedom thereby providing at least two control points and a load point; said by-pass means are mounted to said support structure; said quarter turn valve connects with said by-pass means through said load point;
(E) said multiple stage of leverage means are mounted to said support structure and connect to one of said control points of said by-pass means hereinafter referred to as the trigger control point; said triggering means interact with and releasably maintain said multiple stage of leverage means at the reset position thereof; said multiple stage of leverage means thence interconnect with said return actuating means and are able to restrain said return actuating means at the reset position thereof.

18. A universal trip valve operator as described in claim 17 wherein said return actuating means connect to said trigger control point along with said multiple stage of leverage means thereby forming a valve operator in which said return actuating means do not cycle with actuations of said quarter turn valve from the second said control point.

19. A universal trip valve operator as described in claim 17 wherein said multiple stage of leverage means for reducing the load on said triggering means comprises at least three stages of leverage.

20. A universal trip valve operator for operating a quarter turn valve between a reset position and a returned position, comprising:
(A) return actuating means which interconnect with a quarter turn valve and are for actuating said quarter turn valve from a reset position to a returned position, comprising:
  (1) spring actuating means; and,
  (2) bias transmitting and transforming means; said spring actuating means connect to said bias transmitting and transforming means which thence interconnect with said quarter turn valve; said bias transmitting and transforming means provide a varying leverage through which said spring actuating means act on said quarter turn valve, said varying leverage being greater at the returned position of said return actuating means than at the reset position thereof;
(B) triggering means;
(C) multiple stage of leverage means for reducing the load on said triggering means which provide at least two stages of leverage, namely:
  (1) a first stage of leverage means; and,
  (2) a second stage of leverage means;
(D) by-pass means which provide at least two control points and a load point; said quarter turn valve connects with said by-pass means through said load point;
(E) said multiple stage of leverage means connect to one of said control points of said by-pass means hereinafter referred to as the trigger control point; said triggering means interact with and releasably maintain said multiple stage of leverage means at the reset position thereof; said multiple stage of leverage means thence interconnect with said return actuating means and are able to restrain said return actuating means at the reset position thereof.

21. A universal trip valve operator as described in claim 20 wherein said return actuating means connect to said trigger control point of said by-pass means along with said multiple stage leverage means thereby forming a valve operator in which said return actuating means do not cycle with actuations of said quarter turn valve from the second said control point.

22. A universal trip valve operator as described in claim 21 wherein controlled actuating means connect to the second said control point of said by-pass means; said controlled actuating means comprise an electric gear motor; and said triggering means comprise a solenoid.

23. A triggerable device for controlling a load, comprising:
(A) a support structure;
(B) triggering means;

(C) leverage means for reducing the load on said triggering means and which are actuatable between a reset position and a returned position, comprising:
  (1) first lever means which is rotatably mounted to said support structure;
  (2) a second lever means which is mounted to said first lever means through a pivot connection;
  (3) force transmitting and guiding means for:
    (i) transmitting force between said second lever means and said support structure when said first and second lever means are at the reset position thereof; and,
    (ii) guiding said second lever means during actuation between the reset position and the returned position thereof, said leverage means thereby being single action resettable;
  (4) said second lever means has a first location which defines a first arm length from said pivot connection; said triggering means interact with said second lever means through said first location;
  (5) said force transmitting and guiding means act on said second lever means at a second location which defines a second arm length from said pivot connection;
  (6) said first arm length is longer than said second arm length thereby providing a reduced force load at said first location;
  (7) said force transmitting and guiding means interconnect said second location of said second lever means with said support structure such that the combined area of operation of said first lever means and said second arm length of said second lever means overlaps with the area of operation of said force transmitting and guiding means;
(D) said triggering means interact with said second lever means at said first location thereof to releasably maintain said leverage means at the reset position thereof.

24. A triggerable device as described in claim 23, wherein said second lever means and said force transmitting and guiding means enable said first lever means to actuate through at least substantially a quarter turn between the reset and returned positions thereof.

25. A triggerable device as described in claim 24, wherein said first arm length of said second lever means is oriented with respect to said second arm length such that the area of operation of said first arm length overlaps with the area of operation of said first lever means.

26. A triggerable device as described in claim 24, wherein said force transmitting and guiding means comprise connecting link means which connect to said second lever means at said second location through pivotal connecting means and which connect to said support structure through pivotal connecting means at a location within the area of operation of said first lever means.

27. A triggerable device as described in claim 24, wherein said force transmitting and guiding means comprise:
  a pin which is rigidly mounted to said second lever means at said second location; and,
  tracking means for said pin which comprise a slot in said support structure and which provides a fulcrum point and a guide path for said pin.

28. A triggerable device for controlling a load, comprising:
  (A) a support structure;
  (B) triggering means;
  (C) multiple stage of leverage means for reducing the load on said triggering means and which are actuatable between a reset position and a returned position, comprising at least two concatenated four bar linkages, namely a first four bar linkage and a second four bar linkage, wherein:
    (1) said first four bar linkage comprises said support structure, first lever means which are rotatably mounted to said support structure, second lever means which are rotatably mounted to said support structure and are for reducing the load on said triggering means, and a first connecting link which pivotally connects said first lever means with said second lever means;
    (2) said second four bar linkage comprises said support structure, said second lever means, third lever means which are rotatably mounted to said support structure and are for reducing the load on said triggering means, and a second connecting link which pivotally connects said second lever means with said third lever means;
    (3) said first lever means, said second lever means and said third lever means each actuate over at least substantially a quarter turn between the respective reset and returned positions thereof;
  (D) said triggering means interact with said third lever means to releasably maintain said multiple stage of leverage means at the reset position thereof.

29. A triggerable device as described in claim 28, wherein said multiple stage of leverage means for reducing the load on said triggering means and which are actuatable between a reset position and a returned position comprise at least three concatenated four bar linkages, including namely an additional third four bar linkage, wherein:
  (4) said third four bar linkage comprises said support structure, said third lever means, fourth lever means which are rotatably mounted to said support structure and are for reducing the load on said triggering means, and a third connecting link which pivotally connects said third lever means with said fourth lever means; said fourth lever means is actuatable over at least a quarter turn between the reset and returned positions thereof.
  said third lever means comprise an offset bell crank; said fourth lever means are located such that the operating area of said third four bar linkage overlaps the operating area of said first four bar linkage thereby establishing a helical stacking pattern of said concatenated four bar linkages.

30. A triggerable device as described in claim 28, wherein said first lever means pivotally connects to said first connecting link through means providing a first multiply interleaved clevis and clevis pin structure which produce at least four shear areas in said first clevis pin; said first connecting link pivotally connects to said second lever means through means providing a second multiply interleaved clevis and clevis pin structure which produce at least four shear areas in said second clevis pin; and, said second lever means rotatably connects to said support structure through means providing a third multiply interleaved clevis and clevis pin structure which produce at least four shear areas in said third clevis pin.

31. A triggerable device for controlling a load, comprising:
 (A) a support structure;
 (B) by-pass means which comprise a floating lever and which provide at least two degrees of freedom thereby providing at least two control points and a load point;
 (C) return actuating means which are mounted to said support structure;
 (D) triggering means;
 (E) multiple stage of leverage means for reducing the load on said triggering means and providing at least two stages of leverage at the reset position thereof, namely:
  (1) a first stage of leverage means; and,
  (2) a second stage of leverage means;
 said multiple stage of leverage means are mounted to said support structure and connect to one of said control points of said by-pass means, hereinafter referred to as the trigger control point;
 (F) said return actuating means connect to said trigger control point of said by-pass means along with said multiple stage of leverage means thereby forming a valve operator in which said return actuating means do not cycle with actuations of said load point from the second said control point; said triggering means interact with and releasably maintain said multiple stage of leverage means and thereby said return actuating means at the respective reset positions thereof.

32. A triggerable device as described in claim 31 wherein said return actuating means comprise:
 (1) spring actuating means; and,
 (2) bias transmitting and transforming means;
said spring actuating means connect to said bias transmitting and transforming means which thence interconnect with said trigger control point of said by-pass means; said bias transmitting and transforming means provide a varying leverage through which said spring actuating means act on said by-pass means and thence said load point, said varying leverage being greater at the returned position of said return actuating means than at the reset position thereof.

33. A vibration sensitive trip actuator which responds to seismic motion, comprising:
 (A) return actuating means for actuating a load device from a reset position to a returned position;
 (B) triggering means comprising:
  (1) a movably mounted trigger element which is actuatable between a hold position and a release position; and,
  (2) vibration sensing means which produce a displacement response when subjected to seismic ground motion, comprising:
   (a) a mass element;
   (b) a first spring restoring force means which provide an approximately linear restoring force to said mass element;
  (3) said vibration sensing means mechanically act on said trigger element to cause the actuation of said trigger element from the hold position to the release position thereof;
 (C) multiple stage of leverage means for reducing the load on said triggering means which provide at least two stages of leverage at the reset position thereof;
 (D) said triggering means interact with and releasably maintain said multiple stage of leverage means at the reset position thereof; said multiple stage of leverage means thence interconnect with said return actuating means and are able to restrain said return actuating means at the reset position thereof.

34. A vibration sensitive trip actuator for responding to seismic motion as described in claim 33 wherein said return actuating means connect with a quarter turn valve and are for actuating said quarter turn valve from a reset position to a returned position.

35. A vibration sensitive trip actuator which responds to seismic motion, comprising:
 (A) return actuating means for actuating a load device from a reset position to a returned position;
 (B) triggering means comprising:
  (1) a movably mounted trigger element which is actuatable from a hold position to a release position;
  (2) vibration sensing means which produce a displacement response when subjected to seismic ground motion, comprising:
   (a) a mass element;
   (b) a first restoring force means which provide an approximately linear restoring force to said mass element;
  (3) displaceable means which allow said vibration sensing means to mechanically act on said trigger element thereby enabling said vibration sensing means to cause the actuation of said trigger element from the hold position to the release position thereof; said displaceable means comprise:
   (a) a cam; and,
   (b) a follower;
 (C) multiple stage of leverage means for reducing the load on said triggering means which provide at least two stages of leverage at the reset position thereof;
 (D) said triggering means interact with and releasably maintain said multiple stage of leverage means at the reset position thereof; said multiple stage of leverage means thence interconnect with said return actuating means and are able to restrain said return actuating means at the reset position thereof.

36. A vibration sensitive trip actuator which responds to seismic motion, comprising:
 (A) by-pass means which provide at least two control points and a load point;
 (B) return actuating means which connect to said by-pass means and which are for actuating a load device that is connected to said load point;
 (C) triggering means;
 (D) vibration responsive means for actuating said triggering means from a hold position and a release position;
 (E) multiple stage of leverage means for reducing the load on said triggering means and providing at least two stages of leverage at the reset position thereof;
 (F) said multiple stage of leverage means connect to one of said control points of said by-pass means hereinafter referred to as the trigger control point; said triggering means interact with and releasably maintain said multiple stage of leverage means at the reset position thereof; said multiple stage of leverage means thence interconnect with said return actuating means and are able to restrain said return actuating means at the reset position thereof.

37. A vibration responsive device for detecting seismic motion, comprising:

(A) horizontally omnidirectional vibration sensing means, comprising:
  (1) a mass element movable in any horizontal direction thereby having at least two degrees of freedom;
  (2) a horizontally omnidirectional restoring force means, comprising a spring network, which are connected between said mass element and a support structure, and which define an equilibrium position of said mass element; said spring network comprises a plurality of spring elements each having a respective force axis that lies in a predominantly horizontal direction;
(B) horizontally omnidirectional transducing means which convert a radial displacement of said mass element from the equilibrium position in any horizontal direction into a vertical displacement;
(C) motion receiving means having two discrete states and a transition therebetween;
(D) said vibration sensing means connect with said transducing means which thence connect with said motion receiving means;
and, wherein:
  (3) the natural frequency of said vibration sensing means is less than 10 hz. thereby falling in the frequency range of seismic ground motion.

38. A vibration responsive device for detecting seismic motion, comprising:
(A) horizontally omnidirectional vibration sensing means, comprising:
  (1) a support structure providing a substantially horizontal base;
  (2) a mass element movable in any horizontal direction thereby having at least two degrees of freedom;
  (3) friction reducing means for omnidirectionally reducing the weight generated friction of said mass element, comprising:
    (a) at least three rolling elements acting between said mass element and said base;
    (b) alignment preserving means for maintaining the alignment of said rolling elements with respect to said mass element and said support structure thereby preventing misalignment owing to, for example, the vertical separation of said mass element from said rolling elements;
(B) motion receiving means which respond to the output response motion of said vibration sensing means.

39. A vibration responsive device for detecting seismic motion, comprising:
(A) horizontally omnidirectional vibration sensing means comprising:
  (1) a support structure providing a substantially flat and horizontal base;
  (2) a mass element which is in slidable contact with said base and is movable in any horizontal direction thereby having at least two degrees of freedom;
  (3) pretensioned spring network means comprising a plurality of pretensioned spring elements that are connected between said mass element and said support structure such that the respective output force axes of said spring elements have a vertical elevation angle with respect to said horizontal base; said pretensioned spring network means define an equilibrium position of said mass element, provide a horizontally omnidirectional restoring force, and provide a lifting force for lifting a fraction of the weight of said mass element and partially reducing the amount of weight of said mass element that acts against said horizontal base thereby reducing the weight generated friction of said mass element and also providing some sliding friction damping for switching the response of said vibration sensing means;
(B) motion receiving means having two discrete states and a transition therebetween; said vibration sensing means mechanically act on and are for actuating said motion receiving means; and, wherein:
  (i) the resonant frequency of said vibration sensing means is less than 10 hz. thereby falling in the frequency range of seismic ground motion.

40. A vibration responsive device for detecting seismic motion, comprising:
(A) horizontally omnidirectional vibration sensing means, comprising:
  (1) a mass element;
  (2) a spring restoring force means which are connected between said mass element and a support structure and which provide a horizontally omnidirectional restoring force to said mass element of approximately linear character at least for small deflections;
(B) horizontally omnidirectional transducing means which convert a radial displacement of said mass element from the equilibrium position thereof in any horizontal direction therefrom into a vertical displacement, comprising:
  (1) a conically symmetric cam having a gradient;
  (2) a follower;
(C) motion receiving means;
(D) said vibration sensing means connect with said transducing means which thence connect with said motion receiving means;
and, wherein:
  (4) the natural frequency of said vibration sensing means is less than 10 hz. thereby falling in the frequency range of seismic ground motion.

41. A vibration responsive device for detecting seismic motion, comprising:
(A) vibration sensing means which provide an actuating output response that is:
  (a) switched; and,
  (b) resonantly amplified; comprising:
    (1) a mass element;
    (2) a restoring force means which are of approximately linear character and which are connected between said mass element and a support structure;
    (3) sliding friction damping means which connect to said mass element and which comprise sliding elements and forcing means for producing a normal force component between said sliding elements;
(B) motion receiving means having two discrete states and a transition therebetween; said vibration sensing means mechanically act on and are for actuating said motion receiving means; and, wherein:
  (4) the natural frequency of said vibration sensing means is less than 5 hz. thereby falling in the frequency range of seismic ground motion where significant amplification and displacement amplitude occur;

(5) the amount of linear damping in said vibration sensing means is less than 20% of critical damping thereby providing a seismic motion linear amplification factor which is greater than 1;

(6) said sliding friction damping means are for switching the response of said vibration sensing means;

(7) said transition of said motion receiving means corresponds to a response displacement, $S_R$, of said mass element which is amplified with respect to the maximum forcing displacement of said support structure, S. . , at the natural frequency of said vibration sensing means when said vibration sensing means are forced by seismic motion;

(8) said transition of said motion receiving means additionally corresponds to a maximum acceleration of said support structure or ground acceleration setpoint, S. . , that is at least 0.08 g. when said vibration sensing means are forced by seismic motion;

(9) said response displacement, S. , is at least 0.125 inch.

42. A vibration sensitive trip actuator which responds to seismic motion as defined in claim 35 wherein said load device comprises a quarter turn valve; said first restoring force means comprise a horizontally omnidirectional spring network; and, said displaceable means are horizontally omnidirectional and convert a radial displacement of said mass element from the equilibrium position thereof in any horizontal direction therefrom into a vertical displacement; said cam is conically symmetric.

43. A vibration sensitive trip actuator which responds to seismic motion as defined in claim 36 wherein said load device comprises a quarter turn valve; and, said by-pass means comprise a multiple bar linkage having at least two degrees of freedom.

44. A vibration responsive device for detecting seismic motion as defined in claim 37 wherein said spring network comprises at least three pretensioned extension springs of substantially equal spring rate which are radially oriented and angularly equally spaced at said equilibrium position.

45. A vibration responsive device for detecting seismic motion as defined in claim 38 wherein said rolling elements are bearing balls;

said alignment preserving means additionally are for providing a horizontal omnidirecitonal restoring force to said mass element and comprise:

1) a spring network connected between said mass element and said support structure;

2) a cage which rollably retains said bearing balls in fixed relation to each other;

3) said cage connects to said spring network at the center locations therein which move with two degrees of freedom and are displaced one half as much as said mass element;

said motion receiving means have two discrete states and a transition therebetween; and further wherein, the natural frequency of said vibration sensing means is less than 10 hz. thereby falling in the frequency range of seismic ground motion.

46. A vibration responsive device for detecting seismic motion as defined in claim 40 wherein said motion receiving means have two discrete states and a transition therebetween; said spring restoring force means comprise a spring network; the amount of linear damping in said vibration sensing means is less than 20% of critical damping thereby providing a seismic motion linear amplification factor which is greater than 1; said transition of said motion receiving means corresponds to a response displacement, $S_R$, of said mass element which is amplified with respect to the maximum forcing displacement of said support structure, $S_{GD}$, at the natural frequency of said vibration sensing means when said vibration sensing means are forced by seismic motion; said horizontal omnidirectional transducing means provide a mechanical advantage for swapping the amplified response displacement of said mass element for higher levels of force delivered to said motion receiving means.

47. A vibration responsive device for detecting seismic motion as defined in claim 41 wherein said restoring force means are spring restoring force means; and, forcing means for producing a normal force between said sliding elements comprise a spring, whereby said normal force and hence the sliding friction force are substantially unaffected by seismic motion.

48. A vibration responsive device for detecting seismic motion as defined in claim 47 wherein said sliding friction damping means include means for defining a maximum response amplitude over which sliding friction damping forces are generated which is less than the response displacement setpoint, $S_R$, thereby providing a higher degree of amplification at said response displacement setpoint, wherein said sliding elements comprise:

a raised surface of height H; and, plunger means which make contact with said raised surface at the equilibrium position thereof;

said plunger means are able to actuatably extend a further distance T relative to the extension thereof at the equilbrium position; said distance T is less than said height H; said raised surface extends a distance R from the equilibrium position, R being less than $S_R$, thereby defining a maximum response amplitude over which said plunger and said raised surface generate a sliding friction damping force.

49. A vibration responsive device for detecting seismic motion as defined in claim 48 wherein said sliding friction damping means additionally provide a holding restoring force for further shifting the switching of the response of said vibration sensing means, further comprising a sloped depression in said raised surface and against which said plunger is pressed by said forcing means for producing a normal force.

* * * * *

UNITED STATES PATENT AND TRADEMARK OFFICE
CERTIFICATE OF CORRECTION

PATENT NO. : 5,048,552  
DATED : Sep. 17, 1991  
INVENTOR(S) : Douglas A. Bourne Page 1 of 5

It is certified that error appears in the above-identified patent and that said Letters Patent is hereby corrected as shown below:

Title Page under References Cited, page 2, col. 2, line 4, change "Flaviani" to -Flauiani-;

Col. 18, line 29, change "requireing" to -requiring-;

Col. 24, line 53, change "Lig" to -L1g-;

Col. 24, line 55, change "Rig" to -R1g-;

Col. 26, line 15, change " $\sqrt{2(\overline{L1g})}$ " to - $\sqrt{2}(L1g)$ -;

Col. 35, line 8, change "561" to -56I-;

Col. 37, line 26, change "$A2 \sim Rp_2$" to -$A2 \sim Rp_2^2$-;

Col. 37, line 54, change "Lig" to -L1g-;

Col. 37, line 56, change "Lig" to -L1g-;

Col. 37, line 61, change "Lig" to -L1g-;

Col. 48, line 58, between "voltage" and "applied" insert -is-;

Col. 51, line 50, change " $10^{1/2 \cong 3.2}$ " to - $10^{1/2} \cong 3.2$ -;

Col. 55, line 14, change "Lia" to -L1a-;

Col. 55, line 17, change "Rig" to -R1g-;

Col. 55, line 18, change "Rig" to -R1g-;

Col. 55, line 19, change "Lia" to -L1a-;

UNITED STATES PATENT AND TRADEMARK OFFICE
CERTIFICATE OF CORRECTION

PATENT NO. : 5,048,552
DATED : Sep. 17, 1991
INVENTOR(S) : Douglas A. Bourne

It is certified that error appears in the above-identified patent and that said Letters Patent is hereby corrected as shown below:

Col. 55, line 26, change "Rig" to $-R1g-$;

Col. 67, line 27, change "$Ns_1 \sim S^{1/2}$" to $-Ns_2 \sim S^{1/2}-$;

Col. 67, line 47, the exponent "5/8" is illegible, make the eqn. read $- R3s \sim Rp_2 \sim S^{5/8} -$;

Col. 75, line 58, change " $M\ _a + 1.5\ (K + P/L)\ x = 0$ " to $- M\ \ddot{x}_a + 1.5\ (K + P/L)\ x = 0 -$;

Col. 75, line 60, change " $M\ _a + 1.5\ (K + P/L)\ y = 0$ " to $- M\ \ddot{y}_a + 1.5\ (K + P/L)\ y = 0 -$;

Col. 75, line 65, before "-absolute" change " $_a$ " to $-\ddot{x}_a-$;

Col. 76, line 1, before "-absolute" change " $_a$ " to $-\ddot{y}_a-$;

Col. 80, line 14, change " $_9 = F_f /M$" to $-\ddot{X}_9 = F_f /M-$;

Col. 81, line 2, change "$\phi_e$" to $-J_e-$ so that the eqn. reads $- A_{se} = 1/(2.1\ J_e + .295) -$;

Col. 81, line 3, change "$\phi_e$" to $-J_e-$ and change "$\phi_\ell$" to $-J_\ell-$ so that the eqn. reads $- 2\ J_e = 4F_f /\pi K_r X + 2\ J_\ell -$;

Col. 81, line 9, change "$\phi_\ell$" to $-J_\ell-$ so that the eqn. reads $- A_{s\ell} = 1/(2.1\ J_\ell + .295) -$;

UNITED STATES PATENT AND TRADEMARK OFFICE
CERTIFICATE OF CORRECTION

PATENT NO. : 5,048,552
DATED : Sep. 17, 1991
INVENTOR(S) : Douglas A. Bourne

It is certified that error appears in the above-identified patent and that said Letters Patent is hereby corrected as shown below:

Col. 81, line 23, change "$\ddot{g}_{max} = F_f/M$" to $-\ddot{X}_{gmax} = F_f/M$ -;

Col. 81, line 53, change "$X_{gmax} = w_o^2 X_{gmax}$" to $-\ddot{X}_{gmax} = w_o^2 X_{gmax}$ -;

Col. 89, line 29, change "$F_a = cx$" to $-F_a = c\dot{x}$ -;

Col. 89, line 34, insert an integral sign after "4" so that the eqn. reads $- \Delta U_a = 4 \int_0^R F_a \, dx$ -;

Col. 89, line 37, "$w_f t$" is not clear, make the line read
$- x = X \sin(w_f t - \phi)$ -;

Col. 89, line 38, "$w_f t$" is not clear, make the line read
$- (F_a/cw_f) = X \cos(w_f t - \phi)$ -;

Col. 89, line 42, insert an integral sign after "$4cw_f$" so that the eqn. reads $- \Delta U_a = 4cw_f \int_0^R (X^2 - x^2)^{1/2} dx$ -;

Col. 90, line 8, insert space between the eqn. "$X_{max} = \frac{1}{2}[A_{s\ell} X_{gmax}]$" and the label of said eqn's. plot "(curve F)";

Col. 90, line 13, insert space between the eqn. "$X_{max} = A_{s\ell} (X_{gmax} - S_{SD})$" and the label of said eqn's. plot "(curve B)";

Col. 90, line 35, change "f<1" to -f>1-;

UNITED STATES PATENT AND TRADEMARK OFFICE
CERTIFICATE OF CORRECTION

PATENT NO. : 5,048,552

DATED : Sep. 17, 1991

INVENTOR(S) : Douglas A. Bourne

Page 4 of 5

It is certified that error appears in the above-identified patent and that said Letters Patent is hereby corrected as shown below:

Col. 93, line 14, change "$\phi$" to -$\mathcal{J}$- so that the eqn. reads $$- X/X_g = r_e^2 / \sqrt{(1 - r_e^2)^2 + (2\mathcal{J}r_e)^2} \; -;$$

Col. 93, line 27, change "½ $\phi$" to -$1/2\mathcal{J}$- so that the eqn. reads $$- X = \sqrt{(1/2\mathcal{J})^2 (X_g^2 - (2X_B)^2) + X_B^2} - X_B \; -;$$

Col. 104, line 59, in the mathamatical expression "90 - x" change "90" from bold type to ordinary type;

Col. 111, line 48, after "stage of leverage" and before the comma insert -means-;

Col. 122, line 42, change index numeral "(4)" to -(3)-;

Col. 123, line 16, after "support structure, change "S.." to - $S_{GD}$ -;

Col. 123, line 23, after "acceleration setpoint" change "S.." to - $S_{GA}$ -;

Col. 123, line 26, after "response displacement" change "S." to - $S_R$ -;

Col. 123, line 54, (printed line nos. are off), after "providing a horizontal" change "omnidirecitonal" to -omnidirectional-;

UNITED STATES PATENT AND TRADEMARK OFFICE
CERTIFICATE OF CORRECTION

PATENT NO. : 5,048,552
DATED : Sep. 17, 1991
INVENTOR(S) : Douglas A. Bourne

It is certified that error appears in the above-identified patent and that said Letters Patent is hereby corrected as shown below:

Col. 12, line 3, change " minimumm " to - minimum -;

Col. 63, line 68, after " R4s = 0.375 " delete the comma "," and change the first "and" to - in., -;

Col. 92, line 49, change "556" to -667-;

Col. 92, line 55, change "556" to -667-;

Col. 118, line 47, at the end of the line after "positions thereof" change the period "." to a comma -,-;

Col. 120, line 53, after "hold position and" and before "a release" insert -to-.

Signed and Sealed this

Thirteenth Day of April, 1993

Attest:

STEPHEN G. KUNIN

*Attesting Officer*  *Acting Commissioner of Patents and Trademarks*